(12) United States Patent
Thompson

(10) Patent No.: US 12,531,741 B1
(45) Date of Patent: Jan. 20, 2026

(54) SYSTEMS AND METHODS FOR SECURE VOTING WITH ZERO-KNOWLEDGE PROOFS AND TOKENS

(71) Applicant: AS0001, Inc., Carmel, IN (US)

(72) Inventor: Jonathan J. Thompson, Carmel, IN (US)

(73) Assignee: AS0001, Inc., Carmel, IN (US)

( * ) Notice: Subject to any disclaimer, the term of this patent is extended or adjusted under 35 U.S.C. 154(b) by 0 days.

(21) Appl. No.: 19/331,890

(22) Filed: Sep. 17, 2025

Related U.S. Application Data

(60) Provisional application No. 63/697,087, filed on Sep. 20, 2024.

(51) Int. Cl.
| | |
|---|---|
| *H04L 29/06* | (2006.01) |
| *G06F 21/64* | (2013.01) |
| *H04L 9/32* | (2006.01) |

(52) U.S. Cl.
CPC ............ *H04L 9/3218* (2013.01); *G06F 21/64* (2013.01); *H04L 9/3213* (2013.01)

(58) Field of Classification Search
CPC ...... H04L 9/3218; H04L 9/3213; G06F 21/64
See application file for complete search history.

(56) References Cited

U.S. PATENT DOCUMENTS

| | | | |
|---|---|---|---|
| 11,488,434 B1* | 11/2022 | Zuevsky | H04L 9/3239 |
| 2017/0257364 A1* | 9/2017 | Ligatti | G06F 21/6281 |
| 2020/0258338 A1* | 8/2020 | Goswami | H04L 63/12 |
| 2022/0141020 A1* | 5/2022 | Jang | H04L 9/3247 |
| | | | 713/168 |
| 2023/0282052 A1* | 9/2023 | Ren | H04L 9/3252 |
| | | | 235/54 R |
| 2025/0158810 A1* | 5/2025 | Ranellucci | H04L 9/3247 |

* cited by examiner

*Primary Examiner* — Harunur Rashid
(74) *Attorney, Agent, or Firm* — Foley & Lardner LLP

(57) ABSTRACT

Systems, methods, and computer-readable storage media for protecting data. A data protection system can include one or more processing circuits including memory and at least one processor configured to register an entity or user for voting based on issuing an eligibility token corresponding with the entity or user, receive, responsive to registering, a casting token including a vote of the entity or user and a confirmation token including a cryptographic proof of receipt of the casting token, encrypt the vote of the entity or user for inclusion in a vote count, verify the casting token using a proof model and the confirmation token based on generating an inclusion token including a cryptographic proof of inclusion of the vote in the vote count, and issue a certification token corresponding with verifying the casting token, the certification token including a cryptographic proof of an integrity of the vote count.

20 Claims, 31 Drawing Sheets

SYSTEMS AND METHODS FOR SECURE VOTING WITH ZERO-KNOWLEDGE PROOFS AND TOKENS

CROSS-REFERENCE TO RELATED PATENT APPLICATIONS

This application claims the benefit of U.S. Provisional Application No. 63/697,087, filed Sep. 20, 2024, which is incorporated herein by reference in its entirety and for all purposes.

BACKGROUND

The present disclosure relates generally to computer security architecture and software for information security and cybersecurity. In networked environments for electronic voting, data from entities or users can include sensitive data, and entities or users can desire to protect such data.

SUMMARY

Some implementations relate to a data protection system. The data protection system can include one or more processing circuits including memory and at least one processor configured to register an entity or user for voting based on issuing at least one eligibility token corresponding with the entity or user, receive, responsive to registering the entity or user, at least one casting token including a vote of the entity or user and at least one confirmation token including a cryptographic proof of receipt of the at least one casting token, encrypt, responsive to receiving the at least one confirmation token, the vote of the entity or user for inclusion in a vote count, verify the at least one casting token using a proof model and the at least one confirmation token, wherein verifying includes generating at least one inclusion token including a cryptographic proof of inclusion of the at least one casting token in the vote count, and issue at least one certification token including a cryptographic proof of an integrity of the vote count.

In some implementations, the at least one processor configured to generate, using the proof model, a nullifier for the at least one casting token to (i) prevent duplicate use, (ii) maintain anonymity of the entity or user, and (iii) reject any subsequently received casting token including the nullifier, perform, prior to issuing the at least one certification token, batch zero-knowledge verification of a plurality of the at least one casting token or a plurality of the at least one inclusion token to output a proof verifying correctness, apply threshold decryption to a homomorphically aggregated vote count and generate, within the proof model, a zero-knowledge proof indicating correct decryption of the vote count, provide the at least one confirmation token or the at least one inclusion token to prove inclusion of the vote of the entity or user in the vote count without proving a specific selection, delay or relay submission of the at least one casting token to cause an expansion of an anonymity set and reduction in metadata linkage, process a plurality of the at least one casting token from the entity or user within a revoting window by accepting a last-valid nullifier, and verify, using the proof model, the at least one eligibility token is jointly issued by a plurality of eligibility authorities and combined in zero-knowledge to satisfy jurisdictional voting rules.

In some implementations, the at least one processor configured to store a hash of the at least one confirmation token in a tree data structure of a voting system, the tree data structure including hashes of confirmation tokens corresponding with a plurality of casting tokens of a plurality of entities or users, verify the at least one casting token and the plurality of casting tokens based on analyzing the tree data structure, wherein analyzing includes determining a root node of the tree data structure is derived from the hash of the at least one confirmation token and the hashes of the confirmation tokens of the plurality of entities or users, and issue the at least one certification token based on verifying the at least one casting token and the plurality of casting tokens.

In some implementations, the at least one processor configured to store the at least one certification token on a distributed ledger, and validate, responsive to receiving a ledger request, the vote count based on providing the at least one certification token as the cryptographic proof of the integrity of the vote count.

In some implementations, the at least one processor configured to cause the proof model to output the at least one confirmation token based on verifying the at least one casting token, wherein an input corresponding with the at least one casting token is applied as input to the proof model to confirm the vote of the entity or user while maintaining anonymity of all or a portion of data corresponding with the vote.

In some implementations, the proof model maintains anonymity of the entity or user after issuing the at least one certification token based on verifying the at least one casting token while preventing disclosure of a name or identifier corresponding to the entity or user.

In some implementations, the at least one processor configured to provide the at least one confirmation token to a first wallet of the entity or user as proof of the entity casting the vote, provide the at least one inclusion token to the first wallet of the user or entity as proof of the inclusion of the vote in the vote count, and provide the at least one certification token to a second wallet of one or more non-voting entities or users as proof of voting integrity.

Some implementations relate to a method for protecting data. The method can include registering, by one or more processing circuits, an entity or user for voting based on issuing at least one eligibility token corresponding with the entity or user, receiving, by the one or more processing circuits and responsive to registering the entity or user, at least one casting token including a vote of the entity or user and at least one confirmation token including a cryptographic proof of receipt of the at least one casting token, encrypting, by the one or more processing circuits, the vote of the entity or user for inclusion in a vote count, verifying, by the one or more processing circuits, the at least one casting token using a proof model and the at least one confirmation token, wherein verifying includes generating at least one inclusion token including a cryptographic proof of inclusion of the vote in the vote count, and issuing, by the one or more processing circuits, at least one certification token including a cryptographic proof of an integrity of the vote count.

In some implementations, the method includes generating, by the one or more processing circuits, using the proof model, a nullifier for the at least one casting token to (i) prevent duplicate use, (ii) maintain anonymity of the entity or user, and (iii) reject any subsequently received casting token including the nullifier, performing, by the one or more processing circuits, prior to issuing the at least one certification token, batch zero-knowledge verification of a plurality of the at least one casting token or a plurality of the at least one inclusion token to output a proof verifying correctness, applying, by the one or more processing circuits, threshold decryption to a homomorphically aggregated vote count and generate, within the proof model, a zero-knowledge proof indicating correct decryption of the vote count, providing, by the one or more processing circuits, the at least one confirmation token or the at least one inclusion token to prove inclusion of the vote of the entity or user in the vote count without proving a specific selection, delaying or relaying, by the one or more processing circuits, submission of the at least one casting token to cause an expansion of an anonymity set and reduction in metadata linkage, processing, by the one or more processing circuits, a plurality of the at least one casting token from the entity or user within a revoting window by accepting a last-valid nullifier, and verifying, by the one or more processing circuits, using the proof model, the at least one eligibility token is jointly issued by a plurality of eligibility authorities and combined in zero-knowledge to satisfy jurisdictional voting rules.

In some implementations, the method includes storing, by the one or more processing circuits, a hash of the at least one confirmation token in a tree data structure of a voting system, the tree data structure including hashes of confirmation tokens corresponding with a plurality of casting tokens of a plurality of entities or users, verifying, by the one or more processing circuits, the at least one casting token and the plurality of casting tokens based on analyzing the tree data structure, wherein analyzing includes determining a root node of the tree data structure is derived from the hash of the at least one confirmation token and the hashes of the confirmation tokens of the plurality of entities or users, and issuing, by the one or more processing circuits, the at least one certification token based on verifying the at least one casting token and the plurality of casting tokens.

In some implementations, the method includes storing, by the one or more processing circuits, the at least one certification token on a distributed ledger, and validating, by the one or more processing circuits and responsive to receiving a ledger request, the vote count based on providing the at least one certification token as the cryptographic proof of the integrity of the vote count.

In some implementations, the method includes causing, by the one or more processing circuits, the proof model to output the at least one inclusion token based on verifying the at least one casting token, wherein an input corresponding with the at least one casting token is applied as input to the proof model to confirm the vote of the entity or user while maintaining anonymity of all or a portion of data corresponding with the vote.

In some implementations, the proof model maintains anonymity of the entity or user after issuing the at least one certification token based on verifying the at least one casting token while preventing disclosure of a name or identifier corresponding to the entity or user.

In some implementations, the method includes providing, by the one or more processing circuits, the at least one confirmation token to a first wallet of the entity or user as proof of the entity casting the vote, providing, by the one or more processing circuits, the at least one inclusion token to the first wallet of the user or entity as proof of the inclusion of the vote in the vote count, and providing, by the one or more processing circuits, the at least one certification token to a second wallet of one or more non-voting entities or users as proof of voting integrity.

In some implementations, the techniques described herein relate to a non-transitory computer-readable medium (CRM) including one or more instructions executable by one or more processing circuits to register an entity or user for voting based on issuing at least one eligibility token corresponding with the entity or user, receive, responsive to registering the entity or user, at least one casting token including a vote of the entity or user and at least one confirmation token including a cryptographic proof of receipt of the at least one casting token, encrypt the vote of the entity or user for inclusion in a vote count, verify the at least one casting token using a proof model and the at least one confirmation token, wherein verifying includes generating at least one inclusion token including a cryptographic proof of inclusion of the vote in the vote count, and issue at least one certification token including a cryptographic proof of an integrity of the vote count.

In some implementations, the one or more instructions causing the one or more processing circuits to generate, using the proof model, a nullifier for the at least one casting token to (i) prevent duplicate use, (ii) maintain anonymity of the entity or user, and (iii) reject any subsequently received casting token including the nullifier, perform, prior to issuing the at least one certification token, batch zero-knowledge verification of a plurality of the at least one casting token or a plurality of the at least one inclusion token to output a proof verifying correctness, apply threshold decryption to a homomorphically aggregated vote count and generate, within the proof model, a zero-knowledge proof indicating correct decryption of the vote count, provide the at least one confirmation token or the at least one inclusion token to prove inclusion of the vote of the entity or user in the vote count without proving a specific selection, delay or relay submission of the at least one casting token to cause an expansion of an anonymity set and reduction in metadata linkage, process a plurality of the at least one casting token from the entity or user within a revoting window by accepting a last-valid nullifier, and verify, using the proof model, the at least one eligibility token is jointly issued by a plurality of eligibility authorities and combined in zero-knowledge to satisfy jurisdictional voting rules.

In some implementations, the one or more instructions causing the one or more processing circuits to store a hash of the at least one confirmation token in a tree data structure of a voting system, the tree data structure including hashes of confirmation tokens corresponding with a plurality of casting tokens of a plurality of entities or users, verify the at least one casting token and the plurality of casting tokens based on analyzing the tree data structure, wherein analyzing includes determining a root node of the tree data structure is derived from the hash of the at least one confirmation token and the hashes of the confirmation tokens of the plurality of entities or users, and issue the at least one certification token based on verifying the at least one casting token and the plurality of casting tokens.

In some implementations, the one or more instructions causing the one or more processing circuits to store the at least one certification token on a distributed ledger, and validate, responsive to receiving a ledger request, the vote count based on providing the at least one certification token as the cryptographic proof of the integrity of the vote count.

In some implementations, the one or more instructions causing the one or more processing circuits to cause the proof model to output the at least one confirmation token based on confirming the vote of the entity or user, wherein an input corresponding with the at least one casting token is applied as input to the proof model to confirm the vote of the entity or user while maintaining anonymity of all or a portion of data corresponding with the vote.

In some implementations, the proof model maintains anonymity of the entity or user after issuing the at least one certification token based on verifying the at least one casting token while preventing disclosure of a name or identifier corresponding to the entity or user.

Figure 1A:
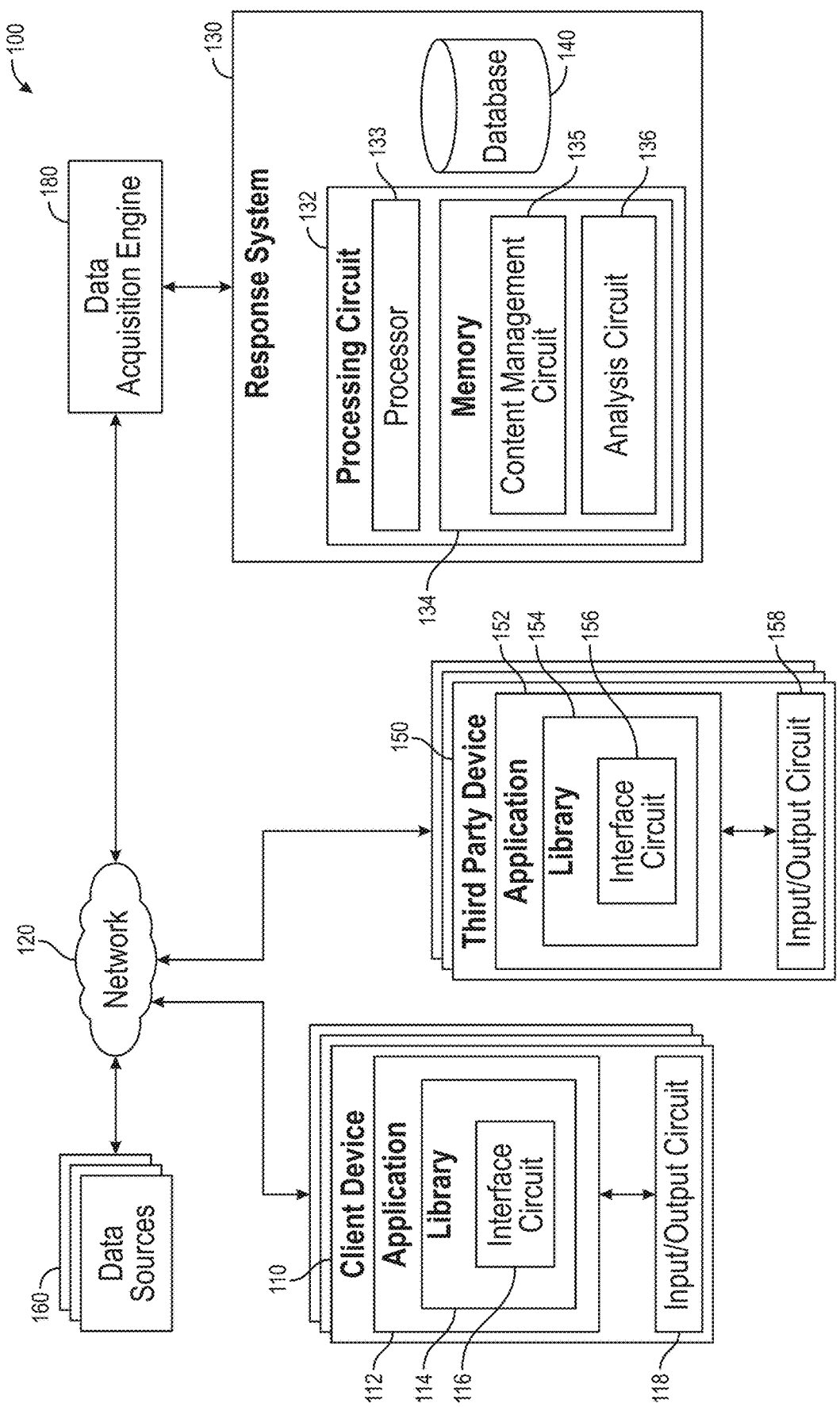
FIG. 1A depicts a block diagram of an implementation of a system for managing and configuring incident responses, according to some implementations.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Referring generally to the FIGURES, systems and methods relate generally to implementing a cybersecurity framework. In some implementations, the system represents an implementation of a security architecture that secures or maintains the integrity of a voting system or electronic voting process.

Many existing voting systems face technical challenges in securely transmitting or storing voter information and verifying the integrity of votes. For example, during transmission, data packets containing votes or voter information (e.g., voter names or other identifiers) can be susceptible to interception or tampering due to inadequate encryption protocols or vulnerabilities in network security layers. Such vulnerabilities in existing voting systems can compromise the integrity of a voting process by allowing unauthorized modifications to votes or potentially causing the votes to be lost before the votes are recorded or tallied. For example, existing systems can fail to adequately separate the identity of the voter from the vote itself during the verification process, which can provide opportunities for voter identities and vote selections to be exposed and potentially cause breaches in voter confidentiality when votes are counted or tallied. In addition, existing voting systems can use centralized databases to store votes and related data in a single location. However, centralizing votes and voter information can reduce the integrity of voting processes and the security of corresponding data transmitted or stored for voting if, for example, system-wide failures (e.g., breaches or outages in the central database) cause the loss of voting data or unauthorized manipulation of one or more votes.

The systems and methods disclosed herein address these technical challenges by implementing cryptographic proofs and token-based verification to protect the integrity and privacy of votes and voter information. For example, the disclosed systems and methods utilize distributed tree data structures to store links to various tokens or tokenized data structures (e.g., confirmation tokens) and verify an entity or user vote is included in a final count or tally. Further, the disclosed systems and methods can include using cryptographic algorithms or proofs (e.g., Zero-Knowledge Proofs or ZKPs) to confirm at least one (e.g., each) vote remains intact during transmission and storage, which can reduce the risk of unauthorized alterations, lost votes, or other discrepancies (e.g., double voting). In addition, the use of tokens provides a decentralized voting architecture that decentralizes the storage of votes and voter information across distributed networks (e.g., a public leger or blockchain). That is, the disclosed systems and methods reduce vulnerabilities associated with centralized databases by using a decentralized architecture and multiple tokens to tally votes while confirming that vote data is not compromised or manipulated. Furthermore, the use of cryptographic proofs (e.g., ZKPs) during the verification process maintains voter anonymity and prevents the exposure of identifying information both before and after a voting process is completed. The systems and methods disclosed herein further provide users or entities participating in a voting process with a certification of the integrity of the voting process by issuing certification tokens, and users or entities can access the certification token to confirm that votes are securely transmitted, verified, and included in a final count.

The systems and methods disclosed herein offer further technical benefits by utilizing distributed data structures (e.g., Merkle trees) and cryptographic algorithms to secure data transmitted or stored for voting process and improve the efficiency of vote verification. For example, the use of Merkle trees provides efficient and scalable storage of votes for verification using a hierarchical data structure. Generally, the tree data structure reduces computational overhead typically associated with vote verification by providing a structure representation of data stored within the tree structure (e.g., hashes or identifiers) that can be used to verify that at least one (e.g., each) vote is counted and accurately included in the final tally. Zero-knowledge proof protocols (e.g., zk-SNARKs, Bulletproofs) are also used to verify the vote count and confirm compliance with voting parameters (e.g., registration) without disclosing individual votes, and can facilitate both transparency and confidentiality in electronic voting systems.

Additionally, many existing cybersecurity systems and architectures face several challenges that limit their effectiveness in managing and responding to cyber threats. One of these problems is a lack of integrated incident response capabilities. In particular, many existing systems operate in silos, with separate tools for threat detection, response, and recovery. This lack of integration can lead to delays in response times, miscommunication between teams, and a lack of overall visibility into the security posture of an organization.

Another problem is the lack of streamlined processes for engaging with third-party vendors for incident response services. Organizations often have to navigate through complex procurement processes during a cyber incident, losing time that could be used to mitigate the incident. Additionally, organizations often struggle to accurately assess their readiness to respond to incidents. They lack clear visibility into their own capabilities and limitations, and often do not have an effective way to communicate this information to potential response providers. Yet another problem with existing cybersecurity systems and architectures is the inability to dynamically adapt to changes in the security landscape. Many existing systems employ static defenses that are unable to adjust to new threats as they arise. This leads to vulnerabilities as attackers continually evolve their strategies and methods. Moreover, static systems also fail to account for changes in the organizational infrastructure and operations, such as the adoption of new technologies or changes in business processes, which can introduce new potential points of attack. This inability to dynamically adapt hampers the ability of the organization to maintain a robust security posture, leaving them exposed to a continuously evolving threat landscape.

Accordingly, the ability to prevent cyber threats, such as hacking activities, data breaches, and cyberattacks, provides entities and users (e.g., provider, institution, individual, and company) improved cybersecurity by creating a customized cybersecurity framework tailored to their specific objectives. This framework helps entities understand their current cybersecurity vulnerabilities and connects them with appropriate vendors offering targeted protection plans. The customized framework enhances the protection of sensitive data, such as medical records and financial information, proprietary business data, and also helps safeguard the reputation of the entity. In addition to improving protection, the tailored cybersecurity framework also has the potential to reduce financial costs associated with data breaches, such as falling stock prices, costs of forensic investigations, and legal fees. The detailed design and execution of cybersecurity models for detecting and addressing vulnerabilities facilitates dynamic monitoring of various relationships, such as network, hardware, device, and financial relationships, between entities and vendors. The approach of providing a customized cybersecurity framework allows for significant improvements in cybersecurity by improving network security, infrastructure security, technology security, and data security. With vendors actively monitoring entities, immediate response to potential threats can be facilitated, thus further enhancing the overall security posture of the entity. This approach mitigates existing vulnerabilities and anticipates potential threats, offering an adaptive and proactive solution to cybersecurity.

Furthermore, by utilizing a customized cybersecurity framework for entities and users, it is possible to understand existing vulnerabilities, link them to specific assets, and provide targeted protection strategies, offering the technical benefit of generating personalized remediation recommendations and avoiding and preventing successful hacking activities, cyberattacks, data breaches, and other detrimental cyber-incidents. As described herein, the systems and methods of the present disclosure can facilitate the connection of entities to suitable vendors, offering security plans tailored to their specific vulnerabilities and objectives. An additional benefit from the implementation of a customized cybersecurity framework is the ability to streamline the process of identifying and addressing vulnerabilities. This improvement of resources provides rapid risk reduction and allows for the ongoing monitoring of the cybersecurity status of the entity by the vendor, verifying continuous protection and immediate response to potential threats. The implementation of such a framework allows entities to understand and address their current vulnerabilities and empowers them to make informed decisions about their cybersecurity strategy. This includes selecting from a range of vendor plans and services, activating these plans, and having the peace of mind that their cybersecurity is being actively monitored and managed by professionals.

Additionally, the present disclosure provides a technical enhancement of dynamic cybersecurity architecture comprehension. For instance, cybersecurity vulnerabilities of an entity can be automatically understood and mapped within the process of implementing a customized cybersecurity framework, eliminating maintaining of separate inventories of network weaknesses, infrastructure vulnerabilities, operating systems susceptibilities, etc. In some implementations, implementing the customized cybersecurity framework includes identifying potential security gaps associated with a particular entity or device identifier, such as a domain identifier (e.g., a top-level domain (TLD) identifier, a sub-domain identifier, or a URL string pointing to a particular directory), an IP address, a subnet, etc. As a result, rather than separately assessing at least one (e.g., each) subclass of vulnerabilities, a computing system can utilize a unified view into a computing environment of a particular target entity (e.g., via the readiness system of the security architecture) and centrally manage the understanding of different types of vulnerabilities and associated potential security threats. For instance, by initiating a comprehensive vulnerability assessment in a single operation. These vulnerability identification operations, described further herein, can include computer-executed operations to discern the cybersecurity status and potential threats of an entity, determine vulnerabilities based on this status and subsequently connect the entity to suitable vendors offering appropriate cybersecurity plans.

Referring to FIG. 1A generally, system 100 is an implementation of a security architecture utilizing modeling to provide an incident response management platform that includes multiple components, such as client device 110, response system 130, third-party devices 150, and data sources 160. These components can be interconnected through a network 120 that supports secure communication protocols such as TLS, SSL, and HTTPS. In some implementations, the response system 130 can generate and provide an application for incident response readiness that guides users through the steps to prepare for and manage incidents effectively. The application can integrate with various technologies and vendors to purchase services to resolve issues, and provides integration points for incident response workflow management. For example, users can access a marketplace within the application to purchase products, insurance, and services, and can determine their organizational capabilities, limitations, and threat focus. In some implementations, the response system 130 also presents the readiness of the organization to incident response providers and automatically routes them to pre-associated panel vendors or organization-selected vendors at the point of need, contracting and activating the incident room immediately.

In some implementations, the response system 130 can integrate readiness, including insurer data, into various third-party systems or devices via APIs. In some implementations, the response system 130 can map an incident response (IR) plan from a static document or documents to the task enablers in Responder that bring them to life, showing where the tasks required by partners such as IR firms, insurers, and breach counsel are covered by the IR plan and IR playbook. The response system 130 can decompose the response plan into associated actionable tasks and activities by the organization, incident response providers, and other stakeholders, and provides different users and partners with a unified view of tasks, activities, and progress/status tracking.

In some implementations, the response system 130 stores data regarding key milestones in an authoritative data source such as blockchain (e.g., database 140), verifying that results are traceable and linkable. For example, issues can be identified, tasks can be created, work can be routed to vendors, and proof of resolution can be recorded. In some implementations, the response system 130 can also supports real-time status tracking of policy-aligned tasks to status updates provided for incident response. In some implementations, instant intake is achieved by a remote embeddable widget on a website, which starts an incident response process that begins with a proposal stage and continues through workflows to achieve response readiness based on pre-defined logic and automation. For example, services can be purchased or extended within the application, and in the event of an inbound incident, the application facilitates routing to a claim manager.

In some implementations, the response system 130 can provide an application for incident response readiness that guides users through the steps to confirm they are prepared for any potential incidents. The application can be designed to integrate with technology and vendors to purchase services that are required to resolve any issues. For example, the user can access the application through a variety of devices, including client device 110. In particular, the application can offer integration points for incident response workflow management, allowing users to streamline their incident response process. The organization incident readiness feature of the response system 130 offers several features, including the integration of readiness, including insurer data, into various third-party systems, such as via an API. By integrating with third-party systems, the response system 130 can confirm that users have access to the up-to-date information regarding the readiness of their organization for potential incidents. In addition, the response system 130 can offer incident response plan mapping from a static plan document to the task enablers in Responder, which brings the tasks required by partners such as IR firms, insurers, and breach counsel to be measurable and identified.

Still referring to FIG. 1A generally, the response system 130 can offer a marketplace for purchasing products, insurance, and services that can be required in the event of an incident. The marketplace includes various vendors that offer different products and services, allowing users to choose a fit for their organization based on their capabilities, limitations, and threat focus. The application also determines organization readiness levels with proof of date, time stamps, and artifacts (e.g., on the blockchain), which can be used to identify any gaps in the incident response plan of the organization. In some implementations, the response system 130 can automate the routing of incidents to pre-associated, panel vendors or organization-selected vendors at the point of need and immediately contracts and activates the incident room (e.g., when a cyber incident occurred or potentially occurred). Accordingly, the system 100 can confirm that the organization can respond to an incident as quickly and efficiently as possible. Additionally, the response system 130 can decompose the response plan into associated actionable tasks and activities by the organization, incident response providers, and others. This allows users to better understand the response plan of their organization and identify areas for improvement.

In general, the application (e.g., graphical user interface provided by content management circuit 135) provides different users/partners with a unified view of tasks, activities, and progress/status tracking. For example, the status tracking can be tied back to incident readiness and managing the incident through resolution. Users can collaborate via the tool instead of via phone calls and emails, which confirms that teams work from the same information and avoids any miscommunication. The application can also offer real-time (or near real-time) status tracking of policy aligned tasks to status updates provided for incident response, allowing users to quickly and easily see how their incident response plan is progressing. In some implementations, data regarding key milestones is stored in an authoritative data source such as blockchain (e.g., database 140 (private ledger) or data sources 160 (public ledger)), verifying that results can be traceable and linkable. Thus, this can facilitate users in identifying areas for improvement in their incident response plan and make changes. In some implementations, the response system 130 offers an instant intake feature that can be integrated into a remote embeddable widget on a website. For example, the widget can start an incident response process that starts with a proposal stage and continues through workflows to achieve response readiness based on pre-defined logic and automation. This confirms that incidents are quickly identified and resolved, and that the organization is prepared for any potential incidents.

Still referring to FIG. 1A generally, the response system 130 of system 100 includes a data acquisition engine 180 and analysis circuit 136 that democratizes posture threats, incidents, and claim data. In particular, all stakeholders in the incident response process can have access to relevant data to make informed decisions. The analysis circuit 136 can use the democratized data in underwriting, claims, and the resilience process to enhance the overall response to an incident. With the data acquisition engine 180, the response system 130 can collect and process data from various sources, such as third-party devices 150 and data sources 160, to provide a comprehensive view of the security posture of the organization. In some implementations, the response system 130 also implement incident response protocols and features via analysis circuit 136 that provide a centralized location for managing and configuring incident responses. For example, an application can walk users through the steps of incident response readiness and integrates with technology and vendors to purchase services to resolve issues. The response system 130 can automate the routing of incident response tasks to pre-associated, panel vendors, or organization-selected vendors at the point of need and immediately contracts and activates the incident room. By decomposing the response plan into associated actionable tasks and activities by the organization, incident response providers, and other stakeholders, the response system 130 confirms that all parties are working together to manage the incident through resolution.

In some implementations, the response system 130 includes a vendor-provider marketplace that allows organizations to purchase products, insurance, and services that enhance their incident response capabilities. For example, the marketplace can be integrated into the response system 130, allowing users to easily access relevant products and services during an incident. Additionally, the response system 130 can determine the organizational capabilities, limitations, and threat focus to present readiness to incident response providers. In some implementations, the response system 130 can include collection, recall, and proof of state features that provide that data regarding key milestones is stored in an authoritative data source such as the blockchain. This includes capabilities pre-incident, what happened after the incident occurred, what was the root cause, and recording. For example, results are traceable and linkable, and issues are identified, tasks are created, work is routed to vendors, and proof of resolution is recorded. In some implementations, the response system 130 can include a drag and drop file tokenization feature that allows users to securely tokenize and store sensitive files. In particular, this feature is useful when organizations desire to share sensitive information with third parties or with internal stakeholders. The system confirms that the information is secure and that access is restricted to authorized parties. Thus, this feature is configured to streamline the incident response process and facilitate better collaboration between all stakeholders.

Referring now to FIG. 1A in more detail, a block diagram depicting an implementation of a system 100 for managing and configuring incident responses. System 100 includes client device 110, response system 130, third party devices 150, and data sources 160. In various implementations, components of system 100 communicate over network 120. Network 120 can include computer networks such as the Internet, local, wide, metro or other area networks, intranets, satellite networks, other computer networks such as voice or data mobile phone communication networks, combinations thereof, or any other type of electronic communications network. Network 120 can include or constitute a display network. In various implementations, network 120 facilitates secure communication between components of system 100. As a non-limiting example, network 120 can implement transport layer security (TLS), secure sockets layer (SSL), hypertext transfer protocol secure (HTTPS), and/or any other secure communication protocol.

In general, the client device(s) 110 and third party device(s) 150 can execute a software application (such as application 112 or application 152, e.g., a web browser, an installed application, or other application) to retrieve content from other computing systems and devices over network 120. Such an application can be configured to retrieve interfaces and dashboards from the response system 130. In one implementation, the client device 110 and third party device 150 can execute a web browser application, which provides the interface (e.g., from content management circuit 135) on a viewport of the client device 110 or third party device 150. The web browser application that provides the interface can operate by receiving input of a uniform resource locator (URL), such as a web address, from an input device (such as input/output circuit 118 or 158, e.g., a pointing device, a keyboard, a touch screen, or another form of input device). In response, one or more processors of the client device 110 or third party device 150 executing the instructions from the web browser application can request data from another device connected to the network 120 referred to by the URL address (e.g., the response system 130). The other device can then provide webpage data and/or other data to the client device 110 or third party device 150, which causes the interface (or dashboard) to be presented by the viewport of the client device 110 or third party device 150. Accordingly, the browser window presents the interface to facilitate user interaction with the interface. In some implementations, the interface (or dashboard) can be presented via an application stored on the client device 110 and third party device 150.

The network 120 can facilitate communication between various nodes, such as the response system 130, third party device 150, client device 110, and data sources 160. In some implementations, data flows through the network 120 from a source node to a destination node as a flow of data packets, e.g., in the form of data packets in accordance with the Open Systems Interconnection (OSI) layers. A flow of packets can use, for example, an OSI layer-4 transport protocol such as the User Datagram Protocol (UDP), the Transmission Control Protocol (TCP), or the Stream Control Transmission Protocol (SCTP), transmitted via the network 120 layered over an OSI layer-3 network protocol such as Internet Protocol (IP), e.g., IPv4 or IPv6. The network 120 is composed of various network devices (nodes) communicatively linked to form one or more data communication paths between participating devices. At least one (e.g., each) networked device includes at least one network interface for receiving and/or transmitting data, typically as one or more data packets. An illustrative network 120 is the Internet; however, other networks can be used. The network 120 can be an autonomous system (AS), e.g., a network that is operated under a consistent unified routing policy (or at least appears to from outside the AS network) and is generally managed by a single administrative entity (e.g., a system operator, administrator, or administrative group).

Client device 110 (sometimes referred to herein as a "mobile device") can be a mobile computing device, smartphone, tablet, smart watch, smart sensor, or any other device configured to facilitate receiving, displaying, and interacting with content (e.g., web pages, mobile applications, etc.). Client device 110 can include an application 112 to receive and display content and to receive user interaction with the content. For example, application 112 can be a web browser. Additionally, or alternatively, application 112 can be a mobile application. Client device 110 can also include an input/output circuit 118 for communicating data over network 120 (e.g., receive and transmit to response system 130).

In various implementations, application 112 interacts with a content publisher to receive online content, network content, and/or application content. For example, application 112 can receive and present various dashboards and information resources from distributed by the content publisher (e.g., content management circuit 135). Dashboards and/or information resources can include web-based content such as a web page or other online documents. The dashboards information resources can include instructions (e.g., scripts, executable code, etc.) that when interpreted by application 112 cause application 112 to display a graphical user interface such as an interactable web page and/or an interactive mobile application to a user. In various implementations, application 112 can include one or more application interfaces for presenting an application (e.g., mobile application, web-based application, virtual reality/augmented reality application, smart TV application, etc.).

Application 112 is shown to include library 114 having an interface circuit 116. The library 114 can include a collection of software development tools contained in a package (e.g., software development kit (SDK), application programming interface (API), integrated development environment (IDE), debugger, etc.). For example, library 114 can include an application programming interface (API). In another example, library 114 can include a debugger. In yet another example, the library 114 can be an SDK that includes an API, a debugger, and IDE. In some implementations, library 114 includes one or more libraries having functions that interface with a particular system software (e.g., iOS, Android, Linux, etc.). Library 114 can facilitate embedding functionality in application 112. For example, a user can use library 114 to automatically transmit event logs whenever an event occurs on application 112. As a further example, library 114 can include a function configured to collect and report device analytics and a user can insert the function into the instructions of application 112 to cause the function to be called during specific actions of application 112 (e.g., during testing as described in detail below). In some implementations, interface circuit 116 functionalities are provided by library 114.

In various implementations, interface circuit 116 of system 100 can provide one or more interfaces to users, which can be accessed through an application interface presented in the viewport of client device 110. These interfaces can take the form of dashboards and other graphical user interfaces, offering a variety of functionality to the user. For example, a user can view incident responses, remediate claims, communicate with team members, purchase or extend products and services, and more. The interfaces provided by interface circuit 116 can be customizable and dynamic, allowing users to configure and adjust them to suit their specific objectives. They can also be designed to present real-time data associated with current incident responses, potential incidents or threats, and other cybersecurity information, allowing users to make informed decisions and take proactive steps to manage risk.

For example, interface circuit 116 can generate dashboards that provide real-time data and insights. These dashboards can be customized to suit the objectives of individual users or groups, providing a comprehensive view of incident responses, potential threats, and the status of remediation efforts. For example, a dashboard might show the status of incident responses across different regions, or highlight areas where additional resources are to be used. In another example, the interface circuit 116 can generate a landscape of all currently connected devices to the entity, such as a company or institution. This can include information on the types of devices, their locations, and other cybersecurity details that can help inform incident response efforts. With this information, users can better understand the scope of potential threats, identify vulnerable areas, and take steps to improve security and resilience.

In another example implementation, the application 112 executed by the client device 110 can cause a web browser to the display the interfaces (e.g., dashboards) on the client device 110. For example, the user can connect (e.g., via the network 120) to a website structured to host the interfaces. In various implementations, interface can include infrastructure such as, but not limited to, host devices (e.g., computing device) and a collection of files defining the interface and stored on the host devices (e.g., in database 140). The web browser operates by receiving input of a uniform resource locator (URL) into a field from an input device (e.g., a pointing device, a keyboard, a touchscreen, mobile phone, or another form of input device). In response, the interface circuit 116 executing the interface in the web browser can request data such as from content (e.g., vendor information, settings, current incident response, other dashboards, etc.) from database 140. The web browser can include other functionalities, such as navigational controls (e.g., backward and forward buttons, home buttons). In some implementations, the debugging interface can include both a client-side interface and a server-side interface. For example, a client-side interface can be written in one or more general purpose programming and can be executed by client device 110. The server-side interface can be written, for example, in one or more general purpose programming languages and can be executed by the response system 130.

Interface circuit 116 can detect events within application 112. In various implementations, interface circuit 116 can be configured to trigger other functionality based on detecting specific events (e.g., transactions, in-app purchases, performing a test of a vendor, scrolling through an incident response plan, sending a contract to a vendor, spending a certain amount of time interacting with an application, etc.). For example, interface circuit 116 can trigger a pop-up window (overlayed on an interface) upon selecting an actionable object (e.g., button, drop-down, input field, etc.) within a dashboard. In various implementations, library 114 includes a function that is embedded in application 112 to trigger interface circuit 116. For example, a user can include a function of library 114 in a transaction confirmation functionality of application 112 that causes interface circuit 116 to detect a confirmed transaction (e.g., purchase cybersecurity protection plans, partnering). It should be understood that events can include any action related to a user within an application and are not limited to the examples expressly contemplated herein. In various implementations, interface circuit 116 is configured to differentiate between different types of events. For example, interface circuit 116 can trigger a first set of actions based on a first type of detected event (e.g., selecting actionable objects within the static response plan) and can trigger a second set of actions based on a second type of detected event (e.g., running a test). In various implementations, interface circuit 116 is configured to collect event logs associated with the detected event and/or events and transmit the collected event logs to content management circuit 135.

In various implementations, the interface circuit 116 can collect events logs based on a designated session. In one example, the designated session can be active from when application 112 is opened/selected to when application 112 is closed/exited. In another example, the designated session can be active based on a user requesting a session to start and a session to end. During at least one (e.g., each) session, the interface circuit 116 can collect event logs while the session is active. Once completed, the event logs can be provided to any system described herein. During the session, the event logs can trace at least one (e.g., each) event in the session such that the events are organized in ascending and/or descending order. In some implementations, the events can be organized utilizing various other techniques (e.g., by event type, by timestamp, by malfunctions, etc.).

In various implementations, the interface circuit 116 of the client device 110 (or third party device 150) can start collecting event logs when application 112 is opened (e.g., selected by the user via an input/output circuit 118 of the client device 110), thus starting a session. In some implementations, once the application is closed by the user the interface circuit 116 can stop collecting event logs, thus ending the session. In various implementations, the user can force clear event logs or force reset application 112 such that the current session can reset, thus ending a particular session and starting a new session.

The input/output circuit 118 is structured to send and receive communications over network 120 (e.g., with response system 130 and/or third-party device 150). The input/output circuit 118 is structured to exchange data (e.g., bundled event logs, content event logs, interactions), communications, instructions, etc. with an input/output component of the response system 130. In one implementation, the input/output circuit 118 includes communication circuitry for facilitating the exchange of data, values, messages, and the like between the input/output circuit 118 and the response system 130. In yet another implementation, the input/output circuit 118 includes machine-readable media for facilitating the exchange of information between the input/output device and the response system 130. In yet another implementation, the input/output circuit 118 includes any combination of hardware components, communication circuitry, and machine-readable media.

In some implementations, the input/output circuit 118 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuit 118 can provide an interface for the user to interact with various applications (e.g., application 112) stored on the client device 110. For example, the input/output circuit 118 includes a keyboard, a keypad, a mouse, joystick, a touch screen, a microphone, a haptic sensor, a car sensor, an IoT sensor, a biometric sensor, an accelerometer sensor, a virtual reality headset, smart glasses, smart headsets, and the like. As another example, input/output circuit 118, can include, but is not limited to, a television monitor, a computer monitor, a printer, a facsimile, a speaker, etc. As used herein, virtual reality, augmented reality, and mixed reality can be used interchangeably yet refer to any kind of extended reality, including virtual reality, augmented reality, and mixed reality.

In some implementations, input/output circuit 118 of the client device 110 can receive user input from a user (e.g., via sensors, or any other input/output devices/ports described herein). A user input can be a plurality of inputs, including by not limited to, a gesture (e.g., a flick of client device 110, a shake of client device 110, a user-defined custom gesture (e.g., utilizing an API), biological data (e.g., stress level, heart rate, hand geometry, facial geometry, psyche, etc.) and/or behavioral data (e.g., haptic feedback, gesture, speech pattern, movement pattern (e.g., hand, food, arm, facial, iris, etc.), or combination thereof, etc. In some implementations, one or more user inputs can be utilized to perform various actions on client device 110.

For example, a user can use a gesture, such as a flick or a shake, to quickly invoke an incident response through the response system 130 from their client device 110. With the use of biological and behavioral data, a user could trigger an incident response, access the vendor marketplace, or recall proof of state using custom-defined gestures via an API with input/output circuit 118. The drag and drop file tokenization feature can also be activated by a gesture, allowing a user to seamlessly tokenize files and secure them on the blockchain with a simple motion or touch on their client device 110.

Input/output circuit 118 can exchange and transmit data information, via network 120, to all the devices described herein. In various implementations, input/output circuit 118 transmits data via network 120. Input/output circuit 118 can confirm the transmission of data. For example, input/output circuit 118 can transmit requests and/or information to response system 130 based on selecting one or more actionable items within the interfaces and dashboards described herein. In another example, input/output circuit 118 can transmit requests and/or information to third party devices 150 operated one or more vendors. In various implementations, input/output circuit 118 can transmit data periodically. For example, input/output circuit 118 can transmit data at a predefined time. As another example, input/output circuit 118 can transmit data on an interval (e.g., ten minutes, ten hours, etc.).

The third party device 150 includes application 152, library 154, interface circuit 156, and input/output circuit 158. The application 152, library 154, interface circuit 156, and input/output circuit 158 can function substantially similar to and include the same or similar components as the components of client device 110, such as application 112, library 114, interface circuit 116, and input/output circuit 118, described above. As such, it should be understood that the description of the client device 110, such as application 112, library 114, interface circuit 116, and input/output circuit 118 of the client device 110 provided above can be similarly applied to the application 152, library 154, interface circuit 156, and input/output circuit 158 of the third party device 150. However, instead of a user of a company or institution operations the third party device 150, a vendor or providers (e.g., goods or services) operates the third party device 150.

The response system 130 can include a logic device, which can be a computing device equipped with a processing circuit that runs instructions stored in a memory device to perform various operations. The processing circuit can be made up of various components such as a microprocessor, an ASIC, or an FPGA, and the memory device can be any type of storage or transmission device capable of providing program instructions. The instructions can include code from various programming languages commonly used in the industry, such as high-level programming languages, web development languages, and systems programming languages. The response system 130 can also include one or more databases for storing data and an interface, such as a content management circuit 135, that receives and provides data to other systems and devices on the network 120.

The response system 130 can be run or otherwise be executed on one or more processors of a computing device, such as those described below in FIG. 2. In broad overview, the response system 130 can include a processing circuit 132, a processor 133, memory 134, a content management circuit 135, an analysis circuit 136, a database 140, a front and 142. The interface and dashboards generated by content management circuit 135 can be provided to the client devices 110 and third party devices 150. Generally, the interfaces and dashboards can be rendered at the client devices 110 and/or third party devices 150. The content management circuit 135 can include a plurality of interfaces and properties. The interfaces and dashboards can execute at the response system 130, the client device 110, the third party devices 150, or a combination of the three to provide the interfaces and dashboards. In some implementations, the interfaces and dashboards generated and formatted by content management circuit 135 can be provided within a web browser. In another implementation, the content management circuit 135 executes to provide the interfaces and dashboards at the client devices 110 and third party devices 150 without utilizing the web browser.

The response system 130 can be a server, distributed processing cluster, cloud processing system, or any other computing device. Response system 130 can include or execute at least one computer program or at least one script. In some implementations, response system 130 includes combinations of software and hardware, such as one or more processors configured to execute one or more scripts. Response system 130 is shown to include database 140 and processing circuit 132. Database 140 can store received data. For example, the database 140 can include data structures for storing information such as, but not limited to, the front end information, interfaces, dashboards, incident information, claim information, user information, vendor information, contract information, invoices, a blockchain ledger, etc. The database 140 can be part of the response system 130, or a separate component that the response system 130, the client device 110, or the third party device 150 can access via the network 120. The database 140 can also be distributed throughout system 100. For example, the database 140 can include multiple databases associated with the response system 130, the client device 110, or the third party device 150, or all three. Database 140 can include one or more storage mediums. The storage mediums can include but are not limited to magnetic storage, optical storage, flash storage, and/or RAM. Response system 130 can implement or facilitate various APIs to perform database functions (e.g., managing data stored in database 140). The APIs can be but are not limited to SQL, ODBC, JDBC, NOSQL and/or any other data storage and manipulation API.

Processing circuit 132 includes processor 133 and memory 134. Memory 134 can have instructions stored thereon that, when executed by processor 133, cause processing circuit 132 to perform the various operations described herein. The operations described herein can be implemented using software, hardware, or a combination thereof. Processor 133 can include a microprocessor, ASIC, FPGA, etc., or combinations thereof. In many implementations, processor 133 can be a multi-core processor or an array of processors. Memory 134 can include, but is not limited to, electronic, optical, magnetic, or any other storage devices capable of providing processor 133 with program instructions. Memory 134 can include a floppy disk, CD-ROM, DVD, magnetic disk, memory chip, ROM, RAM, EEPROM, EPROM, flash memory, optical media, or any other suitable memory from which processor 133 can read instructions. The instructions can include code from any suitable computer programming language.

The data sources 160 can provide data to the response system 130. In some implementations, the data sources 160 can be structured to collect data from other devices on network 120 (e.g., client devices 110 and/or third-party devices 150) and relay the collected data to the response system 130. In one example, a user and/or entity can have a server and database (e.g., proxy, enterprise resource planning (ERP) system) that stores network information associated with the user and/or entity. In this example, the response system 130 can request data associated with specific data stored in the data source (e.g., data sources 160) of the user or entity. For example, in some implementations, the data sources 160 can host or otherwise support a search or discovery engine for Internet-connected devices. The search or discovery engine can provide data, via the data acquisition engine 180, to the response system 130. In some implementations, the data sources 160 can be scanned to provide additional data. The additional data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases, generative artificial intelligence (GAI) data, and/or any other intelligence data associated with the specific entity of interest.

The system 100 can include a data acquisition engine 180. In various implementations, the response system 130 can be communicatively and operatively coupled to the data acquisition engine 180. The data acquisition engine 180 can include one or more processing circuits configured to execute various instructions. In various implementations, the data acquisition engine 180 can be configured to facilitate communication (e.g., via network 120) between the response system 130 and systems described herein. The facilitation of communication can be implemented as an application programming interface (API) (e.g., REST API, Web API, customized API), batch files, and/or queries. In various implementations, the data acquisition engine 180 can also be configured to control access to resources of the response system 130 and database 140.

The API can be used by the data acquisition engine 180 and/or computing systems to exchange data and make function calls in a structured format. The API can be configured to specify an appropriate communication protocol using a suitable electronic data interchange (EDI) standard or technology. The EDI standard (e.g., messaging standard and/or supporting technology) can include any of a SQL data set, a protocol buffer message stream, an instantiated class implemented in a suitable object-oriented programming language (e.g., Java, Ruby, C#), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages can be implemented in any of the above or using another suitable technology.

In some implementations, data is exchanged by components of the data acquisition engine 180 using web services. Where data is exchanged using an API configured to exchange web service messages, some or all components of the computing environment can include or can be associated with (e.g., as a client computing device) one or more web service node(s). The web service can be identifiable using a network address, such as an IP address, and/or a URL. Some or all components of the computing environment can include circuits structured to access and exchange data using one or more remote procedure call protocols, such as Java remote method invocation (RMI), Windows distributed component object model (DCOM). The web service node(s) can include a web service library including callable code functions. The callable code functions can be structured according to a predefined format, which can include a service name (interface name), an operation name (e.g., read, write, initialize a class), operation input parameters and data type, operation return values and data type, service message format, etc. In some implementations, the callable code functions can include an API structured to access on-demand and/or receive a data feed from a search or discovery engine for Internet-connected devices. Further examples of callable code functions are provided further herein as embodied in various components of the data acquisition engine 180.

The data sources 160 can provide data to the response system 130 based on the data acquisition engine 180 scanning the Internet (e.g., various data sources and/or data feeds) for data associated with a specific user or entity (e.g., vendor, insurer). That is, the data acquisition engine 180 can hold (e.g., in non-transitory memory, in cache memory, and/or in database 140) the executables for performing the scanning activities on the data sources 160. Further, the response system 130 can initiate the scanning operations. For example, the response system 130 can initiate the scanning operations by retrieving domain identifiers or other user/entity identifiers from a computer-implemented DBMS or queue. In another example, a user can affirmatively request a particular resource (e.g., domain or another entity identifier) to be scanned, which triggers the operations. In various implementations, the data sources 160 can facilitate the communication of data between the client devices 110 and third party devices 150, such that the data sources 160 receive data (e.g., over network 120) from the client devices 110 and third-party devices 150 before sending the data other systems described herein (e.g., response system 130). In other implementations and as described herein, the client devices 110 and third-party devices 150, and the data sources 160 can send data directly, over the network 120, to any system described herein and the data sources 160 can provide information not provided by any of the client devices 110 and third party devices 150.

As used herein, the terms "scan" and "scanning" refer to and encompass various data collection operations, which can include directly executing and/or causing to be executed any of the following operations: query(ies), search(es), web crawl(s), interface engine operations structured to facilitate the data acquisition engine 180 providing an appropriate system interface to continuously or periodically receive inbound data, document search(es), dataset search(es), retrieval from internal systems of previously received data, etc. These operations can be executed on-demand and/or on a scheduled basis. In some implementations, these operations include receiving data (e.g., device connectivity data, IP traffic data) in response to requesting the data (e.g., data "pull" operations). In some implementations, these operations include receiving data without previously requesting the data (e.g., data "push" operations). In some implementations, the data "push" operations are supported by the interface engine operations.

One of skill will appreciate that data received as a result of performing or causing scanning operations to be performed can include data that has various properties indicative of device properties, hardware, firmware, software, configuration information, and/or IP traffic data. For example, in some implementations, a device connectivity data set can be received. In some implementations, device connectivity data can include data obtained from a search or discovery engine for Internet-connected devices which can include a third-party product (e.g., Shodan), a proprietary product, or a combination thereof. Device connectivity data can include structured or unstructured data.

Various properties (sometimes referred to as "attributes") (e.g., records, delimited values, values that follow particular pre-determined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., metadata associated with packets), such as host name, organization, Internet Service Provider information, country, city, communication protocol information, and Autonomous System Number (ASN) or similar identifier for a group of devices using a particular defined external routing policy. In some implementations, device connectivity data can be determined at least in part based on banner data exposed by the respective source vendor or insurer. For example, device connectivity data can include metadata about software running on a particular device of a source entity.

In various implementations, vendors and users can utilize Internet-wide scanning tools (e.g., port scanning, network scanning, vulnerability scanning, Internet Control Message Protocol (ICMP) scanning, TCP scanning, UDP scanning, semi-structured and unstructured parsing of publicly available data sources) for collecting data (e.g., states and performance of companies, corporations, users). Further, in addition to this data, other data collected and fused with the data obtained via scanning can be newsfeed data (e.g., articles, breaking news, television), social media data (e.g., Facebook, Twitter, Snapchat, TikTok), geolocation data of users on the Internet (e.g., GPS, triangulation, IP addresses), governmental databases, and any other data associated with the specific user or entity (e.g., vendor or insurer), their capabilities, configurations, cyber insurance policy, coverage, attestations, questionnaires and overall state of aforementioned attributes.

In some implementations, scanning occurs in real-time such that the data acquisition engine 180 continuously scans the data sources 160 for data associated with a specific vendor or user (e.g., real-time states of specific vendors or users, real-time threats, real-time performance). In various implementations, scanning can occur in periodic increments such that the data acquisition engine 180 can scan the Internet for data associated with the specific vendor or user periodically (e.g., by minute, hour, day, week, or any other increment of time.) In some implementations, data acquisition engine 180 can receive feeds from be various data aggregating systems that collect data associated with specific vendors or users. For example, the response system 130 can receive specific vendor or user data from the data sources 160, via the network 120 and data acquisition engine 180. The information collected by the data acquisition engine 180 can be stored in database 140. In some implementations, an entity (e.g., company, vendor, insurer, any service or goods provider, etc.) can submit data to response system 130 and provide information about their products or services, pricing, capabilities, statuses, etc., which can be stored in database 140.

Memory 134 can include analysis circuit 136. The analysis circuit 136 can be configured to perform data fusion operations, including operations to generate and/or aggregate various data structures stored in database 140, which can have been acquired as a result of scanning operations or via another EDI process. For example, the analysis circuit 136 can be configured to aggregate entity data stored in the database 140. The entity data can be a data structure associated with a specific entity and include various data from a plurality of data channels. In some implementations, the analysis circuit 136 can be configured to aggregate line-of-business data stored in the database 140. The line-of-business data can be a data structure associated with a plurality of line-of-business of an entity and indicate various data from a plurality of data channels based on line-of-business (e.g., information technology (IT), legal, marketing and sales, operations, finance and accounting).

The analysis circuit 136 can also be configured to receive a plurality of user and entity data. In some implementations, the analysis circuit 136 can be configured to receive data regarding the network 120 as a whole (e.g., stored in database 140) instead of data specific to particular users or entities. The received data that the analysis circuit 136 receives can be data that response system 130 aggregates and/or data that the response system 130 receives from the data sources 160 and/or any other system described herein. As previously described, the response system 130 can be configured to receive information regarding various entities and users on the network 120 (e.g., via device connectivity data). Further, the response system 130 can be configured to receive and/or collect information regarding interactions that a particular user or entity has on the network 120 (e.g., via IP traffic data). Further, the response system 130 can be configured to receive and/or collect additional information. Accordingly, the received or collected information can be stored as data in database 140. In various implementations, the database 140 can include user and entity profiles.

The response system 130 can be configured to electronically transmit information and/or notifications relating to various metrics, dashboards (e.g., graphical user interfaces) and/or models it determines, analyzes, fuses, generates, or fits to user data, entity data, and/or other data. This can allow a user of a particular one of the client devices 110 and third party devices 150 to review the various metrics, dashboards, or models which the response system 130 determines. Further, the response system 130 can use the various metrics to identify remediation actions for users and entities. The analysis circuit 136 implements data fusion operations of the response system 130. In various implementations, the analysis circuit 136 can be configured to receive a plurality of data (e.g., user and entity data) from a plurality of data sources (e.g., database 140, client devices 110, third party devices 150, data sources 160) via one or more data channels (e.g., over network 120). At least one (e.g., each) data channel can include a network connection (e.g., wired, wireless, cloud) between the data sources and the response system 130.

In some implementations, the analysis circuit 136 can also be configured to collect a plurality of data from a particular data source or from a plurality of data sources based on electronically transmitting requests to the data sources via the plurality of data channels, managed and routed to a particular data channel by the data acquisition engine 180. A request submitted via the data acquisition engine 180 can include a request for scanning publicly available information exposed by a user or entity. In some implementations, the request submitted via the data acquisition engine 180 can include information regarding access-controlled data being requested from the user or entity. In such cases, the request can include trust verification information sufficient to be authenticated by the target entity (e.g., multi-factor authentication (MFA) information, account login information, request identification number, a pin, certificate information, a private key of a public/private key pair). This information should be sufficient to allow the target entity to verify that a request is valid.

In various implementations, the analysis circuit 136 can be configured to initiate a scan, via the data acquisition engine 180, for a plurality of data from a plurality of data sources based on analyzing device connectivity data, vendor information, scheduling information (e.g., team members), network properties (e.g., status, nodes, element-level (sub-document level), group-level, network-level, size, density, connectedness, clustering, attributes) and/or network information (e.g., IP traffic, domain traffic, sub-domain traffic, connected devices, software, infrastructure, bandwidth) of a target computer network environment and/or environments of the entity or associated with the entity. The operations to fuse various properties of data returned via the scan can include a number of different actions, which can parse device connectivity data, packet segmentation, predictive analytics, cross-referencing to data regarding known vulnerabilities, and/or searching data regarding application security history. These operations can be performed to identify costs of vendors, services offered, hosts, ports, and services in a target computer network environment. The target computer network environment can be identified by a unique identifier, such as a domain identifier (e.g., a top-level domain (TLD) identifier, a subdomain identifier, a URL string pointing to a particular directory), an IP address, a subnet, etc. Further, the target computer network environment can be defined with more granularity to encompass a particular component (e.g., an entity identified by an IP address, software/applications/operating systems/exposed API functions associated with a particular port number, IP address, subnet, domain identifier). In some implementations, one or more particular target computer network environments can be linked to an entity profile (e.g., in the database 140). In one example, scanning can include parsing out packet and/or device connectivity data properties that can indicate available UDP and TCP network services running on the target computer network environment. In another example, scanning can include parsing out packet and/or device connectivity data that indicates the operating systems (OS) in use on the target computer network environment.

In various implementations, vendor information can be determined based accessing a vendor device (e.g., 150) or website of the vendor to collect vendor information (e.g., via an API call). In various implementations, vulnerabilities and incidents can be determined based on any software feature, hardware feature, network feature, or combination of these, which could make an entity vulnerable to cyber threats, incidents, such as hacking activities, data breaches, and cyberattacks. In turn, cyber-threats (sometimes referred to herein as "cyber-indents" or "incidents") increase the probability of cyber-incidents. Accordingly, a vulnerability or incident can be a weakness that could be exploited to gain unauthorized access to or perform unauthorized actions in a computer network environment (e.g., system 100). For example, obsolete computing devices and/or obsolete software can present vulnerabilities and/or threats in a computer network environment. In another example, certain network frameworks can present vulnerabilities and/or threats in a computer network environment. In yet another example, business practices of an entity can present vulnerabilities and/or threats in a computer network environment. In yet another example, published content on the Internet can present vulnerabilities in a computer network environment. In yet another example, third-party computing devices and/or or software can present vulnerabilities and/or threats in a computer network environment. Accordingly, as shown, all devices (e.g., servers, computers, any infrastructure), all data (e.g., network information, vendor data, network traffic, user data, certificate data, public and/or private content), all practices (e.g., business practices, security protocols), all software (e.g., frameworks, protocols), and any relationship an entity has with another entity can present vulnerabilities and/or threats in a computer network environment that could lead to one or more cyber-incidents.

In broad view, the analysis circuit 136 can also be configured to receive company and vendor information regarding the company/vendor. In some implementations, the analysis circuit 136 can receive a registration request and register user accounts (e.g., accounts). For example, a user of library 114 can register their user account with a client device such that the client device 110 can execute the library 114 and perform various actions. Registering a client device 110 or user (or vendor) can include, but not limited to, providing various identifying information (e.g., device name, geolocation, identifier, etc.), platform designations (e.g., iOS, Android, WebOS, BlackBerry OS, etc.), user actions (e.g., activation gesture, haptic, biometric, etc.), authentication information (e.g., username, password, two-step criteria, security questions, address information, etc.). Once the analysis circuit 136 approves a registration request, the information associated with the request can be stored in database 140. Additionally, a notification can be transmitted to the client device 110 indicating the user, vendor, or client device 110 (or third party device 150) is registered and can utilize the dashboards to perform actions associated with one or more applications.

In various implementations, analysis circuit 136 performs statistical operations on received data to produce statistical measurements describing the received data. For example, analysis circuit 136 can determine capabilities of individuals, objectives, cost estimates, etc. In various implementations, the statistical operations can be calculated based on performing various statistical operations and analysis. In some implementations, received data and previously collected data stored in database 140 can be used to train a machine-learning model. That is, predictions regarding vulnerabilities and incidents could be based on artificial intelligence or a machine-learning model. For example, a first machine-learning model can be trained to identify particular incidents and output a prediction. In this example, a second machine-learning model can be trained to identify remediation actions based on incident. In various implementations, machine learning algorithms can include, but are not limited to, a neural network, convolutional neural network, recurrent neural network, linear regression model, and sparse vector machine). The various computing systems/devices described herein can input various data (e.g., event logs, debugging information, etc.) into the machine learning model, and receive an output from the model indicating a particular action to perform. In some implementations, analysis circuit 136 can be configured to perform source testing on one or more networks. Source testing on one or more networks can include performing various test plans. During the source testing, various malfunctions and exceptions can be identified. Additionally, the network can be identified such that the testing occurs on a designated network (e.g., or multiple designated content networks).

Memory 134 also includes content management circuit 135. The content management circuit 135 can be configured to generate content for displaying to users and vendors. The content can be selected from among various resources (e.g., webpages, applications). The content management circuit 135 is also structured to provide content (e.g., via a graphical user interface (GUI)) to the client devices 110 and/or third party devices 150), over the network 120, for display within the resources. For example, in various implementations, a claim dashboard or incident response dashboard can be integrated in a mobile application or computing application or provided via an Internet browser. The content from which the content management circuit 135 selects can be provided by the response system 130 via the network 120 to one or more client devices 110 and/or third party devices 150. In such implementations, the content management circuit 135 can determine content to be generated and published in one or more content interfaces of resources (e.g., webpages, applications).

The content management circuit 135 can be configured to interact with a database management system or data storage vault, where clients can obtain or store information. Clients can use queries in a formal query language, inter-process communication architecture, natural language or semantic queries to obtain data from the DBMS. In some implementations, one or more clients obtain data from the DBMS using queries in a custom query language such as a Visualization API Query Language. In some implementations, the content management circuit 135 can be configured to provide one or more customized dashboards (e.g., stored in database 140) to one or more computing devices (e.g., client devices 110, third party devices 150) for presentation. That is, the provided customized dashboards (also referred to herein as "customized interface") can execute and/or be displayed at the computing devices described herein. In some implementations, the customized dashboards can be provided within a web browser or installed application. In some implementations, the customized dashboards can include PDF files. In some implementations, the customized dashboards can be provided via email. According to various implementations, the customized dashboards can be provided on-demand or as part of push notifications.

In various implementations, the content management circuit 135 executes operations to provide the customized dashboards to the client devices 110 and third party devices 150, without utilizing the web browser. In various implementations, the customized dashboards can be provided within an application (e.g., mobile application, desktop application). The dashboard from which the content management circuit 135 generates can be provided to one or more users or entities, via the network 120. In some implementations, the content management circuit 135 can select dashboards and/or interfaces associated with the user or entity to be displayed on the client devices 110 or third party devices 150.

In some implementations, an application executed by the client devices 110 and/or third party devices 150 can cause the web browser to display on a monitor or screen of the computing devices. For example, the user can connect (e.g., via the network 120) to a website structured to host the customized dashboards. In various implementations, hosting the customized dashboard can include infrastructure such as host devices (e.g., computing device) and a collection of files defining the customized dashboard and stored on the host devices (e.g., in a database). The web browser operates by receiving input of a uniform resource locator (URL) into a field from an input device (e.g., a pointing device, a keyboard, a touchscreen, mobile phone, or another form of input device). In response, the content management circuit 135 executing the web browser can request data such as from the database 140. The web browser can include other functionalities, such as navigational controls (e.g., backward and forward buttons, home buttons, other navigational buttons or items). The content management circuit 135 can execute operations of the database 140 (or provide data from the database 140 to the client devices 110, and/or third-party devices 150 for execution) to provide the customized dashboards at the client devices 110 and/or third-party devices 150.

In some implementations, the content management circuit 135 can include both a client-side application and a server-side application. For example, a content management circuit 135 can be written in one or more general purpose programming languages and can be executed by client devices 110 and/or third-party devices 150. The server-side content management circuit 135 can be written, for example, in one or more general purpose programming, or a concurrent programming language, and can be executed by the response system 130. The content management circuit 135 can be configured to generate a plurality of customized dashboards and their properties. The content management circuit 135 can generate customized user-interactive dashboards for one or more users and entities, such as the client device 110 and third party devices 150, based on data received, collected, and/or aggregated from the analysis circuit 136, any other computing device described herein, and/or any database described herein (e.g., 140).

The generated dashboards can include various data (e.g., data stored in database 140 and/or data sources 160) associated with one or more entities including scheduling information, profile information, cybersecurity risk and/or vulnerabilities cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices), insurer and vendor information (e.g., policies, contracts, products, services, underwriting, limitations), incident information, cyberattack information (e.g., phishing attacks, malware attacks, web attacks, and artificial intelligence (AI)-powered attacks), remediation items, remediation actions/executables, security reports, data analytics, graphs, charts, historical data, historical trends, vulnerabilities, summaries, help information, domain information, and/or subdomain information. As used herein, a "cyber-incident" can be any incident where a party (e.g., user, individual, institution, company) gains unauthorized access to perform unauthorized actions in a computer network environment. The database 140 can also include data structures for storing information such as system definitions for customized dashboards generated by content management circuit 135, animated or other content items, actionable objects, graphical user interface data, and/or additional information.

The analysis circuit 136 can be configured to determine organization incident readiness. Readiness is the process an organization follows to prepare for a cyber incident before it happens. This includes entering information that can be used at the initiation of an incident by incident response teams and breach counsel. Readiness levels are calculated by binary completion of the n tasks that are included in readiness activities of the organization. An organization with 10 readiness steps and 5 completed shows as 50%. In some implementations, determining organization incident readiness can include integrating readiness (e.g., insurer data and other vendor data) into third party devices 150. For example, the insurer data of an insurer of the company can be recorded and stored at a third party device 150. In various implementations, determining organization incident readiness can include the analysis circuit determining organization capabilities, limitations, cyber threats, and specific focus associated with cyber threats. Additionally, organization incident readiness can be provided to incident response providers (e.g., security providers, firmware providers, software providers, infostructure providers). The analysis circuit 136 can also be configured to automatically route incidents and claims to vendors associated with a company or user (e.g., client device 110) and in turn contracting and activating an incident response. In some implementations, a response plan can be submitted by a company and the analysis circuit 136 can decompose and analyze the response plan to determine actionable tasks and activities to complete (e.g., by the company or after contracting with a vendor).

In various implementations, the determined organization incident readiness can be stored (e.g., by the analysis circuit 136) as a block in a blockchain (or on a ledger) that can metadata identifying the readiness including, but not limited to, a time stamp, proof of date, and artifacts. In various implementations, the data regarding key milestones (e.g., capabilities pre-incident, what happened after the incident occurred, root cause, recoding) can be stored on a blockchain (e.g., such that it is immutable). In particular, key milestones can be traceable and linkable within a blockchain (or ledger) such that issues can be identified, actionable tasks can be tracked, work is routed to vendors (e.g., 150), and proof of resolution is recorded. In some implementations, database 140 can include a plurality of ledgers or blockchains and the database 140 can be a node of a plurality of nodes on a ledger or blockchain. It should be understood that the various data and information described herein can be implemented on a blockchain. For example, the blockchain can be used to provide for irrefutable proof in a data set of the data, locations, capabilities, configurations, that were in place prior to an incident. In another example, the block can be used to link the incident occurrence with what worked (e.g., effective in preventing an incident) and what did not work (e.g., vulnerability that led to the incident). For example, the irrefutable permanent ledgers (or blockchain) can be used by users at points in the process where they wish to record proofs on chain. This can include configurations, capabilities, assets, policies, threats, actors, claims, incident reports, cyber threat intelligence artifacts, and any other state-based attribute that is to be recorded and can be shared with others to irrefutably prove that the state of that attribute was "x" at time "t". Combinations of attributes for different data, assets, configurations, capabilities, are collected and rolled up to show if any elements have changed through the use of Merkel Trees, allowing a check of the top hash of the combination of downstream values facilitating a single checkpoint to determine if any other elements and configurations, combinations of parameters is the same or if they have changed.

In various implementations, the analysis circuit 136 can intake potential or current incidents based on an embedded widget on remote web sites or within remote web applications. This allows an incident response provider or vendor (sometimes referred to herein as "IR providers" or IR vendors") the ability to seamlessly intake incident response requests for assistance from their web site or one of their sales channel partner sites and have it load directly into the incident intake process within responder. In turn, an embedded widget could be communicably coupled to the analysis circuit 136 (e.g., via network 120) to allow the analysis circuit to start an incident response process (e.g., at proposal stage) and continue through a workflow to achieve response readiness based on pre-defined logic or rules. This rule mechanism can allow for the user to specify specific attributes, collection of attributes, order, and routing method for connecting inbound requests to those who are best-fit to execute on the requests. For example, when an inbound instance of an incident response can be routed to a claim manager based on pre-defined logic or rules, such as to route inbound cases to the IR provider that is active currently, or to the provider who specializes in ransomware extortion cases where the ransom exceeds 10 million, or to round-robin inbound cases among a set of panel IR providers, etc.

In some implementations, the analysis circuit 136 can facilities invoice processing within an incident response process across different insurers. Furthermore, throughout an incident response conditions can be modified, added, or removed to route tasks (or work) to different vendors or partners (e.g., 150). In some implementations, the analysis circuit 136 can also be configured to collect incident submission data, normalize the data (e.g., based on historical data or trends), and automatically submit insurance claims based on the normalized data. Moreover, the analysis circuit 136 can connect the underlying root cause to the capability failure or procedural issue and have that data submitted with the insurance claim. For example, the analysis circuit 136 can connect underlying root cause back to the insurers underwriting questions. In various implementations, the analysis circuit 136 can integrate organization incident readiness into all related parties to a company. As such, the analysis circuit 136 can integrate incident response activation and collaborative across business, teams, insurers, etc. Further, the analysis circuit 136 can be configured to link the root cause of an incident to the capability failure or procedural issue and then link back the insurers underwriting questions.

The content management circuit 135 can also be configured to facilitate a user (e.g., of a company) purchasing and extending services via the generated dashboards. In some implementations, the content management circuit 135 allows the user (e.g., via a step through process) to integrate into technology and vendors to resolve issues (e.g., incidents) and/or prevent incidents in the future. For example, the dashboards can provide users integration points for incident response workflow management. As such, the content management circuit 135 can generate dashboards (and/or interfaces) on an application (e.g., 112 or 152) for purchasing products, insurances, and services. In particular, the generated dashboards can provide users of the application with a unified (or universal) view of tasks, activities, and progress/status tracking of incidents, claims, etc. The dashboards can also tie back to incident readiness and managing the incidents through resolution. The content management circuit 135 can also generate the dashboards to include collaboration tools (e.g., video calls, calendar, chats), and the dashboards can include real-time status tracking of policies, incidents, claims, insurers such that policy aligned tasks and status updated can be provide for incident responses and claims.

Figure 1B:
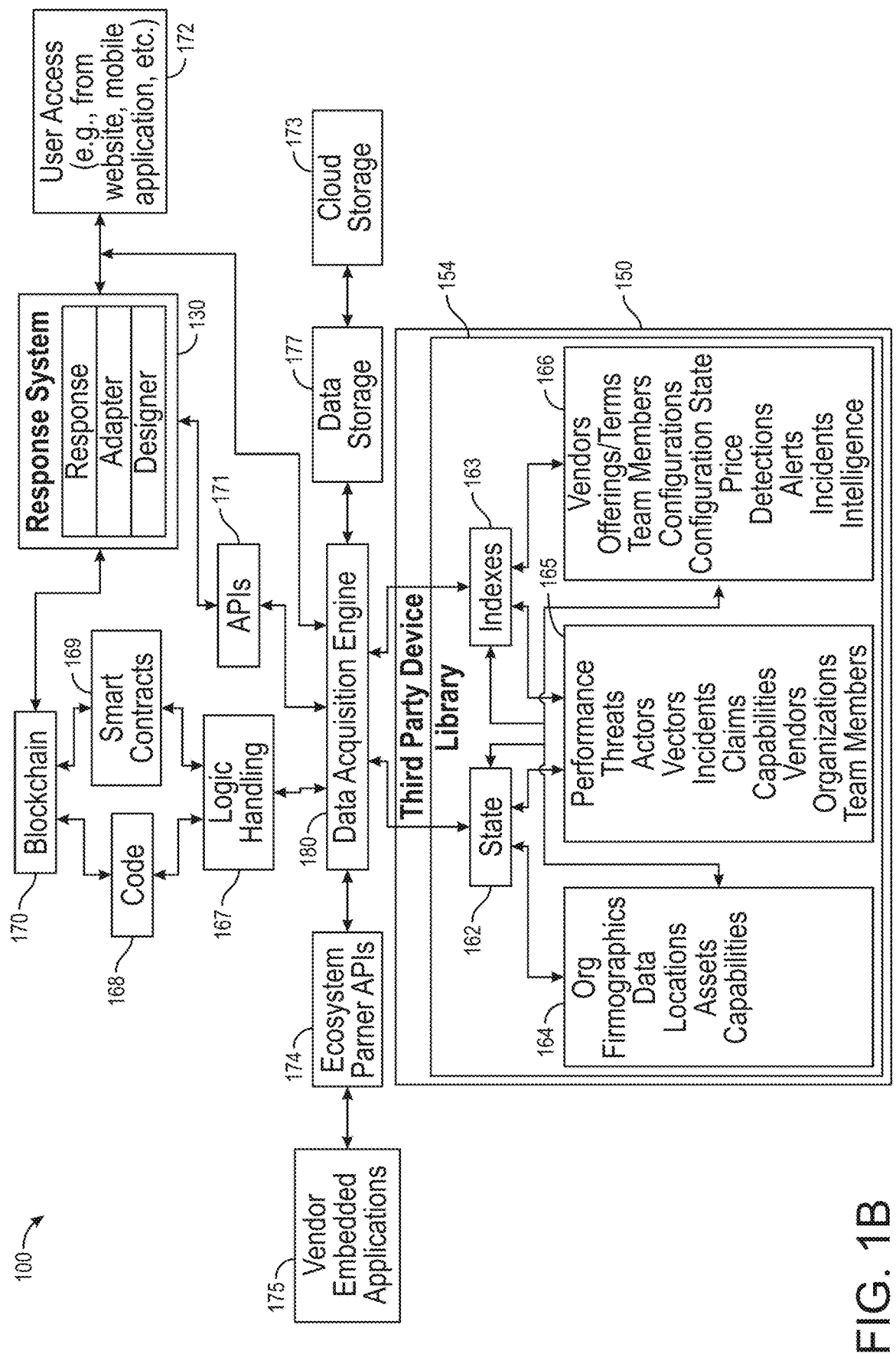
FIG. 1B depicts a block diagram of a more detailed architecture of certain systems or devices of FIG. 1A, according to some implementations.

Referring now to FIG. 1B, a block diagram depicting a more detailed architecture of certain systems or devices of system 100. System 100 includes the data acquisition engine 180 and response system 130 described in detail with reference to FIG. 1A. However, it should be understood that the response system 130 also encompasses the capability to generate content and dashboards tailored for at least one (e.g., each) aspect of the response process, including the response, adapter, and designer components. These content and dashboards are generated by the content management circuit 135.

To illustrate further, the response system 130 facilitates the presentation of diverse information related to security and threats of the organization through the adapter dashboard and architecture. This facilitates a comprehensive understanding of the security landscape and helps inform decision-making processes. Additionally, the dashboard functionality can be customized by the vendor and/or organization using the designer dashboard and architecture. This empowers them to tailor the visual representation of data, making it more intuitive and aligned with their specific requirements. Furthermore, the responder dashboard and architecture provided by the response system 130 allow the vendor and/or organization to effectively prepare for, track, and update incidents and readiness. This comprehensive dashboard encompasses an incident response lifecycle, from the initial incident detection and response through to the final incident closure and claim submission. By leveraging the responder dashboard and architecture, the vendor and/or organization can confirm smooth incident management, streamline processes, and facilitate efficient collaboration among stakeholders.

In the depicted architecture, both organizations and vendors operating the third party devices 150 or client devices 110 have the ability to store states 162 and indexes 163 within the library 154 (or library 114). In some implementations, these states 162 and indexes 163 can be determined based on data derived from various datasets, including the organization dataset 164, performance dataset 165, and vendor dataset 166.

In some implementations, the organization dataset 164 encompasses a wide range of information such as firmographics, data related to locations, assets, and capabilities of the third-party or client organization. This dataset provides a comprehensive understanding of the profile and resources of the organization. In some implementations, the performance dataset 165 includes diverse sets of data, including threat data, actor data, vector data, incident data, claim data, capability data, vendor data, organization data, and team member data. These performance-related datasets capture information for assessing the security posture, incident history, and overall operational performance of the organization. They provide effective monitoring, analysis, and decision-making in incident response activities. In some implementations, the vendor dataset 166 contains information related to offerings (cybersecurity protection plans), terms, team member data, configuration data, configuration state data, pricing details, detection data, alert data, incident data, and intelligence data. This dataset facilitates organizations gaining insights into the capabilities and services provided by vendors, facilitating informed decision-making when selecting and collaborating with specific vendors.

In general, the states 162 and indexes 163, derived from the datasets, are utilized as input by the data acquisition engine 180 (or analysis circuit 136) to output a security posture. In some implementations, the data acquisition engine 180 is configured to scan and perform data collection based on accessing vendor embedded applications 175, via ecosystem partner APIs 174. This provides seamless integration with vendor systems, allowing for efficient retrieval and synchronization of relevant data. In the depicted architecture, the states 162 and indexes 163 improve the efficient operations of the response system 130. These states 162 and indexes 163 can stored within the library 154 (or library 114)

and are determined based on data from various datasets, including the organization dataset 164, performance dataset 165, and vendor dataset 166.

In some implementations, the states 162 represent the current condition or status of the organization or vendor operating the third-party devices 150 or client devices 110. They encapsulate information such as system configurations, security policies, incident response readiness, and other relevant parameters. By maintaining these states, the response system 130 can quickly access and reference up-to-date information about the environment of the organization or vendor. Additionally, in some implementations, the indexes 163 serve as pointers or references to specific data or resources within the library 154 (or library 114). They streamline the retrieval and access of cybersecurity information, providing for efficient data processing and analysis. These indexes are configured to improve search operations and facilitate rapid access to relevant datasets, contributing to the overall responsiveness and effectiveness of the response system 130.

Accordingly, to confirm the accuracy and currency of the states 162 and indexes 163, the data acquisition engine 180 can be configured to scan and collect data by interacting with the vendor embedded applications 175. The communication can occur through ecosystem partner APIs 174, establishing a connection between the response system 130 and the embedded applications 175 used by vendors. Through this communication, the data acquisition engine 180 can retrieve real-time (or near real-time) information from the vendor systems, including offerings, configurations, alerts, incidents, and other relevant data. In some implementations, the engine 180 can utilize the retrieved data to update and synchronize the states 162 and indexes 163, providing that the response system 130 has updated and accurate information to support incident response activities.

Expand further on states 162 and indexes 163, the data acquisition engine 180 can maintain the security posture of the organization. That is, the data acquisition engine 180 can actively check a vendor API for any changes in the configuration "State," the data acquisition engine 180 that the security posture remains up to date and aligned with the evolving environment. By recording these configuration updates to the corresponding index, the data acquisition engine 180 and response system 130 establishes a view of the security landscape of the organization. This approach goes beyond static assessments and provides a dynamic and real-time perspective on the security posture of the organization. By linking the configuration data with real incident data and other relevant metadata, the response system 130 enhances the accuracy and actionability of the match, facilitating quick and effective response to potential threats. In various implementations, this continuous monitoring and adaptation of the security posture over time is provided and/or presented in a posture stream which captures and analyzes the evolving information. As new data points are gathered and recorded in the posture stream, the response system 130 can execute proactive incident response activities.

As used herein, a "security posture" refers to the current state and overall cybersecurity profile of an organization or vendor. It is determined based on various factors and information collected from entity data, including system configurations, security policies, incident response readiness, and other relevant parameters. In some implementations, the data acquisition engine 180 (or analysis circuit 136) scans and collects data from vendor embedded applications through ecosystem partner APIs, verifying the accuracy and currency of the states and indexes used to represent the security posture. In various implementations, the analysis circuit 136 utilizes a distributed ledger to tokenize and broadcast the security posture, verifying transparency and immutability. The analysis circuit 136 can also be configured to model the security posture and multiple security objectives to generate a set of cybersecurity attributes specific to the entity.

Furthermore, the data acquisition engine 180 is shown to gather data from blockchain 170 (e.g., ledgers storing various immutable information about entities, vendors, and corporations) via code 168 and smart contracts 169 that are executed by logic handling 167 (e.g., of the data acquisition engine 180). In some implementations, data acquisition engine 180 can communicate with response system 130 directly (e.g., via a wired or hard-wired connection) or via APIs 171. To facilitate user access and interaction with the dashboards and content generated by the response system 130, user access 172 is provided. Users, including organizations, vendors, and entities, can access the dashboards and content through dedicated applications such as application 112 or application 152. These applications can be accessed through user devices, such as client device 110, or through third-party devices 150. In some examples, the data acquisition engine 180 can communicate and/or interface with data storage 177 and/or cloud storage 173 to collect, store, receive, access, and/or otherwise perform various operations associated with cybersecurity or related data.

Additionally, user access 172 to the dashboards and content can be provided to users (e.g., organizations, vendors, entities) via an application (e.g., 112 or 152) a user device (e.g., 110) and/or third party device 150. Additional, fewer, or different systems and devices can be used. It should be noted that the depicted system and devices are not exhaustive, and additional, fewer, or different systems and devices can be employed depending on the implementation. The architecture can be tailored for organizations, vendors, and entities, allowing for flexibility and customization in the deployment of the response system 130.

In addition to gathering data from the blockchain 170, the response system 130 can establish a communication channel with the blockchain 170. This communication allows the response system 130 to interact with the blockchain 170 in a secure and decentralized manner. By directly accessing the blockchain 170, the response system 130 can leverage blockchain properties of immutability, transparency, and distributed consensus to improve the integrity and reliability of incident-related data and information. Accordingly, the response system 130 can use blockchain 170 to record and verify incident details, maintain an auditable trail of actions and transactions, and confirm the integrity of information throughout the incident response process.

It will be recognized that some or all of the figures are schematic representations for purposes of illustration. The figures are provided for the purpose of illustrating one or more implementations with the explicit understanding that they will not be used to limit the scope or the meaning of the claims.

Figure 2:
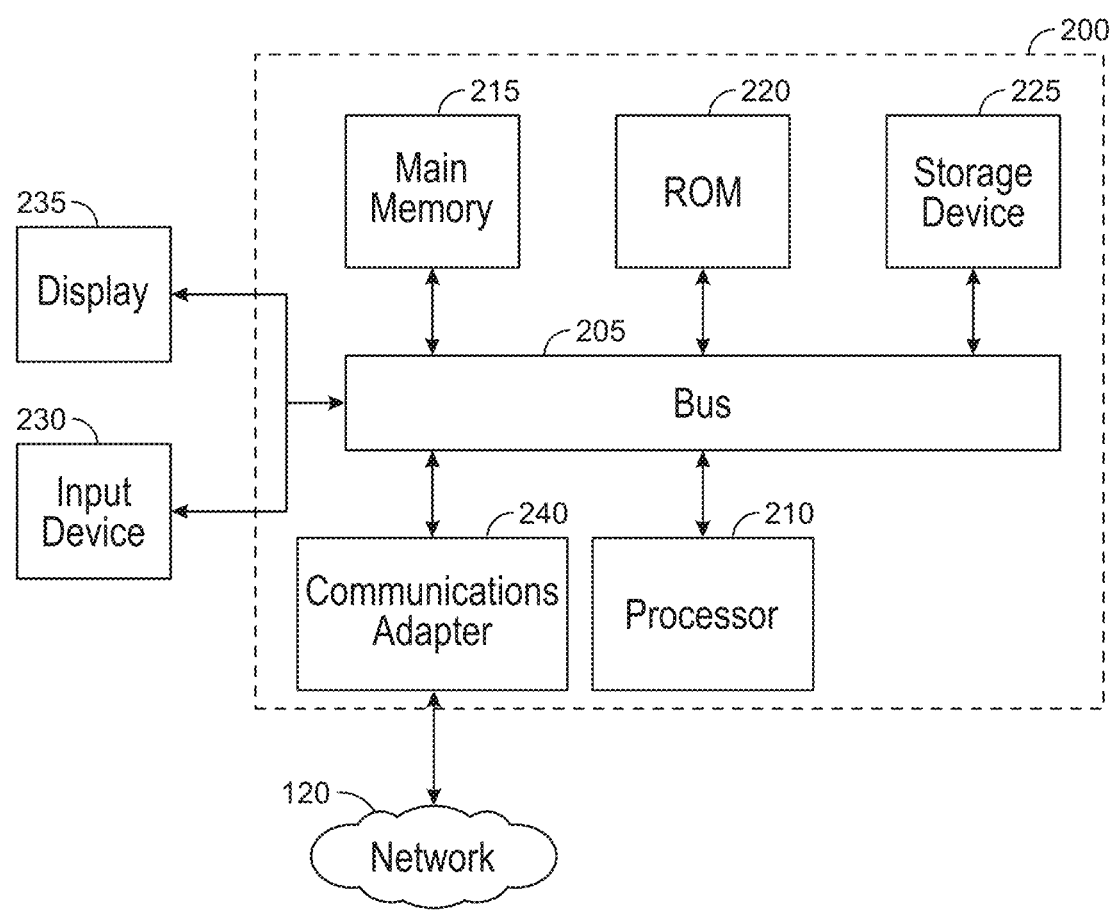
FIG. 2 depicts a computer system, according to some implementations.

Referring now to FIG. 2, a depiction of a computing system 200 is shown. The computing system 200 that can be used, for example, to implement a system 100, response system 130 (e.g., an incident response system), client devices 110, third party devices 150, data sources 160, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 can further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 can be coupled via the bus 205 to a display 235, such as a liquid crystal display, or active matrix display, for displaying information to a user. An input device 230, such as a keyboard including alphanumeric and other keys, can be coupled to the bus 205 for communicating information, and command selections to the processor 210. In some implementations, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some implementations, the computing system 200 can include a communications adapter 240, such as a networking adapter. Communications adapter 240 can be coupled to bus 205 and can be configured to provide communications with a computing or communications network 120 and/or other computing systems. In various illustrative implementations, any type of networking configuration can be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 200 in response to the processor 210 executing instructions contained in main memory 215. Such instructions can be read into main memory 215 from another non-transitory computer-readable medium (CRM), such as the storage device 225. Execution of the instructions contained in main memory 215 causes the computing system 200 to perform the illustrative processes described herein. One or more processors in a multi-processing configuration can also be employed to execute the instructions contained in main memory 215. In alternative implementations, hard-wired circuitry can be used in place of or in combination with software instructions to implement illustrative implementations. Thus, implementations are not limited to any specific combination of hardware circuitry and software.

Systems and Methods for Posture-Based Modeling

Figure 3:
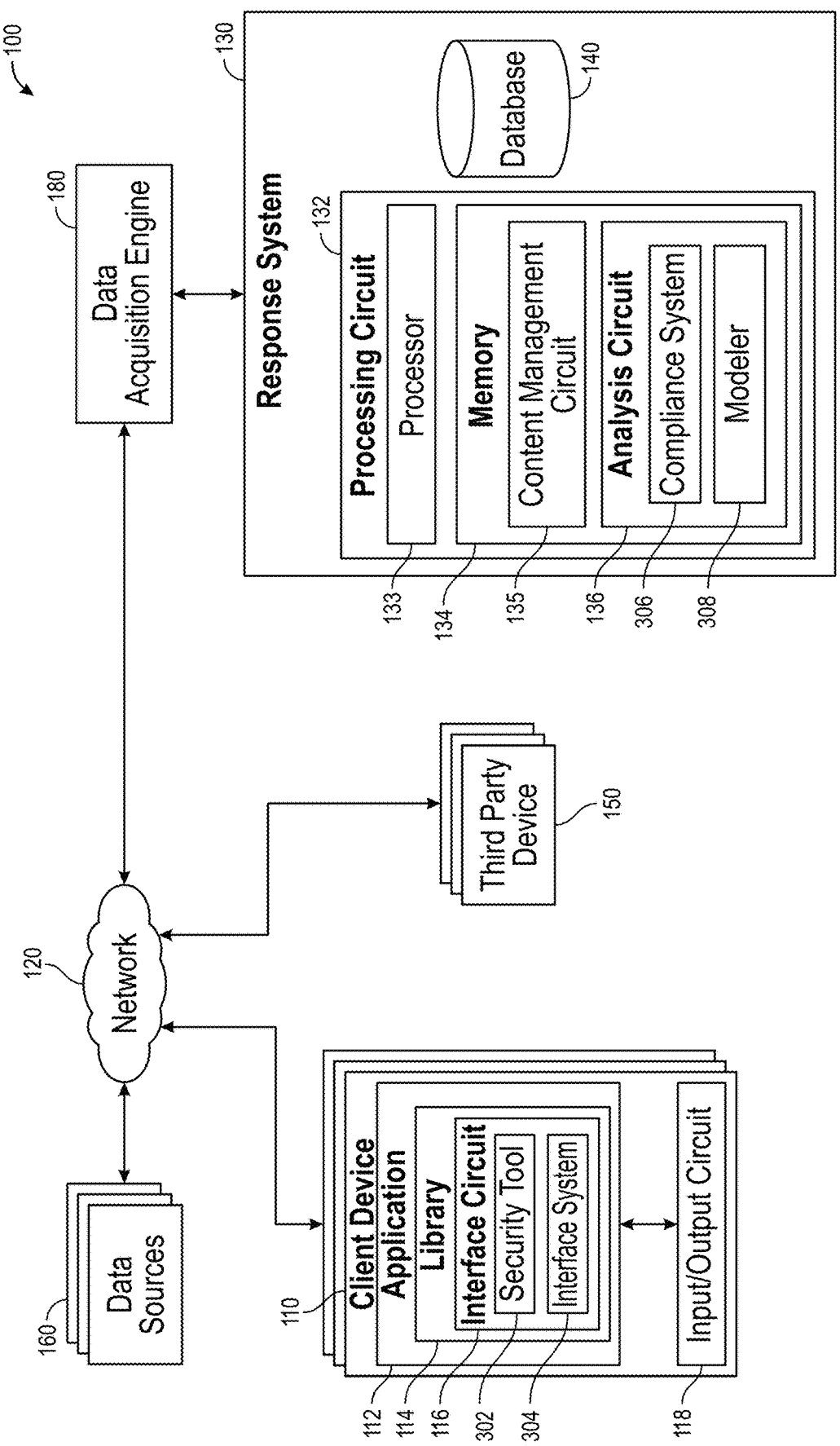
FIG. 3 depicts a block diagram of an implementation of a security architecture for posture-based modeling, according to some implementations.

Referring to FIG. 3, a block diagram of an implementation of a security architecture for posture-based modeling is shown. The implementation shown in FIG. 3 includes a client device 110, response system 130, third-party device 150, data sources 160, and data acquisition engine 180 for protecting data (e.g., entity data, cybersecurity posture data, etc.). These components can be interconnected through a network 120 that supports secure communications profiles (e.g., TLS, SSL, HTTPS, etc.). In some implementations, the elements shown in FIG. 3 can incorporate similar features and functionality as described regarding the elements shown FIG. 1A. For example, the response system 130, as shown in FIG. 3, incorporates similar functionality as described regarding the response system 130 of FIG. 1A; the database 140, as shown in FIG. 3, can incorporate the same or similar functionality as described regarding the database 140 of FIG. 1A; etc. Specifically, like callout references of FIG. 1A are now further described, however the features and functionalities of components like the response system 130 in FIG. 3 still correspond to those referred to with the same callout reference in FIG. 1A. For example, response system 130 is described in FIG. 3 to include additional functionality and features related to the security architecture for posture-based modeling.

In some implementations, the client device 110 can include an application 112 and an input/output circuit 118. The application 112 can include a library 114, and the library 114 can include an interface circuit 116. The interface circuit 116 can further include a security tool 302 and an interface system 304. In some implementations, the response system 130 can include a processing circuit 132 and a database 140. The processing circuit 132 can include a processor 133 and memory 134. The memory 134 can further include a content management circuit 135 and an analysis circuit 136, and the analysis circuit 136 can include a compliance system 306 and a modeler 308, as further described herein.

In some implementations, one or more elements (computing systems, devices) of FIG. 3 can be communicably coupled (connected) to a distributed ledger (e.g., blockchain 170 of FIG. 1B) or other authoritative data source to confirm data integrity and security. For example, as described above regarding FIG. 1A, the database 140 can be a private ledger, and data source 160 can be a public ledger, and data transactions (e.g., updates to proof/posture state data, cybersecurity parameters, entity data, etc.) recorded on the database 140 can be validated against entries recorded on the data source 160 to confirm that updates to entries are accurately reflected and can be audited against an immutable record (e.g., verifying that results can be traceable and linkable). In some implementations, the application 112 can be designed to integrate with technology and databases (e.g., database 140, response system 130, etc.) to access information used for posture-based modeling. The user can access the application 112 through a variety of devices, including client device 110.

In some implementations, the response system 130 can be operably connected to data acquisition engine 180 and includes analysis circuit 136 to democratize posture threats, incidents, and claim data (e.g., cyber security data, protection data, protection control schemas, historical protection data, etc.) for posture-based modeling. The analysis circuit 136 can use the democratized data in underwriting, claims, the resilience process, etc. Using the data acquisition engine 180, the response system 130 can collect and process data (e.g., unstructured data, entity data) from various sources, such as client device 110, third-party devices 150 and data sources 160 for posture-based modeling.

In some implementations, the response system 130 can receive, via a vendor security tool (sometimes referred to herein as a "security tool") application, a cybersecurity protection request from an entity. For example, the response system 130 can receive a request for cybersecurity protection (e.g., inquiry regarding cybersecurity protection plan, etc.) from the client device 110 (e.g., via the entity or other user interacting with the interface system 304), and the request can be transmitted via the network 120. In some implementations, the cybersecurity protection request can include entity data of the entity. For example, the cybersecurity protection request received by the response system 130 via the interface system 304 can include legal data (e.g., regulatory impact, privacy impact, etc.), firmographic data (e.g., industry, revenue, etc.), and/or cybersecurity data (e.g., safeguards, root cause, etc.) of the entity. In some implementations, the security tool 302 is a security tool application (e.g., vendor security tool application of a vendor) configured to receive cybersecurity protection requests from entities or users and provider the cybersecurity protection requests, as described regarding the response system 130. Furthermore, as used herein, a vendor can be a party or protection entity offering a product (e.g., cybersecurity tool), and the cybersecurity tool can allow a prospective entity (e.g., party seeking protection) to purchase cybersecurity protection using the cybersecurity tool.

As used herein, a "protection plan" and "cybersecurity protection plan" refers to any array of measures and strategies primarily focused on bolstering cybersecurity defenses, including cybersecurity monitoring and response services, digital infrastructure hardening programs, employee cyber awareness training, data protection and encryption techniques, insurance plans, all aimed at securing or covering an entity computing and networking infrastructure against cyber threats, vulnerabilities, and incidents, while verifying compliance with relevant standards and regulations.

In some implementations, the response system 130 can determine a cybersecurity posture with proof based on the entity data. For example, the compliance system 306 can receive, process, and model data received via the vendor security tool application (e.g., entity data related to firmographics, security measures, etc.) and output a cybersecurity posture with proof. In some implementations, the proof includes one or more digital signatures and/or authenticated data (e.g., of an entity, related to a security posture, etc.). In some implementations, a cybersecurity posture can be a data package encapsulating a cybersecurity disposition of an entity. This includes a mapping of compliances (e.g., regulatory and privacy impacts) and firmographic insights (e.g., industry classification and revenue metrics). Furthermore, the cybersecurity posture can include data related to protective measures (e.g., encryption standards, MDR, etc.) implemented by the entity and rationales for implementation. For example, the encoded posture state can integrate data reflecting encryption protocols of the entity, thereby offering a "snapshot" of its technical safeguards. This data can be used by a vendor, provider, or protection entity to assess the alignment of the entity with cybersecurity benchmarks and standards, such as ISO/IEC 27001 certification. In some implementations, the cybersecurity posture can include a verifiable account of entity cybersecurity measures, such as the implementation of advanced threat detection systems like MDR and endpoint detection and response solutions.

In some implementations, the response system 130 can determine, utilizing one or more protection parameters, at least one cybersecurity protection plan corresponding to a cybersecurity attribute to protect the entity based on the cybersecurity posture with the proof. For example, the compliance system 306 and/or modeler 308 can identify and/or generate a cybersecurity protection plan (e.g., ransomware protection plan, data breach compensation plan, etc.), and the cybersecurity protection plan can correspond to a cybersecurity attribute (e.g., confidentiality, integrity, authentication, etc.) of the entity. In some implementations, the cybersecurity protection plan determined by the response system 130 can be based on the cybersecurity posture of the entity and/or based on the proof (e.g., digital signatures, authenticated cybersecurity data, etc.). For example, the compliance system 306 and/or modeler 308 can identify and/or generate a cybersecurity protection plan by comparing and mapping compliances (e.g., regulatory and privacy impacts) of the entity, firmographic insights (e.g., industry classification and revenue metrics) of the entity, data related to protective measures (e.g., encryption standards, MDR, etc.) implemented by the entity, etc. to requirements (e.g., protection eligibility) of the cybersecurity protection plan (e.g., encryption standards, managed detection and response (MDR) system requirements, entity size/revenue requirements, etc.). This can include a comparison of rates tied to the effectiveness of current entity-implemented cybersecurity measures, such as encryption strength, endpoint security coverage, and MDR system efficiency.

In some implementations, the response system 130 can provide, via the vendor security tool application of the entity computing system of the entity, the at least one cybersecurity plan (e.g., to the entity). For example, the cybersecurity protection plan determined by the response system 130 can be transmitted to the client device 110 and displayed via the security tool 302 (e.g., using a graphical user interface (GUI)) of the application 112. In some implementations, the cybersecurity protection plan provided via the vendor security tool application can include at least one selectable element (e.g., digital button, drag-n-drop, etc.). For example, a user (e.g., the entity) can interact with the selectable element (e.g., via pressing, clicking, etc.) to select one or more options related to the cybersecurity protection plan (e.g., "Yes"/"No", "I agree," "Please modify," "Please add," etc.). For example, the entity can accept (e.g., digitally sign/approve) the cybersecurity protection plan using the selectable element.

In some implementations, the response system 130 can receive, from the vendor security tool application, an acceptance of the at least one cybersecurity protection plan. For example, the compliance system 306 and modeler 308 can receive an acceptance of the cybersecurity protection plan via the user (e.g., entity) interacting with the application 112 of the client device 110 (e.g., via the interface system 304, using a GUI, etc.). For example, the entity can accept the at least one cybersecurity protection plan by selecting an "Accept" button within the application 112 (e.g., via the interface system 304), by providing a digital signature, etc., and the acceptance of the entity can be received by the response system 130 via the network 120.

In some implementations, the response system 130 can record the acceptance with the proof embedded in a compliance dataset. That is, the proof can be embedded into the acceptance that is then recorded. For example, the response system 130 can store data related to the acceptance of the cybersecurity protection plan of the entity in a data store (e.g., database 140) for compliance verification, and the response system 130 can embed the proof (e.g., digital signatures, compliance certifications, etc.) within the stored data. Furthermore, the acceptance stored in the compliance dataset can be stored on a distributed ledger (e.g., using database 140 as a private ledger, and data source 160 as a public ledger, as described above), or on an external data store (e.g., data sources 160, third party device 150). In some implementations, the acceptance recorded by the response system 130 can include the cybersecurity attribute and the accepted cybersecurity protection plan. For example, the data recorded in the compliance data set can include data related to the cybersecurity attribute (e.g., confidentiality, integrity, authentication, etc.) and the accepted cybersecurity protection plan (e.g., artifact/identifier of signed/accepted breach protection plan, etc.). Furthermore, the compliance dataset can be a dataset/data structure configured to be monitored to confirm ongoing compliance with cybersecurity requirements (e.g., encryption protocol compliance, security patching cadence, and access control integrity, such as SSL/TLS standards for data in transit, frequency of security updates, implementation of least privilege principles, etc.) of the accepted cybersecurity protection plan. As such, the various computing elements of FIG. 3 can perform underwriting for any cybersecurity protection policy/plan matching predefined proof criteria.

It should be understood that while the response system 130 processes cybersecurity protection requests, its functions can also be applied to other areas. These include conducting risk assessments, identifying supply chain vulnerabilities, and verifying compliance with regulatory standards. The system can analyze entity data to recommend technology upgrades or process improvements, based on firmographic data, legal requirements, and cybersecurity posture. Additionally, it can offer monitoring and reporting services to track the effectiveness of implemented measures. Furthermore, the response system 130 can be utilized for disaster recovery planning, facilitating the development of strategies to confirm business continuity in the event of cyber-attacks, natural disasters, or other unforeseen incidents. The response system 130 can create incident response plans, model the assessment of potential impacts on business operations, and perform and prioritize recovery actions.

In some implementations, the response system 130 and/or client device 110 can further receive or collect environmental data from computing and networking structures of the entity for posture-based modeling. For example, the user (e.g., entity) can input environmental data via the interface system 304 of the application 112, and the interface system 304 (or other components of the client device 110, such as input/output circuit 118) can transmit the environmental data via the network 120, and the response system 130 (e.g., compliance system 306, modeler 308, etc.) can receive the environmental data. Furthermore, the environmental data can include information related to the entity computing and networking infrastructure such as hardware and software setups, security mechanisms, and network layouts (e.g., firewall rules, server specifications, network connections, etc.).

In some implementations, the response system 130 and/or client device 110 can further record the environmental data received/collected from the computing and networking structures of the entity in the compliance dataset. For example, the response system 130 (e.g., content management circuit 135, compliance system 306, modeler 308, etc.) can store/catalog environmental data (e.g., data related to network architecture, device configurations, security policies, etc.) in a data set (e.g., stored on database 140). Furthermore, the compliance dataset can be a structured dataset stored in a data store (e.g., database 140, data sources 160, etc.) and can be used (e.g., in compliance automation) by the computing elements of FIG. 3 (e.g., response system 130, compliance system 306, etc.) to determine compliance of the entity with various requirements (e.g., protection parameters) of the cybersecurity plan (e.g., GDPR compliance, data encryption standards, etc.).

In some implementations, determining the at least one cybersecurity protection plan can include executing a zero-knowledge proof (ZKP) model to determine the cybersecurity posture (e.g., readiness, resilience) of the entity against the one or more protection parameters. As described herein, zero-knowledge proofs (ZKPs) are a cryptographic method by which one party (the prover) can prove to another party (the verifier) that a certain statement is true without revealing any information about the statement itself beyond its veracity. ZKP techniques can implement mathematical functions, such as elliptic curve cryptography or hash functions (e.g., SHA-256), to create a proof of knowledge (e.g., proving the possession of a secret key, such as a key proving the implementation of a specific cybersecurity requirement of a cybersecurity protection plan) without disclosing confidential and/or sensitive entity data. ZKPs can be implemented through interactive protocols (e.g., SHA-256, the Schnorr protocol, etc.), where the prover and verifier execute a sequence of exchanges (e.g., challenge-response cycles) to prove knowledge without revealing the underlying data. ZKPs can also be implemented via non-interactive schemes (e.g., e.g., zk-SNARKs (Zero-Knowledge Succinct Non-Interactive Arguments of Knowledge)) using a common reference string (e.g., a publicly agreed-upon set of values used in the cryptographic computation, other identifier, etc.).

In some implementations, the ZKP model used by the response system 130 to determine the cybersecurity posture can maintain anonymity of all or a portion of data used in determining the at least one cybersecurity protection plan. For example, the response system 130 (e.g., compliance system 306, modeler 308) can execute ZKPs to match entity posture to protectability (e.g., eligibility, regulatorability, insurability), allowing the entity to prove compliance with protection parameters (e.g., encryption standards, endpoint security) without revealing underlying data (e.g., sensitive user data, classified cybersecurity data, etc.) of the entity and/or data related to the security tool (e.g., proprietary source code used in cybersecurity product, etc.). Furthermore, the ZKP model can verify the adherence of the entity to required security measures (e.g., SHA-256 encryption for data at rest, TLS 1.3 for data in transit, etc.) without exposing actual encryption keys of data being encrypted. For example, the ZKP model can be used (e.g., by the response system 130, compliance system 306, modeler 308, some combination of various FIG. 3 elements, etc.) to confirm the deployment of next-generation firewalls (NGFWs) required by protection parameters of the cybersecurity protection plan. Further, in some implementations, the anonymity of the entity is maintained until acceptance. For example, the ZKP model used by the response system 130 to determine the cybersecurity posture of the entity can prevent a protection entity from learning the identity of a prospective entity prior to acceptance of the protection plan (e.g., before the prospective entity/representative of the prospective entity accepts the provided security plan).

In some implementations, the modeler 308 can (1) determine at least one cybersecurity protection plan, (2) provide, to a graphical user interface (GUI), the at least one cybersecurity protection plan, (3) receive the acceptance, and (4) embed and record the acceptance can correspond to quoting, binding, and issue (QBI) of the cybersecurity protection plan. For example, the response system 130 can further analyze qualitative business impact (QBI) and resilience against cybersecurity threats of the entity computing infrastructure in performing the various steps described above. For example, the compliance system 306 and/or modeler 308 can unify and analyze data related to the QBI to assess the potential financial loss, reputation damage, and operational downtime associated with cybersecurity incidents (e.g., data breaches, ransomware attacks, DDoS attacks, etc.). In some implementations, determining the at least one cybersecurity protection plan further includes quoting the cybersecurity protection plan based on matching the cybersecurity posture of the entity to the cybersecurity attribute.

For example, the response system 130 can compare the cybersecurity posture of the entity to cybersecurity attributes of one or more protection plans (e.g., by filtering based on protection parameters, by using GAI/ML techniques, etc.) to determine whether the entity meets various criteria (e.g., protection parameters) of the one or more protection plans and determine a protection quote (e.g., premiums, payments schedule, reimbursement, etc.) based on the identified protection plans and the cybersecurity posture of the entity. Further, in this example, the response system 130 can examine the robustness of security measures (e.g., deployment of redundant systems), determine the effectiveness of incident response plans (e.g., using historical/predictive datasets and/or models), and/or analyze other entity datasets and/or security tools and further generate a protection quote based on the above analysis. For example, the response system 130 can use an artificial intelligence (AI) or machine learning (ML) model (e.g., generative AI (GAI), large-language model, supervised learning model, etc.) to predict the impact of specific vulnerabilities within the entity network (e.g., unpatched software, outdated hardware), simulate model potential attack paths (e.g., using cyber penetration testing tools), and determine potential business impacts based on the QBI. In some implementations, providing the at least one cybersecurity protection plan, receiving the acceptance, and recording the acceptance corresponds to binding and issuing the at least one cybersecurity protection plan based on (1) transmitting a first API call to create a protection binder and (2) transmitting a second API call to issue the at least one cybersecurity protection plan. For example, the response system 130 can bind (e.g., signify the commitment of the third party to the protection agreement before the actual protection policy is issued) and issue (e.g., finalize the protection coverage by preparing and sending the formal policy documents to the entity) the protection plan by executing API calls (e.g., for submitting an protection application, quoting an protection application, creating an protection binder, issuing a corresponding cyber plan, etc.), and the API calls executed by the response system 130 can include data payloads for various uses in aligning security posture to protection requirements. In some implementations, the first API call can include a first data payload including an entity identification, cybersecurity protection plan information, and a temporary protection agreement identifier. In some implementations, the second API call can include a finalized protection policy document, a permanent policy identifier, and confirmation of policy activation covering the entity under the at least one cybersecurity protection plan.

In some implementations, the response system 130 can further renew (e.g., automatically) the cybersecurity protection plan of the entity based on the modeled cybersecurity posture and resilience. For example, the compliance system 306 and modeler 308 can evaluate and/or update the cybersecurity protection plan parameters (e.g., encryption requirements, regulatory standards, coverage levels, deductible amounts) by analyzing the modeled cybersecurity posture and resilience to extend or renew the term (e.g., period of effect) of the cybersecurity protection plan. For example, the response system 130 (e.g., using compliance system 306, modeler 308, etc.) can process the renewal of the cybersecurity protection plan by assessing adherence to encryption standards (e.g., AES-256 for data at rest, TLS 1.3 for data in transit), compliance with regulatory standards (e.g., GDPR for data protection, SOC 2 for service organizations), and more. For example, the response system 130 can map data associated with the adherence of the entity to cybersecurity standards (e.g., based on the cybersecurity posture of the entity) to various protection parameters of a cybersecurity protection plan, and further update the cybersecurity protection plan (e.g., by changing/recalibrating the cybersecurity parameters of the plan, by generating a new plan, etc.) based on the adherence of the entity with the plan requirements, thereby unifying protectability tools for autorenewal.

In some implementations, the response system 130 can further dynamically update the at least one cybersecurity protection plan based at least on an update in a cybersecurity landscape or a change in one or more protection preferences of an entity. For example, the response system 130 can adjust the cybersecurity protection plan (e.g., by adjusting cybersecurity plan parameters) in response to emerging threats (e.g., zero-day exploits, advanced persistent threats), new compliance requirements (e.g., updates to international data protection laws), or other changes in the cybersecurity landscape identified by the compliance system 306. Furthermore, the response system 130 (e.g., using modeler 308) can update or refine the cybersecurity protection plan based on changes in the protection preferences of the entity. For example, an entity can change its protection preferences when implementing more enhanced data privacy measures in light of increasing regulatory scrutiny (e.g., changing protection preferences to a higher value associated with a higher degree of cybersecurity protection, etc.). Based on analyzing the update and/or changes, the response system 130 can adjust or update the cybersecurity protection plan to match the current risk profile and cybersecurity objectives of the entity (e.g., extending coverage to new digital assets, recalibrating premiums based on risk assessment outcomes, renewing a plan, generating a new plan, etc.). For example, the response system 130 can update one or more protection parameters to confirm the related protection plan is dynamically aligned with evolving security requirements of the entity and the external cybersecurity environment.

In some implementations, the various computing elements of FIG. 3 (e.g., response system 130) can further perform bulk trading of entity policies matching proof criteria for posture-based modeling, as described in detail below. In some implementations, the response system 130 can receive, from a broker (e.g., provider) computing system, a bundle request from a protection broker. For example, the response system 130 can receive, from a broker computing system (e.g., client device 110, third party device 150, etc.), a bundle request for multiple protection policies that meet certain cybersecurity posture requirements (e.g., MDR system criteria). Furthermore, the bundle request can specify criteria (e.g., proof criteria) such as the presence of continuous monitoring tools, adherence to specific cybersecurity frameworks (e.g., ISO/IEC 27001, NIST), or a score on cybersecurity posture assessments, and the response system 130 (e.g., utilizing modeler 308) can execute functions/ algorithms to assess which policies in the market comply with these proof criteria. For example, the bundle request can be generated (e.g., by the response system 130) based on parsing through policy attributes, analyzing historical claims data for risk assessment, and evaluating compliance certifications that entities possess. Once a match between cybersecurity protection plans and a group of entities is identified, the response system 130 can facilitate the bulk trading of the matched policies to a cybersecurity protection broker.

In some implementations, the bundle request can include a set of cybersecurity parameters (e.g., cybersecurity protection plan criteria, such as incident response (IR) plan requirements). In some implementations, the response system 130 can determine a plurality of prospective entities satisfying the set of cybersecurity parameters. For example, the bundle request can include a set of cybersecurity parameters such as required intrusion detection system capabilities (e.g., signature-based, anomaly-based), data encryption levels (e.g., AES 256-bit encryption), and endpoint protection standards (e.g., real-time malware scanning, automated patch management). The response system 130 (e.g., using compliance system 306 and/or modeler 308) can process data from a database of entities (e.g., protected entities, insured entities, compliant entities) to identify the entities whose cybersecurity measures align with the set of cybersecurity parameters. For example, determining the entities satisfying the criteria can include the response system 130 querying a compliance database (e.g., stored on database 140, data source 160, etc.) for certifications held (e.g., SOC 2 Type II, PCI DSS compliance), checking configuration management databases for installed security software versions, and cross-referencing against security incident and event management logs to determine the efficacy of the cybersecurity implementations of the entity (e.g., cost-avoidance based determination, etc.). Once the matching entities are identified, the response system 130 (or modeler 308) can group or bundle the identified entities that meet bundle request criteria of the protection provider for cybersecurity protection.

In some implementations, the response system 130 can bundle the plurality of prospective entities and corresponding cybersecurity postures into a data package. For example, the response system 130 can bundle the identified prospective entities and corresponding postures into a data package by compiling (e.g., grouping, mapping, etc.) data of the selected entities with data of the security postures of the entity in a unified format (e.g., JSON, XML, etc.). Furthermore, the response system 130 can use data serialization techniques (e.g., converting data structures into JSON format for ease of transmission) and/or encrypt the package using advanced encryption standards (AES) to confirm data confidentiality and integrity. For example, the bundled package can be timestamped and digitally signed (e.g., by the modeler 308) using employing cryptographic hashing (e.g., SHA-256) to protect the data included in the package and to prepare the data package for secure transmission to the protection provider via encrypted communication channels.

In some implementations, the response system 130 can transmit, to a plurality of protection entity computing systems (e.g., one or more third party device 150), the data package including information of the plurality of prospective entities and corresponding security postures. For example, the response system 130 can transmit the bundled data package to a broker computing system, such as a third-party device 150, by establishing a secure connection utilizing various protocols (e.g., TLS (Transport Layer Security) for data in transit, VPN (Virtual Private Network) tunnel or a dedicated leased line for added security, etc.). Upon establishing the connection, the response system 130 can initiate and execute a secure file transfer protocol (e.g., SFTP or SCP) to send the encrypted and signed data package including information of the plurality of protection plans (e.g., coverage type, reimbursements, other data related to the cybersecurity protection plans and/or cybersecurity parameters, etc.). Furthermore, the broker computing system (e.g., third-party device 150) can use decryption keys and digital signature verification tools (as per the shared security protocol with the response system 130) to decrypt, authenticate, and process the received data package, verifying the integrity and confidentiality of the plurality of protection plans information during transit and upon receipt. In some implementations, the data package can include a customized arrangement corresponding to an endorsement or a pricing coverage. For example, the data package can include specific terms (e.g., cyber protection terms) that offer enhanced cybersecurity protection coverage at preferential rates for prospective entities demonstrating strong cybersecurity postures (e.g., robust systems, organizational focus on cyber threats, implementation of specific cybersecurity tools, etc.). Alternatively, the data package can include terms demanding increased premiums or deductibles for entities identified as high-risk (e.g., based on cybersecurity posture, firmographic data of the prospective entity, weak cybersecurity measures implemented, etc.).

In some implementations, the various components of FIG. 3 (e.g., response system 130) can perform bulk trading of entity policies matching proof criteria according to the process outlined above, but by determining, bundling, or transmitting a plurality of protection plans instead of a plurality of prospective entities/corresponding cybersecurity postures. For example, the response system 130 can receive, from a broker computing system (e.g., third party device 150), the bundle request including a set of cybersecurity parameters and determine a plurality of entities (e.g., entities with cyber protection) satisfying the parameters. Further, the response system 130 can identify a plurality of protection plans of the plurality of entities. For example, the response system 130 can identify a plurality of protection plans by querying the compliance system 306 and/or modeler 308 to retrieve and analyze policy attributes from a secured database (e.g., database 140). For example, the response system 130 can execute database search operations (e.g., SQL JOIN queries across policyholder tables and protection plan tables) to cross-reference the protection parameters (e.g., using protection database logs, data on current cybersecurity certifications, risk assessments, etc.) to identify a plurality of protection plans implemented by the entities. The response system 130 can further transmit, to a plurality of protection entity computing systems, the data package including information of the plurality of protection plans (e.g., plan type, coverage amount, term, entity cyber requirements/prerequisites, etc.), receive one or more bid requests for the bundled data package, and exchange the bundled data package for an amount. For example, the exchange can include the response system 130 assigning the plurality of protection plans of the bundled data package to a protection entity.

For example, the processes outlined above can allow a broker, after digitization of cybersecurity safeguards and/or configurations of an entity, to present (e.g., independently or by partnering with a security vendor) a set of qualified prospective entities to a protection entity. For example, the set of qualified prospective entities can include a list of entities (e.g., entities seeking cybersecurity protection) and corresponding cybersecurity posture data (e.g., entity firmographic data, data related to cyber implementations, etc.) to be used by a protection entity in determining whether to bid on a portion (e.g., a bulk amount) of the prospective entities. Furthermore, after receiving the entity and cybersecurity data, the protection entities can make special arrangements (e.g., endorsements, pricing, coverage, etc.) to encourage the broker to provide the prospective entities included in the list of entities to the protection entity. For example, the protection entity can offer reduced pricing terms (e.g., lower premiums) or additional coverage options (e.g., DDoS coverage) after receiving the list of prospective entities and determining the corresponding cybersecurity postures of the entity are robust (e.g., implementation of multiple cybersecurity tools, compliance with updated industry standards, compliance with regulatory standards, etc.). Furthermore, the bid amount offered by the protection entity or the special arrangements made to encourage the broker to send the plurality of entities to the protection entity can be based on a bulk pricing model designed to factor both the number of entities included in the bid (or the entities for which special arrangements are offered) and corresponding cybersecurity postures of the entities.

In some implementations, the response system 130 can receive, from one or more broker computing systems (e.g., third-party device 150), one or more bid requests for the bundled data package. For example, the response system 130 can receive bid requests that include specific parameters such as the desired level of cybersecurity coverage (e.g., coverage against data breaches, ransomware attacks, etc.), premium ranges and/or payment criteria (e.g., payment periods, late fees, etc.), and criteria for cybersecurity compliance standards (e.g., compliance with ISO/IEC 27001, NIST Cybersecurity Framework, etc.). Furthermore, at least one (e.g., each) bid request received by the response system 130 via the one or more broker computing systems can specify requirements of the broker for policy customization options (e.g., inclusion of cyber incident response services, coverage extensions for cloud-based assets, etc.) to match/align the protection plans with the market demand, cybersecurity landscape changes, and/or specific entity cybersecurity protection objectives.

In some implementations, the response system 130 can exchange the bundled data package for an amount based on one of the one or more bid requests. For example, the response system 130 can evaluate and accept a bid request (e.g., offer of monetary sum) that offers improved terms for the exchange by evaluating various factors related to the one or more bid requests, including the proposed amount and compliance of the bidder with required cybersecurity practices (e.g., data encryption standards, regulatory compliance, etc.). In some implementations, the exchange (e.g., process of exchanging bundled data package for amount) includes assigning the plurality of protection plans of the bundled data package to a broker. For example, the broker to whom the protection plans are assigned can be a specialized entity with a robust technological infrastructure capable of handling complex data transactions securely (e.g., intermediator). Furthermore, in assigning the protection plans to the broker, the response system 130 can update a transaction ledger (e.g., stored within database 140) to reflect the transfer of ownership (e.g., the exchange of the bundled data package for amount).

In some implementations, the set of cybersecurity parameters can include proof criteria, and the proof criteria can include cybersecurity measures and technologies (SMT) of the plurality of entities. For example, the response system 130 (e.g., using the modeler 308) can evaluate the bundled data package against the bid requests by applying proof criteria that encompass specific cybersecurity measures and technologies (SMT) of the entities. For example, these proof criteria can include verifying the implementation of entity-implemented Multi-Factor Authentication (MFA) to bolster access control, assessing the effectiveness of Endpoint Detection and Response (EDR) systems in identifying and mitigating cyber threats, evaluating the coverage provided by Managed Detection and Response (MDR) services for comprehensive threat management, etc. In some implementations, determining the at least one cybersecurity protection plan corresponding to the cybersecurity attribute can further includes using the proof to confirm compliance with required cybersecurity measures and technologies. Furthermore, the proof used to confirm compliance can include documentation (e.g., security policy documents, incident response plans, employee training completion certificates), compliance proof (e.g., ISO/IEC 27001 certification, GDPR compliance reports), network security proof (e.g., firewall and IDS/IPS configuration snapshots, VPN usage logs), access control proof (e.g., MFA deployment records, access control lists), data protection proof (e.g., encryption protocol details, data backup and recovery audit trails), threat detection and response proof (e.g., EDR alerts history, malware removal reports), and/or vendor risk management proof (e.g., third-party security assessment reports, vendor SLAs). For example, the response system 130 can incorporate digital certificates or blockchain-based records as proof (e.g., stored via database 140/data source 160 acting as private and public ledgers, respectively, of a distributed ledger). For example, these proofs can validate that cybersecurity implementations of an entity, such as MFA, EDR, and MDR, meet specific standards set by the cyber protection plan. For example, a digital certificate could be issued to an entity upon successful implementation of MFA, and the response system 130 can use this proof of implementation in determining potential cybersecurity plans for which the entity is qualified. In some implementations, determining the at least one cybersecurity protection plan corresponding to the cybersecurity attribute further can include using one or more tokens to align the entity with the cybersecurity attributes. For example, one or more tokens can serve as digital representations of compliance of an entity with required cybersecurity measures and technologies, and holding a token can indicate that an entity has implemented certain cybersecurity measures (e.g., those that have been validated and are in active use). For example, a token could represent the active and effective use of EDR systems within the entity network and be issued following an audit or assessment by a trusted third party or through automated systems capable of independently verifying the presence and effectiveness of EDR systems. In some implementations, the tokens correspond to a verified and authenticated state of the security posture of the entity and resilience. For example, the verified/authenticated state can indicate that the security implementations of the entity have been thoroughly checked for effectiveness and compliance (e.g., verification that a cybersecurity measure is implemented by the entity, that the implemented cybersecurity measure is correctly configured and fully operational (e.g., active), etc.).

In some implementations, the cybersecurity protection plan provided is based on the determined security posture of the entity, and the cybersecurity protection plan corresponds to one or more coverage options aligning with the protection preference of the entity. For example, the response system 130 (e.g., using the compliance system 306 and/or modeler 308) can analyze digital infrastructure vulnerabilities of the entity (e.g., utilizing data collected from security tools 302, such as data regarding recent cyber incidents, current defense mechanisms, etc.), cybersecurity objectives of the entity (e.g., coverage type, amount of coverage, etc.), and other entity data (e.g., firmographic data such as entity size, revenue, etc.) to determine a cybersecurity protection plan aligning with the cybersecurity objectives of the entity (e.g., type of protection, integrations, etc.), preferences, technical implementations, etc. For example, the response system 130 can process entity data to generate an entity risk profile that includes potential attack vectors (e.g., susceptibility to phishing, ransomware attack history), existing safeguards (e.g., deployment of firewalls, use of secure sockets layer (SSL) encryption for data transmission), and areas of compliance (e.g., adherence to the General Data Protection Regulation (GDPR) or the Health Insurance Portability and Accountability Act (HIPAA)). Based on entity risk profiles and cybersecurity objectives, the response system 130 can dynamically configure protection coverage options by providing different cybersecurity protection plans in response to different entity protection preferences/objectives/implementations (e.g., preferences for Endpoint Detection and Response (EDR) systems, desire for phishing protection, entity size/revenue, etc.).

In some implementations, the security tool 302 of the client device 110 can be configured to collect and transmit data to the response system 130 for various actions (e.g., submitting cybersecurity protection requests). The response system 130 can collect and submit entity data, including environmental data about the entity computing and networking infrastructure. This data can be used by the response system 130 in posture-based modeling. Users can input relevant environmental information through an interface of the application, which can then be securely transmitted to the response system for analysis. Furthermore, the security tool 302 can be a conduit for receiving updates from the response system 130 regarding cybersecurity protection plans, modifications based on ongoing risk assessments, and feedback on the cybersecurity posture of the entity.

In some implementations, the security tool 302 can a software application embedded within the client device 110, designed to facilitate secure communication and data exchange with the response system 130 for cybersecurity management tasks. The security tool 302 can include functionalities for initiating cybersecurity protection requests, submitting entity-specific data (e.g., including cybersecurity posture data and environmental data pertaining to the IT infrastructure of the entity), and receiving updates or feedback on cybersecurity protection plans. The security tool 302 can be integrated with the application layer of the device, utilizing secure communication protocols (e.g., TLS/SSL) for data transmission over networks. For example, the security tool 302 can provide a user interface (e.g., graphical user interface (GUI)) for entities to interact with the system, input data, and make selections regarding protection options. Additionally, the tool can incorporate features for real-time monitoring and alerts.

In some implementations, the compliance system 306 can prepare and report cyber incidents according to various governmental regulations. In some implementations, the compliance system 306 can determine when a cyber incident is substantial based on a government regulation, which could range from significant losses in the confidentiality, integrity, or availability of information systems, to serious impacts on operational safety, disruptions in business activities, or unauthorized access stemming from third-party compromises. Upon identifying such incidents, the compliance system 306 can gather a set of data used for reporting. This data collection can encompass all correspondence with threat actors, indicators of compromise, relevant log entries, forensic artifacts, network data, and information on how the threat actor compromised the system, among others. Additionally, the compliance system 306 can track and document all details related to any ransom payments, including the amount, the decision process, and the aftermath of the payment.

For example, a substantial cyber incident can lead to one or more of the following: a substantial loss of confidentiality, integrity or availability of information systems or networks of a covered entity, a serious impact on the safety and resiliency of operational systems and processes of a covered entity, a disruption of ability of a covered entity to engage in business or industrial operations, or deliver goods or services, unauthorized access to information systems or networks of a covered entity, or any nonpublic information included therein, that is facilitated through or caused by (i) a compromise of a cloud service provider, managed service provider, or other third-party data hosting provider, or (ii) supply chain compromise.

Furthermore, in some implementations, the compliance system 306 can also be configured to manage and submit follow-up reports as required. This can include generating supplemental reports when new or different information about a cyber incident becomes available or if additional ransom payments are made. Thus, the compliance system 306 can provide all relevant data such that it is accurately preserved and maintained for a threshold period (e.g., set at two years), following the submission of a corresponding recent report. This data preservation can include the initial detection of a compromise to the full resolution and analysis of the incident, including any payments made and the identification of exploited vulnerabilities.

In some implementations, the operational framework of the compliance system 306 facilitates timely and detailed incident reporting and data preservation to assist organizations in maintaining compliance with regulatory requirements. By automating the process of collecting, preserving, and reporting detailed information about cyber incidents and ransom payments, the compliance system 306 reduces the manual effort required and enhances the accuracy of the information reported. This approach can be used to fulfil legal and regulatory obligations and strengthen the overall cybersecurity posture of organizations by verifying a structured response to incidents and facilitating continuous improvement through detailed incident analysis and feedback.

In some implementations, the preservation requirement of the compliance system 306 can include all correspondence with the threat actor, regardless of the forum or method; indicators of compromise; relevant log entries; relevant forensic artifacts; network data; data and information that can help identify how a threat actor compromised or potentially compromised an information system; system information that can help identify exploited vulnerabilities; information about exfiltrated data; all data or records related to the disbursement or payment of any ransom payment; and any forensic or other reports concerning the incident, whether internal or prepared for the covered entity by a cybersecurity company or other third-party vendor.

Figure 4A:
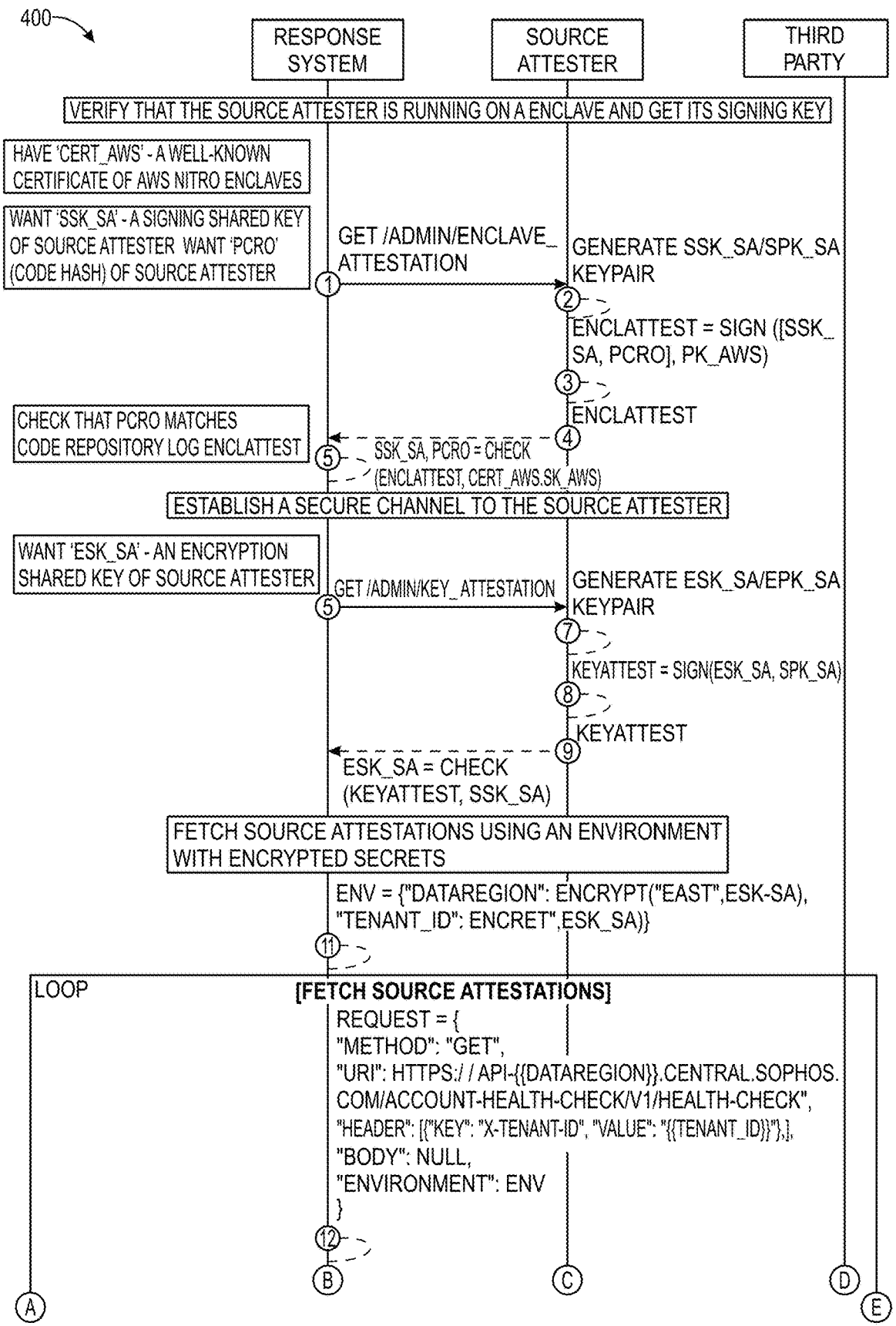
FIGS. 4A-4B depicts a block diagram of a zero-knowledge proof (ZKP) model, according to some implementations.
Figure 4B:
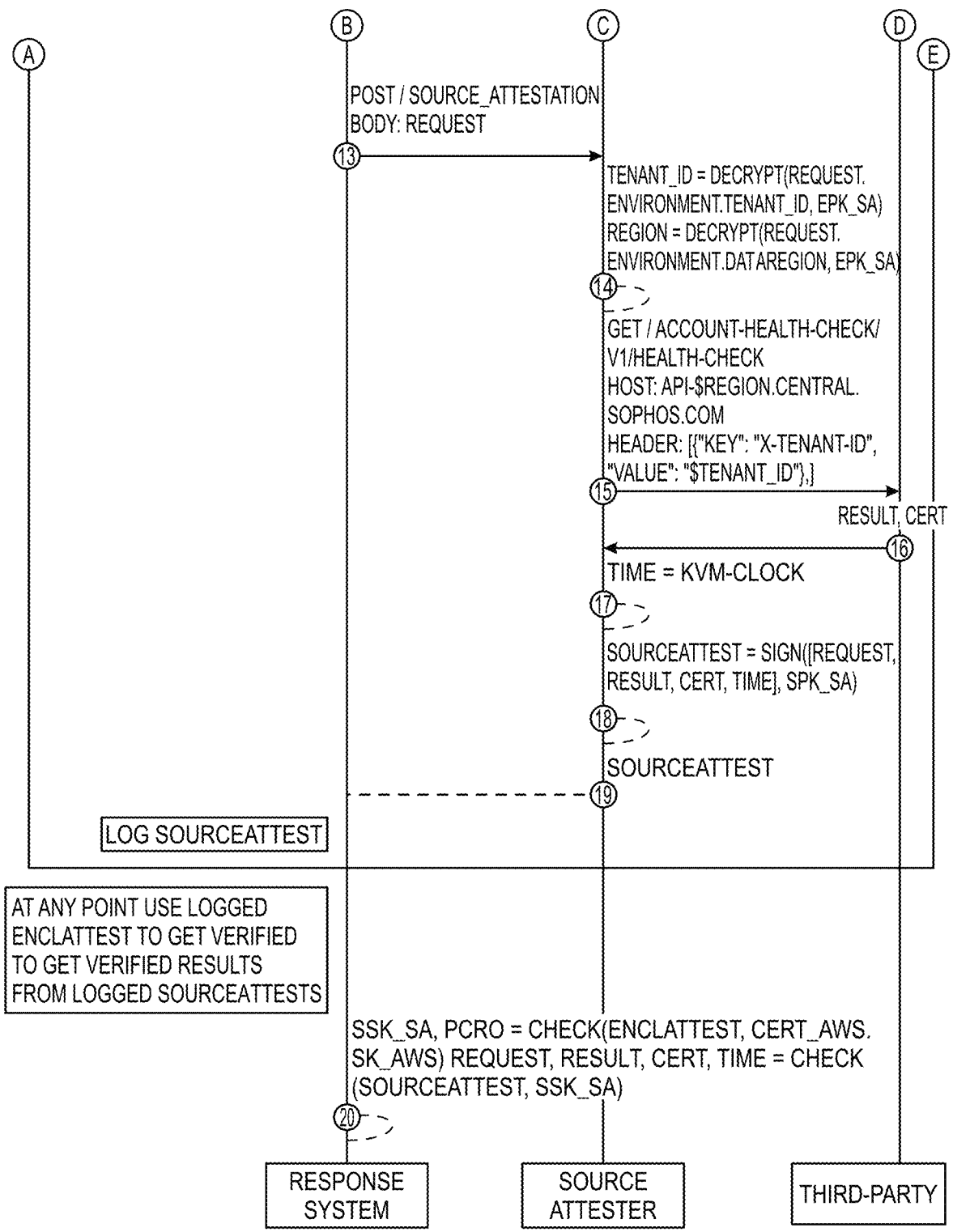

Referring generally to FIGS. 4A-4B, block diagrams of implementations of a system 400 for posture-based modeling (e.g., attestation/verification within a secure computing environment) are shown. Referring to FIG. 4A in more detail, the system 400 can verify that a source attester is running on an enclave and fetch a signing key of the source attester, establish a secure channel to the source attester, and fetch source attestations using an environment with encrypted secrets. For example, the system 400 can verify that a source attester is running on an enclave and fetch a signing key of the source attester by initiating a certificate check process (e.g., utilizing AWS Nitro Enclaves certificates) to authenticate the integrity and identity of the enclave. A compliance system (e.g., compliance system 306 of FIG. 3) can then request and validate an attestation, confirming that the state of the enclave and the code executed by the enclave are as expected (e.g., matching a known good configuration). Furthermore, the system 400 can establish a secure channel to the source attester by executing a cryptographic protocol (e.g., Transport Layer Security (TLS) handshake) that confirms the confidentiality and integrity of communications. This can involve the exchange of session keys generated by a modeler (e.g., modeler 308 of FIG. 3) and the enclave (e.g., with session keys derived using an ephemeral Diffie-Hellman key exchange to facilitate a secure channel setup). Further, the system 400 can fetch source attestations using an environment with encrypted secrets by employing secure cryptographic envelopes (e.g., using symmetric key encryption like AES-256) to encapsulate the attestation data. For example, a modeler (e.g., modeler 308) can encrypt an attestation request payload with a shared secret key, verifying that access and processing of an attestation request is restricted to a source attester which possesses the corresponding decryption key, Referring to FIG. 4B in more detail, the system 400 can capture and securely log a POST action of a source attestation body (e.g., encapsulating requests for attestation validation). For example, the response system 130 of FIG. 3 (e.g., using the modeler 308) can decode the encrypted environment variables/fields (e.g., TENANT_ID, REGION, TIME, SOURCE ATTEST, etc.) and utilize the ESK for decryption). The system 400 can transmit GET requests to verify the health and status of an account (e.g., via an API endpoint as specified in the health check URL) and confirm that the received information is current by timestamping with a trusted source (e.g., KVM-CLOCK). Further, the system 400 can verify that the signature of the source attester is applied to the transaction (e.g., signing with the SPK of the enclave), further verified by the compliance system 306 against the attestation of the enclave and the known certificate authority (e.g., using AWS certificates, using fields such as SSK_SA, PCRO, REQUEST, RESULT, CERT, TIME, etc.), thereby providing an immutable log for subsequent audits and verifications.

Figure 5:
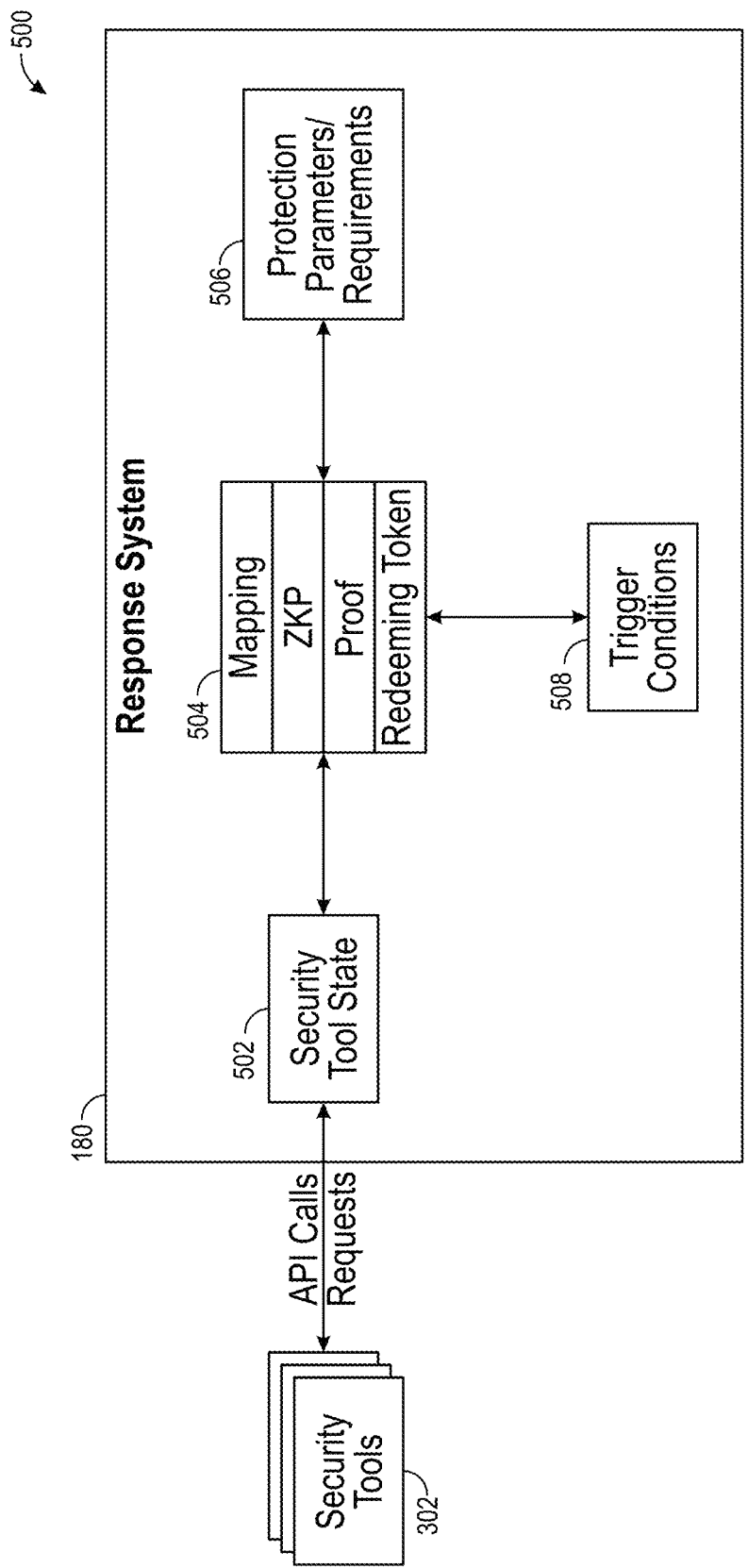
FIG. 5 depicts a block diagram of a more detailed architecture of certain systems or devices of FIG. 3, according to some implementations.

Referring now to FIG. 5, a block diagram of an implementation of a system 500 including a response system 130 for posture-based modeling is shown. In some implementations, the system 500 can include the response system 130 and security tools 302, which can be used at block 502, block 504, block 506, and block 508 for various purposes related to cybersecurity protection, protecting data, and/or posture-based modeling, as further described herein. In some implementations, at block 502, the response system 130 can determine a security tool state corresponding to one or more security tools 302. For example, the response system 130 can utilize API calls/requests (e.g., utilizing RESTful API) to interrogate the security tools 302, retrieving their operational states, configurations, and recent activity logs (e.g., to assess the current state, effectiveness, etc. of the security tools 302). At block 504, the response system 130 can receive data and engage in data processing tasks such as mapping the received data to known security incidents or potential threats using techniques like Zero-Knowledge Proofs (ZKPs) to verify data integrity without exposing the underlying data. For example, the system can use ZKP to validate the redemption of tokens provided by security tools as proof of a secure state or incident resolution without revealing sensitive details related to an entity.

At block 506, the response system 130 can determine and/or apply protection parameters or requirements by comparing the current security tool states against predefined security benchmarks or profiles (e.g., encryption standards, regulatory compliance requirements, etc.). For example, at block 506, the response system 130 can process and analyze data such as the efficacy of current encryption protocols in use (e.g., comparing deployed AES-256 encryption against organizational policy requirements) and the level of adherence to various cybersecurity frameworks (e.g., NIST Cybersecurity Framework, ISO/IEC 27001 standards). At block 508, the response system 130 can trigger conditions based on the analyzed data and security tool states. For example, in response to detecting a discrepancy or anomaly, the response system 130 can execute predefined cybersecurity response protocols (e.g., isolation of affected systems, activation of additional monitoring tools, notification to incident response teams, etc.) based on protection parameters/requirements corresponding to an entity and/or to a protection plan of the entity, as described above regarding FIG. 3.

Figure 6:
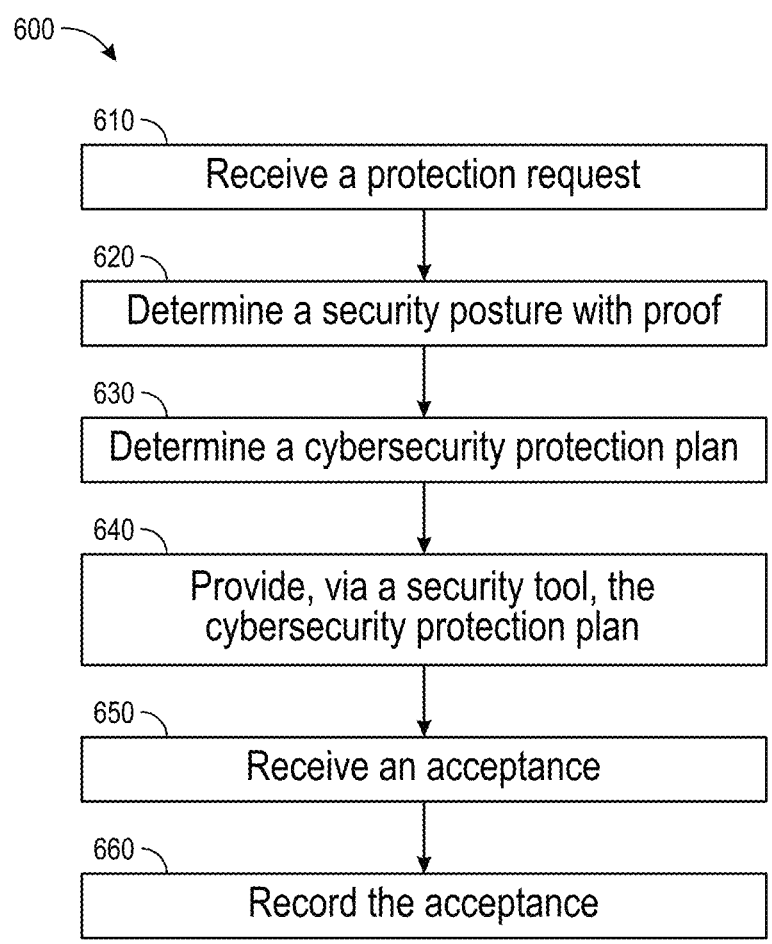
FIG. 6 depicts a flowchart for a method to protect data, according to some implementations.

Referring now to FIG. 6, a flowchart for a method 600 for protecting data (e.g., for posture-based modeling) is shown, in accordance with present implementations. At least the computing/security architecture shown and described regarding FIG. 3 can perform method 600 according to present implementations.

In general, method 600 relates to shifting the point of purchase of cyber protection or a cyber product to cybersecurity tools with compliance automation. For example, in response to a protection entity or vendor of a security tool entering rules (e.g., protection parameters or requirements of a protection plan, such as encryption standards, implementation of MDR systems, entity firmographic data, etc.), the method 600 can be used (e.g., by various computing devices, as shown on FIG. 3) to link the protection plan requirements to real-world cyber implementations of the entity. For example, using an existing link between a security vendor tool and the entity (e.g., prospective entity), the method 600 can be used to verify whether the protection parameters of the cyber protection plan or product are satisfied by the entity and/or the cybersecurity implementations of the entity. For example, rather than a human performing underwriting or verification that the entity and/or the cybersecurity implementations meet (or comply) with the various criteria of the protection plan (e.g., the protection parameters), the method 600 can be used to dynamically map cybersecurity parameters to cyber implementations of the entity, using proof (e.g., digital documentation, evidence, or assessments that demonstrate the security measures and protocols a company or entity has implemented to protect against cyber threats and vulnerabilities) to confirm the entity complies with the requirements/parameters of the protection plan, thus bypassing human involvement in underwriting. Furthermore, the point of purchase of cyber protection can be "shifted" to the security vendor (e.g., cybersecurity company offering a security tool) by embedding, within a security vendor dashboard (e.g., GUI), data related to the mapped cybersecurity parameters, proof, and entity (e.g., information related to qualification or preapproval of the entity for protection). For example, a ZKP model can be used can maintain anonymity of the prospective entity prior to the prospective entity agreeing to (or enrolling in) the cyber protection plan. For example, the ZKP model used in method 600 can prevent sharing the identity of the client prior to the client purchasing, agreeing to, and/or signing the protection plan, thereby avoiding breaking legal agreements (e.g., non-disclosure agreements) associated with the cybersecurity plan, protection entity, and/or prospective entity.

As a broad example of method 600, a prospective entity can interact with a security vendor application (e.g., dashboard) when considering purchasing and/or implementing a cybersecurity tool offered by the vendor (e.g., firewalls, antivirus software, intrusion detection/prevention systems (IDS/IPS), endpoint protection platforms (EPP), multi-factor authentication (MFA) tools, encryption tools, employee training programs, etc.). Furthermore, as the entity reviews these tools via the dashboard/application, a real-time evaluation of the cybersecurity stance or resilience of the entity can be initiated and executed. For example, a ZKP model can be used to analyze security measures of the entity against the requirements of the protection provider without disclosing the identity of the entity, thereby safeguarding confidential information and adhering to any non-disclosure agreements in place. Furthermore, if the cybersecurity practices of the entity align with the specified criteria, a notification of pre-qualification or pre-approval for cyber protection can be provided to the entity (e.g., via the vendor dashboard/application). As such, the method 600 can be used to connect prospective adoption, by an entity, of specific security tools directly with protection eligibility, streamlining the path to obtaining cyber protection based on the security readiness of the entity (e.g., resilience, posture, etc.).

In some implementations, the one or more processing circuits can be configured to shift the point of purchase of cyber protection to cyber security tools with compliance automation. For example, the one or more processing circuits can provide a prospective entity seeking to purchase or implement a cybersecurity tool with compliance data related to protection plans that the prospective entity is qualified for based on potentially implementing the cybersecurity tool (e.g., whether the entity would comply with protection parameters of a cybersecurity plan if the entity implemented the security tool). This data can be provided via a security tool dashboard of the vendor and can allow the entity to purchase a protection plan via the dashboard, thereby shifting the point of purchase to the security tool application. In some implementations, the one or more processing circuits can be configured to use a ZKP method of matching posture to protectability. For example, the one or more processing circuits can be configured to use a Zero-Knowledge Proof model to determine whether a prospective entity is qualified and provide this information to a protection entity without exposing the underlying identity of the prospective entity. In some implementations, the one or more processing circuits can be configured to unify tools for assessing protectability based on cybersecurity posture, identifying cybersecurity/protection gaps, and suggesting solutions, and further to quantify business impact (QBI), enhance resilience, and automate policy renewal processes. For example, the one or more processing circuits can be configured to integrate with cybersecurity assessment platforms to automatically evaluate security measures of an entity, pinpoint specific vulnerabilities, recommend corrective actions, quantify the potential business impact of identified vulnerabilities, and continuously monitor the cybersecurity posture of an entity for further updates. In some implementations, the one or more processing circuits can be configured to allow a protection entity to perform bulk trading of entity policies matching proof criteria. For example, the one or more processing circuits can be configured to aggregate compliance data and cybersecurity evaluations (e.g., in bulk) and to allow protection entities to efficiently identify and transact policies in bulk for entities that meet or exceed the cybersecurity protection parameters corresponding to one or more cybersecurity protection plans, thereby streamlining the underwriting process.

In a broad overview of method 600, at block 610, the one or more processing circuits (e.g., response system 130 of FIG. 3) can receive a protection request. At block 620, the one or more processing circuits can determine a security posture. At block 630, the one or more processing circuits can determine a cybersecurity protection plan. At block 640, the one or more processing circuits can provide, via a security tool, the cybersecurity protection plan. At block 650, the one or more processing circuits can receive an acceptance. At block 660, the one or more processing circuits can embed the proof into the acceptance and record the acceptance.

At block 610, the one or more processing circuits (e.g., response system 130 of FIG. 3) can receive a protection request. In some implementations, at block 610, the one or more processing circuits can receive, via a vendor security tool application, a cybersecurity protection request from an entity. For example, the one or more processing circuits can receive a request for cybersecurity protection (e.g., inquiry regarding cybersecurity protection plan, etc.) from a client device by the entity or other user interacting with an interface system, such as a graphical user interface (GUI). In some implementations, the cybersecurity protection request received at block 610 can include entity data of the entity. For example, the cybersecurity protection request received by the one or more processing circuits can include legal/regulatory data (e.g., regulatory impact, privacy impact, etc.), firmographic data (e.g., industry, revenue, etc.), and/or cybersecurity data (e.g., safeguards, root cause, etc.) of the entity.

At block 620, the one or more processing circuits can determine a security posture. In some implementations, at block 610, the one or more processing circuits can determine a cybersecurity posture with proof based on the entity data. For example, the one or more processing circuits can process data received via the vendor security tool application (e.g., entity data related to firmographics, security measures, etc.) and output a cybersecurity posture with proof. In some implementations, the proof includes one or more digital signatures and/or authenticated data (e.g., of an entity, related to a security posture, etc.). In some implementations, a cybersecurity posture determined at block 610 can be a data package encapsulating/encoding a cybersecurity disposition of an entity (e.g., a mapping of compliances, firmographic insights, protective measures, etc.) For example, the cybersecurity posture can integrate data reflecting the encryption protocols of the entity, which can be used by a vendor, provider, or protection entity to assess the alignment of the entity with cybersecurity benchmarks and standards (e.g., ISO/IEC 27001 certification). In some implementations, the cybersecurity posture can include a verifiable account of cybersecurity measures of the entity (e.g., implementation of advanced threat detection systems like MDR and endpoint detection and response solutions).

At block 630, the one or more processing circuits can determine a cybersecurity protection plan. In some implementations, at block 630, the one or more processing circuits can determine, utilizing one or more protection parameters (e.g., vendor parameters or rules, insurance parameters or rules, regulatory parameters or rules certification authorities (CAs) parameters or rules, technology partners parameters or rules, audit and compliance firms parameters or rules, cybersecurity framework organizations parameters or rules), at least one cybersecurity protection plan corresponding to a cybersecurity attribute to protect the entity based on the cybersecurity posture with the proof. For example, the one or more processing circuits can identify and/or generate a cybersecurity protection plan (e.g., ransomware protection plan), and the cybersecurity protection plan can correspond to a cybersecurity attribute (e.g., confidentiality, integrity, authentication, etc.) of the entity. In some implementations, the cybersecurity protection plan determined by the one or more processing circuits at block 630 can be based on the cybersecurity posture of the entity and/or based on the proof (e.g., digital signatures, authenticated cybersecurity data, etc.). For example, the one or more processing circuits can identify and/or generate a cybersecurity protection plan by comparing and mapping compliances (e.g., regulatory and privacy impacts) of the entity, firmographic insights (e.g., industry classification and revenue metrics) of the entity, data related to protective measures (e.g., encryption standards, MDR, etc.) implemented by the entity, etc. to requirements (e.g., protection eligibility) of the cybersecurity protection plan (e.g., encryption standards, managed detection and response (MDR) system requirements, entity size/revenue requirements, etc.).

Still referring to block 630, the determining step executed by the processing circuits includes a computational assessment to map the cybersecurity posture of the entity against a set of protection parameters. The process can include analyzing various dimensions of the cybersecurity framework of the entity, including but not limited to, encryption protocols, the deployment of security measures such as firewalls, intrusion detection systems, and anti-malware tools, and/or adherence of the entity to regulatory standards. For example, if an entity operates within a highly regulated industry such as finance or healthcare, the processing circuits account for compliance measures like HIPAA or GDPR in shaping the protection plan. This confirms the plan offers coverage for potential cybersecurity incidents and aligns with legal obligations.

Furthermore, the generation of a cybersecurity protection plan includes predicting potential vulnerabilities and simulating threat scenarios based on the current cybersecurity posture of the entity. This determining step uses can use data analytics and machine learning algorithms to identify patterns and predict risks, incorporating both historical data on cyber incidents within similar industry sectors and real-time data from the network of the entity. For example, if entity data analysis reveals a recurrent pattern of phishing attacks, the proposed protection plan might prioritize coverage for incidents stemming from such breaches, including financial loss and data restoration costs. Additionally, the plan might suggest specific preventative measures, like enhanced employee training on phishing identification and response strategies, integrating both protection and prevention into the cybersecurity framework of the entity. In some implementations, the cybersecurity protection plan is configured to change in response to the dynamic nature of cyber threats and the changing cybersecurity landscape of the entity. As such, the processing circuits can also establish parameters for periodic re-evaluation of the cybersecurity posture of the entity and subsequent plan adjustments. For instance, if an entity upgrades its cybersecurity infrastructure by implementing a new Endpoint Detection and Response (EDR) system, this enhancement could be factored into the reassessment process, potentially leading to adjustments in the protection coverage and cost structure to reflect the reduced risk level.

At block 640, the one or more processing circuits can provide, via a vendor security tool application, the cybersecurity protection plan. In some implementations, at block 640, the one or more processing circuits can provide, to a graphical user interface (GUI) of the vendor security tool application of the entity computing system of the entity, the at least one cybersecurity plan (e.g., to the entity). For example, the cybersecurity protection plan determined by the one or more processing circuits at block 630 can be transmitted and displayed via the one or more processing circuits (e.g., using a graphical user interface (GUI)) at block 640. In some implementations, the cybersecurity protection plan provided via the vendor security tool application at block 640 can include at least one selectable element (e.g., digital button, drag-n-drop, etc.). For example, the entity can interact with the selectable element (e.g., via pressing, clicking, etc.) to select one or more options related to the cybersecurity protection plan (e.g., "Yes"/"No", "I agree," etc.). For example, the entity can accept (e.g., digitally sign/approve) the cybersecurity protection plan using the selectable element.

At block 650, the one or more processing circuits can receive an acceptance. In some implementations, at block 650, the one or more processing circuits can receive, from the vendor security tool application, an acceptance of the at least one cybersecurity protection plan. For example, the one or more processing circuits can receive an acceptance of the cybersecurity protection plan via the user (e.g., entity) interacting with the one or more processing circuits via an application of a client device (e.g., by using a GUI, etc.) at block 650. For example, the entity can accept the at least one cybersecurity protection plan by selecting an "Accept" button, by providing a digital signature, etc., and the acceptance of the entity can be received by the one or more processing circuits via a network, as described regarding FIG. 3.

At block 660, the one or more processing circuits can record the acceptance. In some implementations, at block 660, the one or more processing circuits can record the acceptance with proof embedded in a compliance dataset. For example, the one or more processing circuits can store data related to the acceptance of the cybersecurity protection plan of the entity in a data store for compliance verification, and the one or more processing circuits can embed the proof (e.g., compliance certifications, digital signatures, etc.) within the stored data. Furthermore, the acceptance stored in the compliance dataset can be stored on a distributed ledger, or on an external data store. In some implementations, at block 660, the acceptance recorded by the one or more processing circuits can include the cybersecurity attribute and the accepted cybersecurity protection plan. For example, the data recorded in the compliance dataset by the one or more processing circuits at block 660 scan include data related to the cybersecurity attribute (e.g., confidentiality, integrity, authentication, etc.) and the accepted cybersecurity protection plan (e.g., artifact/identifier of signed/accepted breach protection plan, etc.). Furthermore, the compliance dataset used to embed the proof into the acceptance and record the acceptance at block 660 can be a dataset/data structure configured to be monitored to confirm ongoing compliance with the cybersecurity requirements of the accepted cybersecurity protection plan (e.g., encryption protocol compliance, security patching cadence, and access control integrity, such as SSL/TLS standards for data in transit, frequency of security updates, implementation of least privilege principles, etc.).

In some implementations, the one or more processing circuits can further receive or collect environmental data from computing and networking structures of the entity for posture-based modeling. For example, the entity can input environmental data using the one or more processing circuits, which can be transmitted via a network and received for further use in posture-based modeling. Furthermore, the environmental data can include information related to the computing and networking infrastructure of the entity, such as hardware and software setups, security mechanisms, and network layouts (e.g., firewall rules, server specifications, network connections, etc.).

In some implementations, the one or more processing circuits can further record the environmental data received/collected from the computing and networking structures of the entity in the compliance dataset. For example, the one or more processing circuits can store/catalog environmental data in a data set. Furthermore, the compliance dataset can be a structured dataset stored in a data store and used to determine compliance of the entity with various requirements (e.g., protection parameters) of the cybersecurity plan (e.g., GDPR compliance, baseline data encryption standards, etc.).

In some implementations, determining the at least one cybersecurity protection plan by the one or more processing circuits can include executing a zero-knowledge proof (ZKP) model to determine the cybersecurity posture (e.g., readiness, resilience) of the entity against the one or more protection parameters. As described herein and above, zero-knowledge proofs (ZKPs) are a cryptographic method by which one party (the prover) can prove to another party (the verifier) that a certain statement is true without revealing any information about the statement itself beyond its veracity. In some implementations, the ZKP model used by the one or more processing circuits to determine the cybersecurity posture of the entity can maintain anonymity of all or a portion of the data used in determining the at least one cybersecurity protection plan. For example, the one or more processing circuits can execute ZKPs to match entity posture to protectability, allowing the entity to prove compliance with protection parameters (e.g., encryption standards, endpoint security) without revealing underlying data (e.g., sensitive user data, classified cybersecurity data, etc.) of the entity and/or data related to the security tool (e.g., proprietary source code used in cybersecurity product, etc.). Furthermore, the one or more processing circuits can verify, using the ZKP model, the adherence of the entity to required security measures (e.g., SHA-256 encryption for data at rest, TLS 1.3 for data in transit, etc.) without exposing actual encryption keys of data being encrypted. For example, the ZKP model can be used by the one or more processing circuits to confirm the deployment of next-generation firewalls (NGFWs) required by protection parameters of the cybersecurity protection plan by the entity (e.g., vendor protection, insurance protection, regulatory protection). Further, in some implementations, the anonymity of the entity is maintained until acceptance. For example, the one or more processing circuits, utilizing the ZKP model, can prevent a protection entity from learning the identity of a prospective entity prior to acceptance of the protection plan (e.g., before the prospective entity/representative of the prospective entity accepts the provided security plan).

In some implementations, (1) determining at least one cybersecurity protection plan; (2) providing the at least one cybersecurity protection plan, (3) receiving the acceptance, and (4) recording the acceptance can correspond to quoting, binding, and issuing (QBI) of the cybersecurity protection plan. For example, the one or more processing circuits can further analyze qualitative business impact (QBI) and resilience against cybersecurity threats of the entity computing infrastructure in performing the various steps described above. For example, the one or more processing circuits can unify and analyze data related to the QBI to assess the potential financial loss, reputation damage, and operational downtime associated with cybersecurity incidents (e.g., data breaches, ransomware attacks, DDoS attacks, etc.). In some implementations, determining the at least one cybersecurity protection plan further includes quoting the cybersecurity protection plan based on matching the cybersecurity posture of the entity to the cybersecurity attribute. For example, the one or more processing circuits can compare the cybersecurity posture of the entity to cybersecurity attributes of one or more protection plans (e.g., by filtering based on protection parameters, by using GAI/ML techniques, etc.) to determine whether the entity meets various criteria (e.g., protection parameters) of the one or more protection plans and determine a protection quote (e.g., premiums, payments schedule, reimbursement, etc.) based on the identified protection plans and the cybersecurity posture of the entity. Further, in this example, the one or more processing circuits can examine the robustness of security measures (e.g., deployment of redundant systems), determine the effectiveness of incident response plans (e.g., using historical/predictive datasets and/or models), and/or analyze other entity datasets and/or security tools and further generate a protection quote based on the above analysis.

For example, the one or more processing circuits can use an artificial intelligence (AI) or machine learning (ML) model (e.g., generative AI (GAI), large-language model, supervised learning model, etc.) to predict the impact of specific vulnerabilities within the entity network (e.g., unpatched software, outdated hardware), simulate model potential attack paths (e.g., using cyber penetration testing tools), and determine potential business impacts based on the QBI. In some implementations, providing the at least one cybersecurity protection plan, receiving the acceptance, and recording the acceptance corresponds to binding and issuing the at least one cybersecurity protection plan based on (1) transmitting a first API call to create a protection binder and (2) transmitting a second API call to issue the at least one cybersecurity protection plan. For example, the one or more processing circuits can bind (e.g., signify commitment of the protection entity to the protection agreement before the actual protection policy is issued) and issue (e.g., finalize the protection coverage by preparing and sending the formal policy documents to the entity) the protection plan by executing API calls (e.g., for submitting a protection application such as cybersecurity application, protection application, insurance application, third-party application, quoting an protection application, creating a protection binder, issuing a corresponding cyber plan, etc.), and the API calls executed by the one or more processing circuits can include data payloads for various uses in aligning security posture to protection requirements. In some implementations, the first API call can include a first data payload including an entity identification, cybersecurity protection plan information, and a temporary protection agreement identifier. In some implementations, the second API call can include a finalized protection policy document, a permanent policy identifier, and confirmation of policy activation covering the entity under the at least one cybersecurity protection plan.

In some implementations, the one or more processing circuits can further automatically renew the cybersecurity protection plan of the entity based on the modeled cybersecurity posture and resilience. For example, the one or more processing circuits can evaluate and/or update the cybersecurity protection plan parameters (e.g., encryption requirements, regulatory standards, coverage levels, deductible amounts) by analyzing the modeled cybersecurity posture and resilience to extend or renew the term (e.g., period of effect) of the cybersecurity protection plan. For example, the one or more processing circuits can process the renewal of the cybersecurity protection plan by assessing adherence to encryption standards (e.g., AES-256 for data at rest, TLS 1.3 for data in transit), compliance with regulatory standards (e.g., GDPR for data protection, SOC 2 for service organizations), and more. For example, one or more processing circuits can map data associated with the adherence of the entity to cybersecurity standards (e.g., based on the cybersecurity posture of the entity) to various protection parameters of a cybersecurity protection plan, and further update the cybersecurity protection plan (e.g., by changing/recalibrating the cybersecurity parameters of the plan, by generating a new plan, etc.) based on the adherence of the entity with the plan requirements, thereby unifying protectability tools for autorenewal.

In some implementations, the one or more processing circuits can further dynamically update the at least one cybersecurity protection plan based at least on an update in a cybersecurity landscape or a change in one or more protection preferences of the entity. For example, the one or more processing circuits can adjust the cybersecurity protection plan (e.g., by adjusting cybersecurity protection parameters) in response to emerging threats (e.g., zero-day exploits, advanced persistent threats), new compliance requirements (e.g., updates to international data protection laws), or other changes in the cybersecurity landscape identified by the one or more processing circuits. Furthermore, one or more processing circuits can update or refine the cybersecurity protection plan based on changes in protection preferences of the entity. For example, an entity can change its protection preferences when implementing more enhanced data privacy measures in light of increasing regulatory scrutiny (e.g., changing protection preferences to a higher value associated with a higher degree of cybersecurity protection, etc.). Based on evaluating the update and/or changes, the one or more processing circuits can adjust the cybersecurity protection plan to match the current risk profile and cybersecurity objectives of the entity (e.g., extending coverage to new digital assets, recalibrating premiums based on risk assessment outcomes, renewing a plan, generating a new plan, etc.). For example, one or more processing circuits can update one or more protection parameters to confirm the related protection plan is dynamically aligned with evolving security requirements of the entity and the external cybersecurity environment.

In some implementations, the one or more processing circuits can further perform bulk trading of entity policies matching proof criteria for posture-based modeling, as described in detail below. In some implementations, the one or more processing circuits can receive, from a provider computing system, a bundle request from a protection provider (sometimes referred to herein as a third-party, protection entity, e.g., vendor, insurer, certification authorities (CAs), technology partners, audit and compliance firms, cybersecurity framework organizations). For example, the one or more processing circuits can receive, from the provider computing system (e.g., client device) a bundle request for multiple protection policies that meet certain cybersecurity posture requirements (e.g., MDR system criteria). Furthermore, the bundle request can specify criteria (e.g., proof criteria) such as the presence of continuous monitoring tools, adherence to specific cybersecurity frameworks (e.g., ISO/IEC 27001, NIST), or a baseline score on cybersecurity posture assessments, and the one or more processing circuits can execute functions/algorithms to assess which policies in the market comply with these proof criteria. For example, the bundle request can be generated by the one or more processing circuits based on parsing through policy attributes, analyzing historical claims data for risk assessment, and evaluating compliance certifications that entities possess. Once a match between cybersecurity protection plans and a group of entities is identified, the one or more processing circuits can facilitate the bulk trading of the matched policies to a cybersecurity protection provider.

In some implementations, the bundle request can include a set of cybersecurity parameters (e.g., cybersecurity protection plan criteria, such as incident response (IR) plan requirements). In some implementations, the one or more processing circuits can determine a plurality of prospective entities satisfying the set of cybersecurity parameters. For example, the bundle request can include a set of cybersecurity parameters such as required intrusion detection system capabilities (e.g., signature-based, anomaly-based), data encryption levels (e.g., AES 256-bit encryption), and endpoint protection standards (e.g., real-time malware scanning, automated patch management). The one or more processing circuits can process data from a database of entities to identify the entities whose cybersecurity measures align with the set of cybersecurity parameters. For example, determining the entities satisfying the criteria can include the one or more processing circuits querying a compliance database for certifications held (e.g., SOC 2 Type II, PCI DSS compliance), checking configuration management databases for installed security software versions, and cross-referencing against security incident and event management logs to determine the efficacy of the cybersecurity implementations of the entity (e.g., cost-avoidance based determination, etc.). Once the matching entities are identified, the one or more processing circuits can group or bundle the identified entities that meet the bundle request criteria of the protection provider for cybersecurity protection.

In some implementations, the one or more processing circuits can bundle the plurality of prospective entities and corresponding cybersecurity postures into a data package. For example, the one or more processing circuits can bundle the identified prospective entities and corresponding postures into a data package by compiling (e.g., grouping, mapping, etc.) data of the selected entities with data of the security postures of the entity in a unified format (e.g., JSON, XML, etc.). Furthermore, the one or more processing circuits can use data serialization techniques (e.g., converting data structures into JSON format for ease of transmission) and/or encrypt the package using advanced encryption standards (AES) to confirm data confidentiality and integrity. For example, the bundled package can be timestamped and digitally signed using employing cryptographic hashing (e.g., SHA-256) to protect the data included in the package and to prepare the data package for secure transmission to the protection provider via encrypted communication channels.

In some implementations, the one or more processing circuits can transmit, to a plurality of protection entity computing systems, the data package including information of the plurality of prospective entities and corresponding security postures. For example, the one or more processing circuits can transmit the bundled data package to a broker computing system, such as a third-party device, by establishing a secure connection utilizing various protocols (e.g., TLS (Transport Layer Security) for data in transit, VPN (Virtual Private Network) tunnel or a dedicated leased line for added security, etc.). Upon establishing the connection, the one or more processing circuits can initiate and execute a secure file transfer protocol (e.g., SFTP or SCP) to send the encrypted and signed data package including information of the plurality of protection plans (e.g., coverage type, reimbursements, other data related to the cybersecurity protection plans and/or cybersecurity parameters, etc.). Furthermore, the broker computing system can use decryption keys and digital signature verification tools to decrypt, authenticate, and process the received data package including information of the plurality of protection plans. In some implementations, the data package includes a customized arrangement corresponding to an endorsement or a pricing coverage. For example, the data package can include specific terms (e.g., cyber protection terms) that offer enhanced cybersecurity protection coverage at preferential rates for prospective entities demonstrating strong cybersecurity postures (e.g., robust systems, organizational focus on cyber threats, implementation of specific cybersecurity tools, etc.). Alternatively, the data package can include terms demanding increased premiums or deductibles for entities identified as high-risk (e.g., based on cybersecurity posture, firmographic data of the prospective entity, weak cybersecurity measures implemented, etc.).

In some implementations, the one or more processing circuits can perform bulk trading of entity policies or product policies matching proof criteria according to the process outlined above, but by determining, bundling, or transmitting a plurality of protection plans instead of a plurality of prospective entities/corresponding cybersecurity postures. For example, the one or more processing circuits can receive, from a broker computing system, the bundle request including a set of cybersecurity parameters and determine a plurality of entities (e.g., entities with cyber protection) satisfying the parameters. Further, the one or more processing circuits can identify a plurality of protection plans of the plurality of entities. For example, the one or more processing circuits can identify a plurality of protection plans by retrieving and analyzing policy attributes from a secured database. For example, the one or more processing circuits can execute database search operations (e.g., SQL JOIN queries across policyholder tables and protection plan tables) to cross-reference the protection parameters (e.g., using protection database logs, data on current cybersecurity certifications, risk assessments, etc.) to identify a plurality of protection plans implemented by the entities. The one or more processing circuits can further transmit, to a plurality of protection entity computing systems, the data package including information of the plurality of protection plans (e.g., plan type, coverage amount, term, entity cyber requirements/prerequisites, etc.), receive one or more bid requests for the bundled data package, and exchange the bundled data package for an amount. For example, the exchange can include the one or more processing circuits assigning the plurality of protection plans of the bundled data package to a protection entity.

For example, the processes outlined above can allow a broker, after digitization of cybersecurity safeguards and/or configurations of an entity, to present (e.g., independently or by partnering with a security vendor) a set of qualified prospective entities to a protection entity. For example, the set of qualified prospective entities can include a list of entities (e.g., entities seeking cybersecurity protection) and corresponding cybersecurity posture data (e.g., entity firmographic data, data related to cyber implementations, etc.) to be used by a protection entity in determining whether to bid on a portion (e.g., a bulk amount) of the prospective entities. Furthermore, after receiving the entity and cybersecurity data, the protection entities can make special implementations (e.g., endorsements, pricing, coverage, etc.) to encourage the broker to provide the prospective entities included in the list of entities to the protection entity. For example, the protection entity can offer reduced pricing terms (e.g., lower premiums) or additional coverage options (e.g., DDoS coverage) after receiving the list of prospective entities and determining the corresponding cybersecurity postures of the entity are robust (e.g., implementation of multiple cybersecurity tools, compliance with updated industry standards, compliance with regulatory standards, etc.). Furthermore, the bid amount offered by the protection entity or the special implementations made to encourage the broker to send the plurality of entities to the protection entity can be based on a bulk pricing model designed to factor both the number of entities included in the bid (or the entities for which special implementations are offered) and corresponding cybersecurity postures of the entities.

In some implementations, the one or more processing circuits can receive, from one or more broker computing systems, one or more bid requests for the bundled data package. For example, the one or more processing circuits can receive bid requests that include specific parameters such as the desired level of cybersecurity coverage (e.g., coverage against data breaches, ransomware attacks, etc.), premium ranges and/or payment criteria (e.g., payment periods, late fees, etc.), and criteria for cybersecurity compliance standards (e.g., compliance with ISO/IEC 27001, NIST Cybersecurity Framework, etc.). Furthermore, at least one (e.g., each) bid request received by the one or more processing circuits via the one or more broker computing systems can specify requirements of the broker for policy customization options (e.g., inclusion of cyber incident response services, coverage extensions for cloud-based assets, etc.) to match/align the protection plans with the market demand, cybersecurity landscape changes, and/or specific entity cybersecurity protection objectives.

In some implementations, the one or more processing circuits can exchange the bundled data package for an amount based on one of the one or more bid requests. For example, the one or more processing circuits can evaluate and accept a bid request (e.g., offer of monetary sum) that offers improved terms for the exchange by evaluating various factors related to the one or more bid requests, including the proposed amount and compliance of the bidder with required cybersecurity practices (e.g., data encryption standards, regulatory compliance, etc.). In some implementations, the exchange (e.g., process of exchanging bundled data package for amount) includes assigning the plurality of protection plans of the bundled data package to a broker. For example, the broker to whom the protection plans are assigned can be a specialized entity with a robust technological infrastructure capable of handling complex data transactions securely (e.g., intermediator). Furthermore, in assigning the protection plans to the broker, the one or more processing circuits can update a transaction ledger to reflect the transfer of ownership (e.g., the exchange of the bundled data package for monetary amount).

In some implementations, the set of cybersecurity parameters can include proof criteria, and the proof criteria can include cybersecurity measures and technologies (SMT) of the plurality of entities. For example, the one or more processing circuits can evaluate the bundled data package against the bid requests by applying proof criteria that encompass specific cybersecurity measures and technologies (SMT) of the entities. For example, these proof criteria can include verifying the implementation of Multi-Factor Authentication (MFA) to bolster access control, assessing the effectiveness of Endpoint Detection and Response (EDR) systems in identifying and mitigating cyber threats, evaluating the coverage provided by Managed Detection and Response (MDR) services for comprehensive threat management, etc. In some implementations, determining the at least one cybersecurity protection plan corresponding to the cybersecurity attribute further includes using the proof to confirm compliance with required cybersecurity measures and technologies. Furthermore, the proof used to confirm compliance can include documentation (e.g., security policy documents, incident response plans, employee training completion certificates), compliance proof (e.g., ISO/IEC 27001 certification, GDPR compliance reports), network security proof (e.g., firewall and IDS/IPS configuration snapshots, VPN usage logs), access control proof (e.g., MFA deployment records, access control lists), data protection proof (e.g., encryption protocol details, data backup and recovery audit trails), and/or threat detection and response proof (e.g., EDR alerts history, malware removal reports). Vendor risk management proof (e.g., third-party security assessment reports, vendor SLAs). For example, the one or more processing circuits can incorporate digital certificates or blockchain-based records as proof (e.g., stored in a database, distributed ledger, etc.). For example, these proofs can validate that cybersecurity implementations of an entity, such as MFA, EDR, and MDR, meet specific standards set by the cyber protection plan. For example, a digital certificate could be issued to an entity upon successful implementation of MFA, and the one or more processing circuits can use this proof of implementation in determining potential cybersecurity plans for which the entity is qualified. In some implementations, determining the at least one cybersecurity protection plan corresponding to the cybersecurity attribute further includes using one or more tokens to align the entity with the cybersecurity attributes. For example, one or more tokens can serve as digital representations of compliance of an entity with required cybersecurity measures and technologies, and holding a token can indicate that an entity has implemented certain cybersecurity measures (e.g., those that have been validated and are in active use). For example, a token could represent the active and effective use of EDR systems within the entity network and be issued following an audit or assessment by a trusted third party or through automated systems capable of independently verifying the presence and effectiveness of EDR systems. In some implementations, the tokens correspond to a verified and authenticated state of the security posture and resilience of the entity. For example, the verified/authenticated state can indicate that the security implementations of the entity have been thoroughly checked for effectiveness and compliance (e.g., verification that a cybersecurity measure is implemented by the entity, that the implemented cybersecurity measure is correctly configured and fully operational (e.g., active), etc.).

In some implementations, the cybersecurity protection plan provided is based on the determined security posture of the entity, and the cybersecurity protection plan corresponds to one or more coverage options aligning with the protection preference of the entity. For example, the one or more processing circuits can analyze digital infrastructure vulnerabilities of the entity (e.g., utilizing data collected from or related to security tools, such as data regarding recent cyber incidents, current defense mechanisms, etc.), the cybersecurity objectives of the entity (e.g., coverage type, amount of coverage, etc.), and other entity data (e.g., firmographic data such as entity size, revenue, etc.) to determine a cybersecurity protection plan aligning with the cybersecurity objectives (e.g., type of protection, integrations, etc.), preferences, technical implementations, etc. For example, the one or more processing circuits can process entity data to generate an entity risk profile that includes potential attack vectors (e.g., susceptibility to phishing, ransomware attack history), existing safeguards (e.g., deployment of firewalls, use of secure sockets layer (SSL) encryption for data transmission), and areas of compliance (e.g., adherence to the General Data Protection Regulation (GDPR) or the Health Insurance Portability and Accountability Act (HIPAA)). Based on entity risk profiles and the stated cybersecurity objectives of the entity, the one or more processing circuits can dynamically configure protection coverage options by providing different cybersecurity protection plans in response to different entity cybersecurity protection preferences, objectives, and/or implementations (e.g., preferences for Endpoint Detection and Response (EDR) systems, desire for phishing protection, entity size/revenue, etc.).

Cyber Resilience Tokenization

Figure 7:
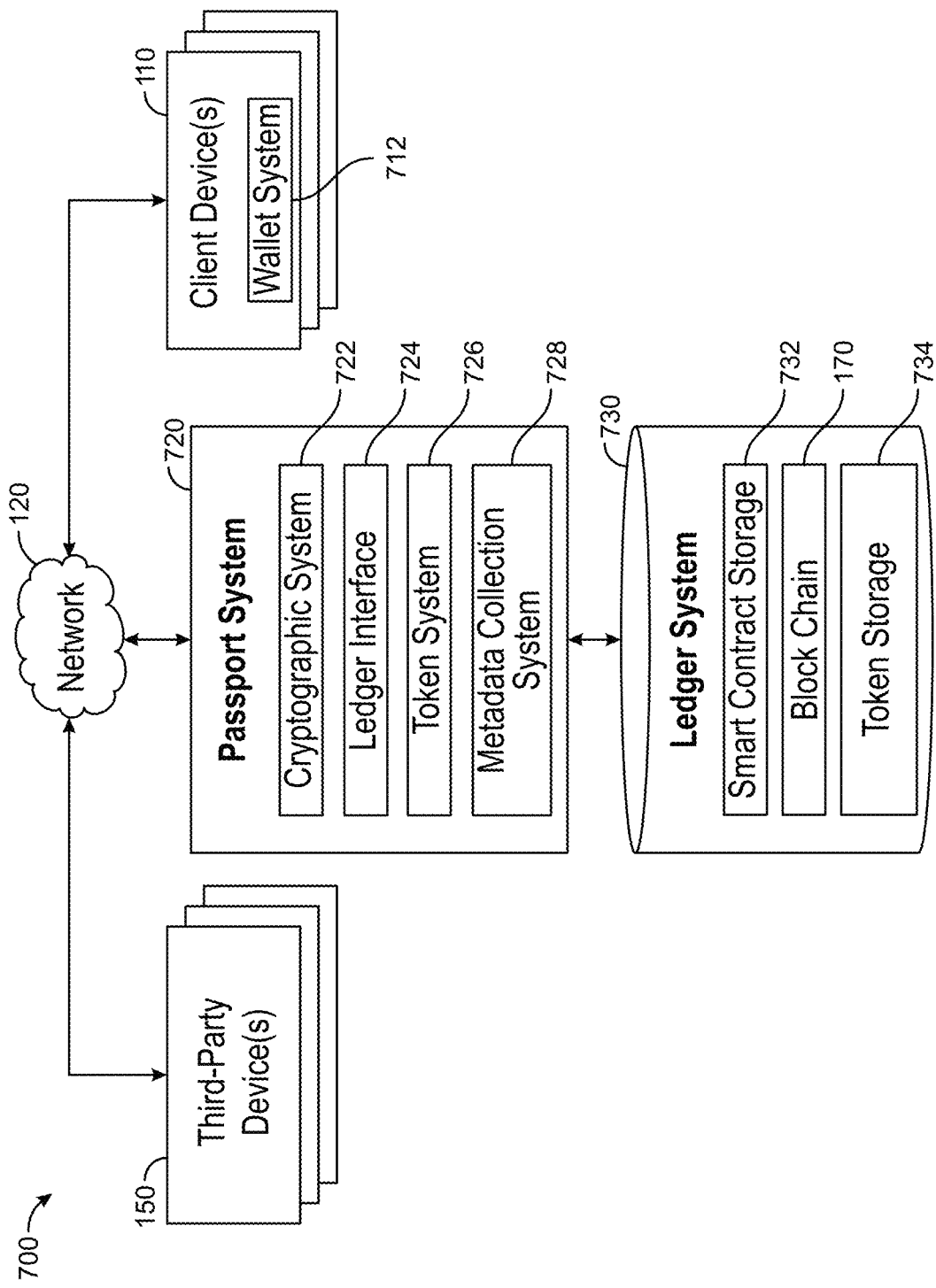
FIG. 7 depicts a block diagram of an implementation of a system for cyber resilience tokenization, according to some implementations.

Referring to FIG. 7, a block diagram of an implementation of a system 700 for cyber resilience tokenization is shown, according to some implementations. The implementation shown in FIG. 7 can include client device(s) 110 ((e.g., user computing systems or user devices), a passport system 720, a ledger system 730, and third-party device(s) 150 (e.g., third-party systems). In some implementations, the client device(s) 110 can include a wallet system 712. In some implementations, the passport system 720 can include a cryptographic system 722, a ledger interface 724, a token system 726, and a metadata collection system 728. In some implementations, the ledger system 730 can include smart contract storage 732, blockchain 170, and token storage 734. These components can be interconnected through a network 120 that supports secure communications profiles (e.g., TLS, SSL, HTTPS, etc.). In some implementations, the passport system 720 can incorporate the same or similar features and/or functionality as described regarding the response system 130 of FIG. 1A. Although the various computing elements of FIG. 7 can be described in the singular form (e.g., client device 110, third-party device 150, etc.), it should be understood that the implementation shown in FIG. 7 can include two or more of any device/system described herein (e.g., two or more client device(s) 110, two or more third-party device(s) 150, etc.).

Each system or device of FIG. 7 can include one or more processors, memories, network interfaces (sometimes referred to herein as a "network circuit") and user interfaces. The memory can store programming logic that, when executed by the processor, controls the operation of the corresponding computing system or device. The memory can also store data in databases. For example, memory can store programming logic that when executed by a processor within a processing circuit, causes a database to update parameters or store a system or event log. The network interfaces can allow the computing systems and devices to communicate wirelessly or otherwise. The various components of devices in system 100 can be implemented via hardware (e.g., circuitry), software (e.g., executable code), or any combination thereof. Devices, systems, and components in FIG. 7 can be added, deleted, integrated, separated, and/or rearranged in various implementations of the disclosure.

Generally, the client device(s) 110, third-party device(s) 150, passport system 720, and ledger system 730, wallet system 712, cryptographic system 722, ledger interface 724, token system 726, metadata collection system 728, smart contract storage 732, blockchain 170, token storage 734, and/or network 120 can include one or more logic devices, which can be one or more computing devices equipped with one or more processing circuits that run instructions stored in a memory device to perform various operations. The processing circuit can be made up of various components such as a microprocessor, an ASIC, or an FPGA, and the memory device can be any type of storage or transmission device capable of providing program instructions. The instructions can include code from various programming languages commonly used in the industry, such as high-level programming languages, web development languages, and systems programming languages. The client device(s) 110, third-party device(s) 150, passport system 720, and other various components of FIG. 7 can also include one or more databases for storing data that receive and provide data to other systems and devices on the network 120.

Generally, the passport system 720 can execute and/or be utilized to execute various processes and/or tasks corresponding with modeling cyber resilience data. For example, the passport system 720 can provide a single sign-on gateway (e.g., using an identity management system like AuthO) facilitating access to an associated security posture of a user, threat, incident, and insurance data sets using data sets encapsulated within various tokens. For example, the passport system 720 can generate a token (e.g., a passport) linked to various additional tokens and further linked to a control structure restricting access to one or more of the additional tokens based on rules (e.g., RBACs). For example, a cyber resilience identifier (e.g., passport) of an entity can include entity data and/or additional cyber resilience data stored in tokens, and the passport system 720 can provide and/or restrict access to one or more portions of the tokenized data based on various conditions, entity types, data types, regulations, etc. That is, an entity can have a container with access controls and a passport created by the passport system 720 linked to both sensitive (e.g., private) and non-sensitive (e.g., public) data, and the passport system 720 can deny access (e.g., to sensitive data) and provide access (e.g., to non-sensitive data) based the access control (e.g., whether the user to access the data is a customer, insurer, vendor, MDR/XDR provider, etc.).

Generally, the passport system 720 can provide secure access to token-related data and facilitate interactions between different cybersecurity systems and data sources of FIG. 7 (e.g., client device(s) 110, third-party device(s) 150, ledger system 730, etc.) based on various access controls. For example, the passport system 720 can create a cyber resilience identity with tokens and rule-based access controls controlling access to the tokens. For example, the passport system 720 can generate a passport for a third party linked to controls such that the third party is restricted to accessing their own data within the token structure. In some implementations, a third-party entity can use the passport system 720 to access performance tokens stored in the token structure, such as in a passport associated with the cybersecurity status of an entity, with RBAC rules restrict other entities from viewing or modifying these tokens. Another example can include third-party vendors having access to their own evaluation tokens that include the results of security assessments relevant to their services, without the ability to access data from other vendors.

In some implementations, the passport system 720 can include one or more processing circuits, including processor(s) and memory. The memory can have instructions stored thereon that, when executed by processor(s), cause the one or more processing circuits to perform the various operations described herein. The operations described herein can be implemented using software, hardware, or a combination thereof. The processor(s) can include a microprocessor, ASIC, FPGA, etc., or combinations thereof. In many implementations, the processor(s) can be a multi-core processor or an array of processors. Memory can include, but is not limited to, electronic, optical, magnetic, or any other storage devices capable of providing processor(s) with program instructions. The instructions can include code from any suitable computer programming language. In some implementations, the passport system 720 can include an interface circuit and function circuit.

In some implementations, the passport system 720 can model cyber resilience data using cyber resilience identities and associated metadata. For example, the passport system 720 can use templates to structure cyber resilience data and apply attributes to model various cyber resilience metrics (e.g., threat detection capabilities, response readiness). In some implementations, the passport system 720 can receive or identify cyber resilience data. For example, the passport system 720 can collect data from various sources, including security incident reports, vulnerability assessments, and system performance metrics. In some implementations, the passport system 720 can encrypt a portion of the cyber resilience data. For example, the passport system 720 can apply cryptographic techniques to secure sensitive information within the cyber resilience dataset, such as private keys or confidential incident data. In some implementations, the passport system 720 can generate a metadata object including metadata of cyber resilience data. For example, the metadata object can include information such as data creation timestamps, data source identifiers, and encryption keys. In some implementations, the passport system 720 can generate a cyber resilience identity including at least a link with the metadata object, a unique identifier (UID), and a performance event dataset. For example, the cyber resilience identity can include a URI linking to the metadata object, a UID for tracking the identity, and a dataset summarizing key performance events.

In some implementations, the passport system 720 can encapsulate the cyber resilience identity within a container including a control structure restricting one or more updates and redemptions of the metadata object. For example, the container can use access controls and permission rules to prevent unauthorized modifications or access to the metadata object. In some implementations, the passport system 720 can determine at least one access data structure being compatible with the control structure. For example, the passport system 720 can analyze data structures such as access control lists (ACLs) or role-based access controls (RBAC) to facilitate compatibility with the control structure. In some implementations, the passport system 720 can broadcast, using the control structure, the cyber resilience identity to a ledger or distributed ledger. For example, the passport system 720 can publish the cyber resilience identity to a blockchain or distributed ledger, and the identify can be securely recorded and accessed by authorized entities via the distributed ledger.

In some implementations, the token system 726 can generates various tokens. In some implementations, the token system 726 can generate cyber resilience identities (e.g., a passport including a token linked to various additional tokens with metadata). That is, generating the cyber resilience identities can include generating tokens that include metadata objects or metadata with information corresponding to components and/or metrics of a cybersecurity posture of an entity, such as firmographic information, security safeguards, threat detection capabilities, incident response data, compliance metrics, or other relevant cybersecurity information. For example, the token system 726 can generate, mint, or otherwise create unified safeguard tokens, unified requirements tokens, performance tokens, coverage tokens, incident readiness tokens, insurability readiness tokens, gap tokens, effectiveness tokens, and/or various additional tokens. For example, the token system 726 can structure a token to encapsulate data sets related to different aspects of cybersecurity such that a set of tokens can facilitate an evaluation of a security status of an entity (e.g., by an insurer or vendor). The various tokens generated by the token system 726 and encapsulated in cyber resilience identities are described in greater detail herein.

In some implementations, the cyber resilience identities can include a coverage token. The coverage token can be structured to store information about insurance policies, including policy numbers, premium amounts, and coverage data. That is, the token system 726 can generate a coverage token when insurance coverage data of an entity is to be documented and managed. For example, the coverage token can be created to include policy information such as the insured client, domain, and premium data. In generating the cyber resilience identities, the coverage token generated by the token system 726 can include data on insurance coverage, retention terms, and claims associated with the policy. For example, the coverage token can store data related to premium payment schedules, policy numbers, and claim UIDs that are linked to an insurance policy of an entity corresponding to a cyber resilience identity.

In some implementations, the cyber resilience identities can include an effectiveness token. The effectiveness token can be structured to store a record of security effectiveness of an organization over time, linking to historical data through performance tokens and capturing outcomes related to incidents and claims. That is, the token system 726 can generate an effectiveness token to document and evaluate the results of past and ongoing security measures within an organization. For example, the effectiveness token can be generated to include the effectiveness token UID, the creation date, a list of performance tokens, and outcomes related to security incidents and claims. In generating the cyber resilience identities, the effectiveness token generated by the token system 726 can include references to associated performance tokens, incident tokens, and claims tokens, providing a longitudinal view of security effectiveness. For example, the effectiveness token can include data indicative of how various incidents have impacted the security posture of the organization over time, including the effectiveness of response efforts and any gaps identified during evaluations.

In some implementations, the cyber resilience identities can include a gaps token. The gaps token can be structured to record and track information about vulnerabilities and compliance issues within an IT infrastructure of an organization. That is, the token system 726 can generate a gaps token to identify and monitor security gaps that could affect a cybersecurity posture of an organization. For example, the gaps token can be generated to include a gap UID, timestamp, description of the vulnerability, impact description, severity rating, and recommended actions for remediation. In generating the cyber resilience identities, the gaps token generated by the token system 726 can include metadata about at least one (e.g., each) identified gap, including the category of the threat, impact on confidentiality, integrity, and availability, and references to external resources for further information. For example, the gaps token can capture the severity of a local privilege escalation vulnerability in an IT infrastructure of an organization and provide recommendations for mitigating the threat.

In some implementations, the cyber resilience identities can include an IOCs (Indicators of Compromise) token. The IOCs token can be structured to store and describe indicators of malicious activity detected within an environment of an organization. That is, the token system 726 can generate an IOCs token to catalog and track known indicators of compromise that are associated with cybersecurity incidents. For example, the IOCs token can be generated to include an indicator UID, type of indicator (e.g., file hash), description of the indicator, and a pattern representing the malicious activity. In generating the cyber resilience identities, the IOCs token generated by the token system 726 can include data such as the confidence level in the indicator, the type of malicious activity it represents, and the pattern or signature detected. For example, the IOCs token can store information about a malicious file hash associated with a known malware instance, helping to identify and respond to similar threats in the future.

In some implementations, the cyber resilience identities can include an incident token. The incident token can be structured to capture data about a cybersecurity incident, including the type, date, outcome, and associated claims data. That is, the token system 726 can generate an incident token when to document and manage the lifecycle of a cybersecurity incident within an organization. For example, the incident token can be generated to include an incident UID, the title of the incident, incident data such as the type of attack, impacted data, response actions taken, and the associated costs. In generating the cyber resilience identities, the incident token generated by the token system 726 can include references to related tokens, such as TTPs (Tactics, Techniques, and Procedures) tokens, IOCs tokens, and breach team data, providing an overview of the incident. For example, the incident token can document the timeline of a ransomware attack, the response efforts, the root cause analysis, and the financial impact on the organization.

In some implementations, the cyber resilience identities can include a performance token. The performance token can be structured to provide a record of evaluations associated with safeguards and requirements within an organization (e.g., at a time). That is, the token system 726 can generate a performance token when to store the results of evaluations and assessments related to the cybersecurity safeguards of the organization. For example, the performance token can be generated to include a performance token UID, the date of creation, safeguard results, safeguard transformation results, and comparison results against predefined requirements. In generating the cyber resilience identities, the performance token generated by the token system 726 can include outcomes of safeguard evaluations, transformation proofs, and any identified gaps in compliance at a point in time. For example, the performance token can track the effectiveness of endpoint security measures, document how well the measures meet the thresholds, and identify areas for improvement.

In some implementations, the cyber resilience identities can include a ransom token. The ransom token can be structured to capture data about a ransomware incident, including ransom demands, payment data, and outcomes. That is, the token system 726 can generate a ransom token to document and manage the specifics of a ransomware event within an organization. For example, the ransom token can be generated to include a ransom UID, an associated incident UID, and data of the ransomware attack such as the group involved, payment wallet address, currency type, and the outcome of the payment. In generating the cyber resilience identities, the ransom token generated by the token system 726 can include references to the breach team involved, post-incident follow-up data, and information about the threat actor. For example, the ransom token can document the financial impact of the ransom payment, the success rate of data decryption, and ongoing risks posed by the threat actor.

In some implementations, the cyber resilience identities can include a TTPs (Techniques, Tactics, and Procedures) token. The TTPs token can be structured to provide an overview of a detected cybersecurity threat event, outlining the tactics, techniques, and procedures identified. That is, the token system 726 can generate a TTPs token to document and analyze adversarial behaviors detected during a cybersecurity incident. For example, the TTPs token can be generated to include a TTP UID, event data such as the event code, provider, start and end time, and description of the event, as well as information about the threat, including the tactic employed, techniques used, procedures followed, and the threat actor involved. In generating the cyber resilience identities, the TTPs token generated by the token system 726 can include observations from the event, such as the actions taken by the adversary, the outcome of those actions, and any data artifacts observed. For example, the TTPs token can document a phishing attack, including how the attack was executed, the tools used by the attacker, and the impact on the organization.

In some implementations, the cyber resilience identities can include a unified asset token. The unified asset token can be structured to provide information about the assets managed within an organization, including types, operational statuses, and associated identifiers. That is, the token system 726 can generate a unified asset token when to document and manage the lifecycle of assets within an IT infrastructure of an organization. For example, the unified asset token can be generated to include an asset UID, the date of creation, asset data such as type, name, description, location, and owner, and the operational status of the asset. In generating the cyber resilience identities, the unified asset token generated by the token system 726 can include identifiers and sources related to the asset, such as inventory data, cloud provider information, and any additional metadata. For example, the unified asset token can document an operational status of a server, cloud instance data, and any associated identifiers such that an organization can track and monitor assets.

In some implementations, the cyber resilience identities can include an incident readiness token. The incident readiness token can be structured to capture the attributes that demonstrate preparedness of an organization for responding to cybersecurity incidents. That is, the token system 726 can generate an incident readiness token to document and verify ability of an organization to handle cybersecurity incidents effectively. For example, the incident readiness token can be generated to include an incident readiness UID, the associated passport UID, and a description of the readiness of the organization to respond to cybersecurity incidents. In generating the cyber resilience identities, the incident readiness token generated by the token system 726 can include attributes such as the incident response plan, training and awareness programs, tools and technologies used, and testing exercises conducted. For example, the incident readiness token can document annual incident response plan updates of the organization, quarterly training sessions, and various additional tools and technologies in place to detect and mitigate cybersecurity threats.

In some implementations, the cyber resilience identities can include an insurability readiness token. The insurability readiness token can be structured to capture attributes for an organization to qualify for cybersecurity insurance, including risk assessments, security measures, and incident history. That is, the token system 726 can generate an insurability readiness token to document and assess preparedness of an organization for obtaining cybersecurity insurance. For example, the insurability readiness token can be generated to include an insurability readiness UID, the carrier UID, the associated passport UID, and a description of the preparedness of the organization for cybersecurity insurance. In generating the cyber resilience identities, the insurability readiness token generated by the token system 726 can include attributes such as risk assessments, security measures, documentation and compliance, and incident history. For example, the insurability readiness token can document annual risk assessments of the organization, the implementation of strong cybersecurity controls, and the effective mitigation of past incidents, providing an overview of the qualifications of the organization for cybersecurity insurance.

In some implementations, the cyber resilience identities can include or be associated with a passport, which can be a token or a distinct entity interacting with other tokens. The passport can be structured to encapsulate information about an entity, including firmographic data, indicators of cybersecurity readiness, and more. That is, the token system 726 can generate or link to a passport to provide certain information corresponding to a cybersecurity posture and readiness of an entity for insurance purposes. For example, the passport can contain or link to various tokens, such as unified safeguard tokens, unified requirements tokens, performance tokens, coverage tokens, incident readiness tokens, insurability readiness tokens, gap tokens, effectiveness tokens, and/or various additional tokens. For example, the token system can generate a cyber resilience identity or passport providing access to metadata inclusive of various cyber resilience data (e.g., legal structure of the entity, number of protected records, preparedness for cyber insurance, etc.) through linked tokens. Additional, token system 726 can generate the passport linked with a control structure to limit access to data and updates, as further described herein.

In some implementations, the wallet system 712 can include one or more processing circuits, including processor(s) and memory. The memory can have instructions stored thereon that, when executed by processor(s), cause the one or more processing circuits to perform the various operations described herein. The operations described herein can be implemented using software, hardware, or a combination thereof. The processor(s) can include a microprocessor, ASIC, FPGA, etc., or combinations thereof. In many implementations, the processor(s) can be a multi-core processor or an array of processors. Memory can include, but is not limited to, electronic, optical, magnetic, or any other storage devices capable of providing processor(s) with program instructions. The instructions can include code from any suitable computer programming language. In some implementations, the wallet system 712 can include an interface circuit and function circuit.

In some implementations, the wallet system 712 can include a storage mechanism for holding digital assets, including cyber resilience tokens, private keys, and access credentials. In some examples, the wallet system 712 can perform cryptographic operations to encrypt and decrypt token-related data and sign transactions, authenticating the client device(s) 110 during interactions with the passport system 720 and the ledger system 730. The wallet system 712 can manage permissions and access control so that authorized can entities initiate or authorize updates to the cyber resilience tokens stored within the ledger system 730. In some implementations, the wallet system 712 can communicate with dynamic non-fungible tokens (DNFTs) or other various tokens associated with the cyber resilience identity. For example, the wallet system 712 can store and manage multiple NFTs or DNFTs representing different aspects of a cybersecurity posture (e.g., cyber resilience status) of an organization or entity. The wallet system 712 can facilitate updates to the tokens by performing cryptographic operations that validate and record changes to the cybersecurity data encapsulated within the DNFTs. The wallet system 712 can also provide an interface that authorized entities use to access and manage the DNFTs, facilitating the review and assessment of the cybersecurity posture of the entity over time.

In some implementations, the wallet system 712 can store, create, and update a variety of tokens associated with the cybersecurity posture of an organization or entity. The wallet system 712 can create and update performance tokens, which can include results of cybersecurity events, assessments, or incident responses (e.g., a security breach response or a periodic vulnerability assessment). The wallet system 712 can create and maintain unified tokens, which can include data representing the state of various cybersecurity elements over time (e.g., safeguards implemented across the organization, internal and third-party requirements compliance, or asset management). The wallet system 712 can capture and record evaluation tokens, which can include cybersecurity data captured at multiple points in time (e.g., snapshots of the organization cybersecurity posture at regular intervals). The wallet system 712 can aggregate and store roll-up tokens, which can include combined data from unified and real-time tokens to provide a view of the cybersecurity performance over a specified period (e.g., annual security performance summary). The wallet system 712 can create and update resilience tokens, which can include tokens representing different dimensions of the organization cybersecurity posture (e.g., tokens for cybersecurity resilience metrics). The wallet system 712 can further provide interfaces for entities to access, manage, and review the various tokens.

In some implementations, the systems or components of FIG. 7 can communicate over network 120. Network 120 can include computer networks such as the Internet, local, wide, metro or other area networks, intranets, satellite networks, other computer networks such as voice or data mobile phone communication networks, combinations thereof, or any other type of electronic communications network. Network 120 can include or constitute a display network. As a non-limiting example, network 120 can implement transport layer security (TLS), secure sockets layer (SSL), hypertext transfer protocol secure (HTTPS), and/or any other secure communication protocol. In some implementations, network 120 can be composed of various network devices (nodes) communicatively linked to form one or more data communication paths between participating devices. The network 120 can facilitate communication between the various nodes, such as the client device(s) 110, third-party device(s) 150, passport system 720, etc. (e.g., using an OSI layer-4 transport protocol such as the User Datagram Protocol (UDP), the Transmission Control Protocol (TCP), Stream Control Transmission Protocol (SCTP), etc.). At least one (e.g., each) networked device can include at least one network interface for receiving and/or transmitting data, typically as one or more data packets. An illustrative network 120 is the Internet (however, other networks can be used). Network 120 can be an autonomous system (AS), e.g., a network that is operated under a consistent unified routing policy (or at least appears to from outside the AS network) and is generally managed by a single administrative entity (e.g., a system operator, administrator, or administrative group).

In some implementations, the ledger system 730 can include one or more processing circuits, including processor(s) and memory. The memory can have instructions stored thereon that, when executed by processor(s), cause the one or more processing circuits to perform the various operations described herein. The operations described herein can be implemented using software, hardware, or a combination thereof. The processor(s) can include a microprocessor, ASIC, FPGA, etc., or combinations thereof. In many implementations, the processor(s) can be a multi-core processor or an array of processors. Memory can include, but is not limited to, electronic, optical, magnetic, or any other storage devices capable of providing processor(s) with program instructions. The instructions can include code from any suitable computer programming language. In some implementations, the ledger system 730 can include an interface circuit and function circuit.

In some implementations, the ledger system 730 can be a ledger or a decentralized ledger. For example, the ledger system 730 can include a distributed ledger technology (DLT) that supports immutable record-keeping and secure data transactions. The ledger system 730 can store various types of tokens and cybersecurity data, including performance tokens, unified tokens, evaluation tokens, roll-up tokens, and resilience tokens. The ledger system 730 can securely record updates and changes to tokens (e.g., providing data integrity and traceability). For example, the ledger system 730 can use blockchain to provide a tamper-evident record of token-related transactions.

In some implementations, the ledger system 730 can include smart contract storage 732, blockchain 170, and token storage 734. In some implementations, the smart contract storage 732, blockchain 170, and/or token storage 734 can include one or more processing circuits, including processor(s) and memory. The memory can have instructions stored thereon that, when executed by processor(s), cause the one or more processing circuits to perform the various operations described herein. The operations described herein can be implemented using software, hardware, or a combination thereof. The processor(s) can include a microprocessor, ASIC, FPGA, etc., or combinations thereof. In many implementations, the processor(s) can be a multi-core processor or an array of processors. Memory can include, but is not limited to, electronic, optical, magnetic, or any other storage devices capable of providing processor(s) with program instructions. The instructions can include code from any suitable computer programming language. In some implementations, the smart contract storage 732, blockchain 170, and/or token storage 734 can include an interface circuit and function circuit.

In some implementations, smart contract storage 732 can manage and execute predefined agreements related to token transactions and updates. In one example, smart contract storage 732 can store role-based access controls (RBACs or other rule-based control systems) or other access control mechanisms restricting access or updates to tokenized cyber resilience data stored via the ledger system 730. In some examples, the smart contract storage 732 can store rules or other data to automate processes such as token validation, data access control, and compliance checks. For example, smart contract storage 732 can store smart contracts that define the rules and logic for managing token transactions and updates. In some examples, smart contract storage 732 can manage contract templates that specify access permissions, including RBACs to restrict access based on user roles. That is, the smart contract storage 732 can implement RBAC to control permissions for executing transactions or modifying token data. Smart contract storage 732 can execute stored access controls/smart contracts to enforce access permissions, validate transactions, and verify compliance of entities or organizations with various cyber resilience parameters. In some implementations, smart contract storage 732 can process transactions according to terms, parameters, or rules to restrict access to tokens or other cyber resilience data.

In some implementations, blockchain 170 can include a decentralized ledger that records and validates token transactions. For example, blockchain 170 can utilize consensus mechanisms (e.g., proof of provenance, proof of work, proof of stake) to validate transactions involving tokenized cyber resilience data across a distributed network. In some examples, blockchain 170 can provide a tamper-evident and/or immutable record of token data by employing cryptographic techniques (e.g., hashing functions) to record and verify token transactions. That is, blockchain 170 can provide transparency and traceability of token-related activities by securely recording token transactions on a distributed computing architecture.

In some implementations, token storage 734 can store tokenized cyber resilience data. For example, token storage 734 can store and/or manage tokens including performance tokens, unified tokens, evaluation tokens, and roll-up tokens generated and/or provided by the token system 726. In some examples, token storage 734 interfaces with blockchain 170 to manage and organize token data. For example, token storage 734 can handle different token types, including performance tokens, unified tokens, evaluation tokens, and roll-up tokens. Token storage 734 can utilize data structures such as relational databases, NoSQL databases, or file systems to organize and manage tokens and/or corresponding data. In some examples, token storage 734 can maintain data accuracy by integrating with blockchain 170 to validate and update token records.

In some implementations, the passport system 720 can include one or more systems and/or subsystems to model cyber resilience data using cyber resilience identities and associated metadata (e.g., cryptographic system 722, ledger interface 724, token system 726, and metadata collection system 728). In some implementations, the cryptographic system 722, ledger interface 724, token system 726, and/or metadata collection system 728 can include one or more processing circuits, including processor(s) and memory. The memory can have instructions stored thereon that, when executed by processor(s), cause the one or more processing circuits to perform the various operations described herein. The operations described herein can be implemented using software, hardware, or a combination thereof. The processor(s) can include a microprocessor, ASIC, FPGA, etc., or combinations thereof. In many implementations, the processor(s) can be a multi-core processor or an array of processors. Memory can include, but is not limited to, electronic, optical, magnetic, or any other storage devices capable of providing processor(s) with program instructions. The instructions can include code from any suitable computer programming language. In some implementations, the cryptographic system 722, ledger interface 724, token system 726, and/or metadata collection system 728 can include an interface circuit and function circuit.

In some implementations, the metadata collection system 728 can receive or identify cyber resilience data. That is, receiving or identifying can include the metadata collection system 728 acquiring, processing, and categorizing data from various sources, such as cybersecurity events, system performance metrics, and vulnerability assessments stored on ledger system 730. For example, the metadata collection system 728 can gather and/or organize data attributes like event timestamps, sources, and types corresponding to a cyber resilience status of the entity and other cyber protection information. Additionally, the metadata collection system 728 can link these data attributes to cyber resilience metrics and update the corresponding records to reflect changes in the cyber protection posture of the entity.

In some implementations, the cryptographic system 722 can encrypt a portion of the cyber resilience data. That is, encrypting can include the cryptographic system 722 securing sensitive data using cryptographic techniques tailored to the requirements of the data. For example, the cryptographic system 722 can apply encryption algorithms to protect sensitive data, such as performance metrics or identifiers of an organization or entity. Further, the cryptographic system 722 can utilize key management techniques to facilitate secure data encryption and decryption process such that authorized entities can access the encrypted data. Additionally, the cryptographic system 722 can use asymmetric encryption to secure data before it is stored or transmitted. For example, the cryptographic system 722 can apply hashing algorithms to verify the integrity of data associated with cyber resilience events and assessments such that the data remains unaltered during transmission or storage.

In some implementations, the token system 726 and/or metadata collection system 728 can generate a metadata object including metadata of cyber resilience data. That is, the token system 726 can create structured metadata objects that include information about tokenized data, such as fields, tags, headers, and other relevant attributes like data type, source, and context. For example, the token system 726 can organize metadata into formats that provide descriptions and classifications for at least one (e.g., each) element of cyber resilience data. Further, the metadata collection system 728 can collect and integrate various metadata elements, such as timestamps, source identifiers, and data relevance indicators, into the metadata object. Additionally, the token system 726 can structure the metadata to improve the understanding and usability of the collected cyber resilience data.

In some implementations, the token system 726 can generate a cyber resilience identity including at least a link with the metadata object, a unique identifier (UID), and a performance event dataset. That is, generating can include creating, associating, and linking metadata objects, identifiers, and performance datasets with an identifier of an organization or entity. For example, the token system 726 can generate a passport that links to metadata stored in one or more tokens, which include data related to different aspects of cyber resilience of an entity. The passport can include a UID or identifier for tracking and linking the metadata object to other associated tokens. Further, the performance event dataset within the passport can capture and store cyber resilience performance data, such as that stored in multiple performance tokens, which can be collected at different points in time. For example, the token system 726 can issue or mint tokens linked to a single token that reference metadata objects and include identifiers for tracking, and the token system 726 can embed performance metrics and historical data within the tokens to provide insights into cyber resilience.

In some implementations, the token system 726 can encapsulate the cyber resilience identity within a container that includes a control structure restricting one or more updates and redemptions of the metadata object. That is, encapsulating can include implementing token gating mechanisms or smart contracts to enforce rules on who can update or redeem the cyber resilience identity, based on predefined criteria and access control policies. For example, the token system 726 can establish a control structure that allows a customer to view relevant data within their own passport while restricting access of an insurer to tokenized data for underwriting decisions. Generally, the passport system 720 can implement a control structure that enforces rules on who can update or redeem the cyber resilience identity based on predefined criteria (e.g., entity type, user preferences/selections, etc.).

In some implementations, the ledger interface 724 can determine at least one access data structure that is compatible with the control structure. That is, determining can include analyzing various data structures to identify or determine alignment with the access control policies and update restrictions defined by the control structure. For example, the ledger interface 724 can evaluate different data structures to verify compatibility with access levels and permissions for interacting with the cyber resilience identity. Additionally, the ledger interface 724 can select and implement data structures that support the secure and compliant management of access and updates within the token system 726.

The control structure (e.g., implemented as a smart contract) governs access to a token structure containing various tokens, such as performance tokens, unified tokens, evaluation tokens, and roll-up tokens. The token structure can include metadata, such as unique identifiers (UIDs), creation timestamps, and links to related data sets. The smart contract specifies predefined rules for accessing and updating these tokens. The ledger interface 724 can process the smart contract to extract rules that define role-based access control (RBAC) permissions. For example, the smart contract can specify that third parties are restricted to accessing their own data within the token structure. In some implementations, a third-party entity can have access its own performance tokens stored in the token structure, such as in a passport associated with the cybersecurity status of an entity. The RBAC rules restrict other entities from viewing or modifying these tokens. Another example can include third-party vendors having access to their own evaluation tokens that include the results of security assessments relevant to their services, without the ability to access data from other vendors.

The ledger interface 724 can configure the selected access data structure to enforce these RBAC permissions as extracted from the smart contract. That is, the configuration can include mapping the access permissions to the token structure, linking at least one (e.g., each) token type to the appropriate access control mechanisms. For example, performance tokens related to a particular third-party can be linked to a role of the third-party. Similarly, access to unified tokens related to internal compliance can restricted to authorized roles within the organization itself (e.g., excluding third-party access). The ledger interface 724 can integrate the configuration within the ledger system 730 to apply the rules of the control structure to token-related operations. The RBAC can facilitate access to tokens to entities or individuals that have been granted access or authorized to read, update, or add. For example, the control structure can use an access level of an entity or individual to determine whether to allow a user to read data but not update or add to the data (e.g., a third-party insurer can access performance datasets on performance tokens linked to a passport of the prosecutive insured, but can be restricted from modifying certain performance data stored thereon), or whether to have full rights (e.g., read/update/add, etc.). That is, the passport system 720 can provide an access level or permissions to a person or entity attempting to access or otherwise interact with tokenized data corresponding to a cyber resilience identity, and the access level/permissions can be used by the passport system 720 to restrict or allow the user or entity to perform various actions related to the tokens.

In some implementations, if the smart contract is modified, the ledger interface 724 can reconfigure the access data structures to match the updated RBAC rules. For example, if the smart contract is updated to change access permissions for a particular third-party entity, the ledger interface 724 can adjust the RBAC configurations to reflect this change such that the access control mechanisms allows access and is consistent with the control structure. In some implementations, an access data structure can function as a token or another access control mechanism within the token structure. That is, the access data structure can facilitate operations, such as reading, writing, adding, or removing metadata objects associated with tokens in the cyber resilience identity (e.g., also operating and implemented as a token). For example, an access control token can link to other tokens representing performance, evaluation, or resilience data. The access control token can encapsulate the permissions for interacting with the tokens and can include metadata defining allowed operations and roles or entities authorized to perform operations. Additionally, an access data structure can implement write access to one or more metadata objects within the token structure. For example, an access control token can identify which entities have permission to update particular aspects of the cyber resilience identity, such as modifying performance metrics or altering the status of an evaluation token. Another access data structure can be used to manage read permissions, restricting a third-party entity to viewing metadata associated with its own tokens within the structure without granting modification rights. In some implementations, an access control structure can function as a token that defines hierarchical permissions across multiple tokens. For example, a control structure token can specify that authority to add or remove tokens from the cyber resilience identity is restricted to a designated role within an organization. Additionally, the access control token can be used to facilitate interactions with other tokens within the token structure to apply these permissions.

In some implementations, the ledger interface 724 can broadcast, using the control structure, the cyber resilience identity to a ledger or distributed ledger. That is, broadcasting can include publishing, sharing, or otherwise transmitting a passport (e.g., cyber resilience identity) of an entity. For example, the ledger interface 724 can transmit the cyber resilience identity to a blockchain or similar distributed ledger to maintain an immutable record of the cyber resilience identity and associated data. Additionally, the ledger interface 724 can store the cyber resilience identity locally (e.g., in a back-end database or other local data store). Further, the ledger interface 724 can transmit or send the cyber resilience identity (e.g., via a shareable link) to various entities, who can access a portion of the data corresponding with the cyber resilience identity but not access another portion of the data based on various access controls.

Figure 8:
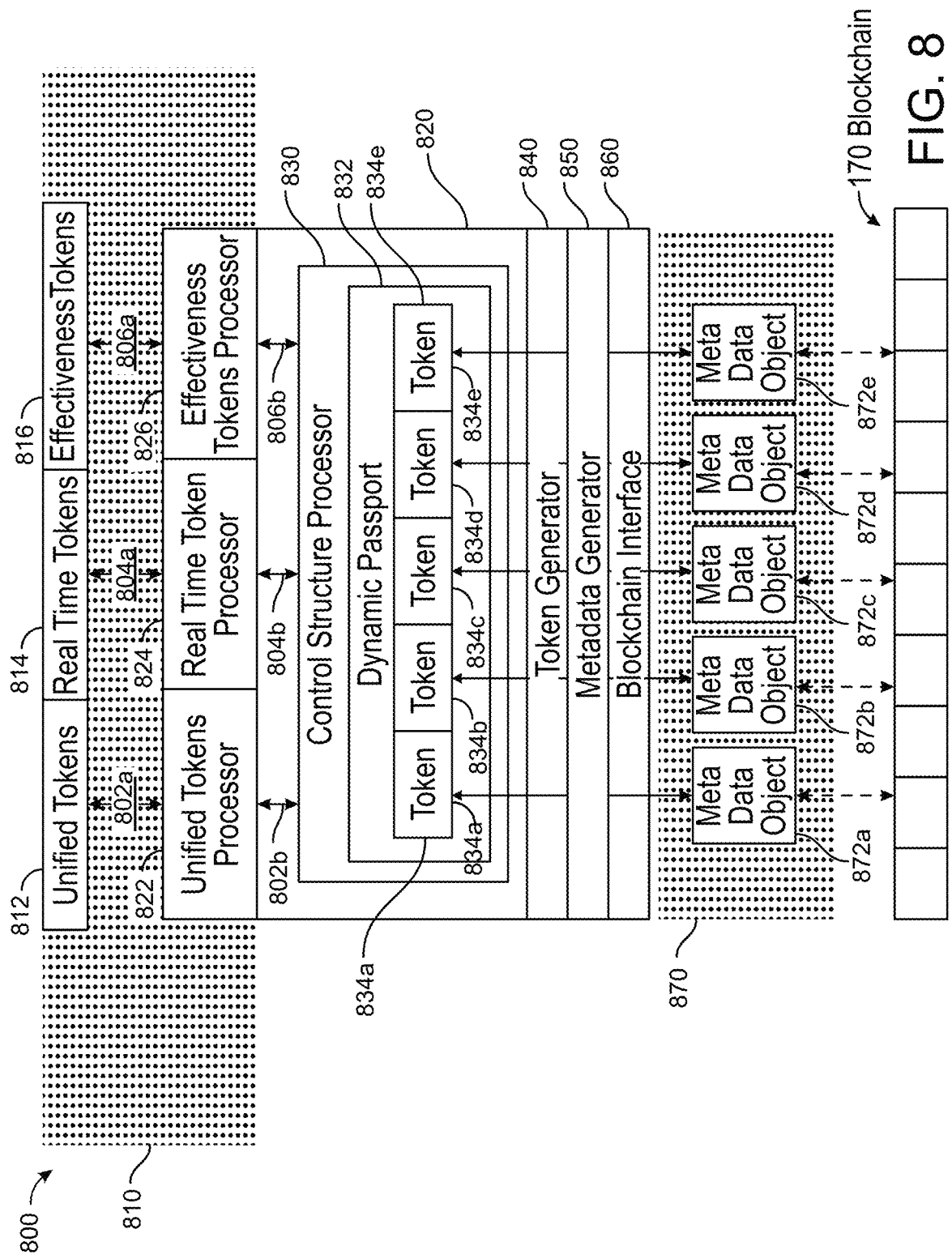
FIG. 8 depicts a block diagram of a more detailed architecture of certain systems or devices of FIG. 7, according to some implementations.

Referring now to FIG. 8, a block diagram of an architecture 800 of certain systems or devices of FIG. 7 is shown, according to some implementations. The implementation shown in FIG. 8 can include a token interface 810 including unified tokens 812, real-time tokens 814, and effectiveness tokens 816. The implementation shown in FIG. 8 can also include a smart contract control structure 820 including a unified token processor 822, a real-time token processor 824, and an effectiveness token processor 826. Further, the smart contract control structure 820 can include a control structure processor 830, a token generator 840, a metadata generator 850, and a blockchain interface 860. In some implementations, the control structure processor 830 can include a dynamic passport 832, and dynamic passport 832 can include tokens 834a-834e (collectively, 834). In some examples, tokens 834 can be linked to a metadata interface 870 including one or more metadata objects 872a-872e (collectively, metadata objects 872). In some implementations, the implementation shown in FIG. 8 can include blockchain 170.

In some implementations, FIG. 8 depicts an example smart contract control structure 820. In some examples, the unified token processor 822, real-time token processor 824, and effectiveness token processor 826 can detect a presence of a token (fungible, non-fungible, partially-fungible, etc.), and can transmit the token to a compatibility processor (e.g., 822, 824, 826) compatible with that particular token. The detection can be responsive to an action by the token interface 810 to transmit the tokens to the smart contract control structure 820. In some examples, the token interface 810 can include a communication channel between one or more of the smart contract control structure 820 and one or more of the unified tokens 812, real-time tokens 814, and effectiveness tokens 816. The token interface 810 can include an application programming interface compatible with the smart contract control structure 820 to detect various cyber resilience tokens. At least the token interface 810 or the smart contract control structure 820 can execute one or more instructions to determine whether one or more of the tokens are compatible with the smart contract control structure 820.

In some implementations, the unified token processor 822 can perform detection of unified tokens 812 via a link 802a or other communication channel (e.g., via a network such as network 120). The detection can be responsive to receiving a unified token from token system 726, client device(s) 110, or third-party device(s) 150, over link 802a. The unified token processor 822 can be configured to be compatible with a unified token 812, or can be generated to be compatible with a particular unified token 812. For example, the unified token processor 822 can be integrated with or store a hash based on a unified token 812 and a hash processor operable to generate a hash based on any unified token 812. The unified token processor 822 can generate a hash in response to detecting the presence of the unified token 812, and can determine whether the unified token 812 is compatible with the smart contract control structure 820 by comparing the generated hash with the stored hash. The unified token processor 822 can include logic to detect a unified token 812 passed to it, by, for example, a JSON object or a header argument. Additionally, the unified token processor 822 can provide the detected unified token to the control structure processor 830 via link 802b.

In some implementations, the real-time token processor 824 can perform detection of real-time tokens 814 via link 804a. The detection can be responsive to receiving a real-time token 814 from token system 726, client device(s) 110, or third-party device(s) 150, over link 804a. For example, the real-time token processor 824 can be integrated with or store a hash based on a real-time token 814 and a hash processor operable to generate a hash based on any real-time token 814. The real-time token processor 824 can generate a hash in response to detecting the presence of the real-time token 814, and can determine whether the real-time token 814 is compatible with the smart contract control structure 820 by comparing the generated hash with the stored hash. The real-time token processor 824 can include logic to detect a real-time token 814 passed to it, by, for example, a JSON object or a header argument. Additionally, real-time token processor 824 can provide the detected real-time token 814 to the control structure processor 830 via link 804a.

In some implementations, the effectiveness token processor 826 can perform detection of effectiveness tokens 816 via link 806a. The detection can be responsive to receiving an effectiveness token 816 from token system 726, client device(s) 110, or third-party device(s) 150, over link 806a. For example, the effectiveness token processor 826 can be integrated with or store a hash based on an effectiveness token 816 and a hash processor operable to generate a hash based on any effectiveness token 816. The effectiveness token processor 826 can generate a hash in response to detecting the presence of the effectiveness token 816, and can determine whether the effectiveness token 816 is compatible with the smart contract control structure 820 by comparing the generated hash with the stored hash. The effectiveness token processor 826 can include logic to detect an effectiveness token 816 passed to it, by, for example, a JSON object or a header argument. Additionally, the effectiveness token processor 826 can provide the detected effectiveness token 816 to the control structure processor 830 via link 806b.

In some implementations, the smart contract control structure 820 can include a control structure processor 830 configured to generate and/or store tokens 834. The tokens 834 can include one or more unified tokens 812, real-time tokens 814, and effectiveness tokens 816. That is, responsive to receiving one or more of the unified tokens 812, real-time tokens 814, and effectiveness tokens 816 from the unified token processor 822, real-time token processor 824, and/or effectiveness token processor 826, the control structure processor 830 can receive the tokens 834 via links 802b, 804b, and/or 806b. In some implementations, the control structure processor 830 can generate a container metadata object, such as a wrapper, where a control structure (e.g., a smart contract) is wrapped or otherwise linked to dynamic passport 832, which can further include links to metadata (e.g., stored data, fields, etc.) of tokens 834. For example, the dynamic passport 832 can be encapsulated in a container with a control structure and can generated by metadata generator 850 as part of the metadata interface 870. The container linking dynamic passport 832 and the control structure can provide access to the tokenized cyber information based on the control structure.

In some implementations, the control structure processor 830 can generate a dynamic passport 832 including a token with a link to (e.g., encapsulated in) a container. The link can be established via a digital signature or cryptographic hash that securely associates the dynamic passport 832 with corresponding metadata. The dynamic passport 832 can be provided to a metadata interface 870 such that a blockchain (e.g., blockchain 170) can verify and store the metadata securely on the chain. Additionally, the control structure processor 830 can encapsulate the dynamic passport 832 and tokens 834 within the smart contract control structure 820 to provide the container. For example, encapsulating can include encrypting the data and setting permissions for data access. That is, the encapsulation can restrict outputs of the container metadata object and the metadata objects 872. For example, when the dynamic passport 832 and tokens 834 are encapsulated, the control structure processor 830 can output when conditions or permissions are verified. In another example, when the dynamic passport 832 and tokens 834 are encapsulated in a container, the control structure processor 830 can output when a valid decryption key is presented. For example, the control structure processor 830 can authorize transactions after verifying that compliance and regulatory requirements are met based on data of the tokens 834.

In some implementations, the control structure processor 830 can be configured to perform segmentation or allocation of tokens 834 of the dynamic passport 832 based on parameters by accessing the metadata of a token and container and evaluating compliance with cyber resilience standards. Accordingly, the control structure processor 830 can automatically pool (or tranche) asset tokens (associated with underlying assets) based on parameters. For example, the parameters can be programmed into smart contracts of the control structure processor 830. For example, the dynamic passport 832 can include one or more segmented allocations of the tokens 834 (e.g., with token 834*a* and token 834*b* segmented into an allocation and token 834*c*, token 834*d*, and token 834*e* segmented into another allocation). While not shown in FIG. 8, a segmented allocation smart contract control structure can be within the smart contract control structure 820 and be operated by the control structure processor 830. In some examples, this integration facilitates automated re-segmentation based on real-time data analysis. In another example, this integration facilitates compliance checks and performance tracking without external system intervention.

In some implementations, the tokens 834 can include metadata objects 872*a*-872*e* (collectively, metadata objects 872). For example, links can connect tokens 834 to respective metadata objects 872. In some examples, the metadata interface 870 can be utilized to connect tokens 834 to corresponding metadata objects 872. For example, the token 834*a* can be connected to the metadata object 872*a* via a link, the token 834*b* can be connected to the metadata object 872*b* via a link, the token 834*c* can be connected to the metadata object 872*c* via a link, the token 834*d* can be connected to the metadata object 872*d* via a link, and the token 834*e* can be connected to the metadata object 872*e* via a link.

In some examples, the metadata interface 870 can include a communication channel between one or more of the tokens in the smart contract control structure 820 and metadata objects of blockchain 170. That is, metadata objects 872 can be accessed and verified through blockchain transactions to verify integrity and authenticity. Furthermore, blockchain 170 can store links to the metadata objects 872 or store the metadata objects 872 in blocks of the blockchain 170. For examples, the blockchain 170 can store the metadata objects 872 in blocks to verify that participants have consistent and unalterable access to the cyber resilience information stored in the tokens 834 of the dynamic passport 832.

In some implementations, the token interface 810 can include an application programming interface compatible with the smart contract control structure 820 to detect various cyber resilience tokens. In some examples, at least the token interface 810 or the smart contract control structure 820 can execute one or more instructions to determine whether one or more of the tokens (e.g., tokens 834 or corresponding unified tokens 812, real-time tokens 814, and/or effectiveness tokens 816) are compatible with the smart contract control structure 820.

In some implementations, the token generator 840 (e.g., token system 726) can generate one or more tokens (e.g., fungible, semi-fungible, or non-fungible tokens, collectively referred to herein as "controllable electronic records") in accordance with a token obtained at one or more of the unified token processor 822, real-time token processor 824, and/or effectiveness token processor 826. For example, the token generator 840 can generate tokens based on a number of new metadata objects indicated by an obtained token, and linked with respective smart contract control structures. For example, the token generator 840 can generate a cyber resilience identity (e.g., dynamic passport 832) with links to one or more tokens linked with a particular smart contract control structure 820 with which the respective token is compatible. The token generator 840 can thus generate a corresponding number of keys that can control restrictions on output by the particular metadata object linked with the particular smart contract control structure compatible with the particular token. The token generator 840 can modify and delete tokens (e.g., tokens 834) linked with cyber resilience identity (e.g., dynamic passport 832), to update control of a partial distribution or exchange of metadata object control.

In some implementations, the metadata generator 850 can generate one or more metadata objects (e.g., metadata objects 872) in accordance with a token obtained at one or more of the unified token processor 822, real-time token processor 824, and/or effectiveness token processor 826 (e.g., at a compatibility processor). That is, the metadata object can include metadata of cyber resilience data. For example, metadata generator 850 can generate multiple tokens based on a number of new metadata objects linked with respective smart contract control structures and encapsulated in a container with a cyber resilience identity (e.g., passport). For example, the metadata generator 850 can generate one or more metadata objects 872 linked to respective tokens 834 and further linked, via the tokens 834, to the dynamic passport 832 with a particular smart contract control structure 820 by which the metadata object is controlled. In some examples, the metadata generator 850 can modify and delete metadata objects linked with tokens or smart contract control structures to update control of a partial transfer of metadata object control. Further, the metadata generator 850 can modify and/or update tokens and/or associated information of existing tokens (e.g., tokens 834) corresponding to a cyber resilience identity (e.g., passport 832).

In some implementations, the blockchain interface 860 can include an API compatible with the blockchain 170 via metadata generator 850. The blockchain interface 860 can selectively add, modify, and delete blocks from the blockchain 170. The blockchain interface 860 can add, modify, and delete blocks in accordance with restrictions or interfaces of the blockchain 170, and can add, modify, and delete blocks independently of the restrictions or interfaces of the blockchain 170 at any portion or index of the blockchain 170.

Figure 9:
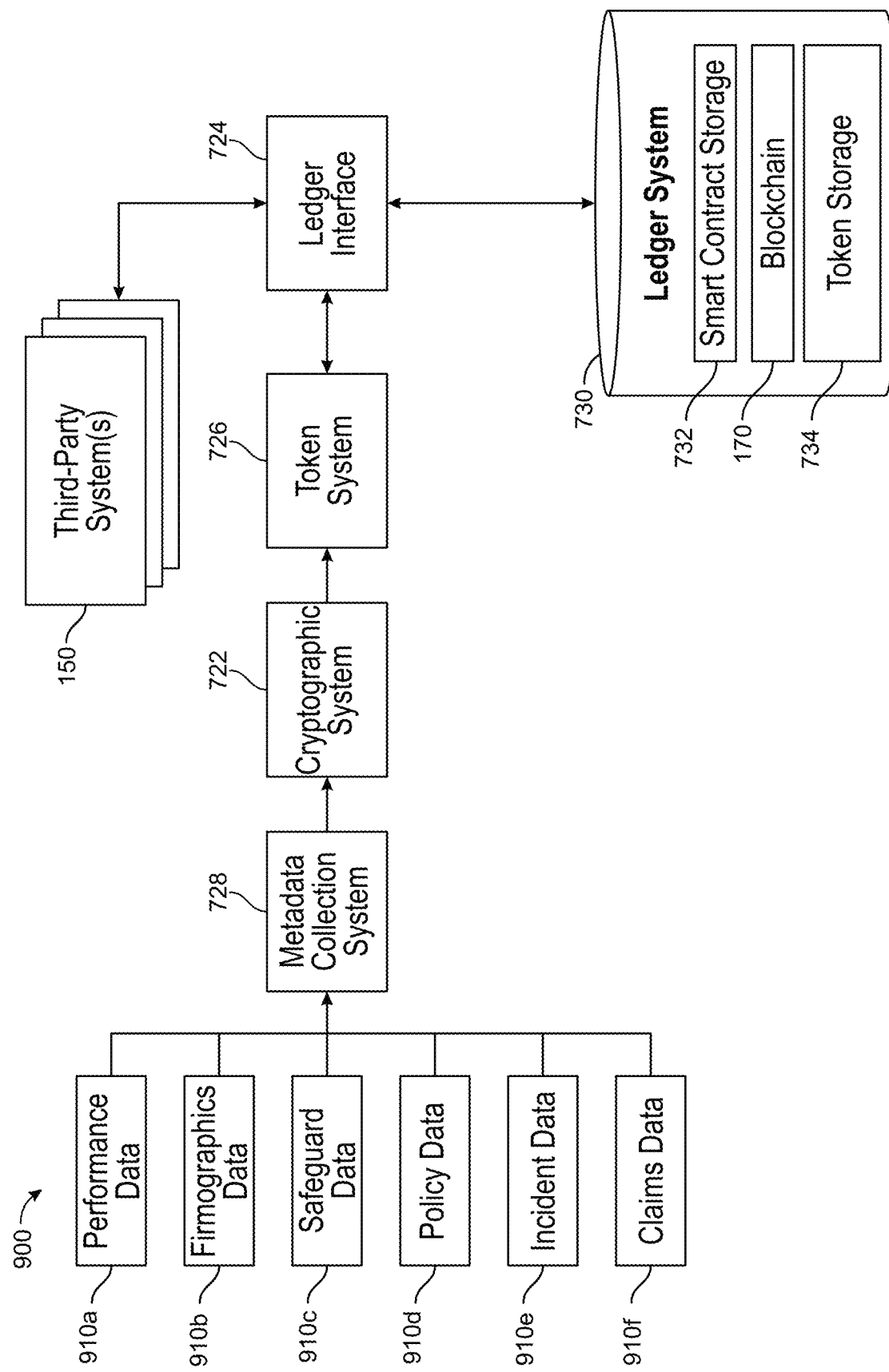
FIG. 9 depicts a block diagram of a more detailed architecture of certain systems or devices of FIG. 7, according to some implementations.

Referring now to FIG. 9, a block diagram of an architecture 900 of certain systems or devices of FIG. 7 is shown, according to some implementations. The implementation shown in FIG. 9 includes third-party device(s) 150 and ledger system 730. The ledger system 730 can include smart contract storage 732, blockchain 170, and token storage 734. The implementation shown in FIG. 9 can also include metadata collection system 728, cryptographic system 722, token system 726, and ledger interface 724. The implementation shown in FIG. 13 can also include performance data 910a, firmographics data 910b, safeguard data 910c, policy data 910d, incident data 910e, and claims data 910f.

In some implementations, the metadata collection system 728 can receive or identify cyber resilience data 910a-910f. For example, the metadata collection system 728 can collect or retrieve performance data 910a (e.g., metrics related to cybersecurity incidents or system performance), firmographics data 910b (e.g., company size, industry type, or geographic location), safeguard data 910c (e.g., implemented security controls or measures), policy data 910d (e.g., security policies or compliance requirements), incident data 910e (e.g., records of security breaches or system failures), and claims data 910f (e.g., insurance claims or risk assessments) of an entity or organization. In some examples, the metadata collection system 728 can integrate data from various cybersecurity tools and databases (e.g., third-party device(s) 150, blockchain 170, etc.) to compile a cyber resilience dataset. In some implementations, the metadata collection system 728 can provide the received or identified cyber resilience data to the cryptographic system 722.

In some implementations, the cryptographic system 722 can encrypt a portion of the cyber resilience data. For example, the cryptographic system 722 can apply symmetric encryption algorithms (e.g., AES) to secure sensitive data such as performance data 910a (e.g., performance metrics) or firmographics data 910b. In another example, the cryptographic system 722 can use asymmetric encryption techniques (e.g., RSA) to protect keys and authentication credentials. Further, the cryptographic system 722 can implement hashing algorithms (e.g., SHA-256) to verify the integrity of the data by generating hash values for at least one (e.g., each) data record. In some implementations, the cryptographic system 722 can provide the portion of encrypted cyber resilience data to the token system 726.

In some implementations, the token system 726 can generate a metadata object including metadata of cyber resilience data. For example, the token system 726 can create metadata objects that encapsulate encrypted performance data, safeguard records, and compliance data. In some implementations, the token system 726 can include additional metadata such as timestamps, data sources, and integrity checks. In some implementations, the token system 726 can generate a cyber resilience identity including at least a link with the metadata object, a unique identifier (UID), and a performance event dataset. For example, the cyber resilience identity can include a UID to identify the entity, a link to a metadata object (e.g., data of one or more tokens), and include a dataset with performance events or incidents. In some implementations, the token system 726 can encapsulate the cyber resilience identity within a control structure restricting one or more updates and redemptions of the metadata object. The control structure can be a data structure or other system including a cyber resilience identifier (e.g., passport) with linked tokens and restricting accessing to metadata object (e.g., data) of certain tokens. In some implementations, the token system 726 can determine at least one access data structure being compatible with the control structure. For example, the token system 726 can utilize various access management techniques, such as access control lists (ACLs), role-based access controls (RBACs), or attribute-based access controls (ABACs), to verify that the access data structure aligns with the permissions and restrictions defined within the control structure. The passport system 720 can assess these access data structures to determine whether the structures comply with predefined standards or policies (e.g., determining whether an entity or authorized user has the appropriate credentials or attributes to access, modify, or update the metadata objects encapsulated within the control structure). Additionally, the token system 726 can dynamically adjust the access parameters based on changes in roles, permissions, or security requirements such that the control structure remains consistent with the evolving access requirements of various entities and users involved in managing or interacting with the cyber resilience identity.

In some implementations, access controls, such as role-based access controls (RBACs) or access parameters, can be implemented in various forms to manage permissions for entities interacting with the metadata object (e.g., token). Access controls can include any method or mechanism that limits, restricts, or authorizes access to certain data based on predefined criteria. Examples of access controls could involve establishing rules that dictate who can view, modify, or delete data elements within the metadata object or cyber resilience identity. Such controls can be used to regulate access across different entities, such as allowing a third party like an insurer to view certain data, modify data, or be restricted from accessing other sensitive data. These access controls can also be configured within a broader access management framework, such as ACLs or RBACs, that dynamically adapts to the roles and permissions associated with different users or systems.

In some implementations, the token system 726 can generate a cyber resilience identity including at least a link with the metadata object, a unique identifier (UID), and a performance event dataset. For example, the cyber resilience identity can incorporate a UID to identify the entity, link to the metadata object to reference encrypted data, and include a dataset detailing performance events or incidents. The token system 726 can encapsulate the cyber resilience identity within a control structure restricting one or more updates and redemptions of the metadata object. Further, the token system 726 can determine at least one access data structure that aligns with the control structure. For example, the token system 726 can use access control lists or role-based access controls to verify alignment with the control structure for control over which data elements can be accessed or modified by different entities. In some implementations, the ledger interface 724 can broadcast, using the control structure, the cyber resilience identity to a ledger or distributed ledger. For example, the ledger interface 724 can interact with the ledger system 730, including smart contract storage 732, blockchain 170, and token storage 734, to submit the cyber resilience identity and associated metadata and publish the cyber resilience identity to blockchain 170. In some examples, the ledger interface 724 can also communicate with third-party device(s) 150 to share and verify the cyber resilience identity across different platforms and networks (e.g., to transmit to a vendor or insurer).

Figure 10A:
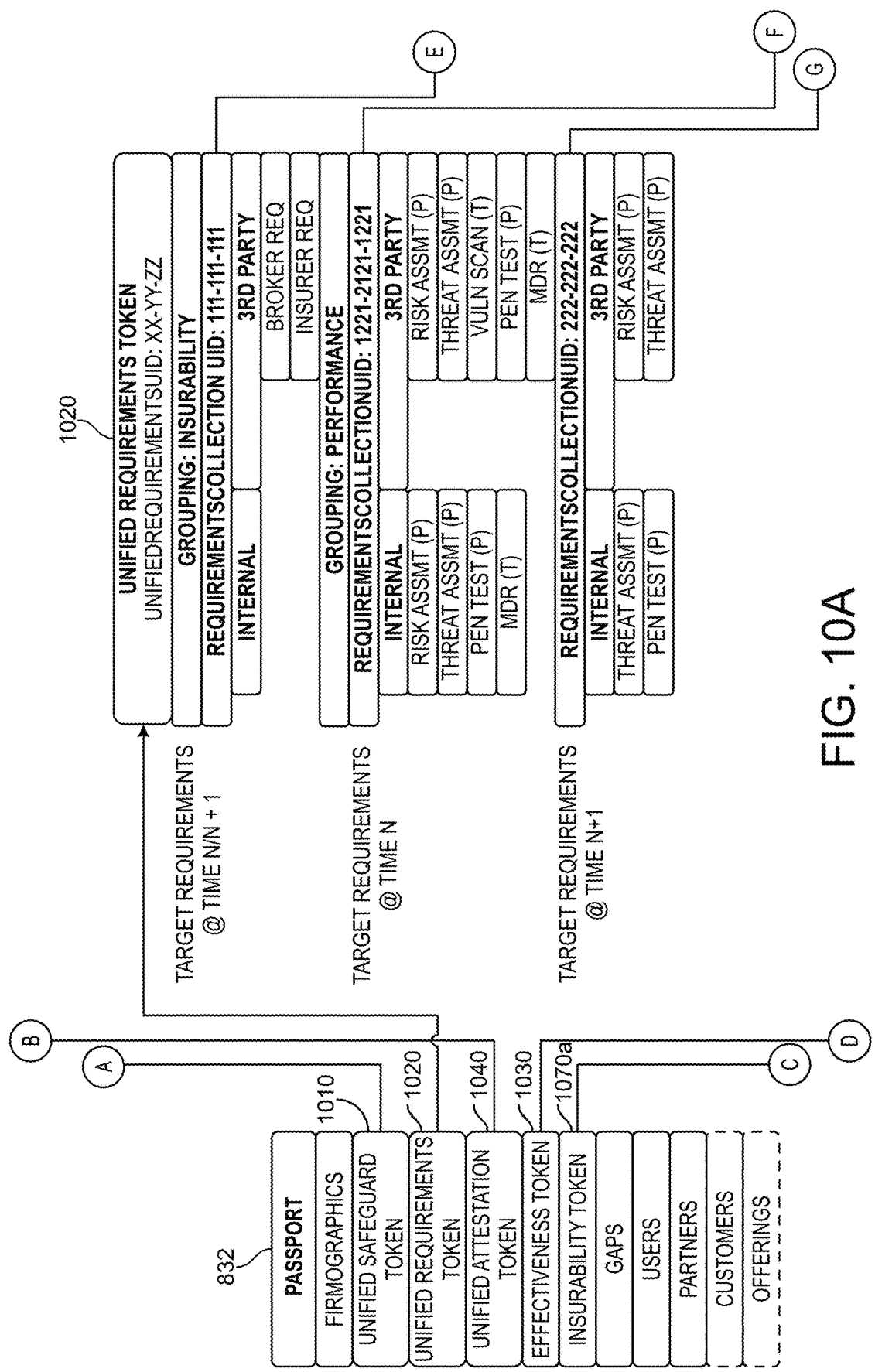
FIGS. 10A-10I depict an architecture for tokenized cyber resilience data, according to some implementations.

Referring generally to FIGS. 10A-10I, an architecture for tokenized cyber resilience data is shown, according to some implementations. Referring now to FIG. 10A, the dynamic passport 832 can include various cyber resilience data, such as firmographics data, unified safeguards token 1010, unified requirements token 1020, unified attestation token 1040, effectiveness token 1030, insurability token 1070a, gap information, users, partners, customers, offerings, etc. In some examples, the unified safeguards token 1010 can receive data/be linked with other systems or data via point A, the unified attestation token 1040 can receive data/be linked with other systems or data via point B, the effectiveness token can receive data/be linked with other systems or data via point C, and the insurability token 1070a can receive data/be linked with other systems or data via point D, as further described herein. In some implementations, entities can interact with and/or access the dynamic passport 832 and/or linked tokens (e.g., unified safeguards token 1010, unified requirements token 1020) based on various rules (e.g., access controls with various access parameters).

In some implementations, FIG. 10A illustrates tokenized cyber security data over various times (e.g., time N/N+1, time N, time N+1, etc.). In some implementations, unified tokens (e.g., unified safeguards token 1010, unified requirements token 1020, unified attestation token 1040, etc.) can store metadata of cyber resilience data over a time period. For example, the unified requirements token 1020 can be generated by the token system 726 and can include a unified requirements UID and an insurability grouping with grouped cyber resilience data. In another example, the unified requirements token 1020 can include a first requirements collection UID corresponding to requirements (e.g., cyber resilience standards for a policy) at a first time (e.g., time N/N+1), which can be linked with other systems/and or data via point E, as further described herein. In another example, the unified requirements token 1020 can include a second requirements collection UID corresponding to requirements at a second time (e.g., time N+1), which can be linked with other systems/and or data via point F, as further described herein. Still yet, in another example, the unified requirements token 1020 can include a third requirements collection UID corresponding to requirements at a third time (e.g., time N), which can be linked with other systems/and or data via point G, as further described herein. For example, the first, second, and third UID can correspond to various internal and/or third-party cyber resilience requirements at different times, such as risk assessment data, threat assessment data, other testing data, MDR data, pen test data, vulnerability scan data, broker requirements, and/or insurer requirements.

Figure 10B:
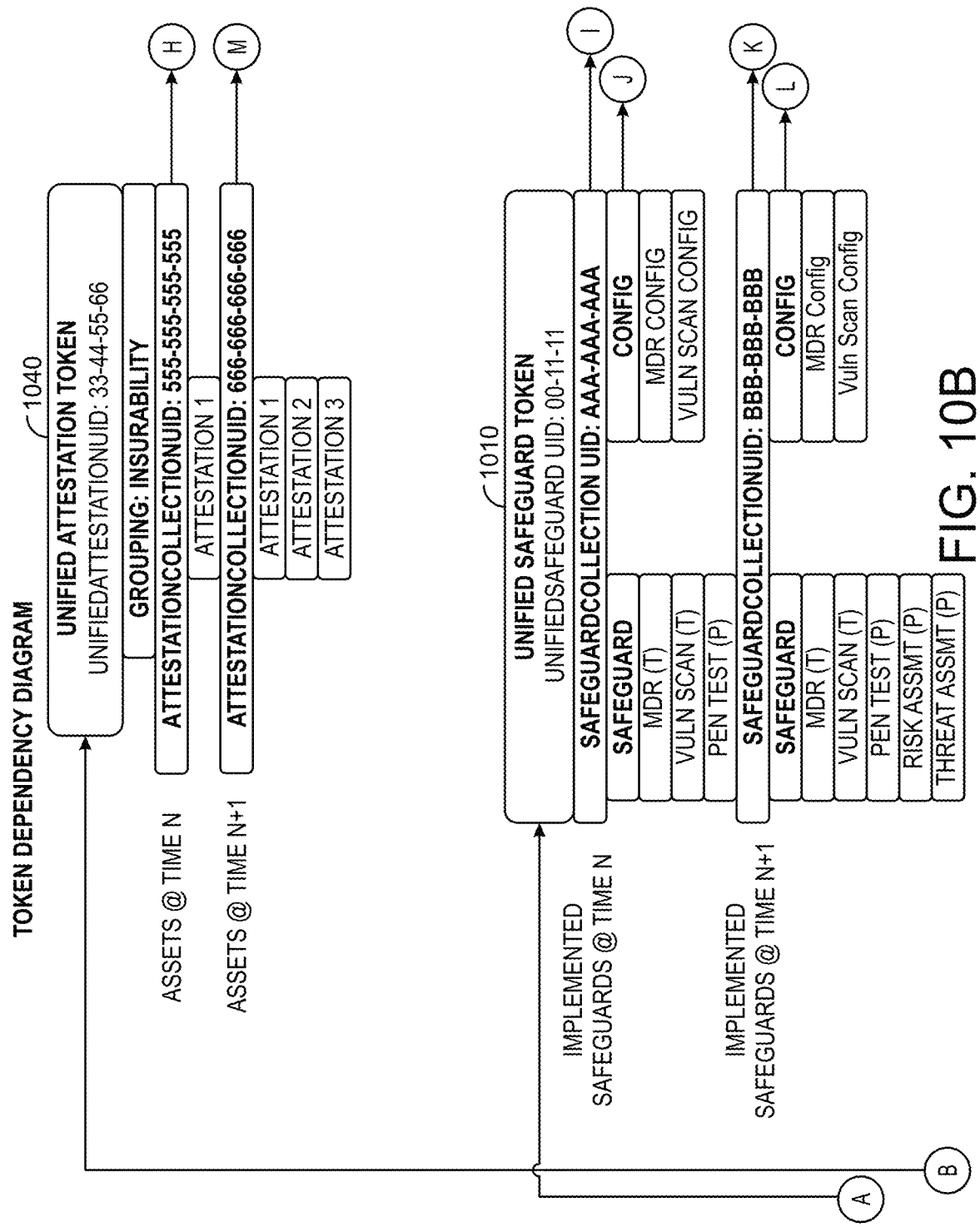

Referring now to FIG. 10B, the unified attestation token 1040 can be linked to the dynamic passport 832 via point A. As described regarding the unified requirements token 1020, the unified attestation token 1040 can include groupings and/or data corresponding to attestations at various times. For example, the unified attestation token 1040 can be generated by the token system 726 and can include an insurability grouping with a first attestation collection UID corresponding with assets (e.g., attestation 1) at a first time (e.g., time N), and the first attestation collection UID can be linked with other systems/data via point H. Further, the unified attestation token 1040 can include a second attestation collection UID corresponding with assets (e.g., attestation 1, attestation 2, attestation 3, etc.) at a second time (e.g., time N+1), and the second attestation collection UID can be linked with other systems/data via point M. In some implementations, the unified safeguard token 1010 can be linked to the dynamic passport 832 via point B. For example, as described above, the unified safeguard token 1010 can include groupings and/or data corresponding to safeguards at various times. For example, the unified safeguard token 1010 can include a first safeguard collection UID corresponding with safeguards (e.g., MDR, vulnerability scans, penetration test rules, etc.) at a first time (e.g., time N), and the first safeguard collection UID can be linked with other systems/data via point I. The unified safeguard token 1010 can further include a first configuration, which can be linked to other data/systems via point J and include data corresponding to cyber resilience systems and/or protection techniques implemented in a cyber resilience architecture of an organization (e.g., MDR configurations, vulnerability scan configurations, etc.). Further, the unified safeguard token 1010 can include a second safeguard collection UID corresponding with safeguards implemented at a second time (e.g., time N+1), and the second attestation collection UID can be linked with other systems/data via point K. The unified safeguard token 1010 can further include a second configuration, which can be linked to other data/systems via point L.

Figure 10C:
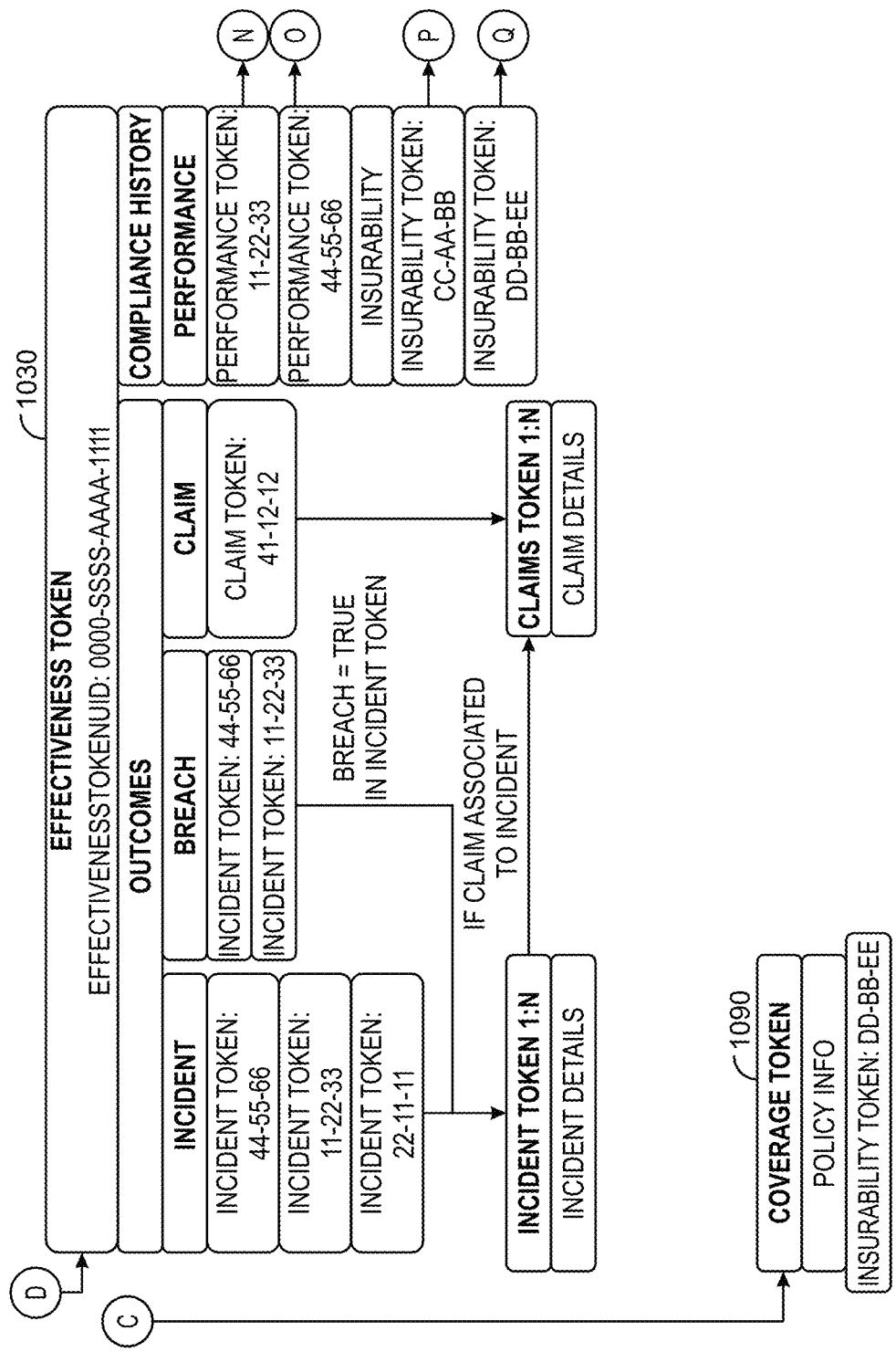

Referring now to FIG. 10C, a coverage token 1090 can be linked to the dynamic passport via point C. In some examples, the coverage token 1090 can be generated by the token system 726 can include cyber protection information such as policy information (e.g., policy number, type, etc.) and various tokens including insurability information (e.g., an insurability token). In some implementations, the effectiveness token 1030 can be linked to the dynamic passport 832 via point D. The effectiveness token 1030 can include various data corresponding to cyber resilience outcomes, such as incident data (e.g., via incident tokens 1 through N), corresponding breach data (e.g., via incident tokens 1 through N), and corresponding claims data or data (e.g., via claims tokens 1 through N associated with incident tokens 1 through N). In some implementations, the effectiveness token 1030 can include various data corresponding to cyber resilience compliance history, such as performance data. For example, the performance data can include multiple performance tokens including respective timestamps or identifiers corresponding to cyber resilience performance of an entity during one or more incidents/breaches or claims associated with incident tokens and/or claims tokens, and the performance tokens (e.g., performance tokens 1080a-1080b) can be linked to other data/systems via point N and point O. In some implementations, the effectiveness token 1030 can include insurability data, such as one more insurability tokens (e.g., received via coverage token 1090). In some examples, the insurability tokens (e.g., insurability tokens 1070a-1070b) can be linked to other data/systems via point P and point Q.

Figure 10D:
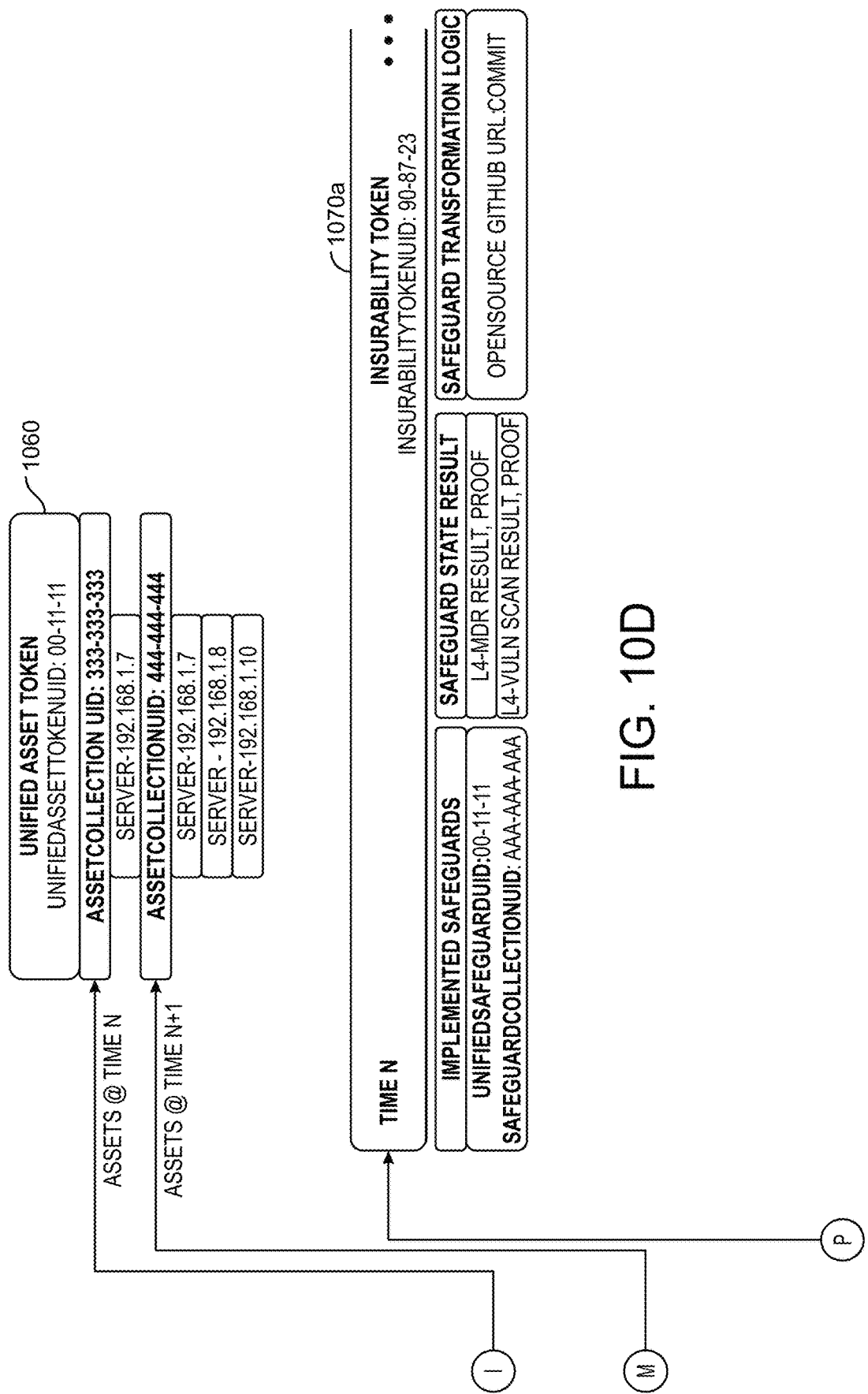
Figure 10E:
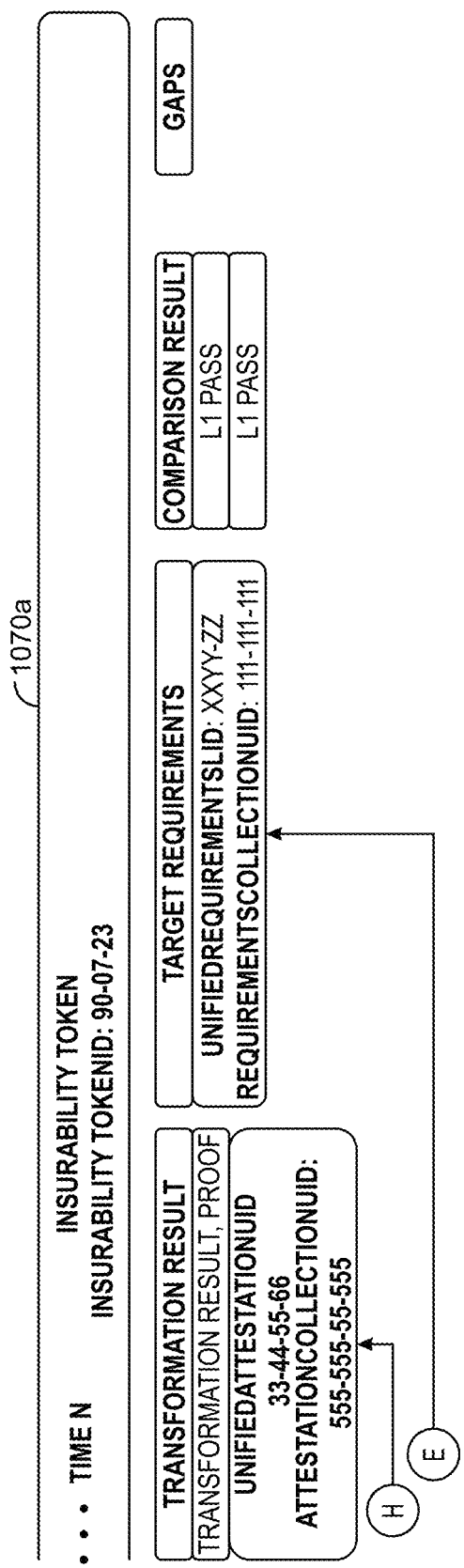

Referring now to FIG. 10D, the dynamic passport 832 can be linked to the unified asset token 1060 via point I and/or via point M. For example, the unified asset token 1060 can be generated by the token system 726 and can include a first grouping of assets (e.g., server identifier 1) at a first time (e.g., time N) and a second grouping of assets (e.g., server identifier 1, server identifier 2, server identifier 3, etc.) at a second time (e.g., time N+1). In some implementations, the insurability token 1070a can be linked to the dynamic passport 832 via point P with the effectiveness token 1030. For example, the insurability token 1070a can include insurability data at a first time (e.g., time N), such as implemented safeguards and associated identifiers, safeguard state results (e.g., L4-MDR result and proofs, L4-vulnerability scan results and proofs), and/or safeguard transformation logic (e.g., accessible via a URL or other link). Referring now to FIG. 10E, the insurability token 1070a can further include a transformation result and/or proof, which can be linked via UIDs to point H with the unified attestation token 1040. The insurability token 1070a can further include target requirements, which can be linked via UIDs or other identifiers with the unified requirements token 1020. The insurability token 1070a can further include comparison results (e.g. L1) pass, gap data (e.g., data of missing and/or inadequate cyber protections), and more.

Figure 10F:
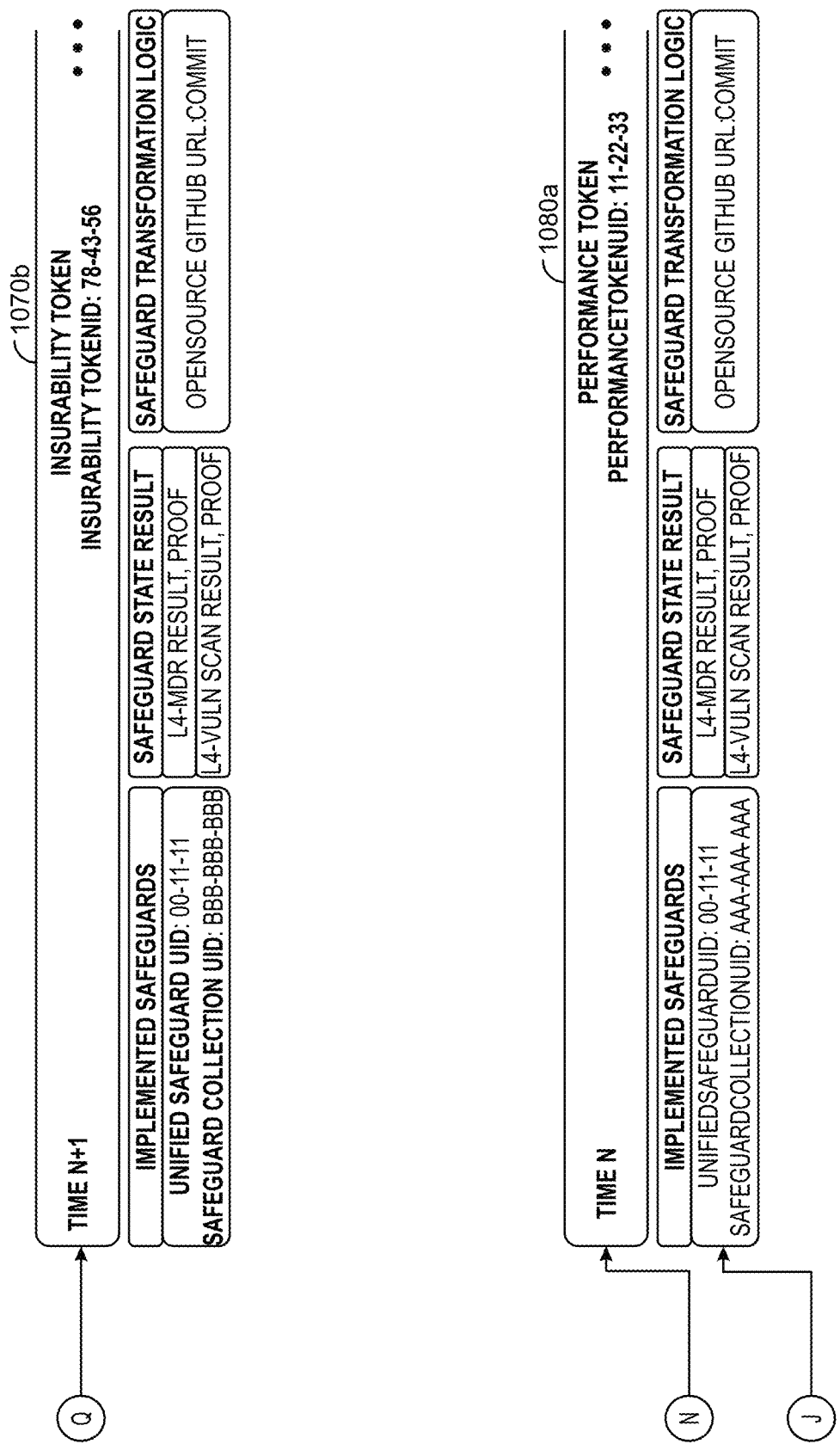

Referring now to FIG. 10F, the dynamic passport 832 can be linked to the insurability token 1070b via point Q. As shown in FIG. 10F, the insurability token 1070b can be generated by the token system 726 and can include insurability data at a second time (e.g., time N+1), such as implemented safeguards and associated identifiers, safeguard state results, and/or safeguard transformation logic. For example, the insurability token 1070b can include encrypted data of implemented safeguards, such as firewall configurations or endpoint protection settings, verified against cyber resilience requirements. The encrypted data can be encapsulated within a control structure configured to restrict updates or access based on cryptographic proofs, allowing authorized entities (e.g., those with permitted access based on RBACs) to modify, create, view, and/or retrieve the data in accordance with access controls defined for the dynamic passport 832. In some implementations, the dynamic passport 832 can be linked to the performance token 1080a via point N with the effectiveness token 1030. In some examples, the performance token 1080a can include performance data of an entity at a first time (e.g., time N), including implemented safeguards, results, and/or transformation logic. In some implementations, the implemented safeguards can be linked, via point J, with a configuration of the unified safeguard token 1010.

Figure 10G:
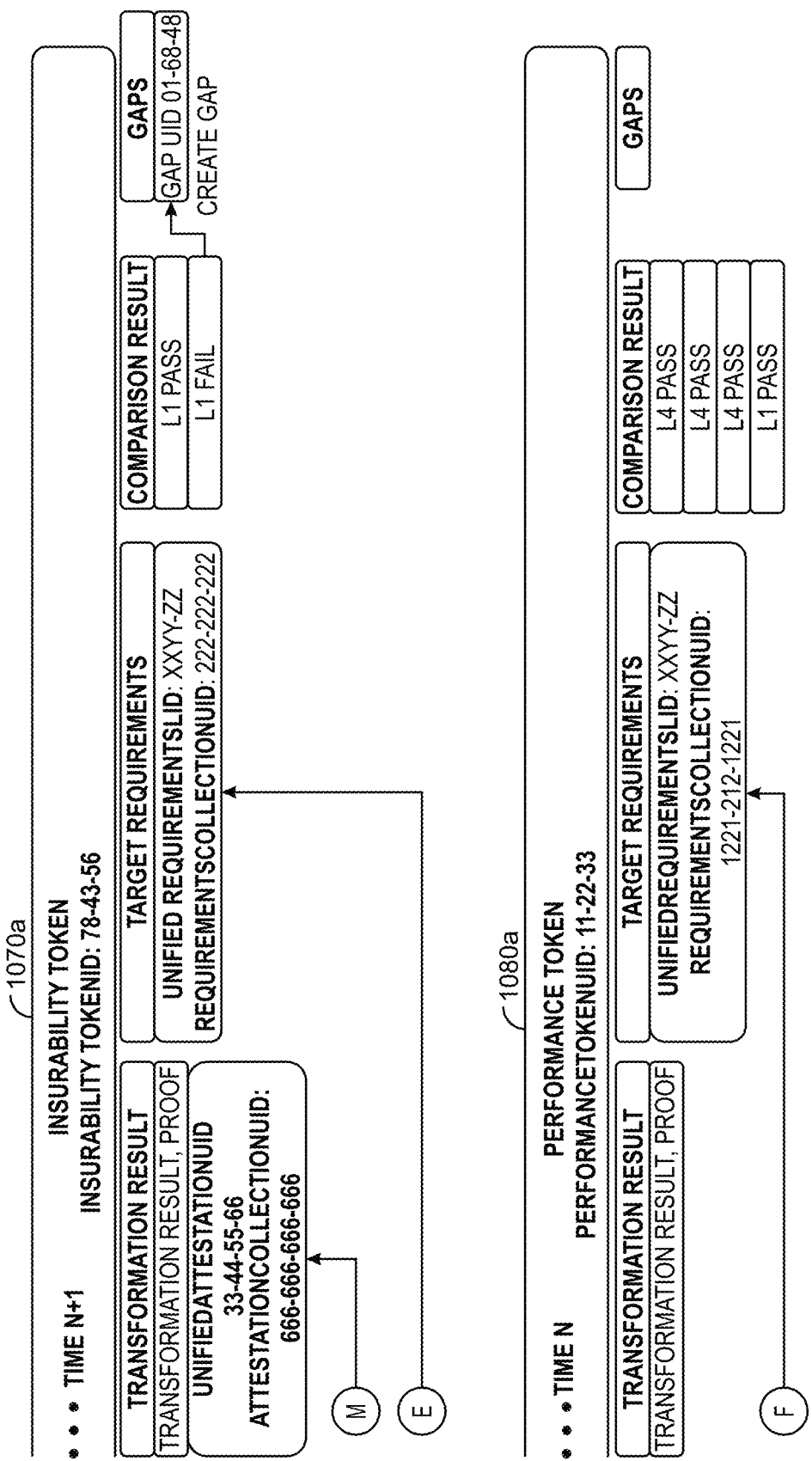

Referring now to FIG. 10G, the insurability token 1070b can further include a transformation result and/or proof, which can be linked via UIDs to point M with the unified attestation token 1040. In some implementations, the insurability token 1070b can be generated by the token system 726 and can further include target requirements, which can be linked via UIDs or other identifiers with the unified requirements token 1020 via point E. Further, the insurability token 1070a can further include comparison results (e.g. L1 pass/fail) and/or gap data (e.g., gap UIDs). In some implementations, the performance token 1080a can further include transformation results and/or proofs, comparison results (e.g., L4 pass/fail), and gaps. Further, the insurability token 1070b (or another token) can store cryptographic proofs of provenance corresponding with and entity and/or associated cyber resilience data. In some examples, the performance token 1080a can include target requirements and associated IDs, accessible via point F, from the unified requirements token 1020.

Figure 10H:
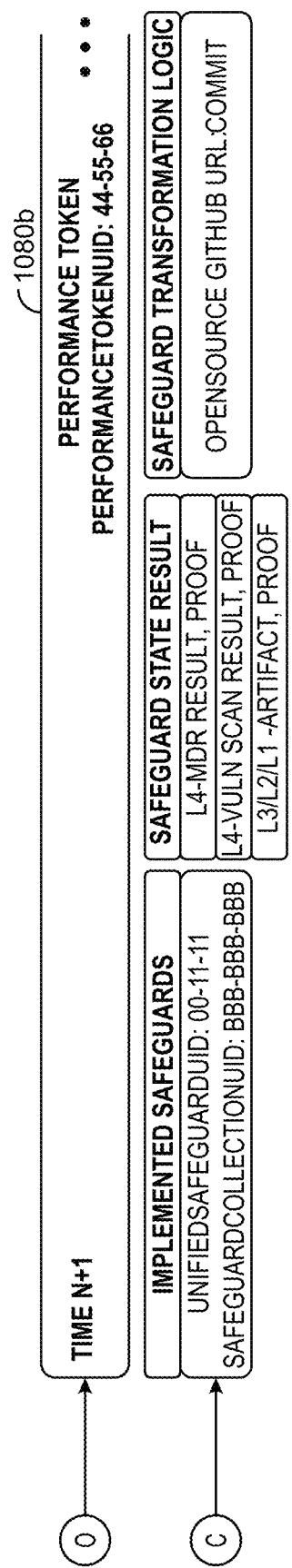
Figure 10I:
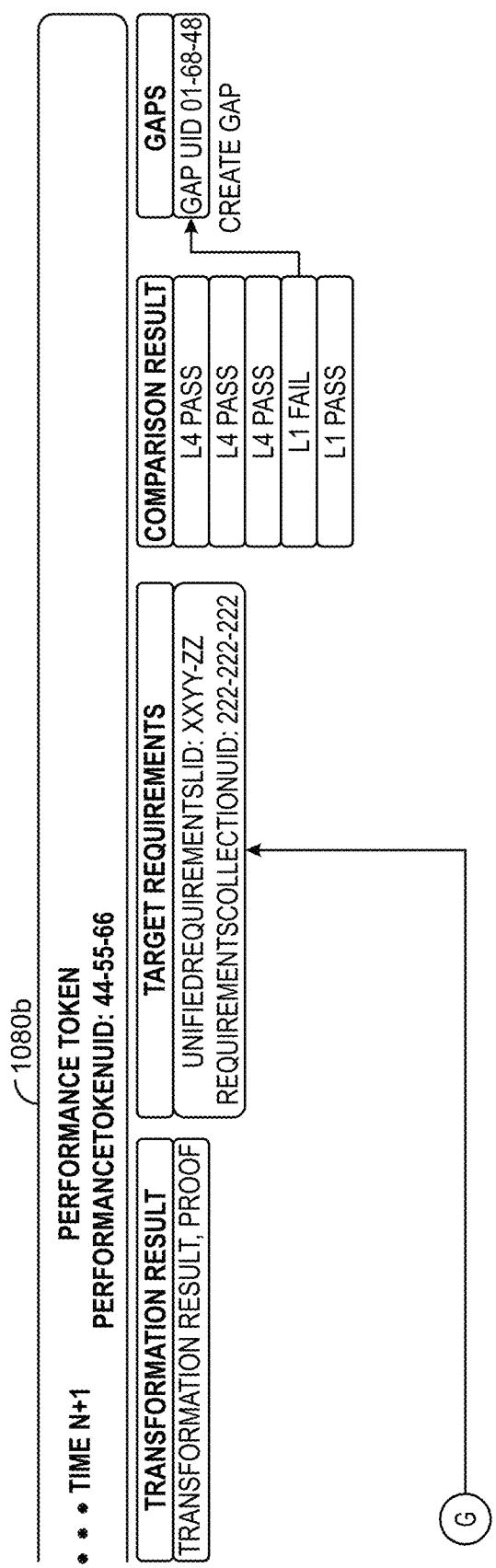

Referring now to FIG. 10H, the dynamic passport 832 can be linked to the performance token 1080b via point O with the effectiveness token 1030. In some examples, the performance token 1080b can be generated by the token system 726 and can include performance data of an entity at a second time (e.g., time N+1), including implemented safeguards, results, and/or transformation logic. For example, the performance token 1080a and the performance token 1080b can include performance data sets encapsulated within a control structure corresponding to the dynamic passport 832, and access to data of the performance tokens 1080a-1080b can be granted based on a specific access data structure compatible with a control structure (e.g., allowing authorized entities to retrieve and/or update metadata of the performance token 1080b based on access controls, restricting access and/or updates to the performance data based on access controls, etc.). In some implementations, the implemented safeguards can be linked, via point L, with a configuration of the unified safeguard token 1010. Referring now to FIG. 10I, the performance token 1080b can further include transformation results and/or proofs, comparison results, and gaps. The performance token 1080b can also include target requirements and identifiers received via point G with the unified requirements token 1020.

Secure Voting with Zero-Knowledge Proofs and Tokens

Figure 11:
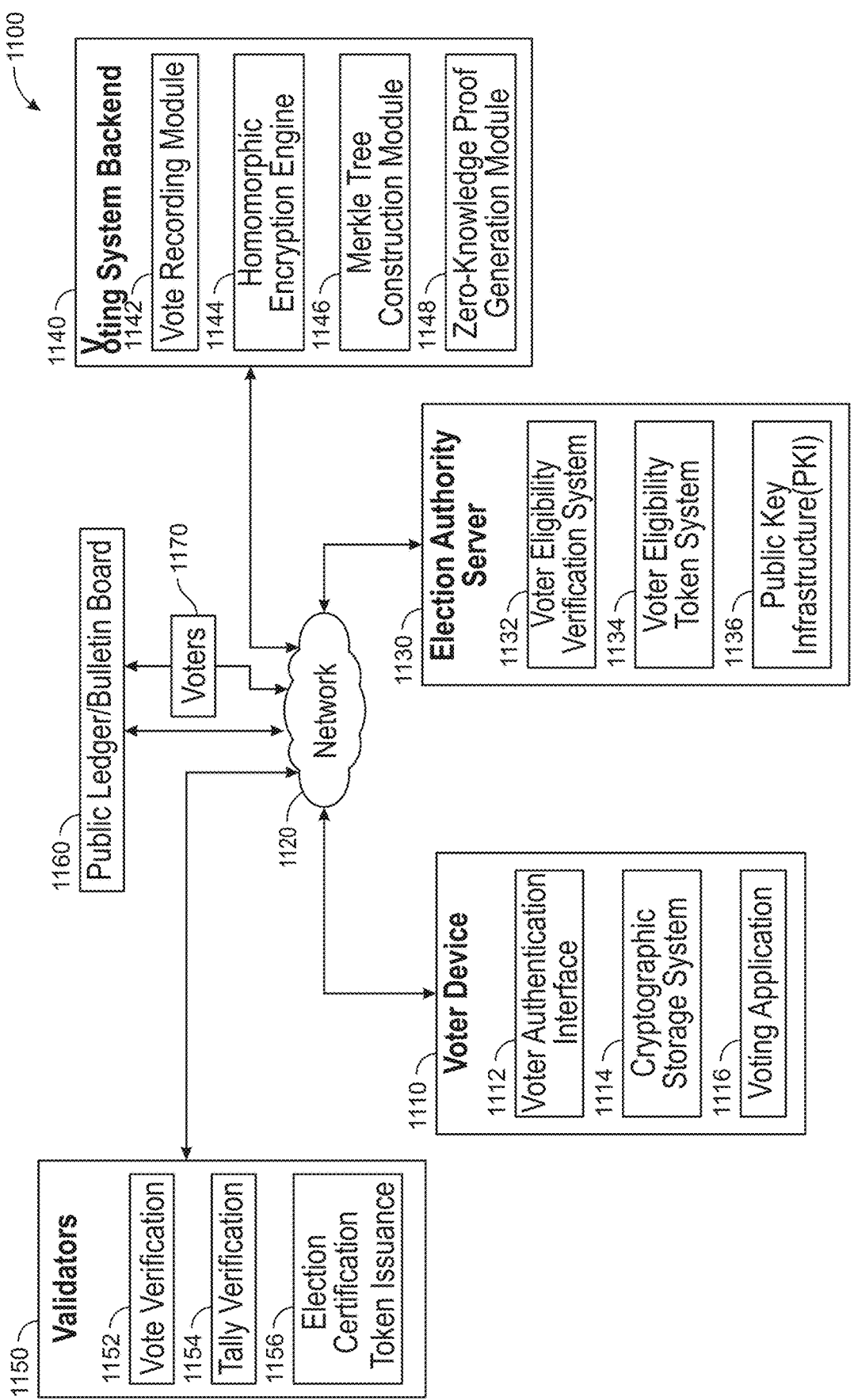
FIG. 11 depicts a block diagram of an implementation of a system for data protection, according to some implementations.

Referring now to FIG. 11, a block diagram of a system 1100 for data protection is shown, according to some implementations. In some implementations, the system 1100 can include one or more components, such as a voter device 1110, an election authority server 1130, a voting system backend 1140, validators 1150, public ledger/bulletin board 1160, and voters 1170. The components of FIG. 11 can be interconnected through a network 1120 that supports secure communication protocols such as TLS, SSL, and HTTPS. The voter device 1110 can include a voter authentication interface 1112, a cryptographic storage system 1114, and a voting application 1116. The election authority server 1130 can include a voter eligibility verification system 1132, a voter eligibility token system 1134, and a public key infrastructure (PKI) 1136. The voting system backend 1140 can include a vote recording module (or system) 1142, a homomorphic encryption engine 1144, a Merkle tree construction module (or system) 1146, and a zero-knowledge proof (ZKP) generation module (or system) 1148. The validators 1150 can include a vote verification system 1152, a tally verification system 1154, and an election certification token issuance system 1156. Generally, while the elements of FIG. 11 can be illustrated and/or described in a singular form, it should be understood that the system 1100 can include two or more of the systems or components described herein (e.g., two or more voter devices 1110, etc.). In some implementations, FIG. 11 illustrates an architecture of a secure voting system.

Generally, the systems or components of FIG. 11 (e.g., voter device 1110, voter authentication interface 1112, cryptographic storage system 1114, voting application 1116, election authority server 1130, voter eligibility verification system 1132, voter eligibility token system 1134, public key infrastructure (PKI) 1136, voting system backend 1140, vote recording module (or system) 1142, a homomorphic encryption engine 1144, Merkle tree construction module 1146, ZKP generation module (or system) 1148, validators 1150, vote verification system 1152, tally verification system 1154, election certification token issuance system 1156, public ledger/bulletin board 1160, and voters 1170) can include one or more processing circuits, including processor(s) and memory. The memory can have instructions stored thereon that, when executed by processor(s), cause the one or more processing circuits to perform the various operations described herein. The operations described herein can be implemented using software, hardware, or a combination thereof. The processor(s) can include a microprocessor, ASIC, FPGA, etc., or combinations thereof. In many implementations, the processor(s) can be a multi-core processor or an array of processors. Memory can include, but is not limited to, electronic, optical, magnetic, or any other storage devices capable of providing processor(s) with program instructions. The instructions can include code from any suitable computer programming language. In some implementations, one or more of the elements of FIG. 11 can include an interface circuit and function circuit.

Generally, the components of FIG. 11 can receive, generate, analyze, transmit, modify, and/or process various tokens used in a voting process, including eligibility tokens, casting tokens, confirmation tokens, inclusion tokens, and certification tokens. Generally, an eligibility token (or voter eligibility token) can refer to a cryptographically generated data structure issued after verifying eligibility of a user or entity to participate in a voting process. In some implementations, the eligibility token can be issued by an election authority or server (e.g., election authority server 1130) in response to validating credentials of the entity or user, such as verifying citizenship, voter registration status, party affiliation, or other forms of proof of identity in an election (e.g., national election or primary election) or other democratic process. In some examples, the eligibility token can contain cryptographic information that can be used to authenticate the user in the voting system while maintaining privacy. Further, the eligibility token can facilitate access to the voting system and be used to generate a valid casting token when the user proceeds to cast a vote.

Generally, a casting token (or cast vote token) can refer to a cryptographically secured data structure that represents a vote cast by an entity or user in a decentralized voting system. In some examples, the casting token can include encrypted vote data corresponding to the selected choices of the entity or user. Further, the casting token can be generated in response to the entity or user casting a vote and can encapsulate cryptographic proofs that verify integrity and authenticity of data corresponding with the token (e.g., vote selections). In some examples, the casting token can be linked to one or more confirmation tokens to provide proof of successful vote submission and inclusion in a voting process. In some examples, one or more casting tokens are generated based on how many issues a voter voted on in a ballot. That is, at least one (e.g., each) vote for an issue in a ballot generates a separate casting token. For example, if a voter leaves a portion of a ballot incomplete (e.g., a voting issue blank), no corresponding casting token is generated for the incomplete portion.

Generally, a confirmation token (or voting confirmation token) can refer to a cryptographic token that provides proof of receipt for a vote cast by an entity or user. In some implementations, the confirmation token can be generated by voting system or backend (e.g., voting system backend 1140) upon receiving and processing the casting token. Further, the confirmation token can include cryptographic data (e.g., one or more proofs) and/or links to corresponding casting tokens, which can provide mechanisms for validating that the vote was successfully recorded. In some examples, the confirmation token can be hashed and stored in a tree data structure (e.g., a Merkle tree) to facilitate future verification. In some other examples, the confirmation token can be provided to the user as proof that a vote was cast and/or received, and can be further utilized as input for generating an inclusion token. In some examples, a confirmation token serves as a receipt proving that a specific casting token was received and recorded by a voting system backend, but does not itself prove that the corresponding vote was included in the final tally.

Generally, an inclusion token (or vote inclusion proof token) can refer to a cryptographic token that provides proof that one or more votes (e.g., a vote corresponding to an entity or user) are included in a final vote count. In some implementations, the inclusion token can be generated based on using a proof model (e.g., ZKP generation module 1148) to confirm that the vote represented by a casting token is present in the final tally. In some examples, the inclusion token can include cryptographic data or proofs that link the inclusion token to the tree data structure where the votes (e.g., confirmation tokens corresponding to cast votes) are stored (e.g., a Merkle tree). That is, the inclusion token can be used by the voter to verify that a vote is included in certified results of an election or other democratic process. In some other examples, the inclusion token can be generated based on a casting vote associated with a particular issue. That is, one or more inclusion tokens can be generated based on how many issues a voter voted on. In some examples, an inclusion token can serve as explicit proof of inclusion within a voting tally. For example, an inclusion token can include a Merkle-path from a corresponding confirmation token to a recorded Merkle-root for a defined tally epoch, thereby verifying presence in the tally associated with that root while maintaining voter privacy.

Generally, a counting token (or vote count token) can refer to a cryptographic token that provides information about how the vote cast by an entity or user is tallied in a decentralized voting system. In some examples, the counting token can include encrypted voting data corresponding to different voting systems, such as plurality voting, runoff voting, ranked-choice voting, cumulative voting, majority voting, weighted voting, etc. In some implementations, the counting token is generated in response to generating the confirmation token and the inclusion token. Further, the counting token can be generated by the voting system or backend (e.g., voting system backend 1140) upon receiving and processing the confirmation token and the inclusion token. In some examples, the counting token can be generated to provide proof of where a voter resides or the jurisdiction where the vote was cast.

Generally, a certification token (or election certification token) can refer to a cryptographically generated token that certifies the integrity of the vote count or an overall voting process. In some implementations, the certification token can be issued by validators (e.g., validators 1150) or the voting system (e.g., voting system backend 1140) after verifying that all votes (e.g., casting tokens) were counted correctly and/or that the overall vote count remains unaltered or otherwise complies with various voting rules (e.g., by referencing the counting token). In some examples, the certification token can include cryptographic proof of the integrity of the vote count and can provide the proof as assurance to auditors, election officials, or other stakeholders that the election results are accurate. In some implementations, the certification token can include a cryptographic chain-of-custody record for corresponding casting tokens to help identify what systems have transferred and received a casting token. In some examples, the certification token can also be published on a public ledger to provide transparent access to verified results.

Generally, the tokens (e.g., casting token, confirmation token, inclusion token, counting token, certification token, etc.) can take one or more forms. For example, the tokens can include at least one of hash-based tokens, blockchain-based tokens, time-limited access keys, elliptic curve cryptography tokens, secure hardware-generated tokens, dynamic cryptographic tokens, etc.

Generally, the tokens (e.g., casting token, confirmation token, inclusion token, counting token, certification token, etc.) can contain encrypted data. For example, the tokens can include (e.g., cryptographically include) information about the token issuer (e.g., election authority server 1130), the time of issuance of the token, the real-time voter eligibility status (e.g. whether the voter is eligible or ineligible to vote), a cryptographic signature (e.g., a signature provided by a verifier after verifying voter eligibility), acceptance information (e.g., a list of authorized systems and applications that can process the token), location information (e.g., the location the voter registered to vote or cast the vote), metadata (e.g., metadata about whether a system or application used the token), etc. In some implementations, a system (e.g., voting system backend 1140) encrypts the data. Encrypting data for the tokens can include executing one or more encryption techniques such as symmetric encryption, asymmetric encryption, hashing, homomorphic encryption, stream ciphers, block ciphers, or post-quantum cryptography techniques (e.g., lattice-based cryptography, hash-based cryptography, etc.).

In some implementations, tokens used in the voting process (e.g., eligibility token, casting token, confirmation token, inclusion token, counting token, certification token, revote token) can include a tuple of fields defining both public and private cryptographic elements. For example, the tuple can include: (i) public data fields, such as token type, issuer identifier, time or epoch of issuance, and permissible scope of use; (ii) cryptographic commitments to private values, such as commitments to vote selections, eligibility proofs, or other attributes, which can be bound using one-way functions or commitment schemes; (iii) a zero-knowledge proof statement that defines the property being proven about the committed or encrypted data (e.g., "this credential corresponds to an eligible voter" or "this ballot is well-formed and in the tally"); (iv) a nullifier field or cryptographic commitment to a nullifier to prevent duplicate use of an underlying eligibility credential without revealing the credential; and/or (v) parent token references, which can include secure references or hashes that link the token to one or more related tokens from earlier stages of the voting process.

Generally, a ZKP can take one or more forms and a voter can establish the ZKP in one or more ways. For example, the ZKP can be an interactive ZKP in which a verifier (e.g., election authority server 1130) can ask the voter a series of challenges (e.g., consistency check, partial disclosure challenge, permutation and/or shuffle challenges, etc.) and the voter responds to one or more challenges to prove the voter is eligible to vote. In another example, the ZKPs can include non-interactive ZKPs in which a verifier (e.g., election authority server 1130) generates a proof using a cryptographic statement and a common reference string and the voter uses this common reference string to verify proof of voter eligibility (e.g., without any further interactions for verification). In some implementations, the ZKPs can include commitment schemes (e.g., voter makes a commitment to their age or registration ID by encrypting their age or registration ID in a cryptographic hash function such that the voter can verify the commitment without disclosing their age or registration ID), Merkle proofs (e.g., voter proves that their identity hash is part of a Merkle tree, such as a voter roll, without revealing the rest of the tree or other voters), homographic encryption proofs (e.g., voter encrypts their votes or voting credentials and prove one or more properties associated with the vote or voting credential without decrypting the votes or voting credentials), or group membership proofs (e.g., voter proves their credentials are part of a set of authorized credentials using group signatures associated with a set of eligible voters).

Generally, in some implementations, the voter device 1110 can be any computing device, such as a desktop computer, a mobile computing device, smartphone, tablet, smart watch, smart sensor, or any other device configured to facilitate receiving, displaying, and interacting with content (e.g., voting selection pages, web pages, applications, etc.) by a voter (e.g., an entity, user, etc.). For example, the voter device 1110 can be configured to display electronic ballots to a voter, receive selections from a voter corresponding with the electronic ballots, and transmit the voter selections securely to the voting system backend 1140. For example, the voter device 1110 can be an electronic kiosk (e.g., physical device located at a voting center), a mobile device (e.g., cell phone), or a computing system configured to process votes or ballots (e.g., scanning and recording system for physical ballots or other documents). In some implementations, the voter device 1110 can be configured to securely communicate voting information (e.g., votes, tokens, etc.) and can further be configured to execute security protocols including multi-factor authentication (MFA) to verify voter identity, cryptographic signing of votes, and/or secure storage of voter eligibility tokens. Further, the voter device 1110 can securely communicate voting information by encrypting the information (e.g., end-to-end encryption), transfer protocols (e.g., secure file transfer protocol), digital certificates, hashing, checksum, key management systems, etc. The voter device 1110 can also provide feedback to the voter, such as a confirmation that the vote has been successfully cast and transmitted (e.g., confirmation token) and/or that various votes (e.g., the vote of the voter, other votes in the voting process, etc.) were included in a final tally or count (e.g., certification token).

In some examples, the voter device 1110 can provide an interface and receive user selections corresponding with voter authentication, candidate or issue selection, and/or vote submission. Further, the interface can include one or more sub-interfaces that allow the voter to view relevant voting information (e.g., information about ballot measures, the political party affiliation of candidates, biographical information about candidates, etc.). In some implementations, the interface can include one or more selectable graphical elements (e.g., interface buttons, text fields, etc.) that allow voters to perform one or more actions (e.g., navigate between interfaces and sub-interfaces, submit personal information, attach documents).

Still referring to FIG. 11, in some implementations, the voter device 1110 can execute various tasks associated with the voting process. For example, a user or entity can register for voting by providing credentials or other information (e.g., name, address, etc.) via the voter device 1110. In another example, the voter authentication interface 1112 can verify voter identity using multi-factor authentication (MFA), which verifies that authorized (e.g., registered) users or entities can access the ballot. In another example, the voter authentication interface 1112 verifies voter identity by collecting biometric data and cross-referencing the biometric data against data stored in a database. Further, the cryptographic storage system 1114 can securely store voter information, such as encrypted data or tokens (e.g., confirmation tokens, casting tokens, etc.), and provide the stored data responsive to requests from various components of FIG. 11 (e.g., from voting system backend 1140, voters 1170, etc.). In one example, the voting application 1116 can present and/or be used to select candidates or issues, which can be further broken down by classification metrics (e.g., political party affiliation). The voting application 1116 can further encrypt votes for secure transmission to the voting system backend 1140 and provide the voter with a confirmation token (e.g., voter confirmation token) that verifies the successful casting and transmission of the vote. Further, the voter device 1110 can be configured to interface with various external systems or databases to verify voting information (e.g., personal identifiers, username, password, address, voter ID number) input by a voter.

Still referring to FIG. 11, in some implementations, the voter device can execute one or more smart contracts via one or more smart contract platforms (e.g., blockchain platforms, virtual machines, consensus mechanisms, etc.). In some examples, executing the smart contracts can automatically enforce voting rules (e.g., one voter, one vote), tally the votes when the voting period ends, trigger notifications or results to release, verify voter eligibility, and execute zero-knowledge proofs or ring signatures to verify a voter identity. Further, the smart contracts can communicate with validators 1150, the election authority server 1130, and the voting system backend 1140. In some implementations, the smart contracts are executed by the validators 1150, the election authority server 1130, and the voting system backend 1140. For example, voter authentication interface 1112 can execute a smart contract that automatically verifies the identity of a voter, or voter eligibility verification system 1132 can execute a smart contract that automatically verifies whether a voter is eligible to vote. In some implementations, voting system backend 1140 works to support smart contract execution across various systems (e.g., voter devices).

Generally, in some implementations, the network 1120 can include similar features and/or functionality as described regarding the network 120 of FIG. 1A. For example, the network 1120 can include computer networks such as the Internet, local, wide, metro or other area networks, intranets, satellite networks, other computer networks such as voice or data mobile phone communication networks, combinations thereof, or any other type of electronic communications network. In various implementations, network 1120 facilitates secure communication between components of system 1100, including voter device 1110, election authority server 1130, voting system backend 1140, validators 1150, public ledger/bulletin board 1160, and voters 1170. As a non-limiting example, network 1120 can implement transport layer security (TLS), secure sockets layer (SSL), hypertext transfer protocol secure (HTTPS), and/or any other secure communication protocol.

Generally, in some implementations, the election authority server 1130 can be any computing device or server configured to verify voter registration and/or eligibility for a voting process. For example, the election authority server 1130 can be configured to securely provide a voter registration interface via the voter device 1110, check voter credentials, purge voter rolls of ineligible voters, and verify that non-authorized or unregistered users or entities are excluded from participation in a voting process. In some examples, the election authority server 1130 can communicate with various components of a voting system (e.g., voting system backend 1140) using secure communication protocols to prevent unauthorized access or tampering with data related to voter eligibility and vote submissions. Further, the election authority server 1130 can be configured to interface with various external systems or databases to validate eligibility and manage voter data (e.g., performing validation or background checks, referencing data of previous voting processes to inform current standards, etc.).

Still referring to FIG. 11, in some implementations, the election authority server 1130 can be configured to verify the eligibility of voters participating in a voting process (e.g., election). For example, the voter eligibility verification system 1132 can confirm whether a voter (e.g., an entity or user) and/or corresponding vote meets various requirements (e.g., voting parameters such as one vote per candidate/issue, eligibility standards, etc.) for inclusion in a final count or tally. Additionally, the voter eligibility token system 1134 can issue voter eligibility tokens that can be used to determine voter status without disclosing the identity of the voter. In some implementations, the election authority server 1130 can also include a public key infrastructure (PKI) 1136 to manage cryptographic keys used for secure communications between the election authority server 1130 and other components, such as the voter device 1110 or voting system backend 1140. Further, the public key infrastructure (PKI) can include a certificate authority (CA) (e.g., election authority server 1130, validators 1150, etc.) for issuing and managing digital certificates (e.g., a certificate that binds a public key to an identity of an entity) and a registration authority that acts as an intermediary between users (e.g., voters) and the certificate authority. Generally, the election authority server 1130 can communicate securely various components via the network 1120 to verify or confirm that registered voters participate in a voting process and/or that vote submissions are authenticated and encrypted. Further, the election authority server 1130 can interface with various external systems or databases to verify voter eligibility in a particular voting process (e.g., election).

Generally, in some implementations, the voting system backend 1140 can be a server or set of computing devices configured to collect, encrypt, and/or tally votes in a voting process. For example, the voting system backend 1140 can be configured to receive votes from voter devices, securely store the votes and/or voter information, and process the votes for tallying. In some examples, the voting system backend 1140 can integrate cryptographic and verification mechanisms to maintain the integrity of the voting process, utilizing techniques such as homomorphic encryption, Merkle tree construction, and zero-knowledge proof generation. Further, the voting system backend 1140 can communicate with the election authority server 1130, validators 1150, and other components of the voting system (e.g., via network 1120) to receive, process, and/or transmit data corresponding to a voting process.

Still referring to FIG. 11, in some implementations, the voting system backend 1140 can be configured to manage vote recording, encryption, and verification during the voting process. For example, the vote recording module 1142 can record votes received from voter devices by storing casting tokens or vote information included in casting tokens, while the homomorphic encryption engine 1144 can apply encryption to protect the voting information from exposure. In some examples, the Merkle tree construction module 1146 can organize votes in a cryptographic structure (e.g., Merkle tree or other data structure) for verification and/or to establish to establish the inclusion of one or more votes a final tally or vote count. Further, the zero-knowledge proof (ZKP) generation module 1148 can generate proofs (e.g., zero-knowledge proofs) used by voting system backend 1140 to verify votes (e.g., to verify confirmation tokens, casting tokens, etc.) and generate inclusion tokens while maintaining anonymity, voter privacy, and confidentiality. Further, the voting system backend 1140 can be configured to interface with validators 1150 to verify the integrity of votes using certification tokens generated based on verifying that multiple votes (e.g., all votes for a voting process) have been counted and/or adhere to applicable voting rules/parameters. Additionally, the voting system backend 1140 can be configured to interface with various external systems or databases to manage vote recording, encryption, and verification during the voting process.

In some implementations, the homomorphic encryption engine 1144 can implement an additive homomorphic encryption scheme such as the Paillier cryptosystem, which allows encrypted vote selections to be summed directly without decryption, thereby producing an encryption of the total tally. In some implementations, the homomorphic encryption engine 1144 can implement vector-capable or approximate-arithmetic homomorphic encryption schemes such as a Brakerski-Fan-Vercauteren (BFV) scheme or a Cheon-Kim-Kim-Song (CKKS) scheme to support tallying operations across multiple selections or weighted votes. To preserve voter privacy and verify that no single entity can decrypt individual votes, decryption of the final homomorphic tally can be performed using a threshold decryption protocol in which decryption keys are shared among multiple election trustees. For example, a predefined threshold of trustees (e.g., a quorum) can cooperate to perform the decryption, and no individual trustee can decrypt the tally alone. In some examples, the decryption process can include the ZKP generation module 1148 generating a zero-knowledge proof of correct decryption which demonstrates to verifiers that the decrypted tally corresponds to the encrypted aggregate produced by the homomorphic addition, without revealing any individual ballot contents.

Generally, in some implementations, the validators 1150 can be entities or computing systems or devices of entities configured to verify and/or validate votes, voter information, and/or information corresponding with various stages of a voting process. For example, the validators 1150 can be configured to check the integrity of vote tallies and verify that all votes have been recorded and processed correctly. In some examples, the validators 1150 can interface with other components of the voting system, such as the voting system backend 1140, the public ledger/bulletin board 1160, and public key infrastructure 1136, to verify the accuracy and integrity of the voting process. In some examples, entities external to the voting system (e.g., third-party audit groups, election authorities) can use validators 1150 to certify the voting results before final publication. Further, the validators 1150 can be configured to provide and/or receive a confirmation token including proof of the integrity of vote tallies, counts, and/or other data corresponding with a voting process.

Still referring to FIG. 11, in some implementations, the validators 1150 can be configured to verify votes during various stages of the voting process. For example, the vote verification system 1152 can review votes recorded by the voting system backend 1140 to verify that content has not been altered or tampered with (e.g., due to a data breach). Additionally, the tally verification system 1154 can confirm that a total vote tally corresponds to the recorded votes (e.g., using the generated Merkle tree) and confirm that no discrepancies exist in the final vote tally or count. In some examples, the election certification token issuance system 1156 can issue certification tokens based on verified results to provide cryptographic proof (e.g., using ZKPs) of the integrity of the vote tally. Further, the validators 1150 can communicate with the public ledger/bulletin board 1160 to provide a publicly accessible record of the certified voting results (e.g., to a voting entity or user, to the general public, etc.) responsive to a ledger request. Additionally, public key infrastructure (PKI) 1136 can issue digital certificates and corresponding private keys to voters and the private keys can sign voters tokens so that the validators 1150 can verify the authenticity of the tokens using public keys issued by the public key infrastructure (PKI) 1136. In some examples, validators 1150 can interact with external entities to audit or verify the voting process, which can further improve the transparency and security of an election, voting process, democratic process, or electronic survey.

Generally, in some implementations, the public ledger/bulletin board 1160 can be any distributed or decentralized system configured to securely store and publish data related to a voting process. In some examples, the public ledger/bulletin board 1160 can be implemented using blockchain technology and can be configured to provide a decentralized and immutable record of votes, vote tallies, and/or certifications. Further, the blockchain-implemented public ledger/bulletin board 1160 can verify recordings that occur on the public ledger/bulletin using a plurality of network nodes. In some examples, the public ledger/bulletin board 1160 can provide a publicly accessible platform for voters 1170 and/or validators 1150 to verify the inclusion of votes, audit voting results, and verify transparency in an election process. That is, the public ledger/bulleting board 1160 can store votes or vote information included in tokens (e.g., cast vote tokens, certification tokens, etc.) for a voting user or entity (e.g., participant) or non-voting entity or user (e.g., non-participant). In some examples, the bulletin board component of the public ledger/bulletin board 1160 can refer to a system that displays voting information (e.g., vote tallies, certification statuses) to participants and/or observers (e.g., using a GUI). For example, the public ledger/bulletin board 1160 can be configured to securely record and publish data related to the voting process (e.g., cryptographic proofs of vote integrity and/or vote inclusion) for later verification and/or confirmation. For example, the public ledger/bulletin board 1160 can store certification tokens and provide user or entities with a platform to verify user or entity votes were counted in a final tally.

Generally, the voters 1170 can include voting users or entities, or computing systems or devices operated by voters (e.g., individuals, entities, users, etc.) or used to participate in the voting process. For example, voters 1170 can use computing devices such as smartphones, tablets, laptops, or desktop computers to access the voting application, submit votes, and receive confirmation of vote submission. In some implementations, voters 1170 can interact with the public ledger/bulletin board 1160, which can store cryptographic proofs or summaries of voting records and/or election results. For example, voters 1170 can access public ledger/bulletin board 1160 to confirm that votes of various users or entities were properly included in a final tally without revealing sensitive data corresponding to the votes and/or users or entities (e.g., while maintaining anonymity of voters and/or votes). In some examples, voters 1170 can use tokens (e.g., casting tokens, confirmation tokens, etc.) received after casting votes to verify that participation in the election was successfully documented and maintained.

Still referring to FIG. 11, in some implementations, one or more systems can gather and store information about voters 1170. For example, voters 1170 can use voter device 1110 to submit personal information relating to the voting process (e.g., age, date of birth, social security number, voter ID number, home address, place of employment, etc.). Further, voters 11 can be prompted by one or more interfaces (e.g., user interfaces) of voter device 1110 to provide such personal information if it is not otherwise retrievable. In another example, voter eligibility verification system 1132 retrieves information about voters 1170 related to voter eligibility (e.g., date of birth, voter ID number, etc.) in response to a voter eligibility verification request. Further, the voter eligibility verification system 1132 can store information about voters 1170 related to voter eligibility to efficiently handle future voter eligibility verification requests. In some implementations, personal information about voters is stored in a centralized or distributed database.

Generally, the system 1100 includes a data protection system for protecting data (e.g., in a voting process). In some implementations, the election authority server 1130 can register an entity or user for voting by issuing at least one eligibility token corresponding with the entity or user. For example, the voter eligibility token system 1134 can generate and issue the eligibility token after verifying credentials of an entity or user using the voter eligibility verification system 1132. For example, registering can include the election server 1130 accessing or referencing an external database or a local voter record. In some examples, registering can include the voter device 1110 receiving an eligibility token that is cryptographically signed by the election authority server 1130 and/or storing the eligibility token securely in the cryptographic storage system 1114 to later authenticate the entity or user in the voting process.

In some implementations, the voting system backend 1140 can receive, in response to registering the entity or user, at least one casting token including a vote of the entity or user and at least one confirmation token including a cryptographic proof of receipt of the at least one casting token. For example, the voting system backend 1140 can receive a vote stored within one or tokens provided via voting application 1116 of the voter device 1110 in response to a user or entity making voting selections (e.g., selecting candidates or users) using user input elements of the voter device 1110. In some implementations, the voting system backend 1140 can encrypt the vote of the entity or user for inclusion in a vote count. For example, the voting system backend 1140 can encrypt the at least one casting token or data of the casting token in response to receiving the confirmation token using a homomorphic encryption technique (e.g., such that the encrypted data can be verified (e.g., counted, tallied, etc.) while preventing disclosure of sensitive information (e.g., voter identity)). Generally, homomorphic encryption can refer to a technique that supports mathematical operations directly on encrypted data (e.g., addition or multiplication) without decrypting the underlying data. In another example, the homomorphic encryption engine 1144 can generate a ciphertext structure from the casting token and transit the ciphertext to validators 1150 or others (e.g., non-voting entities or users) for verification.

In some implementations, the voting system backend 1140 can verify the at least one casting token using a proof model and the at least one confirmation token. For example, the zero-knowledge proof (ZKP) generation module 1148 of the voting system backend 1140 can generate an inclusion token including a zero-knowledge proof to validate that the casting token is authentic and corresponds to a legitimate vote without revealing any private voter data or vote details. That is, the ZKP generation module 1148 can confirm that the casting token is valid without disclosing any identifying information about the voter or the content of the vote. For example, confirming that the casting token is valid can include verifying that the root node of a data structure (e.g., Merkle tree) is derived from identifiers corresponding to at least the casting token. In another example, the vote verification system 1152 of the validators 1150 can receive the casting token and the confirmation token and validate the received tokens based on proof generated by the ZKP generation module 1148.

In some implementations, the ZKP generation module 1148 can be implemented using proof models that implement a trusted setup phase, such as Groth16 (a succinct non interactive argument of knowledge), PLONK (Permutations over Lagrange bases for Oecumenical Noninteractive arguments of Knowledge), or Marlin (Modular and Adaptable Recursive Layered Interactive NIZK), or proof models that may not implement a trusted setup phase, such as STARKs (Scalable Transparent Arguments of Knowledge), Bulletproofs, or Halo 2. In some examples, the voting system backend 1140 and the vote verification system 1152 of the validators 1150 can be configured to generate and verify proofs produced using various proof models or other techniques providing comparable security and privacy guarantees. In some examples, to improve verification efficiency, the ZKP generation module 1148 and associated verification logic can support batch verification and aggregated proof verification. For example, batch verification can include verifying multiple separate proofs in a single combined operation to reduce redundant computation compared to verifying each proof individually. For example, aggregated proof verification can include combining multiple proofs into a single proof object that can be verified once to establish the validity of underlying statements. Batch and aggregated verification can reduce computation time and resource usage for on chain verification (e.g., where a smart contract or other blockchain based execution environment verifies proofs directly) or scalable off chain verification (e.g., where a high volume backend service or independent audit process verifies proofs outside a blockchain environment, such as in a large scale public election with millions of votes).

In some implementations, the voting system backend 1140 can verify the at least one casting token by generating at least one inclusion token including a cryptographic proof of inclusion of the at least one casting token in the vote count. For example, the zero-knowledge proof (ZKP) generation module 1148 of the voting system backend 1140 can generate a zero-knowledge proof to validate that the casting token is authentic and corresponds to a legitimate vote while maintaining anonymity and issue an inclusion token to a user or entity, which the user or entity can use to verify that the vote of the user or entity was included in the vote count or final tally. That is, the ZKP generation module 1148 can confirm that the casting token is valid without disclosing any identifying information about the voter or the content of the vote. In another example, the vote verification system 1152 of the validators 1150 can receive both the casting token and the confirmation token and validate the received tokens based on the proof generated by the ZKP generation module 1148. In some implementations, verifying the casting token can include the Merkle tree construction module 1146 organizing hashes or other identifiers of one or more confirmation tokens into a cryptographic Merkle tree structure. For example, the Merkle tree construction module 1146 can generate or derive a root hash that verifies the inclusion of one or more casting tokens in the final vote tally and provides an indication of the integrity of the voting process. In another example, the vote verification system 1152 can validate the integrity of the casting token by analyzing the Merkle tree structure, scanning various nodes, and confirming that the casting token is included in the root hash of the tree (e.g., via detecting hashes or identifiers of confirmation tokens corresponding to multiple casting tokens of entities or users stored in the tree data structure).

In some implementations, the voting system backend 1140 can issue at least one counting token, including a cryptographic proof of the counting system used to tally the votes. For example, the tally verification system 1154 can issue a counting token indicating the type of counting system used to tally the votes. That is, the tally verification system 1154 can generate a cryptographic token that provides proof of the counting system used to tally the votes. In another example, the voting system backend 1140 can record the counting token on the public ledger/bulletin board 1160 to provide third-party auditors, voting officials, voters, and the general public transparency regarding the counting system used to tally the votes. Further, the counting token can include cryptographic evidence showing the votes corresponding to a specific counting system to verify that all votes were tallied in the correct manner. That is, the tally verification system 1154 can attach a cryptographic signature to the counting token to provide verifiable proof that votes were tallied in the correct manner. In another example, the counting token can be accessed via the public ledger/bulletin board 1160 by voters, non-voters (e.g., non-voting entitles or users), or auditors to confirm that the vote was counted correctly. In some implementations, the voting system backend 1140, validators 1150, and/or public ledger/bulletin board 1160 can validate, responsive to receiving a ledger request, the counting system based on providing a counting token as cryptographic proof of the integrity (e.g., trustworthiness, accuracy, security, etc.) of a counting system.

In some implementations, the voting system backend 1140 can issue at least one certification token including a cryptographic proof of an integrity of the vote count. For example, the election certification token issuance system 1156 of the validators 1150 can generate a certification token indicating that the casting token has been successfully verified and included in the final vote tally, and that all votes corresponding to the final tally have been properly counted and/or comply with relevant election rules. That is, the election certification token issuance system 1156 can generate a cryptographic token that provides proof of the successful validation of the casting token and/or integrity, accuracy, or transparency of the voting process. In another example, the voting system backend 1140 can record the certification token on the public ledger/bulletin board 1160 to provide third-party auditors, authorized users, and/or the general public proof of the integrity of the vote count. Further, the certification token can include cryptographic evidence that the casting tokens were not tampered with and/or were correctly counted in the final tally. That is, the election certification token issuance system 1156 can attach a cryptographic signature to the certification token to provide verifiable proof that the casting token has been securely recorded and tallied. In another example, the certification token can be accessed via the public ledger/bulletin board 1160 by voters, non-voters (e.g., non-voting entitles or users), or auditors to confirm that the vote was accurately counted and preserved in an election or in voting results. In some implementations, the voting system backend 1140, validators 1150, and/or public ledger/bulletin board 1160 can validate, responsive to receiving a ledger request, the vote count based on providing a certification token as cryptographic proof of the integrity (e.g., trustworthiness, accuracy, security, etc.) of a vote count.

In some implementations, the voting system backend 1140 can store a hash of the confirmation token in a tree data structure. For example, the voting system backend 1140 can generate and store a cryptographic commitment for the confirmation token (e.g., one-way hash, Pedersen commitment, etc.) in the tree data structure to facilitate subsequent verification while safeguarding underlying data. For example, the tree data structure can include hashes of confirmation tokens corresponding with casting tokens of multiple entities or users. In some examples, the tree structure can be used to organize and store cryptographic hashes, which can provide a reference to verify the integrity of votes. In some implementations, verifying the at least one casting token and the plurality of casting tokens can include analyzing the tree data structure. For example, the voting system backend 1140 and/or validators 1150 can determine that a root node of the tree data structure is derived from the hash of the at least one confirmation token and hashes of confirmation tokens of multiple users to provide validation that the votes were included correctly. For example, determining can include analyzing or scanning through the tree structure and calculating or recalculating the root hash to confirm accuracy without altering or leaking underlying sensitive data. In some implementations, the validators 1150 can issue at least one certification. For example, issuing can include the election certification token issuance system 1156 of the validators 1150 generating a certification token based on verifying both the casting token and the plurality of casting tokens. For example, the certification token can include a cryptographic proof that confirms all votes have been accurately recorded in the tally. In some examples, the certification token can be linked to verified casting tokens to establish or provide an indication of vote count integrity.

In some implementations, the voting system backend 1140 can store the certification token or the counting token on the public ledger/bulletin board 1160. For example, after generating the certification token or the counting token, the voting system backend 1140 can record the token publicly on the ledger. The certification token can provide cryptographic evidence of the certified vote count while the counting token can provide cryptographic evidence of the counting system used to tally the votes. Auditors (e.g., validators 1150), voters, and other entities can then access the certification token, the counting token, or both to verify that the election results were correctly counted and preserved.

In some implementations, the system 1100 can cause the proof model (e.g., ZKP generation module 1148 of the voting system backend 1140) to output the at least one confirmation token based on verifying the at least one casting token. For example, causing the proof model to output the at least one confirmation token can include or correspond with a token generation and verification lifecycle, including (i) creating a casting token that includes encrypted vote data and an associated zero-knowledge proof attesting to ballot validity and compliance with election rules, (ii) accepting the casting token and associated proof and issuing a confirmation token as a cryptographic receipt indicating that the ballot has been received and recorded, (iii) subsequently (e.g., after batching multiple confirmation tokens for a tally epoch) generating or emitting an inclusion token with proof for each corresponding casting token, and (iv) generating or emitting a certification token in response to verifying global correctness by checking that eligible ballots are each represented once, that no ineligible ballots are included, and that voting tallies match the recorded encrypted votes. In some examples, the proof model can validate that the confirmation token corresponds to the casting token by performing cryptographic checks and/or verification. In some implementations, the proof model can maintain the anonymity of the entity or user after issuing the at least one certification token. In some implementations, the proof model can prevent the disclosure of identifying information related to the entity or user and verify that voter information (e.g., voter identity linked to vote content) remains confidential during verification and certification processes.

In some implementations, the voting system backend 1140 can be used to securely compile voting statistics. For example, the casting tokens are associated with a plurality of cryptographic proofs (e.g., "I am over 18," "I am male," "I belong to demographic X") and the zero-proof generation module 1148 resolves these cryptographic proofs to verify and aggregate personal information about voters 1170 (e.g., age, gender, demographic, etc.). That is, the proof model can validate and aggregate personal information about voters by performing cryptographic checks and/or verification without exposing this information. In some examples, one or more third-parties (e.g., election organizers) perform secure multiparty computations to jointly compute voting statistics (e.g., the number of males that voted in an election, the number of X demographic that voted for a particular candidate, the number of voters between 18 and 30 that voted "yes" on a particular proposal, etc.). That is, voting statistics can be computed across multiple third-parties to verify that no single entity controls personal information about voters. In some implementations, the casting votes are encrypted using homomorphic encryption, allowing the one or more third-parties to compute voting statistics on encrypted data (e.g., casting tokens). That is, the one or more third-parties can avoid decrypting data to compute voting statistics.

In some implementations, the voting system backend 1140 can store voting statistics on the public ledger/bulletin board 1160. For example, after one or more third-parties compute voting statistics, the voting system backend 1140 can record the voting statistics on the public ledger/bulletin. Auditors (e.g., validators 1150), voters, and other entities can then access the voting statistics to verify that the voting statistics were properly calculated. In some implementations, the zero-knowledge proof generation module 1148 can generate at least one voting statistics token based on verifying the at least one casting token. That is, the zero-knowledge proof generation module can validate that the at least one voting statistic token corresponds to the at least one casting token by performing cryptographic checks and/or verification.

In some implementations, the voting system backend 1140 can be used to initiate a vote re-count. For example, the voting system backend 1140 can receive a request from one or more stakeholders (e.g., candidates, election officials, voters, authorized personnel, etc.) and initiate a vote recount based on a pre-defined threshold (e.g., X number of voters request a recount). Further, a vote recount can be initiated based on a pre-defined condition (e.g., a candidate or voting proposal succeeds by X number of votes). In some examples, one or more smart contacts can automatically execute vote recounts. That is, the smart contracts can contain terms and conditions for automatically executing a recount. Further, the one or more smart contract can terminate a voting period (e.g., voters can no longer cast ballots) before automatically executing vote recounts. In some implementations, the voting system backend 1140 automatically executes the one or more smart contracts when terms or conditions in the one or more smart contracts are satisfied. In some examples, a distributed network (e.g., blockchain) can verify the terms or conditions for a vote recount. In some examples, the recount includes re-verifying the recorded votes against the cryptographic information stored in casting tokens.

In some implementations, the voter device 1110 can provide the at least one confirmation token to a first wallet of the entity or user as proof of the entity or user casting the vote. For example, after the user or entity submits a vote through the voting application 1116, the voter device 1110 can generate a confirmation token and securely transmit the confirmation token to the user wallet (e.g., mobile device, wallet application, etc.). The confirmation token can contain a unique identifier (e.g., a hash) associated with the vote such that the voter can verify receipt of the vote using the confirmation token. In some implementations, the voter device 1110 can provide the at least one inclusion token to the first wallet of the entity or user as proof of the inclusion of the vote in the vote count. For example, once the vote is included in the final tally, the voting system backend 1140 can generate an inclusion token to confirm or verify that the vote was successfully counted in overall election results, and further transmit the inclusion token to the user wallet for future verification. In some examples, the voting system backend 1140 can provide the at least one certification token to a second wallet of one or more non-voting entities or users as proof of voting integrity. For example, the certification token can be sent to auditors or election officials (e.g., validators 1150) to provide data to verify that multiple votes have been accurately counted and validated without revealing individual voter data. Generally, the certification token can include a cryptographic signature or proof that confirms the integrity of the vote count (e.g., all votes, one or more votes, etc.). In some examples, the public key infrastructure (PKI) 1136 can issue private keys to voters and public keys to authorized systems (e.g., validators), where the private keys sign the certification tokens so that authorized systems (e.g., validator systems or election authority server 1130) with public keys can verify a vote without revealing individual voter data.

In some implementations, various components of FIG. 11 (e.g., system 1100, voter device 1110, etc.) can be configured to support continuous development and improvement. For example, a pilot program can be implemented to test the system 1100 in a controlled environment and provide testing data for stakeholders such as election officials and auditors to evaluate system performance and address any issues. In some examples, the system 1100 can facilitate collaboration with relevant experts, such as cybersecurity specialists, to verify compliance with established security standards and voting protocols. Additionally, resources can be provided to educate voters and election officials on using system 1100 or to promote understanding and increase adoption. In some examples, feedback from stakeholders can be collected to continuously refine the system 1100 and improving effectiveness in voting integrity or process efficiency.

In some examples, system 1100 can implement cryptographic libraries and standards can to secure data. For instance, cryptographic libraries can be utilized for encryption and other cryptographic operations, while zero-knowledge proof implementations (e.g., zk-SNARKs) can be applied for secure vote verification. The system 1100 can further verify adherence to standards or voting rules, such as guidelines set by the National Institute of Standards and Technology (NIST) and similar organizations providing guidelines for electronic voting security. Additionally, system 1100 can be designed to align with federal laws such as the Help America Vote Act (HAVA) and the Voting Rights Act (VRA), various state election regulations, and other applicable legal or regulatory frameworks.

In some implementations, the voting system backend 1140 can issue a revote token to facilitate a voter submitting an updated ballot that supersedes a previously submitted ballot. For example, the revote token can be generated and linked to the eligibility record of the voter after a valid casting token and associated confirmation token have been processed. In some examples, when a subsequent ballot is submitted together with a valid revote token, the voting system backend 1140 updates stored vote records such that an updated or recent valid ballot for that voter is retained for tallying, and earlier ballots from that voter are marked as revoked. For example, the revote token can be single-use or time-limited mechanism and can include cryptographic data linking the token to the original voting session or voter eligibility entry, while maintaining ballot secrecy. In some examples, revote tokens can be issued automatically at initial voting or upon voter request during the permitted voting period to facilitate "last-write-wins" revoting and provide a safeguard against coercion by allowing a coerced ballot to be replaced later in private. Additionally, in some implementations, the confirmation token provided to the voter can be generated to provide receipt-freeness (e.g., the confirmation token is constructed to serve as proof that the ballot was recorded and included in the count without encoding, revealing, or otherwise allowing the voter to conclusively demonstrate their specific voting choice). In some examples, audit trails maintained by validators 1150 can record the issuance and use of revote tokens and the inclusion of receipt-free confirmation tokens to provide transparency without compromising voter privacy.

In some implementations, the system 1100 can implement a threat model and/or security techniques to protect against election security threats (e.g., side-channel deanonymization attacks that attempt to link voter eligibility information to casting activity through network-layer or temporal metadata). For example, adversaries with visibility into network addresses, message timing, or submission order can attempt to correlate an eligibility token or voter device 1110 to a specific casting token or recorded ballot, thereby threatening election security and anonymity. To prevent such threats, the system 1100 can implement one or more metadata-minimization techniques to restrict or hide network or temporal metadata linking eligibility and casting, including transmitting votes through mix networks or relay nodes to obscure source network addresses, batching or delaying the submission of casting tokens to break direct timing correlations, encrypting channel metadata, or introducing cover traffic or dummy submissions (e.g., applied at the voter device 1110, voting system backend 1140, intermediary network components, etc.).

In some implementations, the system 1100 can facilitate bidirectional verification of election integrity by providing mechanisms for different classes of participants to perform complementary verification functions. For example, individuals (e.g., voters 1170) can use confirmation tokens and/or inclusion tokens to independently verify that their own ballot has been recorded and included in the official vote tally. In addition, validators 1150 and/or authorized auditors can execute zero-knowledge proof-based verification of global election correctness, including verifying that a total number eligible votes have been counted once, that no ineligible votes are included, and that tally computations match the recorded encrypted votes, with certification tokens issued by the election certification token issuance system 1156 to voters 1170 in response to successful completion of such global verifications.

In some implementations, system 1100 can be configured for deployment in environments that leverage a public blockchain or other append-only distributed ledger to anchor election integrity data. For example, at the close of a tally epoch or at the end of the election, the voting system backend 1140 or validators 1150 can commit one or more anchors (e.g., one or more computed Merkle-root values and associated certification tokens) to a public chain to provide a publicly verifiable, tamper-evident reference to the set of ballots and certified result. In some embodiments, zero-knowledge proofs or other verification artifacts corresponding to these anchors can be generated and verified off-chain or in a near-chain environment to improve performance (e.g., with a succinct verifier or verification result recorded on-chain to reduce transaction costs). In some embodiments, if permitted by resource constraints (e.g., gas limits, transaction costs), the verification process can be executed fully on-chain such that proof checking occurs within a public execution environment.

In some implementations, the zero-knowledge proof generation module 1148 of the voting system backend 1140 can generate, within the proof model, a nullifier for the at least one casting token to prevent duplicate use (e.g., double voting, replay of a prior submission, and/or any other reuse of a casting token), maintain anonymity of the entity or user (e.g., by unlinking the nullifier from voter identity, by using cryptographic blinding, and/or any privacy-preserving encoding), and reject any subsequently received casting token including the nullifier. That is, the zero-knowledge proof generation module 1148 can embed the nullifier inside the zero-knowledge statement such that the nullifier is unlinkable to the voter identity but still detectable for duplication. For example, the voting system backend 1140 can store a list of nullifiers in protected memory (e.g., secure enclave, hardware security module, and/or any tamper-resistant storage) and compare incoming casting tokens against the stored list. For example, a match can cause the casting token to be rejected without revealing the identity. Additionally, the Merkle tree construction module 1146 can record the nullifier in a hashed form (e.g., SHA-256, Keccak-256, and/or any cryptographic hash function) to support later verification. For example, the nullifier hash can be included in the Merkle tree leaf corresponding to the casting token.

In some implementations, the zero-knowledge proof generation module 1148 can perform, prior to issuing the at least one certification token, batch zero-knowledge verification of a plurality of the at least one casting token or a plurality of the at least one inclusion token to output a proof verifying correctness (e.g., aggregated zk-SNARK, Bulletproofs batch proof, and/or any succinct proof system). That is, the zero-knowledge proof generation module 1148 can aggregate multiple verification statements into a single succinct proof. For example, the voting system backend 1140 can collect multiple casting tokens from the vote recording module 1142 and multiple inclusion tokens from the Merkle tree construction module 1146. In this example, the zero-knowledge proof generation module 1148 can generate one aggregated proof that all tokens are valid. Additionally, the validators 1150 can receive the aggregated proof for independent verification (e.g., by the vote verification system 1152, the tally verification system 1154, and/or any third-party auditor). For example, the vote verification system 1152 can validate the single proof instead of verifying each token individually.

In some implementations, the homomorphic encryption engine 1144 can apply threshold decryption to a homomorphically aggregated vote count (e.g., ElGamal, Paillier, and/or any additive or multiplicative homomorphic encryption scheme) and generate, within the proof model, a zero-knowledge proof indicating correct decryption of the vote count. That is, the homomorphic encryption engine 1144 can require partial decryption shares from multiple authorities (e.g., election authority server 1130, validators 1150, and/or any trusted decryption party) before revealing the tally. For example, the election authority server 1130 and validators 1150 can each provide a decryption share. In this example, the zero-knowledge proof generation module 1148 can produce a proof that the decrypted tally matches the encrypted aggregate without revealing individual votes. Additionally, the tally verification system 1154 can verify the proof before certification (e.g., by checking cryptographic commitments, by verifying decryption share validity, and/or any consistency check). For example, the tally verification system 1154 can confirm that the decrypted result is consistent with the encrypted votes recorded by the vote recording module 1142.

In some implementations, the voting system backend 1140 can provide the at least one confirmation token or the at least one inclusion token to prove inclusion of the vote of the entity or user in the vote count without proving a specific selection (e.g., candidate choice, ballot option, and/or any voter preference). That is, the zero-knowledge proof generation module 1148 can generate proofs that confirm inclusion without revealing vote content. For example, the inclusion token can be derived from the Merkle tree construction module 1146 using only the position of the vote in the tree (e.g., Merkle path, sibling hashes, and/or any position-based proof). In this example, the voter can verify inclusion without being able to prove to a third party how they voted. Additionally, the cryptographic storage system 1114 of the voter device 1110 can store the inclusion token for later verification (e.g., local secure storage, encrypted file, and/or any protected memory). For example, the voter device 1110 can present the inclusion token to the public ledger/bulletin board 1160 to confirm inclusion.

In some implementations, the voting system backend 1140 can delay or relay submission of the at least one casting token to cause an expansion of an anonymity set (e.g., mixing with other votes, batching submissions, and/or any obfuscation technique) and reduction in metadata linkage (e.g., timing correlation, IP address tracking, and/or any network-level fingerprinting). That is, the vote recording module 1142 can hold casting tokens in a secure queue before committing them to the Merkle tree construction module 1146. For example, the voting system backend 1140 can mix casting tokens from multiple network sources before recording. In this example, the delay or relay can obscure timing correlations between voter actions and recorded votes. Additionally, the network 1120 can route casting tokens through intermediate relays (e.g., validators 1150, anonymizing proxies, and/or any mixnet). For example, the casting token can be forwarded through validators 1150 before reaching the voting system backend 1140.

In some implementations, the zero-knowledge proof generation module 1148 can process a plurality of the at least one casting token from the entity or user within a revoting window (e.g., predefined time period, rolling deadline, and/or any configurable interval) by accepting a last-valid nullifier. That is, the voting system backend 1140 can replace earlier casting tokens from the same voter with a later one if submitted within the defined time period. For example, the vote recording module 1142 can mark earlier nullifiers as revoked when a new nullifier is accepted. In this example, only the casting token associated with the last-valid nullifier is included in the final tally. Additionally, the Merkle tree construction module 1146 can update the tree to remove or supersede earlier entries (e.g., by pruning leaves, by replacing hashes, and/or any tree-update operation). For example, the updated tree can be published to the public ledger/bulletin board 1160 for transparency.

In some implementations, the voter eligibility token system 1134 of the election authority server 1130 can verify, using the proof model, the at least one eligibility token is jointly issued by a plurality of eligibility authorities (e.g., national election commission, state election board, and/or any jurisdictional authority) and combined in zero-knowledge to satisfy jurisdictional voting rules. That is, multiple election authority servers 1130 can each issue a partial eligibility token (e.g., residency credential, age credential, and/or any eligibility attribute). For example, one authority can verify residency while another verifies age. In this example, the zero-knowledge proof generation module 1148 can combine the partial tokens into a single eligibility token without revealing the underlying attributes. Additionally, the voter eligibility verification system 1132 can confirm that the combined token meets all jurisdictional requirements (e.g., geographic restrictions, eligibility deadlines, and/or any statutory requirement). For example, the combined token can be used to access the ballot via the voter authentication interface 1112 of the voter device 1110.

Figure 12:
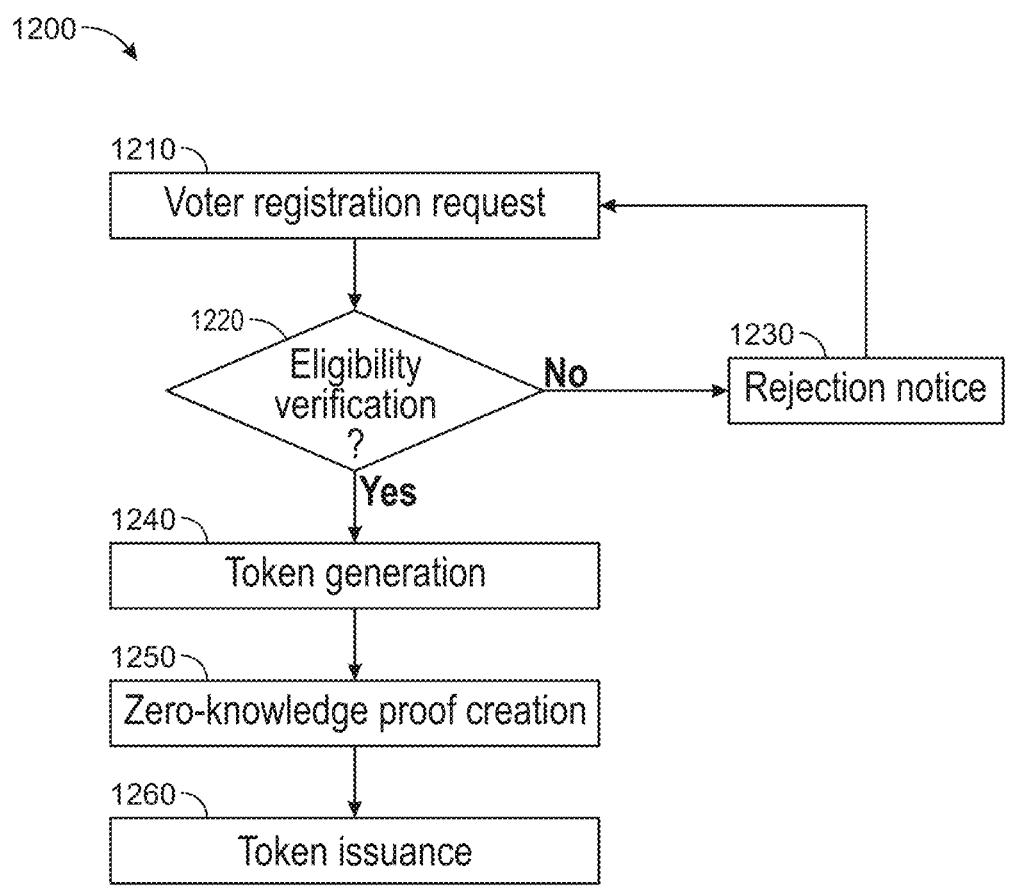
FIG. 12 depicts a flowchart for a method of protecting data, according to some implementations.

Referring now to FIG. 12, a flowchart for a method 1200 of protecting data is shown, according to some implementations. In some implementations, the method 1200 can be implemented or executed by one or more components of FIG. 11 (e.g., the voter device 1110, election authority server 1130, etc.) and/or by one or more processing circuits. In various implementations, one or more steps (e.g., blocks) of method 1200 can be added, removed, repeated, omitted, rearranged, and/or reordered. In some implementations, method 1200 depicts operations for voter registration and the issuance of a voter eligibility token.

In some implementations, the method 1200 can include receiving or providing a voter registration request at block 1210. That is, a user or entity can use a user eligibility token to access a ballot (e.g., electronic ballot). In some examples, receiving or providing voter registration can include the voter device 1110 transmitting a registration request to the election authority server 1130 for processing. In some implementations, the method 1200 can include determining or performing eligibility verification at block 1220. For example, block 1220 can include confirming whether the voter meets the criteria for registration by accessing the voter eligibility verification system 1132. In some implementations, block 1220 can include one or more steps for verifying voter eligibility. For example, block 1220 can include extracting personal data (e.g., age, date of birth, residence, signature, photos, biometric data, etc.) of voters from private and/or public records and comparing the personal information against one or more voting requirement parameters (e.g., voter is to be 18, voter is to be a resident of a particular county, etc.). In other examples, the election authority server 1130 can confirm that the voter information satisfies the requirements (e.g., age, date of birth, residence, etc.) for issuing the eligibility token. For example, the election authority server 1130 can verify voter credentials (e.g., name, home address, work address, etc.) using the voter eligibility verification system 1132, which can access a secure database of voter information for validation. If eligibility is verified, the method 1200 can continue to block 1240. Additionally, if eligibility is not confirmed (e.g., if a user or entity has not pre-registered, if an error is detected, etc.), the method 1200 can continue to block 1230. In some implementations, generating the token (e.g., eligibility token) at block 1220 can include encrypting the data associated with the token discussed herein. For example, the election authority server 1130 can encrypt the eligibility tokens as part of the voter eligibility token system 1134. In other examples, the public key infrastructure (PKI) 1136 generates one or more cryptographic keys (e.g., public key) that the election authority server 1130 uses to encrypt data associated with the token.

In some implementations, the method 1200 can include receiving or providing a rejection notice at block 1230. For example, block 1230 can include the election authority server 1130 transmitting a rejection notice back to the voter device 1110. In some examples, the rejection notice can include data corresponding to the rejection, such as a date, an identifier, reasons for the rejection, and/or instructions on how to reapply. In other examples, the rejection notice can include one or more recommendation voters can take to improve their eligibility to vote (e.g., waiting to turn 18). Additionally, after issuing the rejection notice, the method 1200 can return to block 1210 and repeat the steps described above any number of times. In some implementations, the method 1200 can include generating a token at block 1240. For example, block 1240 can include the voter eligibility token system 1134 generating a token (e.g., eligibility token) after successful eligibility verification. Voter eligibility token system 1134 can generate a token in one or more ways. For example, generating a token at block 1240 can include cryptographically signing data (e.g., by the election authority server 1130) and/or generating a unique identifier (UID) using a cryptographic random number generator. Further, the generated eligibility token can be transmitted to the cryptographic storage system 1114 on the voter device 1110 for later use (e.g., confirmation) in a voting process.

In some implementations, the method 1200 can include creating zero-knowledge proofs at block 1250. For example, block 1250 can include generating a zero-knowledge proof (ZKP) based on information associated with the eligibility token. That is, the ZKP generation module 1148 of the voting system backend 1140 can create one or more proofs of voter eligibility while maintaining anonymity (e.g., without revealing personal information of the voter, such as the signature on the ballot, the age of the voter, the residence of the voter, etc.). Additionally, the ZKP proofs can be stored within the voting system backend 1140 for validation. Generally, the ZKPs can confirm the vote adheres to election rules (e.g., vote conforms with ballot requirements, voter cast the ballot within the designated voting period, etc.). In some examples, ZKPs can implement zero-knowledge proof protocols, such as zk-SNARKS (e.g., providing succinct proofs suitable for verification without disclosing vote content) and/or bulletproofs (e.g., shorter proofs without trusted setup and useful for range proofs and vote validity).

In some implementations, the method 1200 can include issuing tokens (e.g., eligibility tokens) at block 1260. For example, block 1260 can include the issuing the eligibility token to confirm or verifies the eligibility of the user or entity for voting. Further, the issued token can be securely stored (e.g., in cryptographic storage system 1114 or public ledger/bulletin board 1160) to provide an indication of integrity of a voting process to participants or others (e.g., non-voting entities or users). Generally, the voter receives the token via one or more secure channels of transmission. For example, a voter can receive a token via a user device (e.g., voter device 1110), an application (e.g., voting application 1116), hardware-based delivery (e.g., USB, smartcards, near field communication (NFC) tags, etc.), or an encrypted message (e.g., email). In some implementations, the tokens (e.g., eligibility tokens) are cryptographically bound to the voter such that access to the tokens are restricted to the recipient voter and cannot be misused by other voters. In some implementations, the verifier (e.g., election authority server 1130) can revoke the token if the voter becomes ineligible to vote (e.g., voter becomes disqualified). In some implementations, a verifier (e.g., election authority server 1130) completes one or more post-issuance validations. For example, the verifier (e.g., election authority server 1130) can verify that the token was issued by the verifier, that the token is not used (e.g., not assigned to a different voter), or that the token is valid for an election type (e.g., voting category).

In some implementations, the method 1200 can include registering, by one or more processing circuits, an entity or user for voting based on issuing at least one eligibility token corresponding with the entity or user. The method 1200 can further include generating, using the proof model, a nullifier for the at least one casting token to prevent duplicate use, maintain anonymity of the entity or user, and reject any subsequently received casting token including the nullifier. In some implementations, the nullifier can be embedded in the proof model so that duplicate casting tokens are rejected without revealing the identity of the entity or user. The method 1200 can further include performing, prior to issuing the at least one certification token, batch zero-knowledge verification of a plurality of the at least one casting token or a plurality of the at least one inclusion token to output a proof verifying correctness. In some implementations, the batch zero-knowledge verification can aggregate multiple verifications into a single proof to reduce computational overhead. The method 1200 can further include applying threshold decryption to a homomorphically aggregated vote count and generating, within the proof model, a zero-knowledge proof indicating correct decryption of the vote count. In some implementations, the threshold decryption can require partial decryption shares from multiple authorities before revealing the vote count. The method 1200 can further include providing the at least one confirmation token or the at least one inclusion token to prove inclusion of the vote of the entity or user in the vote count without proving a specific selection.

In some implementations, the confirmation token or inclusion token can be used to verify that the vote was counted without revealing the choice made by the entity or user. The method 1200 can further include delaying or relaying submission of the at least one casting token to cause an expansion of an anonymity set and reduction in metadata linkage. In some implementations, delaying or relaying can obscure timing or network information that could otherwise be used to link the vote to the entity or user. The method 1200 can further include processing a plurality of the at least one casting token from the entity or user within a revoting window by accepting a last-valid nullifier. In some implementations, earlier casting tokens within the revoting window can be revoked so that only the last-valid nullifier is included in the vote count. The method 1200 can further include verifying, using the proof model, the at least one eligibility token is jointly issued by a plurality of eligibility authorities and combined in zero-knowledge to satisfy jurisdictional voting rules. In some implementations, the combination in zero-knowledge can confirm compliance with jurisdictional requirements without revealing underlying eligibility attributes.

Figure 13:
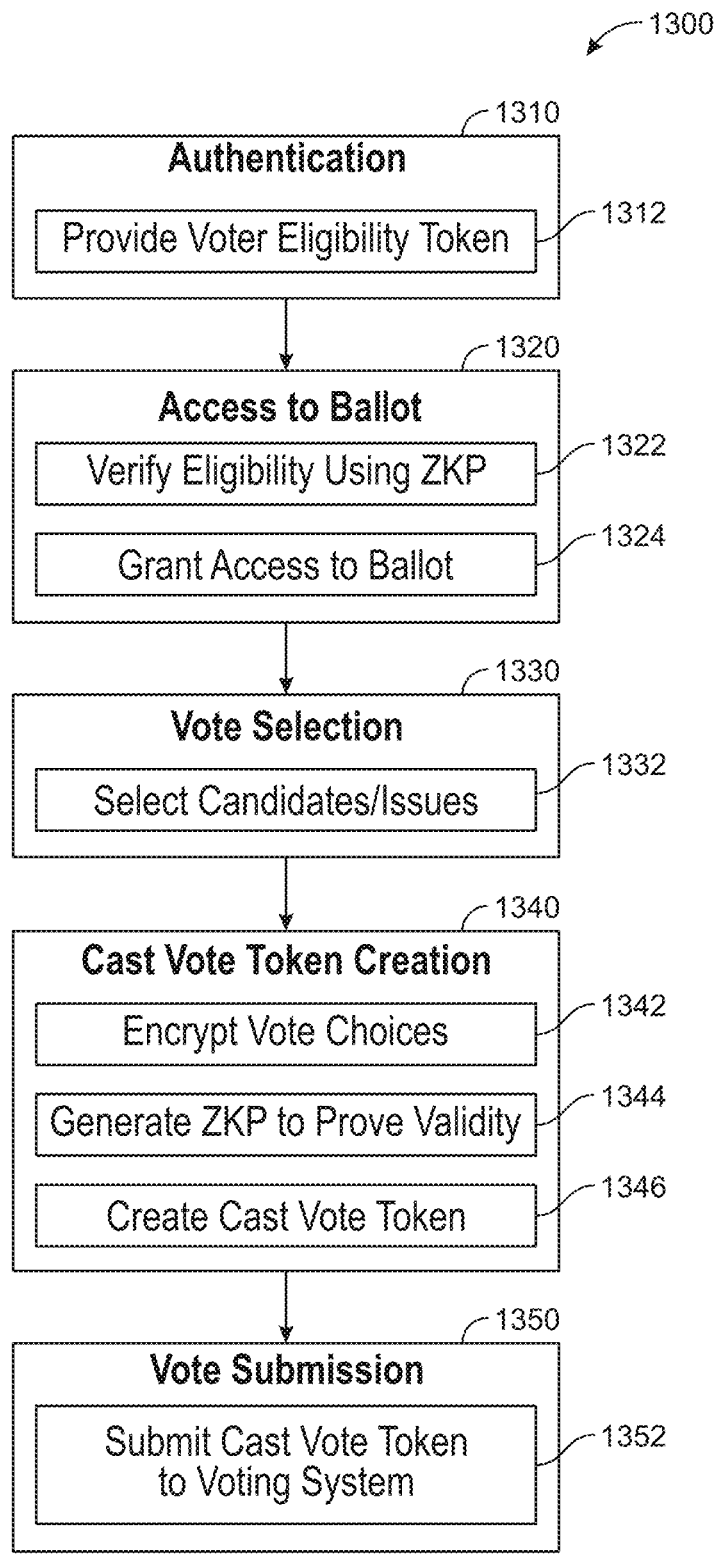
FIG. 13 depicts a flowchart for a method of protecting data, according to some implementations.

Referring now to FIG. 13, a flowchart for a method 1300 of data protection is shown, according to some implementations. In some implementations, the method 1300 can be implemented or executed by one or more components of FIG. 11 (e.g., the voter device 1110, election authority server 1130, etc.) and/or by one or more processing circuits. In various implementations, one or more steps (e.g., blocks) of method 1300 can be added, removed, repeated, omitted, rearranged, and/or reordered. Generally, method 1300 illustrates a method for casting a vote and generating a corresponding cast vote token.

In some implementations, the method 1300 can include performing authentication at block 1310. For example, block 1310 can include providing a voter eligibility token at block 1312. That is, block 1310 can include the voter device 1110 transmitting the eligibility token to the election authority server 1130 for cryptographic validation. Additionally, block 1312 can include the election authority server 1130 decrypting and verifying the eligibility token using the voter eligibility verification system 1132 to confirm the identity of a voter by cross-referencing a voter database. In some examples, the authentication at block 1310 can include the voter device 1110 generating, storing, and/or transmitting a hash of the eligibility token to confirm the token is not corrupted, is not improperly accessed, and/or complies with various voting parameters (e.g., election rules, survey rules, etc.). Further, the eligibility token can include metadata that links the eligibility token to a cryptographic key or other identifier corresponding to a voter. In some examples, the authentication block at 1100 can include using the validators 1150 to verify one or more eligibility tokens. Further, the authentication block at 1100 can include public key infrastructure (PKI) 1136 generating one or more private-public key pairings and using the private key to sign the tokens so that validators 1150 can verify the signatures against one or more public keys.

In some implementations, the method 1300 can include accessing a ballot at block 1320. For example, accessing the ballot at block 1320 can include verifying eligibility using zero-knowledge proofs (ZKP) (e.g., of the eligibility token) at block 1322 and granting access to the ballot at block 1324. For example, block 1320 can include the election authority server 1130 validating the eligibility token using a proof to confirm that the voter is eligible without revealing sensitive voter information. In some examples, block 1322 can include the ZKP generation module 1148 maintaining anonymity by creating a zero-knowledge proof that confirms the validity of the confirmation token without accessing voter records directly. In some implementations, block 1320 can include one or more verification methods, such as digital signature verification (e.g., verifying a digital signature associated with an eligibility token), hash verification (e.g., comparing a hash associated with an eligibility token with a stored hash), public ledger verification (e.g., comparing a token against a token record on a distributed ledger), or ring signature verification (e.g., one or more tokens use ring signatures that facilitate verification as part of a group of eligible voters). Further, block 1324 can include the voter device 1110 using the verified confirmation token to unlock a ballot interface on the voting application 1116 and present the voter with available voting options (e.g., candidates, issues) for selection. In some implementations, the method 1300 can include vote selection at block 1330. Vote selection at block 1330 can include selecting candidates or issues at block 1332. For example, block 1330 can include the voter device 1110 receiving a selection for a user or entity via voting application 1116, and block 1332 can include the voting application 1116 generating a list of selected candidates or issues and storing the selected options in a temporary encrypted format using the cryptographic storage system 1114 on the voter device 1110. In some examples, block 1332 can include the voter device 1110 encrypting the selected options before the data is sent to the voting system backend 1140, securing the vote choices before submission to avoid tampering or interception. Further, block 1230 can include verifying the choices or issues selected by the voters are eligible for selection via the validators 1150, such as voter verification system 1152.

In some implementations, the method 1300 can include creating cast vote tokens (also referring to herein as "casting tokens") at block 1340. In some implementations, cast vote token creation at block 1340 can include encrypting vote choices at block 1342, generating a ZKP to prove validity at block 1344, and creating a cast vote token at block 1346. For example, block 1342 can include the voting system backend 1140 utilizing the homomorphic encryption engine 1144 to encrypt the selected vote choices for storage in a Merkle tree. In some examples, block 1342 can include public key infrastructure (PKI) 1136 generating public keys that encrypt the vote choices. In some examples, block 1344 can include the ZKP generation module 1148 generating a casting token with a cryptographic proof for each encrypted vote to validate that the vote choices are legitimate without disclosing underlying selections and/or voter identities. In some examples, block 1346 can include the voting system backend 1140 creating a cast vote or casting token that encapsulates encrypted vote data. Further, the cast vote token can include an identifier (e.g., hash of the encrypted votes) and one or more cryptographic proofs to confirm vote integrity and/or detect tampering attempts.

In some implementations, the method 1300 can include submitting the cast vote token at block 1350. In some implementations, submitting the cast vote token at block 1350 can include submitting the cast vote token to the voting system at block 1352. For example, block 1350 can include the voter device 1110 transmitting the cast vote token, which includes the encrypted vote and/or the ZKP, to the voting system backend 1140 and further validating the received cast vote token using a proof (e.g., the generated ZKP) of the inclusion token. In some examples, responsive to receiving the casting token submitted at block 1350, a voting system can include the vote corresponding with the submitted token in a vote count (e.g., tally). In some implementations, block 1350 can include using a public key infrastructure (e.g., public key infrastructure (PKI) 1136) to provide one or more private keys to the voting system such that the voting system can decipher the encrypted data associated with the vote.

Figure 14:
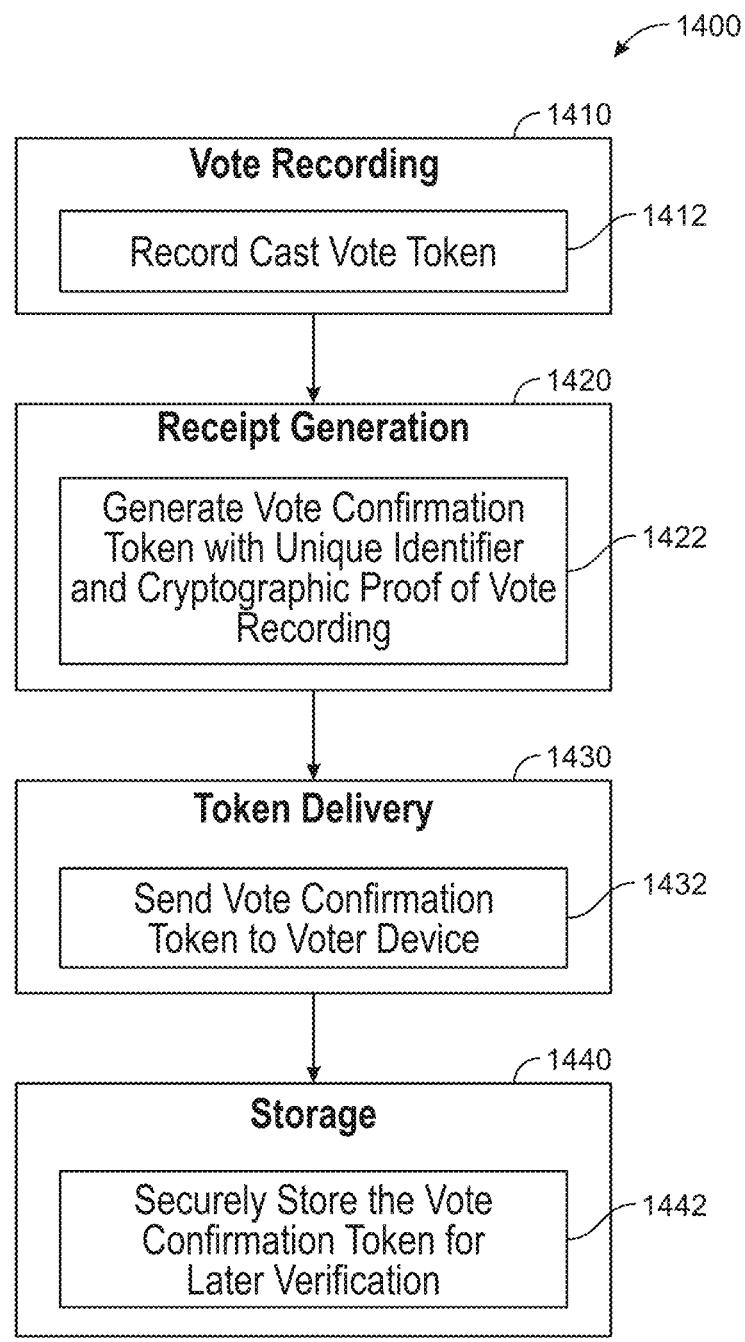
FIG. 14 depicts a flowchart for a method of protecting data, according to some implementations.

Referring now to FIG. 14, a flowchart for a method 1400 of data protection is shown, according to some implementations. In some implementations, the method 1400 can be implemented or executed by one or more components of FIG. 11 (e.g., the voting system backend 1140, election authority server 1130, etc.) and/or by one or more processing circuits. In various implementations, one or more steps (e.g., blocks) of method 1400 can be added, removed, repeated, omitted, rearranged, and/or reordered. Generally, method 1400 illustrates steps for receiving a vote confirmation token after casting a vote.

In some implementations, the method 1400 can include recording a cast vote token at block 1410. For example, block 1410 can include cryptographically storing the cast vote token in a tamper-evident structure, such as a Merkle tree, at block 1412, which provides detection of unauthorized modifications or discrepancies, and can be analyzed to verify receipt or determine inclusion of votes. In some examples, block 1410 can include recording the cast token on public ledger/bulletin board 1160 at block 1412 to prevent unauthorized modifications to the cast token. In some examples, block 1410 can include storing the cast token on voter device 1110 via cryptographic storage system 1114 at block 1412. Further, the block 1410 can include generating a cryptographic hash of the token to verify at least one (e.g., each) cast vote token is associated with the voter submission. In some examples, block 1410 can include public key infrastructure (PKI) 1136 to generate public-private key paring, where the voters can sign their cast tokens using a private key and vote recording module 1142 verifies the cast tokens using a public key before recording the vote associated with the cast token. Additionally, block

1412 can include associating the cast vote token with additional metadata, such as timestamps, voter IDs, and/or election names or types.

In some implementations, the method 1400 can include generating a vote confirmation token at block 1420. For example, generating the vote confirmation token at block 1420 can include creating a unique identifier and cryptographic proof of vote recording at block 1422. In some examples, block 1422 can include hashing the cast vote token to generate the unique identifier, where cryptographic proofs links the vote to the confirmed submission without exposing the contents of the vote itself. Additionally, block 1422 can include embedding the cryptographic proof into the confirmation token to confirm the vote to provide a traceable audit trail (e.g., to verify or confirm receipt). In some examples, public key infrastructure 1136 can generate and issue private keys used to sign the vote confirmation token, where the signature corresponds with a unique identifier and/or cryptographic proof of vote recording.

In some implementations, the method 1400 can include delivering the vote confirmation token at block 1430. For example, delivering the token at block 1430 can include sending the vote confirmation token to a voter device at block 1432. In some examples, block 1432 can include transmitting the vote confirmation token through a secure and/or encrypted communication channel such that an authorized voter device (e.g., voter device 1110) receives the confirmation token. Additionally, the confirmation token can include cryptographic data (e.g., ZKPs or other proofs) used to verify that the vote was properly recorded and counted without revealing the identity and/or selections of the voter (e.g., maintaining or providing anonymity). Further, block 1430 can include public key infrastructure 1136 providing private keys to the authorized user device (e.g., voter device 1110) so that the authorized user device can decrypt encrypted data associated with the vote confirmation token. In some implementations, the method 1400 can include storing the vote confirmation token at block 1440. That is, block 1442 can include placing or storing the token in tamper-proof storage for voters or other stakeholders to access (e.g., to verify voting integrity). For example, storing the vote confirmation token at block 1440 can include securely storing the token in a blockchain or other distributed ledger for future verification (e.g., public ledger/bulletin board 1160). In some examples, storing the vote confirmation token at block 1440 can include storing the token on cryptographic storage system 1114 of voter device 1110. In some examples, a web application (e.g., voting application 1116) can store the vote confirmation token via at least one of a local browser storage or cookies. In some implementations, the vote confirmation token can be stored in a database or a server-side storage system.

Figure 15:
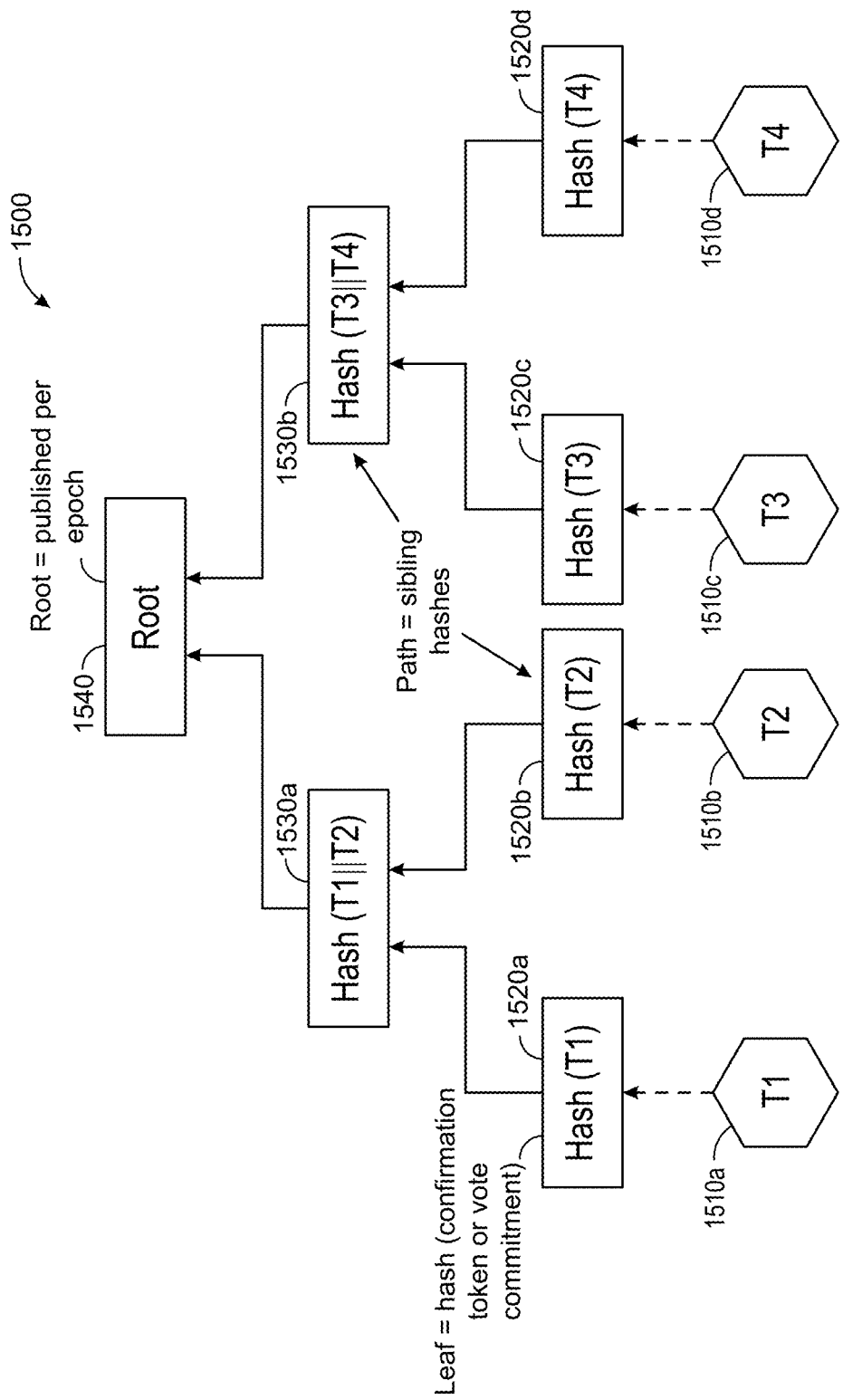
FIG. 15 depicts an architecture for tokenized voting data, according to some implementations.

Referring now to FIG. 15, a block diagram of a system for data protection is shown. In some implementations, the implementation shown on FIG. 15 includes a tree structure 1500. Generally, the tree structure 1500 can store representations or identifiers corresponding with nodes associated with votes. For example, the tree structure 1500 can include confirmation tokens 1510a-1510d (collectively, confirmation tokens 1510), nodes 1520a-1520d (collectively, nodes 1520), intermediate nodes 1530a-1530b (collectively, intermediate nodes 1530), and root node 1540. One or more (e.g., each) of the nodes 1520, intermediate nodes 1530, and/or root node 1540 can include identifiers (e.g., hashes) corresponding to votes (e.g., confirmation tokens corresponding with casting tokens) of one or more users or entities. In some examples, the tree structure 1500 can be implemented as a Merkle tree or any type of data structure used for organizing and verifying data. Generally, the tree structure 1500 can be utilized to verify vote integrity by confirming that nodes corresponding to votes were included in a final count or tally. It should be understood that the tree structure 1500 can include any number of layers or branches and can correspond to any number of nodes associated with votes submitted or cast by any number of users or entities. That is, the tree structure 1500 can be scalable to efficiently verify any number of votes and/or voting processes.

In some implementations, at least one (e.g., each) of the confirmation tokens 1510 can correspond to individual votes based on being associated with one or more casting tokens (not pictured) used to cast the votes. For example, a confirmation token 1510 can be linked to a respective cryptographic hash included in nodes 1520. For example, a cryptographic hash of node 1520a can correspond with confirmation token 1510a, which can represent a vote cast by an entity or user. In some examples, the cryptographic hashes of nodes 1520 can be generated based on vote data and provide a mechanism to detect tampering by scanning the nodes 1520, intermediate nodes 1530, and/or root node 1540. In some implementations, the intermediate nodes 1530 can represent a combination of two cryptographic hashes of nodes 1520 (e.g., hashes of nodes 1520a-1520b or 1520c-1520d). For example, intermediate node 1530a can represent the combination of cryptographic hashes of nodes 1520a and 1520b and provide an indication or summarization of the information contained in lower-level nodes (e.g., nodes 1520). In some examples, the intermediate nodes 1530 can support hierarchical review or summarization of vote data within the tree structure 1500 (e.g., via root node 1540).

In some implementations, the cryptographic hashes of the nodes 1520 correspond to one or more hash functions. That is, the cryptographic hashes of the nodes 1520 are hash values, digests, or checksums that correspond to the outputs of one or more mathematical algorithms. For example, the cryptographic hashes of node 1520 can be based on at least one of message digest algorithms, secure hash algorithms, or other algorithms. In some implementations, the cryptographic hashes of nodes 1520 can combine according to one or more combination schemes. For example, the output of a first hash function can be the input to a second hash function to produce a combined hash. In some examples, a system (e.g., election authority server 1130, voting system backend 1140, etc.) can concatenate a first output of a first hash function with a second output of a second hash function to produce a combined hash. In some examples, a system (e.g., election authority server 1130, voting system backend 1140, etc.) can apply one or more logical operations (e.g., XOR, AND, OR, etc.) between a first output of a first hash function and a second output of a second hash function.

In some implementations, the root hash of the root node 1540 can represent a top level of the tree structure 1500 and can encapsulate data representing the integrity of all underlying votes. Generally, the root node 1540 can provide a point of verification for auditing multiple votes included in the tree structure 1500 and be accessed and/or scanned to confirm accuracy and integrity of a voting process. That is, the root node 1540 can be hashed for public access. In some examples, a system (e.g., election authority server 1130, voting system backend 1140, etc.) publishes the hash of the root node 1540 to a public ledger or other secure platform to provide auditors or other entities with access to data to verify the results of the voting process. In some examples, a system (e.g., election authority server 1130, voting system backend 1140, etc.) stores the hash of the root node 1540 in cryptographic storage system 1114 of voter device 1110. In some implementations, the tree structure 1500, when implemented as a Merkle tree or a similar structure, can maintain anonymity of individual vote content. In some implementations, the root hash of the root node 1540 is the result of one or more mathematical operations (e.g., concatenation, weighted hashing, parallel hashing, logical operations (XOR, AND, OR, etc.), etc.) between the cryptographic hashes of at least one (e.g., each) of the intermediary nodes 1530.

In some implementations, zero-knowledge proofs (ZKPs) can be generated based on the tree structure 1500 to verify individual votes without revealing sensitive data. For example, the ZKP generation module 1148 can generate inclusion tokens including cryptographic proofs for at least one (e.g., each) vote to confirm that the corresponding confirmation tokens 1510 and cryptographic hashes of nodes 1520 exist with the tree structure 1500 and/or are otherwise valid without exposing vote details. For example, the cryptographic proofs of an inclusion token can include data corresponding with Merkle proofs (e.g., path from a leaf node corresponding to the vote to the root node). In some examples, the ZKPs can allow validators 1150 to confirm the integrity of votes stored in the tree structure 1500 (e.g., represented by the root node 1540). In some implementations, the tree structure 1500 can store all data corresponding with a vote on an issue or candidate, data corresponding with multiple votes on one or more issues, and/or data corresponding with a portion of voting data associated with an election.

In some implementations, the nodes 1520 can include leaf nodes storing a hash of a corresponding confirmation token or a hash of an underlying vote commitment. The leaf hashes can be arranged in pairs and combined to form internal branch nodes (e.g., nodes 1530), which summarize the contents of the corresponding child or leaf nodes. The node 1540 can include a root node that is published per epoch. To prove that a particular leaf is included in the tree represented by a published root, a Merkle path including sibling hash values to recompute the root from that leaf can be used. For example, for node 1520a, the path can include the hash in node 1520b and the hash in node 1530b, a verifier supplied with these sibling values and the leaf hash can recompute the internal node hashes and confirm that the calculated root matches the published root (e.g., node 1540).

Figure 16:
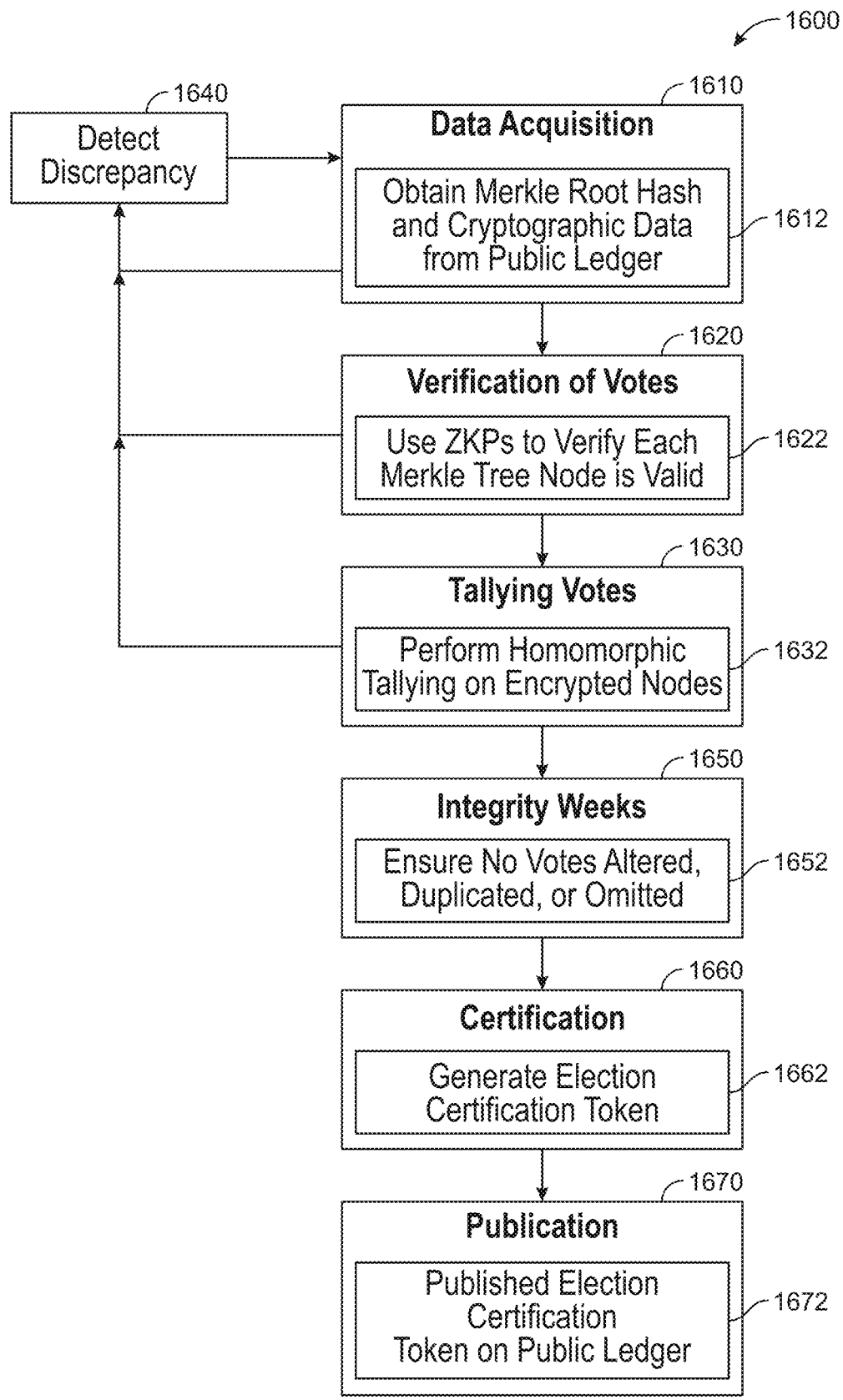
FIG. 16 depicts a flowchart for a method of protecting data, according to some implementations.

Referring now to FIG. 16, a flowchart for a method 1600 of auditing votes and verifying election integrity is shown, according to some implementations. In some implementations, the method 1600 can be implemented or executed by one or more components of FIG. 11 (e.g., validators 1150, voting system backend 1140, etc.) and/or by one or more processing circuits. In various implementations, one or more steps (e.g., blocks) of method 1600 can be added, removed, repeated, omitted, rearranged, and/or reordered. Generally, method 1600 illustrates a process for verifying election results and issuing an election certification token.

In some implementations, the method 1600 can include performing data acquisition at block 1610. For example, block 1610 can include obtaining the Merkle root hash and cryptographic data from a public ledger at block 1612. In some examples, block 1612 can include retrieving cryptographic data related to previously recorded votes (e.g., hashes, root node information) stored on a distributed ledger such as a blockchain. In some examples, block 1612 can include obtaining metadata, such as timestamps or digital signatures, to verify at least one (e.g., each) vote is counted in a voting process (e.g., linked to the root hash of the Merkle tree). Further, block 1612 can include validating the integrity of the root hash against published ledger records. In some implementations, block 1612 can comprise connecting, by one or more processing circuits, a requestor (e.g., voting system backend 1140) to one or more API endpoints of the distributed ledger, querying, by the one or more processing circuits, one or more blocks of the distributed ledger, and extracting, by the one or more processing circuits, one or more Merkle root hashes from one or more block headers of the one or more block. In some implementations, block 1612 can comprise initiating, by one or more processing circuits, a distributed ledger, syncing, by the one or more processing circuits, one or more nodes of the distributed ledger, connecting, by the one or more processing circuits, to one or more remote procedure call endpoints to query one or more blocks of the distributed ledger, and extracting, by the one or more processing circuits, one or more Merkle root hashes from one or more block headers of the one or more blocks.

In some implementations, the method 1600 can include verifying votes at block 1620. For example, verifying votes at block 1620 can include using zero-knowledge proofs (ZKPs) to verify at least one (e.g., each) Merkle tree node is valid at block 1622 without revealing data within the Merkle tree node. That is, the ZKPs prove nodes correctly hash underlying data and the hashes of intermediate nodes are derived correctly from corresponding child node hashes. In some examples, block 1622 can include the validators 1150 applying cryptographic algorithms to confirm that the nodes of the Merkle tree correspond to legitimate votes (e.g., are linked to valid confirmation tokens and/or casting tokens). Further, block 1622 can include validating the integrity of at least one (e.g., each) vote by checking that the Merkle tree root hash corresponds to valid, unchanged hashes of leaf nodes corresponding to various votes while maintaining anonymity (e.g., without revealing the underlying data in the votes).

In some implementations, the method 1600 can include tallying votes at block 1630. For example, tallying votes at block 1630 can include performing homomorphic tallying on encrypted nodes at block 1632. Further, block 1632 can include aggregating encrypted votes and performing operations (e.g., summing the encrypted votes (additive homomorphic encryption), multiplying the encrypted values (multiplicative homomorphic encryption), etc.) to produce a final tally without decrypting any sensitive voter information. That is, homomorphic tallying can verify that the final tally is decryptable, where decryption (e.g. via a private key) reveals the total result (e.g., 10 votes for Candidate A) without revealing information about individual votes and/or voters. Additionally, block 1632 can include using zero-knowledge proofs (ZKPs) to prove the correctness of the tally without revealing individual votes. In some implementations, the method 1600 can include detecting discrepancies at block 1640. For example, block 1640 can involve detecting irregularities or inconsistencies in the vote data (e.g., altered or missing vote tokens) and triggering a re-verification process. Further, block 1640 can include comparing cryptographic hashes (e.g., corresponding to confirmation tokens) from the Merkle tree with published hashes on the public ledger to identify discrepancies. Additionally, block 1640 can include calculating cryptographic hashes of the nodes (e.g., nodes 1520, intermediary nodes 1530) and verify the hashes up to the root hash of the root node (e.g., root node 1540). Further, block 1640 can include cryptographic proofs (e.g., Merkle proofs) to verify the integrity of hashes. If a discrepancy is detected, block 1640 can direct the system to reinitiate integrity checks at block 1650 or initiate further verification of the votes at block 1620.

In some implementations, the method 1600 can include performing integrity checks at block 1650. For example, block 1650 can include confirming that no votes were altered, duplicated, or omitted at block 1652, and/or that all votes complied with election rules or voting parameters. In some examples, block 1652 can include validators 1150 scanning the cryptographic structure (e.g., the Merkle tree) to detect discrepancies, such as altered or missing hashes corresponding to confirmation tokens used to confirm casting tokens. Further, block 1652 can include verifying the authenticity of at least one (e.g., each) cast vote token by cross-referencing the tokens with previously validated cryptographic proofs, thereby confirming that at least one (e.g., each) vote is valid and unchanged. Additionally, block 1652 can include validators 1150 and/or election authority server 1130 using public keys to verify digital signatures associated with one or more tokens (e.g., casting tokens).

In some implementations, the method 1600 can include performing certification at block 1660. For example, certifying the election results at block 1660 can include generating an election certification token at block 1662. In some examples, block 1662 can include the election certification token issuance system 1156 generating a cryptographic certification token that confirms the integrity of the verified vote tally. Further, block 1662 can include signing the certification token with a digital signature and/or attaching a various metadata, such as timestamp to validate when the certification was performed and/or an identifier of the voting user or entity. In some examples, block 1662 can include performing a vote verification via vote verification system 1152 and/or a tally verification via tally verification system 1154 before generating an election certification token. In some implementations, the method 1600 can include publishing the certification token at block 1670. For example, publishing the certification token at block 1670 can include posting the election certification token on a public ledger at block 1672. Further, block 1672 can include providing access to the certification token for independent auditors and participants (e.g., validators 1150) to verify the election results and audit the integrity of the voting process. In some implementations, block 1670 can include providing the certification to one or more users or an entity responsive to receiving a request via a ledger (e.g., a ledger request).

Figure 17:
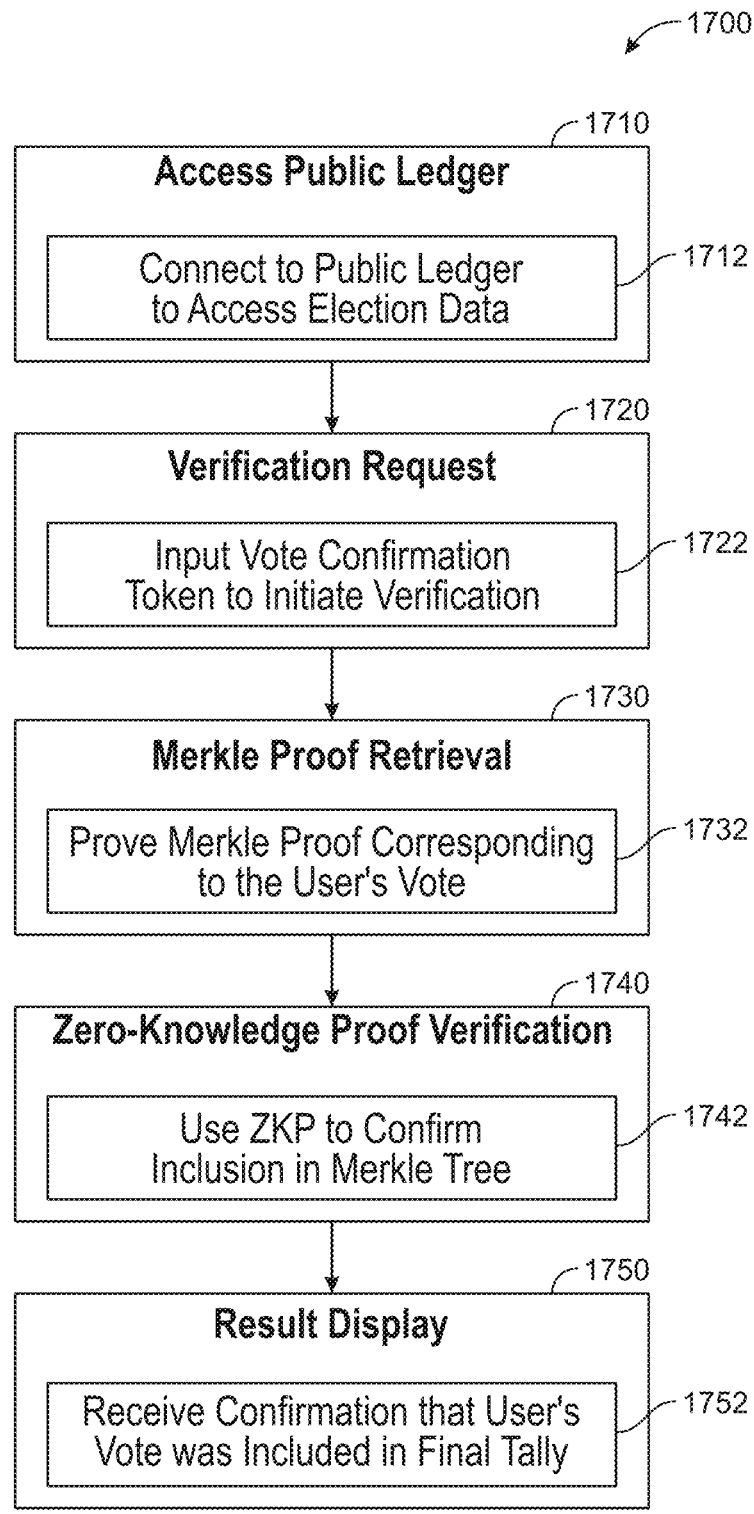
FIG. 17 depicts a flowchart for a method of protecting data, according to some implementations.

Referring now to FIG. 17, a flowchart for a method 1700 of protecting data (e.g., verifying vote inclusion) is shown, according to some implementations. In some implementations, the method 1700 can be implemented or executed by one or more components of FIG. 11 (e.g., validators 1150, public ledger/bulletin board 1160, etc.) and/or by one or more processing circuits. In various implementations, one or more steps (e.g., blocks) of method 1700 can be added, removed, repeated, omitted, rearranged, and/or reordered. Generally, method 1700 illustrates a process for voters to verify votes were included in certified results of a voting process.

In some implementations, the method 1700 can include accessing a public ledger at block 1710. For example, block 1710 can include voters 1170 connecting to public ledger/bulletin board 1160 to access election data at block 1712. In some examples, connecting to the public ledger can include the voter device 1110 or another computing device querying the public ledger to retrieve data on vote confirmation tokens or election results. In some examples, block 1712 can include retrieving the data by using secure communication protocols (e.g., SSL, TLS) to verify that election data remains guarded from attacks or other attempts to intercept the data. In some examples, block 1712 can include a computing system (e.g., voter device 1110) using public ledger/bulletin board APIs, public ledger/bulletin board wallets, and/or command line interface tools to connect to the public ledger/bulletin board 1160. In some implementations, the method 1700 can include submitting a verification request at block 1720. For example, submitting a verification request at block 1720 can include inputting a vote confirmation token to initiate verification at block 1722. In some examples, the voter device 1110 can provide the vote confirmation token to the public ledger/bulletin board 1160, or a similar distributed system, to verify whether the vote was included in the final tally. Block 1722 can include the public ledger/bulletin board 1160 initiating a lookup for the provided confirmation token and cross-referencing the confirmation token against data stored on the ledger. In some examples, block 1720 can include the public ledger/bulletin board 1160 communicating with validators 1150 to initiate verification of the vote confirmation token.

In some implementations, the method 1700 can include retrieving a Merkle proof at block 1730. For example, retrieving the Merkle proof at block 1730 can include proving the Merkle proof corresponding to the user vote at block 1732. In some examples, block 1732 can include the validators 1150 or the public ledger/bulletin board 1160 retrieving the relevant Merkle tree structure that contains the root hash linked to the user vote. Further, block 1732 can include retrieving the Merkle proof or ZKP to verify that the vote was recorded as part of the voting process and included in the tally without revealing sensitive voter information. In some examples, block 1732 can include a computing system (e.g., voting system backend 1140) combining (e.g. concatenation) the hash associated with a vote with one or more sibling hashes in the proof using a hash function and comparing the result with the root hash. In some implementations, the method 1700 can include verifying the zero-knowledge proof (ZKP) at block 1740. For example, verifying the ZKP at block 1740 can include confirming inclusion in the Merkle tree at block 1742. That is, the ZPK can confirm that a vote is part of the Merkle tree without revealing information about the vote or any information about the Merkle tree structure. Further, the ZPK can encode hash computations (e.g., combining the vote hash with the sibling hashes leads to the root hash). In some examples, block 1742 can include the ZKP generation module 1148 verifying that the ZKP corresponds to a valid vote without revealing any vote content. Block 1742 can also include validators 1150 and/or voters 1170 confirming that the users vote was accurately included in the election tally without accessing private voter details. In some implementations, the method 1700 can include displaying the results at block 1750. For example, displaying the results at block 1750 can include receiving confirmation that the user vote was included in the final tally at block 1752. In some examples, block 1752 can include the public ledger/bulletin board 1160 providing data (e.g., tokens via an interface) for the voter or other parties to verify vote inclusion. Block 1752 can include providing the voter with a certification token (e.g., responsive to a ledger request) as cryptographic proof of integrity of the voting process (e.g., that a vote was counted in the election and/or adheres to election rules). In some examples, block 1752 can include displaying a confirmation that the user vote was included in a final tally via voter device 1110.

Figure 18:
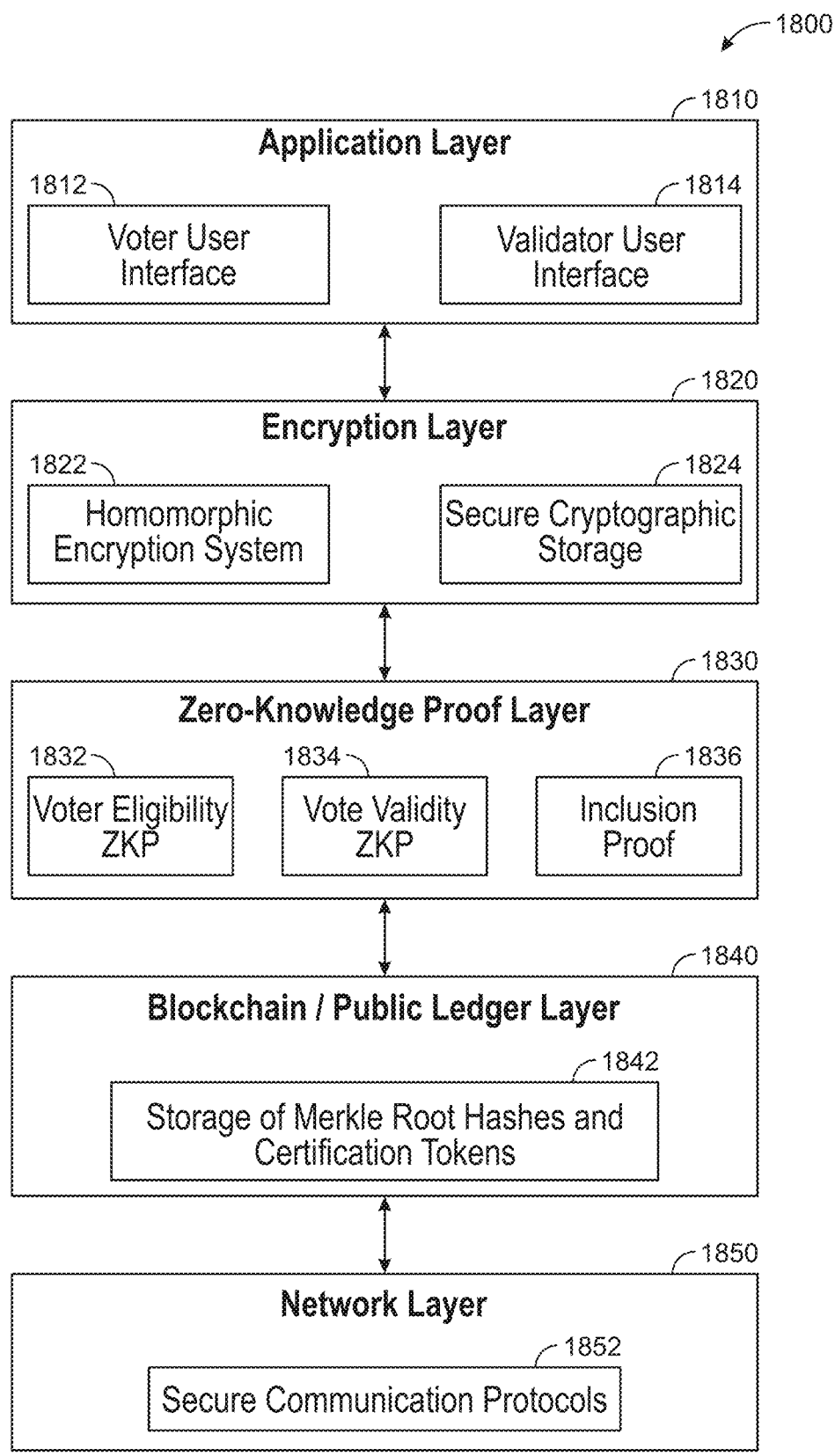
FIG. 18 depicts an architecture for data protection, according to some implementations.

Referring now to FIG. 18, a block diagram of a system 1800 for data protection is shown, according to some implementations. In some implementations, the system 1800 can include multiple layers, such as application layer 1810, encryption layer 1820, zero-knowledge proof layer 1830, blockchain/public ledger layer 1840, and network layer 1850. Generally, the layers of FIG. 18 can be configured to implement various methods or processes within a voting system and can operate in conjunction with other components to secure the integrity of votes and/or voting processes. Generally, the components of system 1800 illustrate implemented security measures and/or data flow in a voting system.

In some implementations, the application layer 1810 can include various interfaces for voter interaction. For example, voter user interface 1812 can provide an interface (e.g., GUI) or platform with various inputs and/or content for the voter to input credentials, access the voting system, and make selections. In some examples, voter user interface 1812 can receive voting data corresponding with casting a vote in response to the voter select candidates or issues. Further, validators (e.g., verifiers) can use validator user interface 1814 to access the voting system. For example, the validators 1150 can use the validator user interface 1814 to verify the results of an election.

In some implementations, the encryption layer 1820 can execute or manage cryptographic processes for securing the voting data. For example, homomorphic encryption system 1822 can apply encryption techniques that allow computations on encrypted vote data without revealing the actual votes. That is, the homomorphic encryption system 1822 can encrypt votes and provide the votes for aggregation (e.g., for tallying) while maintaining anonymity. Further, secure cryptographic storage 1824 can receive and store encrypted data, such as vote records and/or tokens. In some implementations, the zero-knowledge proof layer 1830 can generate and validate cryptographic proofs to verify the integrity of the voting process. For example, voter eligibility ZKP 1832 can validate an eligibility of a voter to participate in the voting process without exposing personal information of the voter. In another example, vote validity ZKP 1834 can correspond with a confirmation token confirming the receipt of the cast vote without exposing information associated with the confirmation token. Additionally, inclusion proof 1836 can validate or demonstrate that a particular vote has been correctly included in the final vote tally without exposing information associated with the particular vote. Further, a confirmation ZPK can verify the legitimacy of multiple cast votes and/or confirm that no votes have been altered or tampered with (e.g., by scanning tree structure 1500) without exposing information associated with the cast votes.

In some implementations, the blockchain/public ledger layer 1840 can store cryptographic records related to the voting process. For example, the blockchain/public ledger layer 1840 can store Merkle root hashes and certification tokens 1842 to provide cryptographic evidence that at least one (e.g., each) vote was properly recorded and verified. In some examples, the stored hashes and certification tokens 1842 can be used by auditors, voter, or other stakeholders. For example, the Merkle root hashes and confirmation tokens can be stored in secure cryptographic storage 1824. In some implementations, the network layer 1850 can facilitate secure communications between the different layers of the system 1800. For example, secure communication protocols 1852 can transmit data between components such as the voter user interface 1812, homomorphic encryption system 1822, and blockchain/public ledger layer 1840. In some examples, secure communication protocols 1852 can include encryption technologies such as Transport Layer Security (TLS) or Secure Sockets Layer (SSL) to protect data (e.g., tokens) in transit between various elements of a voting system.

Figure 19:
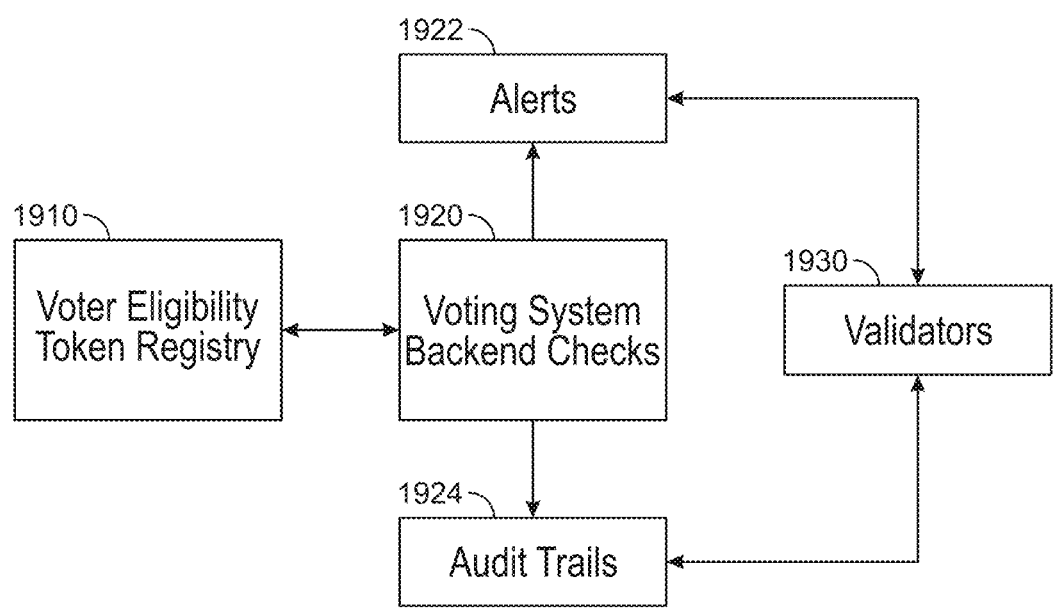
FIG. 19 depicts an architecture for data protection, according to some implementations.

Referring now to FIG. 19, a block diagram of a system 1900 for data protection (e.g., performing checks in a voting system) is shown, according to some implementations. In some implementations, system 1900 can include one or more components, such as a voter eligibility token registry 1910, a voting system backend 1920, an alerts system 1922, audit trails 1924, and validators 1930. The components of system 1900 can operate together to monitor the integrity of voting data and identify potential irregularities during the voting process. Generally, the components of system 1900 illustrate mechanisms to detect a lack of adherence to voting rules (e.g., double voting) and/or to detect fraudulent activities.

In some implementations, voter eligibility token registry 1910 can store eligibility tokens associated with voters or entities. For example, voter eligibility token registry 1910 can maintain cryptographic tokens that confirm or verify whether an individual or entity is eligible to participate in a voting process. In one example, voter eligibility token registry 1910 can generate cryptographic proof for the voting system backend 1920, confirming that a valid token was used during the voter registration process. Additionally, voter eligibility token registry 1910 can store tokens linked to multi-factor authentication data for authenticating voters in the voting process. In some examples, voter eligibility token registry 1910 can communicate with voting system backend 1920 to authenticate and/or verify information associated with eligibility tokens. For example, voting system backend can verify that an eligibility token is associated with one voter. In some examples, voting system backend 1920 can revoke eligibility tokens from voters if voters are no longer eligible and/or qualified to vote.

In some implementations, the voting system backend 1920 can include the same or similar features and/or functionality as described regarding the voting system backend 1140 described in FIG. 11. For example, voting system backend 1920 can monitor the status of cast votes and associated tokens and/or validate the tokens with data stored in voter eligibility token registry 1910 to verify proper vote recording. In one example, voting system backend 1920 can perform cryptographic operations to confirm vote integrity (e.g., by comparing stored casting tokens with confirmation tokens, by verifying ZKPs corresponding to inclusion tokens, etc.). In another example, voting system backend 1920 can generate or derive a root hash from a Merkle tree of cast votes and verify system consistency based on determining the root hash is properly derived from votes to be included in a voting process. In some implementations, alerts system 1922 can generate notifications based on the results of backend checks. For example, alerts system 1922 can generate or provide an alert to voters responsive to detecting a discrepancy or irregularity during the voting process, such as tampered votes or missing tokens. In one example, alerts system 1922 can trigger an alert to a user or entity when a certain percentage of casting tokens do not match corresponding confirmation tokens, or based various additional standards, thresholds, or parameters. In another example, alerts system 1922 can detect suspicious activity, such as duplicate tokens (e.g., double votes or double voting) or altered timestamps in vote records, and flag the errors for review via generated alerts. In another example, alerts system 1922 can provide alerts to voters if over voting system backend 1920 determines that voters are ineligible to vote.

In some implementations, audit trails 1924 can store records corresponding to the results of backend checks and alerts. For example, audit trails 1924 can log token verification checks and flag any detected discrepancies. In one example, audit trails 1924 can maintain a cryptographic ledger that tracks at least one (e.g., each) stage of the voting process and facilitates validators 1930 or third parties tracing vote validation back to voter eligibility tokens (e.g., via voter eligibility token registry 1910. In another example, audit trails 1924 can generate time-stamped records of token verification activities, including vote confirmations and rejections, to provide election officials with an audit trail. In some implementations, validators 1930 can verify the integrity of the voting process by reviewing backend checks and audit trails 1924. For example, validators 1930 can review audit trails 1924 to confirm votes are accurately counted and included in the final tally. In one example, validators 1930 can compare audit trail entries to the Merkle root hash from voting system backend 1920 to verify no vote alterations occurred. In another example, validators 1930 can apply a zero-knowledge proof model or system to audit trails 1924 to validate vote legitimacy while maintaining vote anonymity.

In some implementations, to prevent double voting while preserving voter privacy, a privacy-preserving nullifier token (e.g., spent flag) can be implemented in coordination with voter eligibility token registry 1910. For example, when a ballot is cast, a voter device can generate a zero-knowledge proof attesting to a valid eligibility credential recorded in voter eligibility token registry 1910. Within the zero-knowledge proof, the voter device can deterministically derive a nullifier from the valid eligibility credential using a one-way function or other cryptographic commitment method. The nullifier can uniquely correspond to the credential while preventing use of the nullifier to recover the credential or identify the voter. The zero-knowledge proof can reveal a cryptographic commitment to the nullifier (e.g., a hash of the nullifier) to voting system backend 1920. The voting system backend 1920 can query the voter eligibility token registry 1910 to determine whether the nullifier commitment appears in a record of previously used (e.g., spent) nullifiers. If the nullifier commitment is not present in the record, voter eligibility token registry 1910 can update the spent flag to mark a spent state and proceed with the corresponding vote. If the nullifier commitment is present (e.g., the spent state is marked), the vote can be rejected as a duplicate. In some examples, validators 1930 can perform independent checks on the spent-nullifier record maintained by voter eligibility token registry 1910 to verify that an eligibility credential has been used no more than once, and audit trails 1924 can log each nullifier commitment, the spent status, and a corresponding verification outcome to provide an evidence trail for post-election review.

Figure 20:
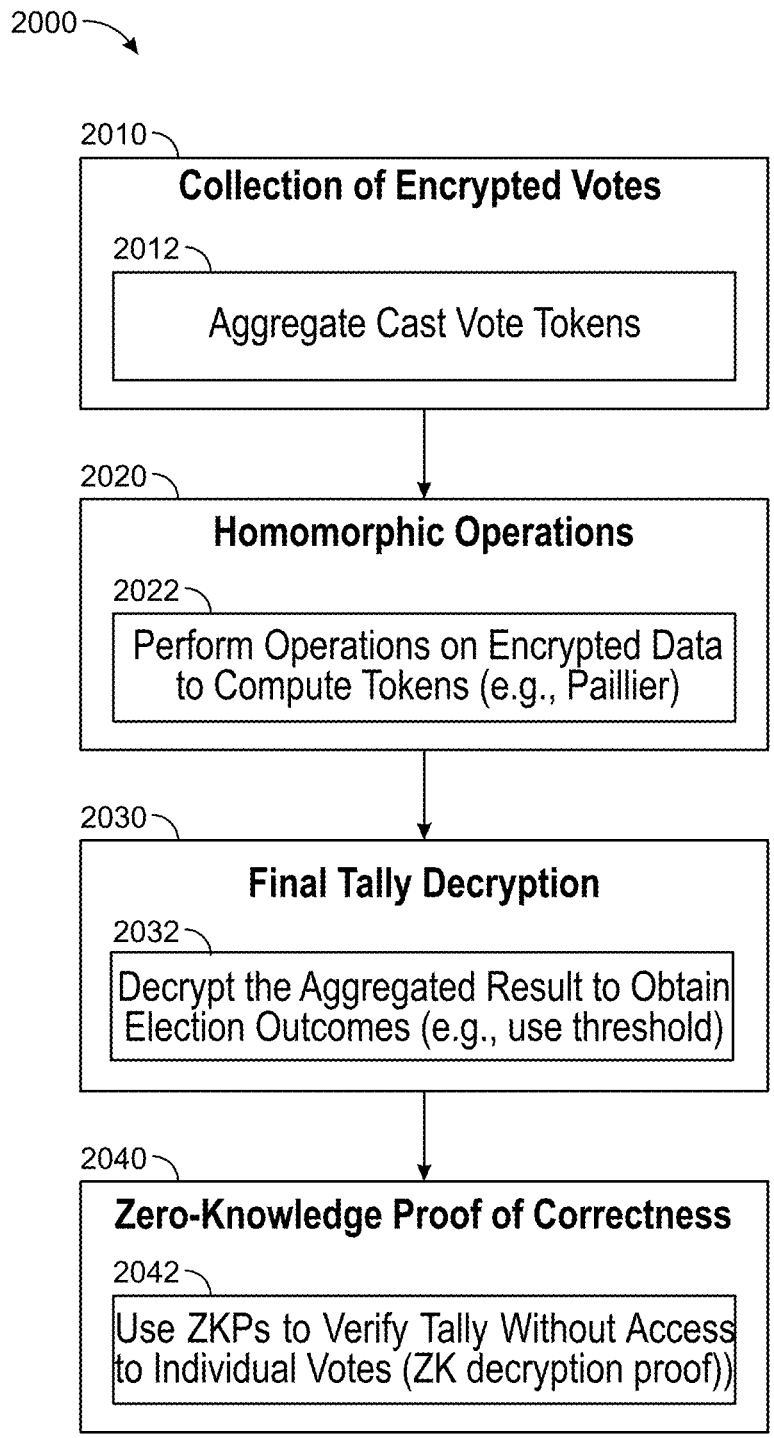
FIG. 20 depicts a flowchart for a method of protecting data, according to some implementations.

Referring now to FIG. 20, a flowchart for a method 2000 of protecting data is shown, according to some implementations. In some implementations, the method 2000 can be implemented or executed by one or more components of FIG. 11 (e.g., voting system backend 1140, validators 1150, etc.) and/or by one or more processing circuits. In various implementations, one or more steps (e.g., blocks) of method 2000 can be added, removed, repeated, omitted, rearranged, and/or reordered. Generally, method 2000 can illustrate a process for homomorphically tallying encrypted votes without decryption.

In some implementations, the method 2000 can include collecting encrypted votes at block 2010. For example, collecting encrypted votes at block 2010 can include aggregating cast vote tokens at block 2012. In some examples, block 2012 can include collecting cast vote tokens from multiple voter devices 1110, where at least one (e.g., each) cast vote token includes encrypted data corresponding to voting selections (e.g., candidates, issues, etc.). Further, block 2012 can include storing the aggregated cast vote tokens in the voting system backend 1140 for processing during the vote tallying phase or in a subsequent vote-verification process. In some implementations, the method 2000 can include performing homomorphic operations at block 2020. For example, performing homomorphic operations at block 2020 can include performing operations on encrypted data to compute tokens at block 2022. In some examples, block 2022 can include the homomorphic encryption engine 1144 of the voting system backend 1140 performing mathematical operations directly on the encrypted votes without decrypting them (e.g., deriving a root hash of a tree structure and verifying that data corresponding to at least one (e.g., each) vote to be included in a vote count is represented in the tree structure). For example, block 2022 can include summing or counting the votes while preserving the privacy of voter selections. In some examples, block 2022 can include using a homomorphic encryption scheme (e.g., an additive scheme such as Paillier) such that the encrypted votes are combined into an aggregated encrypted tally result without decrypting individual ballots.

In some implementations, the method 2000 can include performing final tally decryption at block 2030. For example, final tally decryption at block 2030 can include decrypting the aggregated result to obtain election outcomes at block 2032. In some examples, block 2032 can include the voting system backend 1140 decrypting the results of the homomorphic operations to reveal the final vote tally. Further, block 2032 can include applying cryptographic keys, such as private decryption keys (e.g., private keys generated by public key infrastructure (PKI) 1136), to obtain the total count of votes for at least one (e.g., each) candidate or issue without compromising the privacy of individual votes. In some examples, block 2032 can include performing final tally decryption using a threshold-based decryption protocol. For example, multiple election trustees can hold a share of a private decryption key, individual trustees can produce partial decryptions, and the final result can be provided if partial decryptions from quorum or threshold number of trustees are provided.

In some implementations, the method 2000 can include verifying the tally and providing a zero-knowledge proof (ZKP) of correctness at block 2040. For example, verifying the tally at block 2040 can include using ZKPs to verify the tally without accessing individual votes at block 2042. Further, block 2042 can include validators 1150 using the generated ZKPs to audit voting results and verify the integrity of a voting process or election. In some examples, block 2042 can include tally verification system 1154 verifying the tally of the decrypted voting results. In some examples, block 2042 can include the ZKP generation module 1148 generating cryptographic proofs that confirm the correctness of the tally while guarding or protecting private voter data and/or specific vote details. For example, block 2042 can include generate a zero-knowledge proof or decryption or correctness corresponding to the integrity of the vote count or overall voting process.

Figure 21:
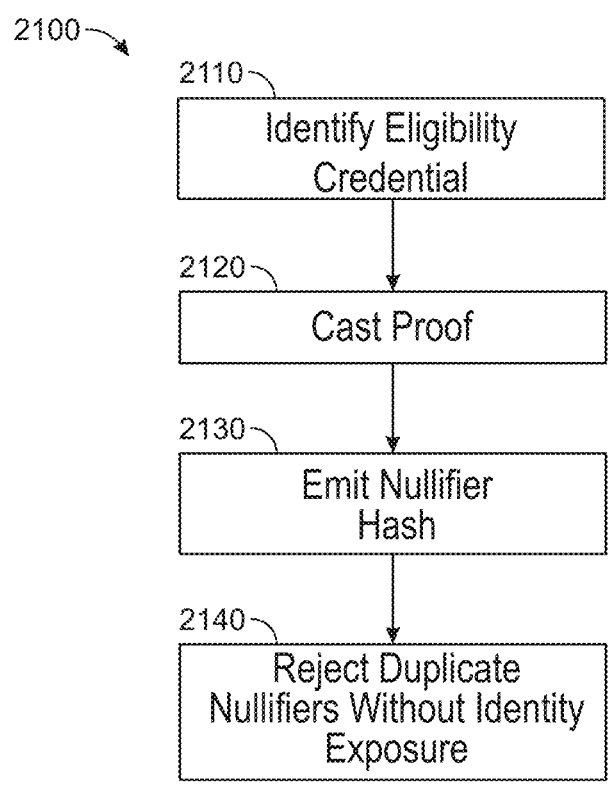
FIG. 21 depicts a flowchart for a method of protecting data, according to some implementations.

Referring now to FIG. 21, a flowchart for a method 2100 of protecting data (e.g., using nullifiers) is shown, according to some implementations. In some implementations, the method 2100 can be implemented or executed by one or more components of FIG. 11 (e.g., voting system backend 1140, validators 1150, etc.) and/or by one or more processing circuits. In various implementations, one or more steps (e.g., blocks) of method 2100 can be added, removed, repeated, omitted, rearranged, and/or reordered. Generally, method 2100 illustrates a process in which a voter proves eligibility, a nullifier is generated and submitted without revealing voter identity, and the backend detects and rejects duplicate nullifiers before tallying.

In some implementations, the method 2100 can include identifying and/or otherwise obtaining an eligibility credential at block 2110. For example, block 2110 can include the voter device 1110 retrieving a valid eligibility token issued by the election authority server 1130 or a plurality of eligibility authorities. In some examples, block 2110 can include verifying, using the proof model, that the eligibility token satisfies jurisdictional rules without revealing underlying voter attributes. For example, the eligibility credential can be stored in a secure element of the voter device 1110 and retrieved when preparing to cast a ballot. In some implementations, the method 2100 can include casting, generating, receiving, and/or otherwise identifying or providing a proof at block 2120. For example, block 2120 can include the voter device 1110 generating a zero-knowledge proof attesting control over a valid eligibility credential, without revealing the credential itself or any identity information, and embedding within the proof a cryptographic nullifier value deterministically derived from the credential. In some examples, the nullifier can be computed inside the ZKP such that the nullifier is unlinkable to any voter identity yet remains constant for the corresponding credential. Block 2120 can include the voting system backend 1140 receiving the proof (including the embedded nullifier) cast or submitted by the voter device 1110 (e.g., as part of a casting token).

In some implementations, the method 2100 can include emitting, generating, receiving, or otherwise obtaining or providing a nullifier hash at block 2130. For example, block 2130 can include the outputting, as part of the proof verification process, a one-way cryptographic hash of the embedded nullifier. In some examples, the nullifier hash can be generated using a secure hash algorithm (e.g., SHA-256, Keccak-256) such that the resulting value cannot be reversed to reveal the underlying nullifier or eligibility credential and is unlinkable to any user identity or voting preference. In some implementations, the nullifier hash can be transmitted from the voter device 1110 to the voting system backend 1140 during casting token submission. Additionally, the voting system backend 1140 and/or the Merkle tree construction module 1146 can store the nullifier hash in tamper-resistant storage and/or as part of a leaf node in a Merkle tree to support subsequent verification, auditing, or inclusion proof generation.

In some implementations, the method 2100 can include rejecting duplicate nullifiers without identity exposure at block 2140. For example, block 2140 can include the voting system backend 1140 comparing the received nullifier hash against a secure registry or database of previously recorded (e.g., spent) nullifier hashes. If a match is found, indicating an attempted reuse of the same eligibility credential (e.g., a duplicate casting token submission, replay attempt, or double-voting), the voting system backend 1140 rejects the associated vote prior to tally inclusion. In some examples, the duplicate-detection process is performed without disclosing voter identity or revealing the link between the nullifier and any specific ballot content. In further examples, revoting functionality can be supported by defining a revoting window during which a last-valid nullifier is accepted and any earlier nullifiers from the same credential are marked as revoked. Additionally, validators 1150 can audit the nullifier registry to confirm that no rejected nullifiers were improperly counted and that valid, non-duplicate nullifiers were included in the final certified tally.

Configuration of Exemplary Implementations

While this specification contains many specific implementation details, these should not be construed as limitations on the scope of any implementations or of what can be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a sub combination or variation of a sub combination.

Additionally, features described with respect to particular headings can be utilized with respect to and/or in combination with illustrative implementation described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations, implementations, illustrative implementations, it is apparent that the foregoing is illustrative and not limiting, having been presented by way of example. In particular, although many of the examples presented herein involve specific combinations of method acts or system elements, those acts, and those elements can be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "including" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In some implementations, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the implementations disclosed herein.

References to "or" can be construed as inclusive so that any terms described using "or" can indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein can be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A data protection system for protecting data, the data protection system comprising:
one or more processing circuits comprising memory and at least one processor configured to:
register an entity or user for voting based on issuing at least one eligibility token corresponding with the entity or user;
receive, responsive to registering the entity or user, at least one casting token comprising a vote of the entity or user and at least one confirmation token comprising a cryptographic proof of receipt of the at least one casting token;
encrypt, responsive to receiving the at least one confirmation token, the vote of the entity or user for inclusion in a vote count;
verify the at least one casting token using a proof model and the at least one confirmation token, wherein verifying comprises generating at least one inclusion token comprising a cryptographic proof of inclusion of the at least one casting token in the vote count, wherein verifying comprises generating a nullifier or a cryptographic duplicate-prevention value for the at least one casting token to reject any subsequently received casting token including the nullifier or the cryptographic duplicate-prevention value;
perform batch or arsenate verification of a plurality of the at least one casting token or a plurality of the at least one inclusion token to output a proof verifying correctness;
generate a zero-knowledge proof indicating integrity of the vote count; and
issue at least one certification token comprising the zero-knowledge proof of the integrity of the vote count.

2. The data protection system of claim 1, the at least one processor configured to:
apply threshold decryption to a homomorphically aggregated vote count;
provide the at least one confirmation token or the at least one inclusion token to prove inclusion of the vote of the entity or user in the vote count without proving a specific selection;
delay or relay submission of the at least one casting token to cause an expansion of an anonymity set and reduction in metadata linkage;
process a plurality of the at least one casting token from the entity or user within a revoting window by accepting a last-valid nullifier; and
verify, using the proof model, the at least one eligibility ted issued by a plurality of eligibility authorities and combined in zero-knowledge to satisfy jurisdictional voting rules.

3. The data protection system of claim 1, the at least one processor configured to:
store a hash of the at least one confirmation token in a tree data structure of a voting system, the tree data structure comprising hashes of confirmation tokens corresponding with a plurality of casting tokens of a plurality of entities or users;
verify the at least one casting token and the plurality of casting tokens based on analyzing the tree data structure, wherein analyzing comprises determining a root node of the tree data structure is derived from the hash of the at least one confirmation token and the hashes of the confirmation tokens of the plurality of entities or users; and
issue the at least one certification token based on verifying the at least one casting token and the plurality of casting tokens.

4. The data protection system of claim 1, the at least one processor configured to:
store the at least one certification token on a distributed ledger; and
validate, responsive to receiving a ledger request, the vote count based on providing the at least one certification token as the cryptographic proof of the integrity of the vote count.

5. The data protection system of claim 1, the at least one processor configured to:
cause the proof model to output the at least one confirmation token based on verifying the at least one casting token, wherein an input corresponding with the at least one casting token is applied as input to the proof model to confirm the vote of the entity or user while maintaining anonymity of all or a portion of data corresponding with the vote.

6. The data protection system of claim 5, wherein the proof model maintains anonymity of the entity or user after issuing the at least one certification token based on verifying the at least one casting token while preventing disclosure of a name or identifier corresponding to the entity or user.

7. The data protection system of claim 1, the at least one processor configured to:
provide the at least one confirmation token to a first wallet of the entity or user as proof of the entity casting the vote;
provide the at least one inclusion token to the first wallet of the user or entity as proof of the inclusion of the vote in the vote count; and
provide the at least one certification token to a second wallet of one or more non-voting entities or users as proof of voting integrity.

8. A method for protecting data, comprising:
registering, by one or more processing circuits, an entity or user for voting based on issuing at least one eligibility token corresponding with the entity or user;
receiving, by the one or more processing circuits and responsive to registering the entity or user, at least one casting token comprising a vote of the entity or user and at least one confirmation token comprising a cryptographic proof of receipt of the at least one casting token;
encrypting, by the one or more processing circuits, the vote of the entity or user for inclusion in a vote count;
verifying, by the one or more processing circuits, the at least one casting token using a proof model and the at least one confirmation token, wherein verifying comprises generating at least one inclusion token comprising a cryptographic proof of inclusion of the vote in the vote count, wherein verifying comprises generating a nullifier or a cryptographic duplicate-prevention value for the at least one casting token to reject any subsequently received casting token including the nullifier or the cryptographic duplicate-prevention value;
performing, by the one or more processing circuits, batch or arsenate verification of a plurality of the at least one casting token or a plurality of the at least one inclusion token to output a proof verifying correctness;
generating, by the one or more processing circuits, a zero-knowledge proof indicating integrity of the vote count; and
issuing, by the one or more processing circuits, at least one certification token comprising the zero-knowledge proof of the integrity of the vote count.

9. The method of claim 8, further comprising at least one of:
applying, by the one or more processing circuits, threshold decryption to a homomorphically aggregated vote count;
providing, by the one or more processing circuits, the at least one confirmation token or the at least one inclusion token to prove inclusion of the vote of the entity or user in the vote count without proving a specific selection;
delaying or relaying, by the one or more processing circuits, submission of the at least one casting token to cause an expansion of an anonymity set and reduction in metadata linkage;
processing, by the one or more processing circuits, a plurality of the at least one casting token from the entity or user within a revoting window by accepting a last-valid nullifier; or
verifying, by the one or more processing circuits, using the proof model, the at least one eligibility token is jointly issued by a plurality of eligibility authorities and combined in zero-knowledge to satisfy jurisdictional voting rules.

10. The method of claim 8, further comprising:
storing, by the one or more processing circuits, a hash of the at least one confirmation token in a tree data structure of a voting system, the tree data structure comprising hashes of confirmation tokens corresponding with a plurality of casting tokens of a plurality of entities or users;
verifying, by the one or more processing circuits, the at least one casting token and the plurality of casting tokens based on analyzing the tree data structure, wherein analyzing comprises determining a root node of the tree data structure is derived from the hash of the at least one confirmation token and the hashes of the confirmation tokens of the plurality of entities or users; and
issuing, by the one or more processing circuits, the at least one certification token based on verifying the at least one casting token and the plurality of casting tokens.

11. The method of claim 8, further comprising:
storing, by the one or more processing circuits, the at least one certification token on a distributed ledger; and
validating, by the one or more processing circuits and responsive to receiving a ledger request, the vote count based on providing the at least one certification token as the cryptographic proof of the integrity of the vote count.

12. The method of claim 8, further comprising:
causing, by the one or more processing circuits, the proof model to output the at least one inclusion token based on verifying the at least one casting token, wherein an input corresponding with the at least one casting token is applied as input to the proof model to confirm the vote of the entity or user while maintaining anonymity of all or a portion of data corresponding with the vote.

13. The method of claim 12, wherein the proof model maintains anonymity of the entity or user after issuing the at least one certification token based on verifying the at least one casting token while preventing disclosure of a name or identifier corresponding to the entity or user.

14. The method of claim 8, further comprising:
providing, by the one or more processing circuits, the at least one confirmation token to a first wallet of the entity or user as proof of the entity casting the vote;
providing, by the one or more processing circuits, the at least one inclusion token to the first wallet of the user or entity as proof of the inclusion of the vote in the vote count; and
providing, by the one or more processing circuits, the at least one certification token to a second wallet of one or more non-voting entities or users as proof of voting integrity.

15. A non-transitory computer-readable medium (CRM) comprising one or more instructions executable by one or more processing circuits to:

register an entity or user for voting based on issuing at least one eligibility token corresponding with the entity or user;

receive, responsive to registering the entity or user, at least one casting token comprising a vote of the entity or user and at least one confirmation token comprising a cryptographic proof of receipt of the at least one casting token;

encrypt the vote of the entity or user for inclusion in a vote count;

verify the at least one casting token using a proof model and the at least one confirmation token, wherein verifying comprises generating at least one inclusion token comprising a cryptographic proof of inclusion of the vote in the vote count, wherein verifying comprises generating a nullifier or a cryptographic duplicate-prevention value for the at least one casting token to reject any subsequently received casting token including the nullifier or the cryptographic duplicate-prevention value;

perform batch or aggregated verification of a plurality of the at least one casting token or a plurality of the at least one inclusion token to output a proof verifying correctness;

generate a zero-knowledge proof indicating integrity of the vote count; and issue at least one certification token comprising the zero-knowledge proof of the integrity of the vote count.

16. The non-transitory CRM of claim 15, the one or more instructions causing the one or more processing circuits to:
apply threshold decryption to a homomorphically aggregated vote count;
provide the at least one confirmation token or the at least one inclusion token to prove inclusion of the vote of the entity or user in the vote count without proving a specific selection;
delay or relay submission of the at least one casting token to cause an expansion of an anonymity set and reduction in metadata linkage;
process a plurality of the at least one casting token from the entity or user within a revoting window by accepting a last-valid nullifier; and
verify, using the proof model, the at least one eligibility token is jointly issued by a plurality of eligibility authorities and combined in zero-knowledge to satisfy jurisdictional voting rules.

17. The non-transitory CRM of claim 15, the one or more instructions causing the one or more processing circuits to:
store a hash of the at least one confirmation token in a tree data structure of a voting system, the tree data structure comprising hashes of confirmation tokens corresponding with a plurality of casting tokens of a plurality of entities or users;
verify the at least one casting token and the plurality of casting tokens based on analyzing the tree data structure, wherein analyzing comprises determining a root node of the tree data structure is derived from the hash of the at least one confirmation token and the hashes of the confirmation tokens of the plurality of entities or users; and
issue the at least one certification token based on verifying the at least one casting token and the plurality of casting tokens.

18. The non-transitory CRM of claim 15, the one or more instructions causing the one or more processing circuits to:
store the at least one certification token on a distributed ledger; and
validate, responsive to receiving a ledger request, the vote count based on providing the at least one certification token as the cryptographic proof of the integrity of the vote count.

19. The non-transitory CRM of claim 15, the one or more instructions causing the one or more processing circuits to:
cause the proof model to output the at least one confirmation token based on confirming the vote of the entity or user, wherein an input corresponding with the at least one casting token is applied as input to the proof model to confirm the vote of the entity or user while maintaining anonymity of all or a portion of data corresponding with the vote.

20. The non-transitory CRM of claim 19, wherein the proof model maintains anonymity of the entity or user after issuing the at least one certification token based on verifying the at least one casting token while preventing disclosure of a name or identifier corresponding to the entity or user.

* * * * *